United States Patent
Vacca et al.

(10) Patent No.: US 12,479,818 B2
(45) Date of Patent: *Nov. 25, 2025

(54) TREATMENT OF FIBROSIS WITH IRE1 SMALL MOLECULE INHIBITORS

(71) Applicant: Cornell University, Ithaca, NY (US)

(72) Inventors: Joseph P. Vacca, Telford, PA (US); Dansu Li, Warrington, PA (US); Sarah Elizabeth Bettigole, New York, NY (US)

(73) Assignee: Cornell University, Ithaca, NY (US)

( * ) Notice: Subject to any disclaimer, the term of this patent is extended or adjusted under 35 U.S.C. 154(b) by 795 days.

This patent is subject to a terminal disclaimer.

(21) Appl. No.: 17/611,544

(22) PCT Filed: May 15, 2020

(86) PCT No.: PCT/US2020/033259
§ 371 (c)(1),
(2) Date: Nov. 15, 2021

(87) PCT Pub. No.: WO2020/232403
PCT Pub. Date: Nov. 19, 2020

(65) Prior Publication Data
US 2022/0227730 A1    Jul. 21, 2022

Related U.S. Application Data

(60) Provisional application No. 62/848,327, filed on May 15, 2019.

(51) Int. Cl.
*C07D 401/04* (2006.01)
*A61K 45/06* (2006.01)

(52) U.S. Cl.
CPC ............ *C07D 401/04* (2013.01); *A61K 45/06* (2013.01)

(58) Field of Classification Search
None
See application file for complete search history.

(56) References Cited

U.S. PATENT DOCUMENTS

| | | | |
|---|---|---|---|
| 9,382,230 B2 | 7/2016 | Walter et al. | |
| 11,021,466 B2 * | 6/2021 | Vacca | C07D 401/12 |
| 11,649,224 B2 * | 5/2023 | Vacca | C07D 401/04 |
| | | | 514/314 |
| 12,071,426 B2 * | 8/2024 | Vacca | A61P 35/00 |
| 2018/0265497 A1 | 9/2018 | Braun et al. | |
| 2018/0346446 A1 | 12/2018 | Vacca et al. | |

(Continued)

FOREIGN PATENT DOCUMENTS

| | | | | |
|---|---|---|---|---|
| WO | WO-2018222918 A1 * | 12/2018 | ......... | A61K 31/517 |
| WO | WO-2020232403 A1 | 11/2020 | | |

OTHER PUBLICATIONS

Thamsen et al., PLoS One. Jan. 9, 2019;14(1) (Year: 2019).*

(Continued)

*Primary Examiner* — Jeffrey S Lundgren
*Assistant Examiner* — Anthony Joseph Seitz
(74) *Attorney, Agent, or Firm* — Schwegman Lundberg & Woessner, P.A.

(57) ABSTRACT

Provided herein are methods of using IRE1 small molecule inhibitors in combination therapies for treating fibrosis in a subject. The IRE1 small molecule inhibitors described herein may be used in combination therapies for treating fibrosis.

20 Claims, 7 Drawing Sheets

(56) References Cited

U.S. PATENT DOCUMENTS

2019/0084989 A1 3/2019 Backes et al.
2024/0287004 A1* 8/2024 Vacca .................. C07D 403/06

OTHER PUBLICATIONS

Brown, N. (2012). Bioisosteres in Medicinal Chemistry. John Wiley & Sons (Year: 2012).*
"International Application Serial No. PCT/US2020/033259, International Search Report mailed Sep. 30, 2020", 4 pgs.
"International Application Serial No. PCT/US2020/033259, Invitation to Pay Additional Fees and Partial Search Report mailed Aug. 4, 2020", 2 pgs.
"International Application Serial No. PCT/US2020/033259, Written Opinion mailed Sep. 30, 2020", 6 pgs.
Thamsen, et al., "Small molecule inhibition of IRE1alpha kinase/RNase has anti-fibrotic effects in the lung", Plos One vol. 14, (Jan. 9, 2019), 1-14.
"International Application Serial No. PCT/US2020/033259, International Preliminary Report on Patentability mailed Nov. 25, 2021", 8 pgs.

* cited by examiner

TREATMENT OF FIBROSIS WITH IRE1 SMALL MOLECULE INHIBITORS

PRIORITY INFORMATION

This application is a U.S. national stage filing under 35 U.S.C. § 371 from International Application No. PCT/US2020/033259, filed on May 15, 2020, and published as WO20201232403 A1 on Nov. 19, 2020, which claims benefit of priority to the filing date of U.S. Provisional Application Ser. No. 62/848,327, filed May 15, 2019, the contents of which applications are specifically incorporated by reference herein in their entireties.

BACKGROUND

Fibrosis is a constellation of diseases marked by formation of excess fibrous connective tissue in an organ or tissue. Fibrotic scarring can interfere with normal function of the affected organ or tissue. Current clinical therapies do not adequately treat the conditions. There exists a need for improved methods and compositions to treat fibrotic diseases.

BRIEF SUMMARY

The disclosure relates to a method for treating fibrosis in a subject, the method comprising administering to the subject an effective amount of a compound of Formula (I) or a compound from Table 1, or a pharmaceutically acceptable salt thereof, or a solvate thereof. The method can comprise administering an effective amount of a second therapeutic agent.

The compound of the disclosure can selectively bind to at least one amino acid residue of an IRE1 family protein comprising a kinase domain and/or an RNase domain.

Provided herein is a compound of Formula (I), or a pharmaceutically acceptable salt, or solvate thereof:

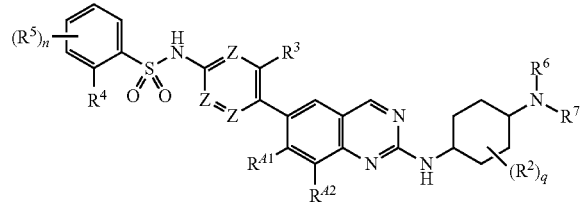

Formula (I)

wherein
each Z is independently N or $CR^1$, provided that at least one Z is N;
each $R^1$ is independently H, halogen, —CN, —$OR^8$, —$SR^8$, —S(=O)$R^9$, —S(=O)$_2R^9$, —S(=O)$_2N(R^8)_2$, —$NR^8S(=O)_2R^9$, —C(=O)$R^9$, —OC(=O)$R^9$, —C(=O)$OR^8$, —OC(=O)$OR^9$, —N($R^8$)$_2$, —OC(=O)N($R^8$)$_2$, —$NR^8C(=O)R^9$, —$NR^8C(=O)OR^9$, optionally substituted $C_1$-$C_4$alkyl, optionally substituted $C_1$-$C_4$fluoroalkyl, optionally substituted $C_1$-$C_4$heteroalkyl, optionally substituted $C_3$-$C_6$cycloalkyl, optionally substituted aryl, or optionally substituted heteroaryl;
$R^3$ is —CN, —$OR^8$, —$SR^8$, optionally substituted $C_1$-$C_4$alkyl, optionally substituted $C_1$-$C_4$fluoroalkyl, optionally substituted —O—$C_1$-$C_4$alkyl, optionally substituted $C_1$-$C_4$heteroalkyl, optionally substituted $C_3$-$C_6$cycloalkyl, optionally substituted —O—$C_3$-$C_6$cycloalkyl, optionally substituted $C_3$-$C_6$heterocycloalkyl, optionally substituted —O—$C_3$-$C_6$heterocycloalkyl, optionally substituted aryl, or optionally substituted heteroaryl;
$R^4$ is halogen, —CN, —$OR^8$, optionally substituted $C_1$-$C_4$alkyl, optionally substituted $C_1$-$C_4$fluoroalkyl, or optionally substituted $C_1$-$C_4$heteroalkyl;
each $R^5$ is independently halogen, —CN, —$OR^8$, —$SR^8$, —N($R^8$)$_2$, optionally substituted $C_1$-$C_4$alkyl, optionally substituted $C_1$-$C_4$fluoroalkyl, optionally substituted $C_1$-$C_4$heteroalkyl, optionally substituted $C_3$-$C_6$cycloalkyl, optionally substituted $C_2$-$C_{10}$heterocycloalkyl, optionally substituted aryl, or optionally substituted heteroaryl;
each $R^2$ is independently halogen, —CN, —$OR^8$, —$SR^8$, —S(=O)$R^9$, —S(=O)$_2R^9$, —S(=O)$_2N(R^8)_2$, —$NR'S(=O)_2R^9$, —C(=O)$R^9$, —OC(=O)$R^9$, —C(=O)$OR^8$, —OC(=O)$OR^9$, —N($R^8$)$_2$, —OC(=O)N($R^8$)$_2$, —$NR^8C(=O)R^9$, —$NR^8C(=O)OR^9$, optionally substituted $C_1$-$C_4$alkyl, optionally substituted $C_1$-$C_4$fluoroalkyl, optionally substituted $C_1$-$C_4$heteroalkyl, optionally substituted $C_3$-$C_6$cycloalkyl, optionally substituted aryl, or optionally substituted heteroaryl;
$R^6$ is H, optionally substituted $C_1$-$C_4$alkyl, optionally substituted $C_1$-$C_4$heteroalkyl, optionally substituted $C_1$-$C_4$fluoroalkyl, optionally substituted $C_3$-$C_6$cycloalkyl, optionally substituted $C_3$-$C_6$cycloalkylalkyl, optionally substituted $C_2$-$C_{10}$heterocycloalkyl, optionally substituted aryl, or optionally substituted heteroaryl;
$R^7$ is optionally substituted $C_1$-$C_4$alkyl, optionally substituted $C_1$-$C_4$heteroalkyl, optionally substituted $C_1$-$C_4$fluoroalkyl, optionally substituted $C_3$-$C_6$cycloalkyl, optionally substituted $C_3$-$C_6$cycloalkylalkyl, optionally substituted $C_2$-$C_{10}$heterocycloalkyl, optionally substituted aryl, or optionally substituted heteroaryl;
or $R^6$ and $R^7$ are taken together with the N atom to which they are attached to form an optionally substituted heterocycle;
each $R^8$ is independently H, optionally substituted $C_1$-$C_4$alkyl, optionally substituted $C_1$-$C_4$heteroalkyl, optionally substituted $C_1$-$C_4$fluoroalkyl, optionally substituted $C_3$-$C_6$cycloalkyl, optionally substituted $C_2$-$C_{10}$heterocycloalkyl, optionally substituted aryl, or optionally substituted heteroaryl;
or two $R^8$ are taken together with the N atom to which they are attached to form an optionally substituted heterocycle;
each $R^9$ is independently optionally substituted $C_1$-$C_4$alkyl, optionally substituted $C_1$-$C_4$heteroalkyl, optionally substituted $C_1$-$C_4$fluoroalkyl, optionally substituted $C_3$-$C_6$cycloalkyl, optionally substituted $C_2$-$C_{10}$heterocycloalkyl, optionally substituted aryl, or optionally substituted heteroaryl;
$R^{41}$ and $R^{42}$ are each independently H, halogen, —$OR^9$, optionally substituted $C_1$-$C_4$alkyl, optionally substituted $C_1$-$C_4$heteroalkyl, optionally substituted $C_1$-$C_4$fluoroalkyl, or optionally substituted aryl; provided that both $R^{41}$ and $R^{42}$ are not H;
n is 0, 1, 2, 3, or 4; and
q is 0, 1, 2, 3, or 4.

The compound of Formula (I) is not 2-chloro-N-(5-2-(((1s,4s)-4-(dimethylamino)-4-methylcyclohexyl)amino)-8-ethylquinazolin-6-yl)-6-methoxypyridin-2-yl)benzenesulfonamide or 2-chloro-N-(5-(2-(((1s,4s)-4-(dimethylamino)-4-methylcyclohexyl)amino)-8-ethylquinazolin-6-yl)-3-fluoro-6-methoxypyridin-2-yl(benzenesulfonamide.

In Formula (I), $R^7$ can be an optionally substituted $C_3$-$C_6$cycloalkylalkyl or $R^7$ can bemethyl, ethyl, —$CH_2CF_3$, —$CH_2$-cyclopropyl, or —$CH_2CH_2OCH_3$.

Any combination of the groups described above or below for the various variables is contemplated herein. Throughout the specification, groups and substituents thereof are chosen by one skilled in the field to provide stable moieties and compounds.

The methods of treating a disease with altered IRE1 signaling or the effects thereof or treating a cell proliferative disorder can comprise administering a compound of Formula (I) or a pharmaceutically acceptable salt thereof, or a solvate thereof, that selectively binds to IRE1a at one or more binding sites. IRE1a can comprises an RNase domain, a kinase domain, or any combination thereof. The kinase domain can be an auto-transphosphorylation kinase domain. The kinase domain can comprise an ATP-binding pocket. The kinase domain can comprise an activation loop. At least one binding site can be within the RNase domain. At least one binding site can be within the kinase domain. At least one binding site can be within the ATP-binding pocket of the kinase domain. At least one binding site can be within the activation loop of the kinase domain. Binding can occur at a first binding site. The first binding site can be located within the RNase domain, kinase domain, ATP-binding pocket, or activation loop. The first binding site can comprise at least one amino acid residue of within amino acid residues 465-977 of SEQ ID NO: 1. The first binding site can comprise at least one amino acid residue within amino acid residues 568-833 of SEQ ID NO: 1. The first binding site can comprise at least one amino acid residue within amino acid residues 577-586, 597, 599, 626, 642-643, 645, 648, 688, 692-693, 695, or 711 of SEQ ID NO: 1. The first binding site can comprise at least one amino acid residue within amino acid residues 710-725 or 729-736 of SEQ ID NO: 1. The first binding site can comprise at least one amino acid residue within amino acid residues 835-963 of SEQ ID NO: 1. Binding can further occurs at a second binding site. The second binding site can be located within the RNase domain, the kinase domain, the ATP-binding pocket, or the activation loop. The second binding site can comprise at least one amino acid residue of within amino acid residues 465-977 of SEQ ID NO: 1. The second binding site can comprise at least one amino acid residue within amino acid residues 568-833 of SEQ ID NO: 1. The second binding site can comprise at least one amino acid residue within amino acid residues 577-586, 597, 599, 626, 642-643, 645, 648, 688, 692-693, 695, or 711 of SEQ ID NO: 1. The second binding site comprise at least one amino acid residue within amino acid residues 710-725 or 729-736 of SEQ ID NO: 1. The second binding site can comprise at least one amino acid residue within amino acid residues 835-963 of SEQ ID NO: 1. Binding can occur when the IRE1a is in a homo-dimerized conformation. Binding can occur when the IRE1a is in an oligomerized conformation. Binding can occur when the IRE1a is in a non-oligomerized or non-dimerized conformation. Binding can occur when the IRE1a is in an ATP-bound state. Binding can occur when the IRE1a is in a non-ATP-bound state. The compound can selectively bind to a first IRE1a. The compound can selectively bind to the first IRE1a blocks dimerization of the first IRE1a to a second IRE1a. The compound can selectively bind to the first IRE1a blocks auto-transphosphorylation of the first IRE1a. The compound can selectively bind to the first IRE1a blocks auto-transphosphorylation of a second IRE1a to which the first IRE1a is dimerized. The compound can selectively bind to the first IRE1a blocks activation of the first IRE1a. The compound can selectively bind to the first IRE1a blocks activation a second IRE1a to which the first IRE1a is dimerized. The compound can selectively bind to the first IRE1a blocks kinase activity of the first IRE1a. The compound can selectively bind to the first IRE1a blocks kinase activity of a second IRE1a to which the first IRE1a is dimerized. The compound can selectively bind to the first IRE1a blocks RNase activity of the first IRE1a. The compound can selectively bind to the first IRE1a blocks RNase activity of a second IRE1a to which the first IRE1a is dimerized.

The methods of treating comprise administering a compound of Formula (I) or a compound from Table 1, or pharmaceutically acceptable salt thereof, or solvate thereof, that selectively binds a first IRE1a protein at two or more sites, wherein when the compound is bound to the first IRE1a protein, the compound binds to an ATP-binding pocket of the first IRE1a protein and blocks the binding of ATP to the first IRE1a protein. The ATP binding pocket can be comprised within a kinase domain. The ATP binding pocket can be comprised within amino acid residues 465-977 of SEQ ID NO: 1. The ATP binding pocket can be comprised within amino acid residues 568-833 of SEQ ID NO: 1. The ATP binding pocket comprises one or more of amino acid resides 577-586, 597, 599, 626, 642-643, 645, 648, 688, 692-693, 695, or 711 of SEQ ID NO: 1.

The methods of treating can comprise administering a pharmaceutical composition comprising a compound of Formula (I) or a compound from Table 1, or a pharmaceutically acceptable salt thereof, or a solvate thereof. The pharmaceutical composition can comprise one or more pharmaceutically acceptable excipients. The pharmaceutical composition can be suitable for oral or intravenous administration.

DETAILED DESCRIPTION

Definitions

Figure 1:
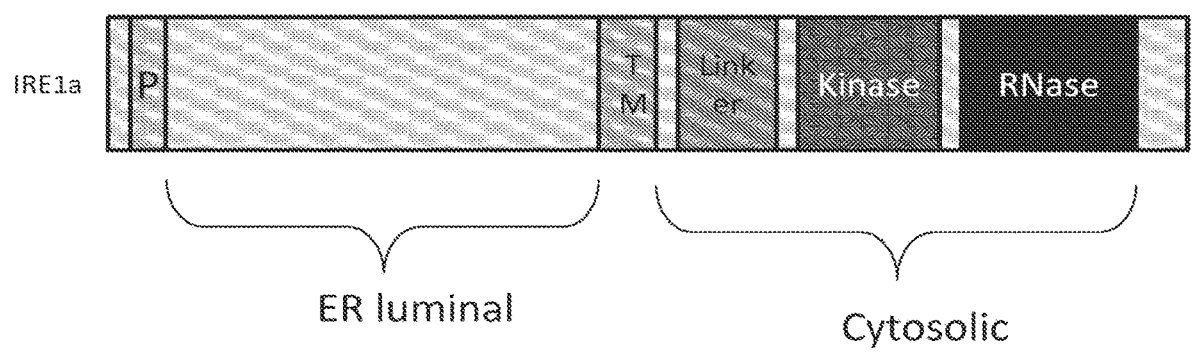
FIG. 1 shows an example diagram of the domain structure of IRE1a. A signal peptide (P) and transmembrane (TM) region are indicated.

For convenience, before further description of the present disclosure, some terms employed in the specification, examples and appended claims are collected here. These definitions should be read in light of the remainder of the disclosure and understood as by a person of skill in the art. Unless defined otherwise, all technical and scientific terms used herein have the same meaning as commonly understood by a person of ordinary skill in the art.

In order for the present disclosure to be more readily understood, some terms and phrases are defined below and throughout the specification.

Unless otherwise stated, the following terms used in this application have the definitions given below. The use of the term "including" as well as other forms, such as "include", "includes," and "included," is not limiting. The section headings used herein are for organizational purposes only and are not to be construed as limiting the subject matter described.

As used herein and in the appended claims, the singular forms "a," "and," and "the" include plural referents unless the context clearly dictates otherwise. Thus, for example, reference to "an agent" includes a plurality of such agents, and reference to "the cell" includes reference to one or more cells (or to a plurality of cells) and equivalents thereof known to those skilled in the art, and so forth. When ranges are used herein for physical properties, such as molecular weight, or chemical properties, such as chemical formulae, all combinations and subcombinations of ranges and specific examples are intended to be included. The term "about" when referring to a number or a numerical range means that the number or numerical range referred to is an approximation within experimental variability (or within statistical experimental error), and thus the number or numerical range may vary between 1% and 15% of the stated number or numerical range. The term "comprising" (and related terms such as "comprise" or "comprises" or "having" or "including") is not intended to exclude that, for example, a composition of matter, composition, method, or process, or the like, described herein, may "consist of" or "consist essentially of" the described features.

"Amino" refers to the —NH$_2$ radical.
"Cyano" refers to the —CN radical.
"Nitro" refers to the —NO$_2$ radical.
"Oxa" refers to the —O— radical.
"Oxo" refers to the =O radical.
"Thioxo" refers to the =S radical.
"Imino" refers to the =N—H radical.
"Oximo" refers to the =N—OH radical.

As used herein, $C_1$-$C_x$ includes $C_1$-$C_2$, $C_1$-$C_3$ ... $C_1$-$C_x$. By way of example only, a group designated as "$C_1$-$C_4$" indicates that there are one to four carbon atoms in the moiety, i.e. groups containing 1 carbon atom, 2 carbon atoms, 3 carbon atoms or 4 carbon atoms. Thus, by way of example only, "$C_1$-$C_4$ alkyl" indicates that there are one to four carbon atoms in the alkyl group, i.e., the alkyl group is selected from among methyl, ethyl, propyl, iso-propyl, n-butyl, iso-butyl, sec-butyl, and t-butyl.

An "alkyl" group refers to an aliphatic hydrocarbon group. The alkyl group is branched or straight chain. Unless otherwise noted, the "alkyl" group has 1 to 10 carbon atoms, i.e. a $C_1$-$C_{10}$alkyl, or 1 to 6 carbon atoms. Whenever it appears herein, a numerical range such as "1 to 10" refers to each integer in the given range; e.g., "1 to 10 carbon atoms" means that the alkyl group consist of 1 carbon atom, 2 carbon atoms, 3 carbon atoms, 4 carbon atoms, 5 carbon atoms, 6 carbon atoms, etc., up to and including 10 carbon atoms, although the present definition also covers the occurrence of the term "alkyl" where no numerical range is designated. An alkyl can be a $C_1$-$C_6$alkyl. Alkyl can be methyl, ethyl, propyl, iso-propyl, n-butyl, iso-butyl, sec-butyl, or t-butyl. Typical alkyl groups include, but are in no way limited to, methyl, ethyl, propyl, isopropyl, butyl, isobutyl, sec-butyl, tertiary butyl, pentyl, neopentyl, or hexyl. Alkyl includes alkenyls (one or more carbon-carbon double bonds) and alkynyls (one or more carbon-carbon triple bonds).

An "alkylene" group refers to a divalent alkyl radical. Any of the above mentioned monovalent alkyl groups may be an alkylene by abstraction of a hydrogen atom from the alkyl. Unless otherwise noted, an alkelene is a $C_1$-$C_6$alkylene. An alkylene can be a $C_1$-$C_4$alkylene. An alkylene can comprise one to four carbon atoms (e.g., $C_1$-$C_4$ alkylene). An alkylene can comprise one to three carbon atoms (e.g., $C_1$-$C_3$ alkylene). An alkylene can comprise one to two carbon atoms (e.g., $C_1$-$C_2$ alkylene). An alkylene can comprise one carbon atom (e.g., $C_1$ alkylene). An alkylene can comprise two carbon atoms (e.g., $C_2$ alkylene). An alkylene can comprise two to four carbon atoms (e.g., $C_2$-$C_4$ alkylene). Typical alkylene groups include, but are not limited to, —CH$_2$—, —CH(CH$_3$)—, —C(CH$_3$)$_2$—, —CH$_2$CH$_2$—, —CH$_2$CH(CH$_3$)—, —CH$_2$C(CH$_3$)$_2$—, —CH$_2$CH$_2$CH$_2$—, —CH$_2$CH$_2$CH$_2$CH$_2$—, and the like.

An "alkoxy" group refers to an (alkyl)O— group, where alkyl is as defined herein.

The term "aromatic" refers to a planar ring having a delocalized n-electron system containing 4n+2 π electrons, where n is an integer. The term "aromatic" includes both carbocyclic aryl ("aryl", e.g., phenyl) and heterocyclic aryl (or "heteroaryl" or "heteroaromatic") groups (e.g., pyridine). The term includes monocyclic or fused-ring polycyclic (i.e., rings which share adjacent pairs of carbon atoms) groups.

The term "carbocyclic" or "carbocycle" refers to a ring or ring system where the atoms forming the backbone of the ring are all carbon atoms. The term thus distinguishes carbocyclic from "heterocyclic" rings or "heterocycles" in which the ring backbone contains at least one atom which is different from carbon. At least one of the two rings of a bicyclic carbocycle can be aromatic. Both rings of a bicyclic carbocycle can be aromatic. Carbocycle includes cycloalkyl and aryl.

As used herein, the term "aryl" refers to an aromatic ring wherein each of the atoms forming the ring is a carbon atom. Aryl can be phenyl or naphthyl. An aryl can be a phenyl. Unless otherwise noted, an aryl is a $C_6$-$C_{10}$aryl. Depending on the structure, an aryl group is a monoradical or a diradical (i.e., an arylene group).

The term "cycloalkyl" refers to a monocyclic or polycyclic aliphatic, non-aromatic radical, wherein each of the atoms forming the ring (i.e. skeletal atoms) is a carbon atom. Cycloalkyls can be spirocyclic or bridged compounds. Cycloalkyls can be optionally fused with an aromatic ring, and the point of attachment is at a carbon that is not an aromatic ring carbon atom. Unless otherwise noted, cycloalkyl groups have from 3 to 10 ring atoms, or from 3 to 6 ring atoms. Cycloalkyl groups can be selected from among cyclopropyl, cyclobutyl, cyclopentyl, cyclopentenyl, cyclohexyl, cyclohexenyl, cycloheptyl, cyclooctyl, spiro[2.2]pentyl, norbornyl and bicycle[1.1.1]pentyl. A cycloalkyl can be a $C_3$-$C_6$cycloalkyl. A cycloalkyl can be a monocyclic cycloalkyl. Monocyclic cycloalkyls include, but are not limited to, cyclopropyl, cyclobutyl, cyclopentyl, cyclohexyl, cycloheptyl, and cyclooctyl. Polycyclic cycloalkyls include, for example, adamantyl, norbornyl (i.e., bicyclo[2.2.1]heptanyl), norbornenyl, decalinyl, 7,7-dimethyl-bicyclo[2.2.1] heptanyl, and the like.

The term "cycloalkylalkyl" refers to a moiety of the formula —$R_bR_d$ where $R_b$ is an alkylene group as defined herein and $R_d$ is a cycloalkyl moiety as defined herein. A cycloalkylalkyl moiety can be a $C_3$-$C_{10}$cycloalkylalkyl moiety. In such a case, the $C_3$-$C_{10}$cycloalkylalkyl includes a $C_3$-$C_{10}$cycloalkyl radical. A cycloalkylalkyl moiety can be a $C_3$-$C_6$cycloalkylalkyl moiety. In such a case, the $C_3$-$C_6$cycloalkylalkyl includes a $C_3$-$C_6$cycloalkyl radical.

The term "halo" or, alternatively, "halogen" or "halide" means fluoro, chloro, bromo or iodo. Halo can be fluoro, chloro, or bromo.

The term "haloalkyl" refers to an alkyl in which one or more hydrogen atoms are replaced by a halogen atom. Haloalkyl can be fluoralkyl.

The term "fluoroalkyl" refers to an alkyl in which one or more hydrogen atoms are replaced by a fluorine atom. Fluoralkyl can be $C_1$-$C_6$fluoroalkyl. A fluoroalkyl can be selected from trifluoromethyl, difluoromethyl, fluoromethyl, 2,2,2-trifluoroethyl, 1-fluoromethyl-2-fluoroethyl, and the like.

The term "heteroalkyl" refers to, unless otherwise stated, a straight or branched alkyl group comprising at least one carbon atom and at least one heteroatom, such as O, N (e.g. —NH—, —N(alkyl)-), P, Si, S, and Se. One or more heteroatoms may be oxidized. Heteroatom(s) may be positioned within the alkyl moiety, e.g., —$CH_2$—O—$CH_2$—; at a point of connectivity with the remainder of the molecule, e.g., —S(=O)$_2$CH(CH$_3$)CH$_2$—; or a combination thereof, e.g., —NHCH$_2$CH$_2$S(=O)$_2$CH$_2$—. Heteroalkyl can be $C_1$-$C_6$heteroalkyl.

As used herein, the term "heteroatom" refers to an atom of any element other than carbon or hydrogen. Unless otherwise noted, the heteroatom is nitrogen, oxygen, or sulfur. The heteroatom is nitrogen or oxygen. The heteroatom can be nitrogen.

The term "heterocycle" or "heterocyclic" refers to heteroaromatic rings (also known as heteroaryls) and heterocycloalkyl rings (also known as heteroalicyclic groups) containing one to four heteroatoms in the ring(s), where each heteroatom in the ring(s) is selected from 0, S and N, wherein each heterocyclic group comprises from 3 to 14 atoms in its ring system comprising 2 to 10 carbon atoms and from one to 4 heteroatoms, and with the proviso that any ring does not contain two adjacent O or S atoms. Heterocycles can be monocyclic, bicyclic, polycyclic, spirocyclic or bridged compounds. Non-aromatic heterocyclic groups (also known as heterocycloalkyls) include rings having 3 to 10 atoms in its ring system and aromatic heterocyclic groups include rings having 5 to 10 atoms in its ring system. The heterocyclic groups include benzo-fused ring systems. Examples of non-aromatic heterocyclic groups are pyrrolidinyl, tetrahydrofuranyl, dihydrofuranyl, tetrahydrothienyl, oxazolidinonyl, tetrahydropyranyl, dihydropyranyl, tetrahydrothiopyranyl, piperidinyl, morpholinyl, thiomorpholinyl, thioxanyl, piperazinyl, aziridinyl, azetidinyl, oxetanyl, thietanyl, homopiperidinyl, oxepanyl, thiepanyl, oxazepinyl, diazepinyl, thiazepinyl, 1,2,3,6-tetrahydropyridinyl, pyrrolin-2-yl, pyrrolin-3-yl, indolinyl, 2H-pyranyl, 4H-pyranyl, dioxanyl, 1,3-dioxolanyl, pyrazolinyl, dithianyl, dithiolanyl, dihydropyranyl, dihydrothienyl, dihydrofuranyl, pyrazolidinyl, imidazolinyl, imidazolidinyl, 3-azabicyclo[3.1.0]hexanyl, 3-azabicyclo[4.1.0]heptanyl, 3H-indolyl, indolin-2-onyl, isoindolin-1-onyl, isoindoline-1,3-dionyl, 3,4-dihydroisoquinolin-1(2H)-onyl, 3,4-dihydroquinolin-2(1H)-onyl, isoindoline-1,3-dithionyl, benzo[d]oxazol-2(3H)-onyl, 1H-benzo[d]imidazol-2(3H)-onyl, benzo[d]thiazol-2(3H)-onyl, and quinolizinyl. Examples of aromatic heterocyclic groups are pyridinyl, imidazolyl, pyrimidinyl, pyrazolyl, triazolyl, pyrazinyl, tetrazolyl, furyl, thienyl, isoxazolyl, thiazolyl, oxazolyl, isothiazolyl, pyrrolyl, quinolinyl, isoquinolinyl, indolyl, benzimidazolyl, benzofuranyl, cinnolinyl, indazolyl, indolizinyl, phthalazinyl, pyridazinyl, triazinyl, isoindolyl, pteridinyl, purinyl, oxadiazolyl, thiadiazolyl, furazanyl, benzofurazanyl, benzothiophenyl, benzothiazolyl, benzoxazolyl, quinazolinyl, quinoxalinyl, naphthyridinyl, and furopyridinyl. The foregoing groups are either C-attached (or C-linked) or N-attached where such is possible. For instance, a group derived from pyrrole includes both pyrrol-1-yl (N-attached) or pyrrol-3-yl (C-attached). Further, a group derived from imidazole includes imidazol-1-yl or imidazol-3-yl (both N-attached) or imidazol-2-yl, imidazol-4-yl or imidazol-5-yl (all C-attached). The heterocyclic groups include benzo-fused ring systems. Non-aromatic heterocycles are optionally substituted with one or two oxo (=O) moieties, such as pyrrolidin-2-one. At least one of the two rings of a bicyclic heterocycle can be aromatic. Both rings of a bicyclic heterocycle can be aromatic.

The terms "heteroaryl" or, alternatively, "heteroaromatic" refers to an aryl group that includes one or more ring heteroatoms selected from nitrogen, oxygen and sulfur. Illustrative examples of heteroaryl groups include monocyclic heteroaryls and bicyclcic heteroaryls. Monocyclic heteroaryls include pyridinyl, imidazolyl, pyrimidinyl, pyrazolyl, triazolyl, pyrazinyl, tetrazolyl, furyl, thienyl, isoxazolyl, thiazolyl, oxazolyl, isothiazolyl, pyrrolyl, pyridazinyl, triazinyl, oxadiazolyl, thiadiazolyl, and furazanyl. Bicyclic heteroaryls include indolizine, indole, benzofuran, benzothiophene, indazole, benzimidazole, purine, quinolizine, quinoline, isoquinoline, cinnoline, phthalazine, quinazoline, quinoxaline, 1,8-naphthyridine, and pteridine. A heteroaryl can contain 0-4 N atoms in the ring. A heteroaryl can contain 1-4 N atoms in the ring. A heteroaryl can contain 0-4 N atoms, 0-1 O atoms, and 0-1 S atoms in the ring. A heteroaryl can contain 1-4 N atoms, 0-1 O atoms, and 0-1 S atoms in the ring. A heteroaryl can be a $C_1$-$C_9$heteroaryl. Monocyclic heteroaryl can be a $C_1$-$C_5$heteroaryl. Monocyclic heteroaryl can be a 5-membered or 6-membered heteroaryl. Bicyclic heteroaryl can be a $C_6$-$C_9$heteroaryl.

A "heterocycloalkyl" or "heteroalicyclic" group refers to a cycloalkyl group that includes at least one heteroatom selected from nitrogen, oxygen and sulfur. A heterocycloalkyl can be a spirocyclic or bridged compound. A heterocycloalkyl can be fused with an aryl or heteroaryl. A heterocycloalkyl can be oxazolidinonyl, pyrrolidinyl, tetrahydrofuranyl, tetrahydrothienyl, tetrahydropyranyl, tetrahydrothiopyranyl, piperidinyl, morpholinyl, thiomorpholinyl, piperazinyl, piperidin-2-onyl, pyrrolidine-2,5-dithionyl, pyrrolidine-2,5-dionyl, pyrrolidinonyl, imidazolidinyl, imidazolidin-2-onyl, or thiazolidin-2-onyl. The term heteroalicyclic also includes all ring forms of the carbohydrates, including but not limited to the monosaccharides, the disaccharides and the oligosaccharides. Heterocycloalkyl can be $C_2$-$C_{10}$heterocycloalkyl. Heterocycloalkyl can be $C_4$-$C_{10}$heterocycloalkyl. A heterocycloalkyl can contain 0-2 N atoms in the ring. A heterocycloalkyl can contain 0-2 N atoms, 0-2 O atoms and 0-1 S atoms in the ring.

The term "bond" or "single bond" refers to a chemical bond between two atoms, or two moieties when the atoms joined by the bond are considered to be part of larger substructure. When a group described herein is a bond, the referenced group is absent thereby allowing a bond to be formed between the remaining identified groups.

The term "moiety" refers to a specific segment or functional group of a molecule. Chemical moieties are often recognized chemical entities embedded in or appended to a molecule.

The term "optionally substituted" or "substituted" means that the referenced group is optionally substituted with one or more additional group(s) individually and independently selected from deuterium, halogen, —CN, —$NH_2$, —NH (alkyl), —$CH_2$N(alkyl)$_2$, —N(alkyl)$_2$, —OH, —$CO_2$H, —$CO_2$alkyl, —$CH_2NH_2$, —C(=O)$NH_2$, —C(=O)NH(alkyl), —C(=O)N(alkyl)$_2$, —S(=O)$_2$$NH_2$, —S(=O)$_2$NH (alkyl), —S(=O)$_2$N(alkyl)$_2$, alkyl, cycloalkyl, fluoroalkyl, heteroalkyl, alkoxy, fluoroalkoxy, heterocycloalkyl, aryl, heteroaryl, aryloxy, alkylthio, arylthio, alkylsulfoxide, arylsulfoxide, alkylsulfone, and arylsulfone. Optional substituents can independently be selected from D, halogen, —CN, —$NH_2$, —NH($CH_3$), —N($CH_3$)$_2$, —OH, —$CO_2$H, —$CO_2$($C_1$-$C_4$alkyl), —$CH_2NH_2$, —C(=O)$NH_2$, —C(=O) NH($C_1$-$C_4$alkyl), —C(=O)N($C_1$-$C_4$alkyl)$_2$, —S(=O)$_2$ $NH_2$, —S(=O)$_2$NH($C_1$-$C_4$alkyl), —S(=O)$_2$N($C_1$-$C_4$ alkyl)$_2$, $C_1$-$C_4$alkyl, $C_3$-$C_6$cycloalkyl, $C_1$-$C_4$fluoroalkyl, $C_1$-$C_4$heteroalkyl, $C_1$-$C_4$alkoxy, $C_1$-$C_4$fluoroalkoxy, —S$C_1$-$C_4$alkyl, —S(=O)$C_1$-$C_4$alkyl, and —S(=O)$_2$$C_1$-$C_4$alkyl. Optional substituents can be independently selected from D, halogen, —CN, —$NH_2$, —OH, —NH($CH_3$), —N($CH_3$)$_2$, —$CH_3$, —$CH_2CH_3$, —$CH_2NH_2$, —$CF_3$, —$OCH_3$, and —$OCF_3$. Substituted groups can be substituted with one or two of the preceding groups. An optional substituent on an aliphatic carbon atom (acyclic or cyclic) can include oxo (=O).

A "tautomer" refers to a molecule wherein a proton shift from one atom of a molecule to another atom of the same molecule is possible. The compounds presented herein may exist as tautomers. In circumstances where tautomerization is possible, a chemical equilibrium of the tautomers will exist. The exact ratio of the tautomers depends on several factors, including physical state, temperature, solvent, and pH. Some examples of tautomeric equilibrium include:

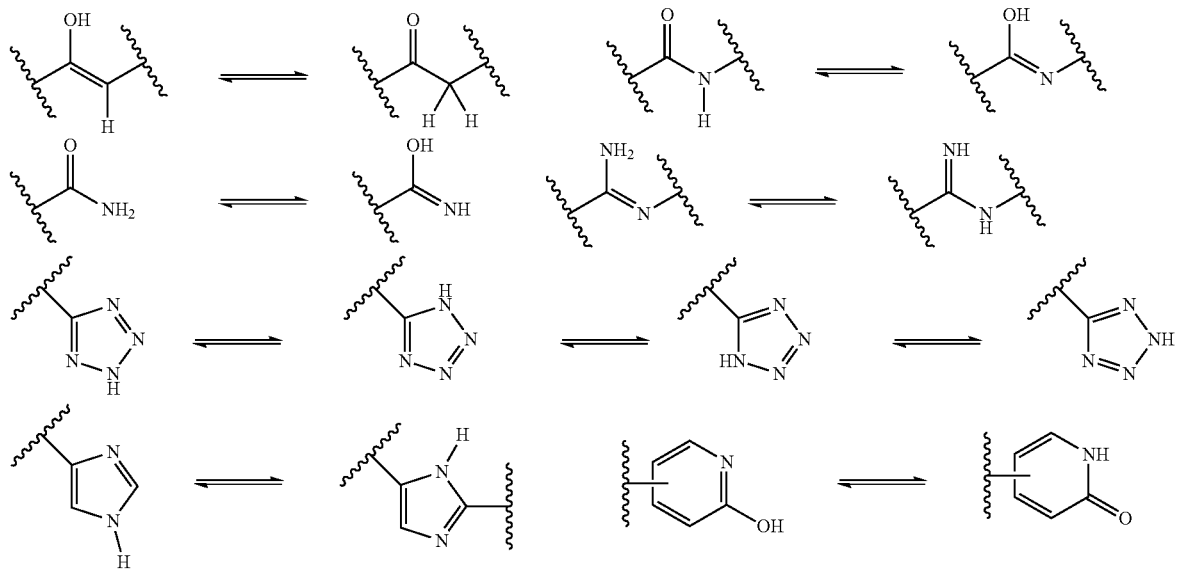

"Optional" or "optionally" means that a subsequently described event or circumstance may or may not occur and that the description includes instances when the event or circumstance occurs and instances in which it does not. For example, "optionally substituted aryl" means that the aryl radical may or may not be substituted and that the description includes both substituted aryl radicals and aryl radicals having no substitution.

"Pharmaceutically acceptable salt" includes both acid and base addition salts. A pharmaceutically acceptable salt of any one of the compounds described herein is intended to encompass any and all pharmaceutically suitable salt forms. Pharmaceutically acceptable salts of the compounds described herein are pharmaceutically acceptable acid addition salts and pharmaceutically acceptable base addition salts.

"Pharmaceutically acceptable acid addition salt" refers to those salts which retain the biological effectiveness and properties of the free bases, which are not biologically or otherwise undesirable, and which are formed with inorganic acids such as hydrochloric acid, hydrobromic acid, sulfuric acid, nitric acid, phosphoric acid, hydroiodic acid, hydrofluoric acid, phosphorous acid, and the like. Also included are salts that are formed with organic acids such as aliphatic mono- and dicarboxylic acids, phenyl-substituted alkanoic acids, hydroxy alkanoic acids, alkanedioic acids, aromatic acids, aliphatic and aromatic sulfonic acids, etc. and include, for example, formic acid, acetic acid, trifluoroacetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like. Exemplary salts thus include sulfates, pyrosulfates, bisulfates, sulfites, bisulfites, nitrates, phosphates, monohydrogenphosphates, dihydrogenphosphates, metaphosphates, pyrophosphates, chlorides, bromides, iodides, acetates, trifluoroacetates, propionates, caprylates, isobutyrates, oxalates, malonates, succinate suberates, sebacates, fumarates, maleates, mandelates, benzoates, chlorobenzoates, methylbenzoates, dinitrobenzoates, phthalates, benzenesulfonates, toluenesulfonates, phenylacetates, citrates, lactates, malates, tartrates, methanesulfonates, and the like. Also contemplated are salts of amino acids, such as arginates, gluconates, and galacturonates (see, for example, Berge S. M. et al., "Pharmaceutical Salts," Journal of Pharmaceutical Science, 66:1-19 (1997)). Acid addition salts of basic compounds may be prepared by contacting the free base forms with a sufficient amount of the desired acid to produce the salt according to methods and techniques with which a skilled artisan is familiar.

"Pharmaceutically acceptable base addition salt" refers to those salts that retain the biological effectiveness and properties of the free acids, which are not biologically or otherwise undesirable. These salts are prepared from addition of an inorganic base or an organic base to the free acid. Pharmaceutically acceptable base addition salts may be formed with metals or amines, such as alkali and alkaline earth metals or organic amines. Salts derived from inorganic bases include, but are not limited to, sodium, potassium, lithium, ammonium, calcium, magnesium, iron, zinc, copper, manganese, aluminum salts and the like. Salts derived from organic bases include, but are not limited to, salts of primary, secondary, and tertiary amines, substituted amines including naturally occurring substituted amines, cyclic amines and basic ion exchange resins, for example, isopropylamine, trimethylamine, diethylamine, triethylamine, tripropylamine, ethanolamine, diethanolamine, 2-dimethylaminoethanol, 2-diethylaminoethanol, dicyclohexylamine, lysine, arginine, histidine, caffeine, procaine, N,N-dibenzylethylenediamine, chloroprocaine, hydrabamine, choline, betaine, ethylenediamine, ethylenedianiline, N-methylglucamine, glucosamine, methylglucamine, theobromine, purines, piperazine, piperidine, N-ethylpiperidine, polyamine resins and the like. See Berge et al., supra.

"Prodrug" is meant to indicate a compound that may be converted under physiological conditions or by solvolysis to a biologically active compound described herein. Thus, the term "prodrug" refers to a precursor of a biologically active compound that is pharmaceutically acceptable. A prodrug may be inactive when administered to a subject, but is converted in vivo to an active compound, for example, by hydrolysis. The prodrug compound often offers advantages of solubility, tissue compatibility or delayed release in a mammalian organism (see, e.g., Bundgard, H., Design of Prodrugs (1985), pp. 7-9, 21-24 (Elsevier, Amsterdam).

A discussion of prodrugs is provided in Higuchi, T., et al., "Pro-drugs as Novel Delivery Systems," A.C.S. Symposium Series, Vol. 14, and in Bioreversible Carriers in Drug Design, ed. Edward B. Roche, American Pharmaceutical Association and Pergamon Press, 1987.

The term "prodrug" is also meant to include any covalently bonded carriers, which release the active compound in vivo when such prodrug is administered to a mammalian subject. Prodrugs of an active compound, as described herein, may be prepared by modifying functional groups present in the active compound in such a way that the modifications are cleaved, either in routine manipulation or in vivo, to the parent active compound. Prodrugs include compounds wherein a hydroxy, amino or mercapto group is bonded to any group that, when the prodrug of the active compound is administered to a mammalian subject, cleaves to form a free hydroxy, free amino or free mercapto group, respectively. Examples of prodrugs include, but are not limited to, acetate, formate and benzoate derivatives of alcohol or amine functional groups in the active compounds and the like.

The term "acceptable" with respect to a formulation, composition or ingredient, as used herein, means having no persistent detrimental effect on the general health of the subject being treated.

The term "modulate" as used herein, means to interact with a target either directly or indirectly so as to alter the activity of the target, including, by way of example only, to enhance the activity of the target, to inhibit the activity of the target, to limit the activity of the target, or to extend the activity of the target.

The term "modulator" as used herein, refers to a molecule that interacts with a target either directly or indirectly. The interactions include, but are not limited to, the interactions of an agonist, partial agonist, an inverse agonist, antagonist, degrader, or combinations thereof. A modulator can be an agonist.

The terms "administer," "administering," "administration," and the like, as used herein, refer to the methods that may be used to enable delivery of compounds or compositions to the desired site of biological action. These methods include, but are not limited to oral routes, intraduodenal routes, parenteral injection (including intravenous, subcutaneous, intraperitoneal, intramuscular, intravascular or infusion), topical and rectal administration. Those of skill in the art are familiar with administration techniques that can be employed with the compounds and methods described herein. The compounds and compositions described herein can be administered orally.

The terms "co-administration" or the like, as used herein, are meant to encompass administration of the selected therapeutic agents to a single patient, and are intended to include treatment regimens in which the agents are administered by the same or different route of administration or at the same or different time.

The terms "effective amount" or "therapeutically effective amount," as used herein, refer to a sufficient amount of an agent or a compound being administered, which will relieve to some extent one or more of the symptoms of the disease or condition being treated. The result includes reduction and/or alleviation of the signs, symptoms, or causes of a disease, or any other desired alteration of a biological system. For example, an "effective amount" for therapeutic uses is the amount of the composition comprising a compound as disclosed herein required to provide a clinically significant decrease in disease symptoms. An appropriate "effective" amount in any individual case is optionally determined using techniques, such as a dose escalation study. Where a compound of Formula (I) and a second therapeutic agent are administered, the "effective amount" of each one is the amount that, together, obtains beneficial or desired results including but not limited to therapeutic benefit and/or a prophylactic benefit.

The terms "enhance" or "enhancing," as used herein, means to increase or prolong either in potency or duration a desired effect. Thus, in regard to enhancing the effect of therapeutic agents, the term "enhancing" refers to the ability to increase or prolong, either in potency or duration, the effect of other therapeutic agents on a system. An "enhancing-effective amount," as used herein, refers to an amount adequate to enhance the effect of another therapeutic agent in a desired system.

The term "pharmaceutical combination" as used herein, means a product that results from the mixing or combining of more than one active ingredient and includes both fixed and non-fixed combinations of the active ingredients. The term "fixed combination" means that the active ingredients, e.g. a compound described herein, or a pharmaceutically acceptable salt thereof, and a co-agent, are both administered to a patient simultaneously in the form of a single entity or dosage. The term "non-fixed combination" means that the active ingredients, e.g. a compound described herein, or a pharmaceutically acceptable salt thereof, and a co-agent, are administered to a patient as separate entities either simultaneously, concurrently or sequentially with no specific intervening time limits, wherein such administration provides effective levels of the two compounds in the body of the patient. The latter also applies to cocktail therapy, e.g. the administration of three or more active ingredients.

The terms "kit" and "article of manufacture" are used as synonyms.

The term "subject" or "patient" encompasses mammals. Examples of mammals include, but are not limited to, any member of the Mammalian class: humans, non-human primates such as chimpanzees, and other apes and monkey species; farm animals such as cattle, horses, sheep, goats, and swine; domestic animals such as rabbits, dogs, and cats; laboratory animals including rodents, such as rats, mice, and guinea pigs, and the like. The mammal can be a human.

As used herein, "treatment" or "treating" or "palliating" or "ameliorating" are used interchangeably herein. These terms refer to an approach for obtaining beneficial or desired results including but not limited to therapeutic benefit and/or a prophylactic benefit. By "therapeutic benefit" is meant eradication or amelioration of the underlying disorder being treated. Also, a therapeutic benefit is achieved with the eradication or amelioration of one or more of the physiological symptoms associated with the underlying disorder such that an improvement is observed in the patient, notwithstanding that the patient may still be afflicted with the underlying disorder. For prophylactic benefit, the compositions may be administered to a patient at risk of developing a particular disease, or to a patient reporting one or more of the physiological symptoms of a disease, even though a diagnosis of this disease may not have been made.

As used herein, a "second therapeutic agent" is a drug used to treat fibrosis or a symptom thereof. A second therapeutic agent is a drug that can reverse, slow, or stop the formation of fibrotic tissue. A second therapeutic agent is a drug that can directly or indirectly inhibit the deposition of connective tissue or reduces, slows, or stops scarring and/or thickening of the affected tissue. A therapeutic agent can treat symptoms of fibrosis or enhance function of the affected tissue.

Compounds

Compounds described herein, including pharmaceutically acceptable salts, and pharmaceutically acceptable solvates thereof, modulate IRE1 mediated signaling, directly or indirectly.

The disclosure relates to a compound of Formula (I), or a pharmaceutically acceptable salt, or solvate thereof.

The disclosure also relates to a compound of Formula (I), or a pharmaceutically acceptable salt, or solvate thereof wherein Z, $R^1$, $R^3$, $R^4$, $R^5$, $R^2$, $R^1$, $R^9$, $R^{41}$, $R^{42}$, n and q are as provided for Formula (I); $R^6$ is H, optionally substituted $C_1$-$C_4$alkyl, optionally substituted $C_1$-$C_4$heteroalkyl, optionally substituted $C_1$-$C_4$fluoroalkyl, optionally substituted $C_3$-$C_6$cycloalkyl, optionally substituted $C_3$-$C_6$cycloalkylalkyl, optionally substituted $C_2$-$C_{10}$heterocycloalkyl, optionally substituted aryl, or optionally substituted heteroaryl; and $R^7$ is optionally substituted $C_3$-$C_6$cycloalkylalkyl or $R^7$ is methyl, ethyl, —$CH_2CF_3$, —$CH_2$-cyclopropyl, or —$CH_2CH_2OCH_3$. $R^7$ can be, for example, methyl, ethyl, —$CH_2CF_3$, —$CH_2$-cyclopropyl, or —$CH_2CH_2OCH_3$. $R^7$ can be, for example, optionally substituted $C_3$-$C_6$cycloalkylalkyl or —$CH_2$-cyclobutyl. $R^6$ can be, for example, hydrogen, optionally substituted $C_1$-$C_4$alkyl, optionally substituted $C_1$-$C_4$heteroalkyl, optionally substituted $C_1$-$C_4$fluoroalkyl, optionally substituted $C_3$-$C_6$cycloalkyl, or optionally substituted $C_3$-$C_6$cycloalkylalkyl. $R^6$ can be, for example, optionally substituted $C_1$-$C_4$alkyl, optionally substituted $C_1$-$C_4$heteroalkyl, optionally substituted $C_1$-$C_4$fluoroalkyl, optionally substituted $C_3$-$C_6$cycloalkyl, or optionally substituted $C_3$-$C_6$cycloalkylalkyl. $R^6$ can be, for example, methyl.

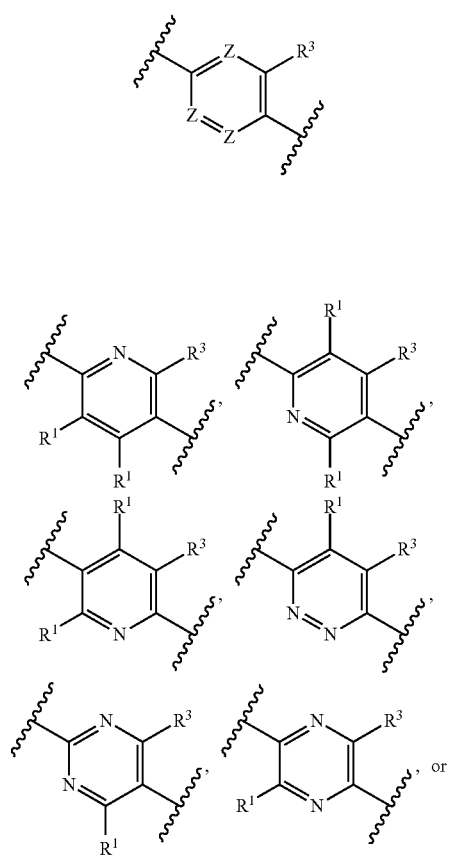

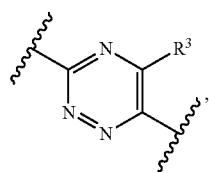

and $R^1$, $R^3$, $R^4$, $R^5$, $R^2$, $R^6$, $R^7$, $R^8$, $R^9$, $R^{41}$, $R^{42}$ n and q can be as defined above for Formula (I).

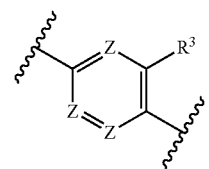

can be

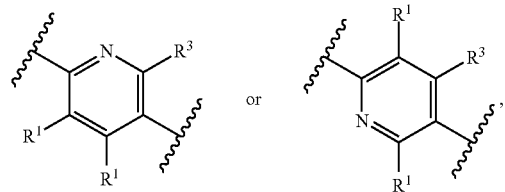

and $R^1$, $R^3$, $R^4$, $R^5$, $R^2$, $R^6$, $R^7$, $R^8$, $R^9$, $R^{41}$, $R^{42}$, n and q can be as defined above for Formula (I).

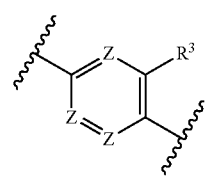

can be

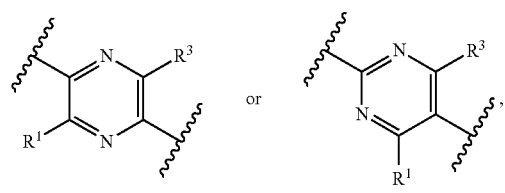

and $R^1$, $R^3$, $R^4$, $R^5$, $R^2$, $R^6$, $R^7$, $R^8$, $R^9$, $R^{41}$, $R^{42}$, n and q can be as defined above for Formula (I).

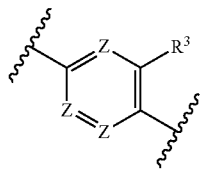

can be

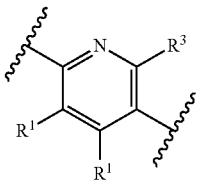

$R^1$, $R^3$, $R^4$, $R^5$, $R^2$, $R^6$, $R^7$, $R^8$, $R^9$, $R^{41}$, $R^{42}$, n and q can be as defined above for Formula (I).

Each $R^1$ can be independently H, halogen, —CN, —$OR^8$, optionally substituted $C_1$-$C_4$alkyl, optionally substituted $C_1$-$C_4$fluoroalkyl, or optionally substituted $C_1$-$C_4$heteroalkyl, and Z, $R^3$, $R^4$, $R^5$, $R^2$, $R^6$, $R^7$, $R^8$, $R^9$, $R^{41}$, $R^{42}$, n and q can be as defined above for Formula (I).

Each $R^1$ can be independently H, halogen, —$OR^8$, optionally substituted $C_1$-$C_4$alkyl, or optionally substituted $C_1$-$C_4$heteroalkyl, and Z, $R^3$, $R^4$, $R^5$, $R^2$, $R^6$, $R^7$, $R^8$, $R^9$, $R^{41}$, $R^{42}$, n and q can be as defined above for Formula (I).

Each $R^1$ can be independently H. Each $R^1$ can be independently halogen. Each $R^1$ can be independently —CN. Each $R^1$ is independently —$OR^8$. Each $R^1$ can be independently optionally substituted $C_1$-$C_4$alkyl. Each $R^1$ can be independently optionally substituted $C_1$-$C_4$fluoroalkyl. Each $R^1$ can be independently optionally substituted $C_1$-$C_4$heteroalkyl. Z, $R^3$, $R^4$, $R^5$, $R^2$, $R^6$, $R^7$, $R^8$, $R^9$, $R^{41}$, $R^{42}$, n and q can be as defined above for Formula (I).

$R^3$ can be —CN, —$OR^8$, optionally substituted $C_1$-$C_4$alkyl, optionally substituted $C_1$-$C_4$fluoroalkyl, optionally substituted $C_1$-$C_4$heteroalkyl, optionally substituted $C_3$-$C_6$cycloalkyl, or optionally substituted —O—$C_3$-$C_6$cycloalkyl, and Z, $R^3$, $R^4$, $R^5$, $R^2$, $R^6$, $R^7$, $R^8$, $R^9$, $R^{41}$, $R^{42}$, n and q can be as defined above for Formula (I).

$R^3$ can be —$OR^8$, optionally substituted $C_1$-$C_4$alkyl, optionally substituted $C_1$-$C_4$fluoroalkyl, or optionally substituted $C_1$-$C_4$heteroalkyl, and Z, $R^3$, $R^4$, $R^5$, $R^2$, $R^6$, $R^7$, $R^8$, $R^9$, $R^{41}$, $R^{42}$, n and q are can be as defined above for Formula (I).

$R^3$ can be —CN. $R^3$ can be —$OR^8$. $R^3$ can be optionally substituted $C_1$-$C_4$alkyl. $R^3$ can be optionally substituted $C_1$-$C_4$fluoroalkyl. $R^3$ can be optionally substituted $C_1$-$C_4$heteroalkyl. $R^3$ can be optionally substituted $C_3$-$C_6$cycloalkyl. $R^3$ can be optionally substituted —O—$C_3$-$C_6$cycloalkyl. Z, $R^1$, $R^4$, $R^5$, $R^2$, $R^6$, $R^7$, $R^8$, $R^9$, $R^{41}$, $R^{42}$, n and q can be as defined above for Formula (I).

$R^8$ can be optionally substituted $C_1$-$C_4$alkyl, optionally substituted $C_1$-$C_4$heteroalkyl, optionally substituted $C_1$-$C_4$fluoroalkyl, or optionally substituted $C_3$-$C_6$cycloalkyl. $R^8$ can be optionally substituted $C_1$-$C_4$alkyl. $R^8$ can be optionally substituted $C_1$-$C_4$heteroalkyl. $R^8$ can be optionally substituted $C_1$-$C_4$fluoroalkyl. $R^8$ can be optionally substituted $C_3$-$C_6$cycloalkyl. Z, $R^1$, $R^3$, $R^4$, $R^5$, $R^2$, $R^6$, $R^7$, $R^9$, $R^{41}$, $R^{42}$, n and q can be as defined above for Formula (I).

$R^4$ can be halogen, —CN, —$OR^8$, optionally substituted $C_1$-$C_4$alkyl, or optionally substituted $C_1$-$C_4$fluoroalkyl, and Z, $R^1$, $R^3$, $R^5$, $R^2$, $R^6$, $R^7$, $R^8$, $R^9$, $R^{41}$, $R^{42}$, n and q can be as defined above for Formula (I).

$R^4$ can be halogen, —CN, —$OR^8$, optionally substituted $C_1$-$C_4$alkyl, or optionally substituted $C_1$-$C_4$fluoroalkyl, and Z, $R^1$, $R^3$, $R^5$, $R^2$, $R^6$, $R^7$, $R^8$, $R^9$, $R^{41}$, $R^{42}$, n and q can be as defined above for Formula (I).

$R^4$ can be halogen, optionally substituted $C_1$-$C_4$alkyl, or optionally substituted $C_1$-$C_4$fluoroalkyl, and Z, $R^1$, $R^3$, $R^5$, $R^2$, $R^6$, $R^7$, $R^8$, $R^9$, $R^{41}$, $R^{42}$, n and q can be as defined above for Formula (I).

$R^4$ can be halogen. $R^4$ can be —$C_1$, —Br, —F, or —I, and Z, $R^1$, $R^3$, $R^5$, $R^2$, $R^6$, $R^7$, $R^8$, $R^9$, $R^{41}$, $R^{42}$, n and q can be as defined above for Formula (I).

$R^4$ can be —$OR^8$. $R^8$ can be H, optionally substituted $C_1$-$C_4$alkyl, or optionally substituted $C_1$-$C_4$fluoroalkyl. Z, $R^1$, $R^3$, $R^5$, $R^2$, $R^6$, $R^7$, $R^8$, $R^9$, $R^{41}$, $R^{42}$, n and q can be as defined above for Formula (I).

$R^4$ can be optionally substituted $C_1$-$C_4$alkyl. $R^4$ can be methyl, ethyl, propyl, or butyl, and Z, $R^1$, $R^3$, $R^5$, $R^2$, $R^6$, $R^1$, $R^8$, $R^9$, $R^{41}$, $R^{42}$, n and q can be as defined above for Formula (I).

$R^4$ can be optionally substituted $C_1$-$C_4$fluoroalkyl. $R^4$ can be —$CF_3$, —$CF_2CH_3$, or —$CH_2CF_3$, and Z, $R^1$, $R^3$, $R^5$, $R^2$, $R^6$, $R^7$, $R^8$, $R^9$, $R^{41}$, $R^{42}$, n and q can be as defined above for Formula (I).

$R^5$ can be absent or each $R^5$ can be independently halogen, —CN, —$OR^8$, —$SR^8$, —$N(R^8)_2$, optionally substituted $C_1$-$C_4$alkyl, or optionally substituted $C_1$-$C_4$fluoroalkyl, and, Z, $R^1$, $R^3$, $R^4$, $R^2$, $R^6$, $R^7$, $R^8$, $R^9$, $R^{41}$, $R^{42}$, n and q can be as defined above for Formula (I).

$R^5$ can be halogen. $R^5$ can be —$C_1$, —Br, —F, or —I, and Z, $R^1$, $R^3$, $R^4$, $R^2$, $R^6$, $R^7$, $R^8$, $R^9$, $R^{41}$, $R^{42}$, n and q can be as defined above for Formula (I).

$R^5$ can be —$OR^8$. $R^8$ can be H, optionally substituted $C_1$-$C_4$alkyl, or optionally substituted $C_1$-$C_4$fluoroalkyl. Z, $R^1$, $R^3$, $R^4$, $R^2$, $R^6$, $R^7$, $R^8$, $R^9$, $R^{41}$, $R^{42}$, n and q can be as defined above for Formula (I).

$R^5$ can be optionally substituted $C_1$-$C_4$alkyl. $R^5$ can be methyl, ethyl, propyl, or butyl. Z, $R^1$, $R^3$, $R^4$, $R^2$, $R^6$, $R^7$, $R^8$, $R^9$, $R^{41}$, $R^{42}$, n and q can be as defined above for Formula (I).

$R^5$ can be optionally substituted $C_1$-$C_4$fluoroalkyl. $R^5$ can be —$CF_3$, —$CF_2CH_3$, or —$CH_2CF_3$. Z, $R^1$, $R^3$, $R^4$, $R^2$, $R^6$, $R^7$, $R^8$, $R^9$, $R^{41}$, $R^{42}$, n and q can be as defined above for Formula (I).

n can be 0 or 1. n can be 0. n can be 1 or 2.

$R^2$ can be independently halogen, —$OR^8$, optionally substituted $C_1$-$C_4$alkyl, optionally substituted $C_1$-$C_4$heteroalkyl, or optionally substituted $C_1$-$C_4$fluoroalkyl, and Z, $R^1$, $R^3$, $R^4$, $R^5$, $R^6$, $R^7$, $R^8$, $R^9$, $R^{41}$, $R^{42}$, n and q can be as defined above for Formula (I).

q can be 0, 1, 2, or 3. q can be 0, 1, or 2. q can be 0. q can be 1. q can be 2. Z, $R^1$, $R^3$, $R^4$, $R^5$, $R^2$, $R^6$, $R^7$, $R^8$, $R^9$, $R^{41}$, $R^{42}$, and n can be as defined above for Formula (I).

$R^6$ can be H, optionally substituted $C_1$-$C_4$alkyl, optionally substituted $C_1$-$C_4$heteroalkyl, optionally substituted $C_1$-$C_4$fluoroalkyl, optionally substituted $C_3$-$C_6$cycloalkyl, or optionally substituted $C_3$-$C_6$cycloalkylalkyl, and Z, $R^1$, $R^3$, $R^4$, $R^5$, $R^2$, $R^7$, $R^8$, $R^9$, $R^{41}$, $R^{42}$, n and q can be as defined above for Formula (I).

$R^6$ can be optionally substituted $C_1$-$C_4$alkyl. $R^6$ can be methyl. $R^6$ can be ethyl. $R^6$ can be propyl. Z, $R^1$, $R^3$, $R^4$, $R^5$, $R^2$, $R^7$, $R^8$, $R^9$, $R^{41}$, $R^{42}$, n and q can be as defined above for Formula (I).

$R^6$ can be optionally substituted $C_1$-$C_4$heteroalkyl. $R^6$ can be optionally substituted $C_1$-$C_4$fluoroalkyl. $R^6$ can be optionally substituted $C_3$-$C_6$cycloalkyl. $R^6$ can be optionally substituted $C_3$-$C_6$cycloalkylalkyl. $R^6$ can be H. Z, $R^1$, $R^3$, $R^4$, $R^5$, $R^2$, $R^7$, $R^8$, $R^9$, $R^{41}$, $R^{42}$, n and q can be as defined above for Formula (I).

$R^7$ can be optionally substituted $C_1$-$C_4$alkyl, optionally substituted $C_1$-$C_4$heteroalkyl, optionally substituted $C_1$-$C_4$fluoroalkyl, optionally substituted $C_3$-$C_6$cycloalkyl, or optionally substituted $C_3$-$C_6$cycloalkylalkyl, and Z, $R^1$, $R^3$, $R^4$, $R^5$, $R^2$, $R^6$, $R^8$, $R^9$, $R^{41}$, $R^{42}$, n and q can be as defined above for Formula (I).

$R^7$ can be optionally substituted $C_1$-$C_4$alkyl. $R^7$ can be optionally substituted $C_1$-$C_4$heteroalkyl. $R^7$ can be optionally substituted $C_3$-$C_6$cycloalkyl. $R^7$ can be optionally substituted $C_1$-$C_4$alkyl. $R^7$ can be optionally substituted $C_3$-$C_6$cycloalkylalkyl. $R^7$ can be selected from the group of methyl, ethyl, —$CH_2CF_3$, —$CH_2$-cyclopropyl, or —$CH_2CH_2OCH_3$. Z, $R^1$, $R^3$, $R^4$, $R^5$, $R^2$, $R^6$, $R^1$, $R^9$, $R^{41}$, $R^{42}$, n and q can be as defined above for Formula (I).

$R^6$ can be H or methyl and $R^7$ can be methyl, ethyl, $CH_2CF_3$, $CH_2$-cyclopropyl, or $CH_2CH_2OCH_3$. $R^6$ can be methyl and $R^7$ can be methyl, ethyl, $CH_2CF_3$, $CH_2$-cyclopropyl, or $CH_2CH_2OCH_3$. $R^6$ can be methyl and $R^7$ can be methyl.

$R^{41}$ can be H, optionally substituted $C_1$-$C_4$alkyl, optionally substituted $C_1$-$C_4$heteroalkyl, or optionally substituted $C_1$-$C_4$fluoroalkyl, and Z, $R^1$, $R^3$, $R^4$, $R^5$, $R^2$, $R^6$, $R^7$, $R^8$, $R^9$, $R^{42}$, n and q can be as defined above for Formula (I).

$R^{41}$ can be H. $R^4$ can be optionally substituted $C_1$-$C_4$alkyl. $R^{41}$ can be optionally substituted $C_1$-$C_4$heteroalkyl. $R^{41}$ can be optionally substituted $C_1$-$C_4$fluoroalkyl. Z, $R^1$, $R^3$, $R^4$, $R^5$, $R^2$, $R^6$, $R^7$, $R^8$, $R^9$, $R^{42}$, n and q can be as defined above for Formula (I).

$R^{42}$ can be H, optionally substituted $C_1$-$C_4$alkyl, optionally substituted $C_1$-$C_4$heteroalkyl, or optionally substituted $C_1$-$C_4$fluoroalkyl, and Z, $R^1$, $R^3$, $R^4$, $R^5$, $R^2$, $R^6$, $R^7$, $R^8$, $R^9$, $R^{41}$, n and q can be as defined above for Formula (I).

$R^{42}$ can be optionally substituted $C_1$-$C_4$alkyl. $R^{42}$ can be methyl, ethyl, propyl, or butyl. $R^{42}$ can be ethyl. $R^{42}$ can be optionally substituted $C_1$-$C_4$heteroalkyl. $R^{42}$ can be optionally substituted $C_1$-$C_4$fluoroalkyl. $R^{42}$ can be H. Z, $R^1$, $R^3$, $R^4$, $R^5$, $R^2$, $R^6$, $R^7$, $R^8$, $R^9$, $R^{41}$, n and q can be as defined above for Formula (I).

The compound of Formula (I) can have the structure of formula (Ia)

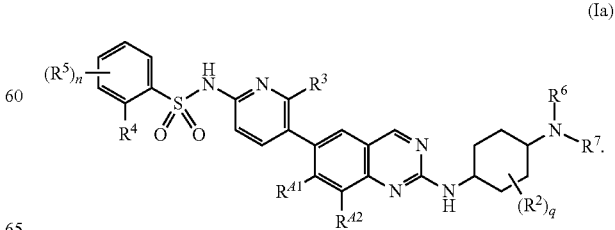

(Ia)

The compound of Formula (I) can have the structure of formula (Ib)

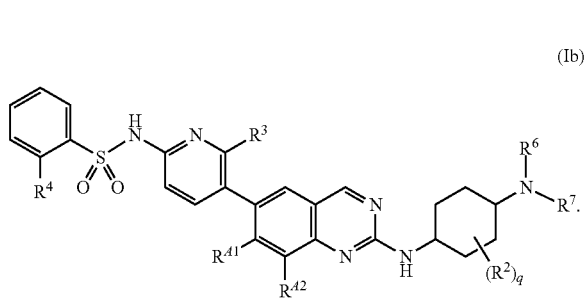
(Ib)

The compound of Formula (I) can have the structure of formula (Ic)

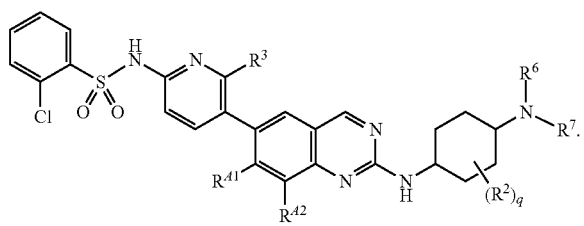
(Ic)

The compound of Formula (I) can have the structure of formula (Id)

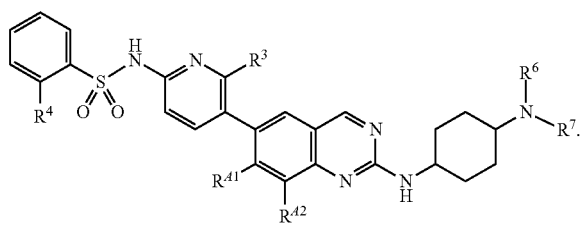
(Id)

The compound of Formula (I) can have the structure of formula (Ie)

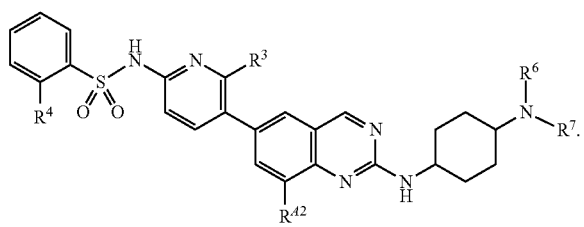
(Ie)

Compounds of formulae (Ia)-(Ie) are provided also as shown or as a pharmaceutically acceptable salt thereof, or a solvate thereof.

The disclosure also relates to a compound of Formula (I*), (Ib*), or (Ic*) or a pharmaceutically acceptable salt thereof, or solvate thereof:

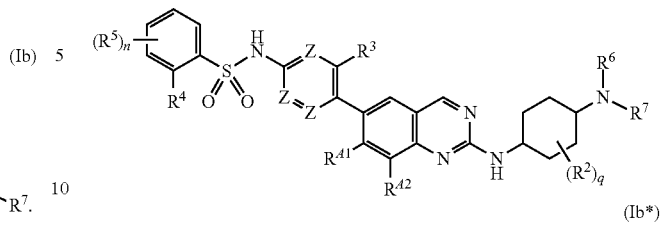
(I*)

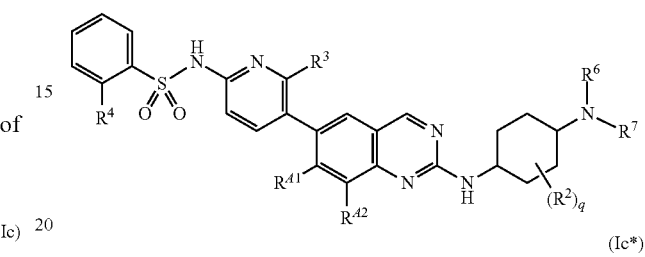
(Ib*)

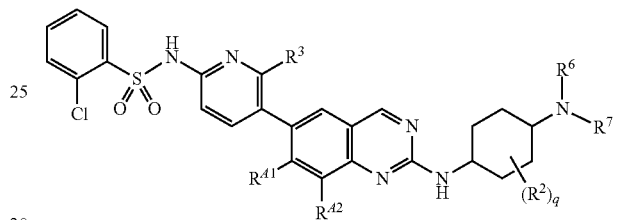
(Ic*)

wherein 3 each Z is independently N or $CR^1$, provided that at least one Z is N;

each $R^1$ is independently hydrogen, fluorine, chlorine or cyano;

$R^3$ is —CN, optionally substituted $C_1$-$C_3$alkyl, optionally substituted $C_3$-$C_4$cycloalkyl, optionally substituted —O—$C_3$-$C_4$cycloalkyl, or optionally substituted —O—$C_1$-$C_3$alkyl;

$R^4$ is chlorine, —$CH_3$, cyano, —$OCH_3$, or $CF_3$;

each $R^5$ is independently chlorine, —$CH_3$, cyano, —$OCH_3$, or $CF_3$;

each $R^2$ is independently fluorine, —$CH_3$, or —OH;

$R^6$ is H, or $C_1$-$C_3$alkyl;

$R^7$ is optionally substituted $C_1$-$C_3$alkyl; $C_1$-$C_3$fluoroalkyl, $C_1$-$C_3$heteroalkyl, or $C_3$-$C_4$cycloalkyl-$C_1$-$C_3$alkyl;

or $R^6$ and $R^7$ are taken together with the N atom to which they are attached to form an optionally substituted 4 to 6 membered ring, the remainder of the ring atoms being carbon;

$R^{41}$ and $R^{42}$ are each independently H, optionally substituted $C_1$-$C_3$alkyl; $C_1$-$C_3$fluoroalkyl, $C_1$-$C_3$heteroalkyl, or $C_3$-$C_4$cycloalkyl-$C_1$-$C_3$alkyl, provided that both $R^{41}$ and $R^{42}$ are not hydrogen;

n is 0, 1, 2, 3, or 4; and q is 0, 1, 2, 3, or 4.

In Formulas (I*), (Ib*) or (Ic*), $R^{41}$ can be H or $C_{1-3}$ alkyl and Z, $R^1$, $R^3$, $R^4$, $R^5$, $R^2$, $R^6$, $R^7$, $R^8$, $R^9$, $R^{42}$, n and q can be as defined above for Formulas (I*), (Ib*) or (Ic*).

In Formulas (I*), (Ib*) or (Ic*), one or more of $R^3$, $R^7$, $R^{41}$, and $R^{42}$ can be optionally substituted, wherein optional substituents are each independently selected from fluorine, —OH, —$OCH_3$, —$OCH_2CH_3$, —$OCH_2CH_2CH_3$, —$NH_2$, —$NH(CH_3)$, or —$N(CH_3)_2$ and Z, $R^1$, $R^4$, $R^5$, $R^2$, $R^6$, $R^1$, $R^9$, n and q can be as defined above for Formulas (I*), (Ib*) or (Ic*).

In Formulas (I*), (Ib*) or (Ic*), one or more of $R^3$, $R^7$, $R^{41}$, and $R^{42}$ can be optionally substituted, wherein optional substituents are each independently selected from fluorine, —OH, —OCH$_3$, —OCH$_2$CH$_3$, —OCH$_2$CH$_2$CH$_3$, —NH(CH$_3$), or —N(CH$_3$)$_2$ and Z, $R^1$, $R^4$, $R^5$, $R^2$, $R^6$, $R^8$, $R^9$, n and q can be as defined above for Formulas (I*), (Ib*) or (Ic*).

In Formulas (I*), (Ib*) or (Ic*), one or more of $R^7$, $R^{41}$, and $R^{42}$ can be C$_1$-C$_3$heteroalkyl, wherein a heteroatom in the C$_1$-C$_3$heteroalkyl is oxygen and Z, $R^1$, $R^3$, $R^4$, $R^5$, $R^2$, $R^6$, $R^8$, $R^9$, n and q can be as defined above for Formulas (I*), (Ib*) or (Ic*).

In Formulas (I*), (Ib*) or (Ic*), $R^6$ can be H, or methyl and can be methyl, ethyl, CH$_2$CF$_3$, CH$_2$-cyclopropyl or CH$_2$CH$_2$OCH$_3$ and Z, $R^1$, $R^3$, $R^4$, $R^5$, $R^2$, $R^1$, $R^9$, $R^{41}$, and $R^{42}$, n and q can be as defined above for Formulas (I*), (Ib*) or (Ic*).

In Formulas (I*), (Lb*) or (Ic*), $R^6$ can be methyl, $R^7$ can be methyl, ethyl, CH$_2$CF$_3$, CH$_2$-cyclopropyl or CH$_2$CH$_2$OCH$_3$, and Z, $R^1$, $R^3$, $R^4$, $R^5$, $R^2$, $R^1$, $R^9$, $R^{41}$, and $R^{42}$, n and q can be as defined above for Formulas (I*), (Ib*) or (Ic*).

In Formulas (I*), (Ib*) or (Ic*), q can be zero.

In Formulas (I*), (Ib*) or (Ic*), each Z can be independently N or CR$^1$, provided that at least one Z is N; each $R^1$ can be independently hydrogen, fluorine, chlorine or cyano; $R^3$ can be C$_1$-C$_3$alkyl or —OC$_1$-C$_3$alkyl; $R^{41}$ can be hydrogen, or C$_1$-C$_3$alkyl; $R^{42}$ can be C$_1$-C$_3$alkyl, C$_1$-C$_3$fluoroalkyl, or C$_1$-C$_3$heteroalkyl; provided that both $R^{41}$ and $R^{42}$ are not hydrogen; $R^4$ can be chlorine; each $R^5$ can be independently chlorine, —CH$_3$, cyano, —OCH$_3$, or CF$_3$; n can be 0, 1, 2, 3, or 4; and q is zero.

In Formulas (I*), (Ib*) or (Ic*),
$R^1$ can be H;
$R^3$ can be methyl, ethyl, or —OCH$_3$,
$R^4$ can be chlorine, or —CH$_3$;
$R^6$ can be H, or methyl;
$R^7$ can be methyl, ethyl, CH$_2$CF$_3$, CH$_2$-cyclopropyl or CH$_2$CH$_2$OCH$_3$;
$R^{42}$ can be ethyl, hydrogen, CF$_2$CH$_3$, CF$_3$, CH$_2$OCH$_3$, or CH$_3$;
$R^{41}$ can be methyl or H;
n can be 0; and
q can be 0.

In Formulas (I*), (Ib*), or (Ic*), $R^4$ can be halo. $R^3$ can be C$_1$-C$_3$alkyl. q can be 0. $R^6$ can be H or C$_1$-C$_3$alkyl, and $R^7$ can be C$_1$-C$_3$alkyl. $R^6$ can be H or methyl and $R^7$ can be methyl. $R^{41}$ can be H. $R^{42}$ can be C$_1$-C$_3$alkyl. $R^{42}$ can be ethyl.

The disclosure also relates to a compound of Formula (Id*) or a pharmaceutically acceptable salt thereof, or a solvate thereof:

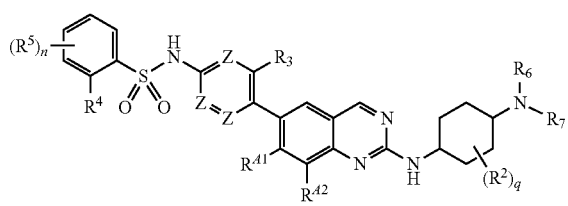

(Id*)

wherein Z, $R^1$, $R^3$, $R^4$, $R^5$, $R^2$, $R^6$, $R^7$, $R^8$, $R^9$, $R^{41}$, and $R^{42}$ are as described for Formula (I), and n and q are each independently 0 or 1. Z can be independently N or CR$^1$, provided that at least one Z is N; when present, each $R^5$ is independently chlorine, fluorine, or C$_1$-C$_3$alkyl; $R^4$ can be chlorine or C$_1$-C$_3$alkyl; $R^3$ can be C$_1$-C$_3$alkyl or —OC$_1$-C$_3$alkyl; $R^{41}$ can be fluorine, chlorine, hydrogen, or C$_1$-C$_3$alkyl; $R^{42}$ can be C$_1$-C$_3$alkyl, —OC$_1$-C$_3$alkyl, hydrogen, C$_1$-C$_3$fluoroalkyl, fluorine, chlorine, or C$_1$-C$_3$heteroalkyl; provided that both $R^{41}$ and $R^{42}$ are not hydrogen; $R^2$ can be fluorine; and each $R^1$ is independently hydrogen or fluorine; and wherein one, two or three Zs can be nitrogen.

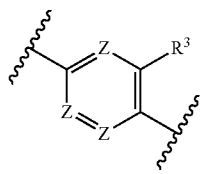

can be

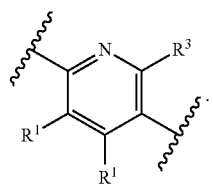

$R^5$ can be chlorine, fluorine, or —CH$_3$; $R^4$ can be chlorine or —CH$_3$; $R^3$ can be —CH$_3$, —CH$_2$CH$_3$, or —OCH$_3$; $R^{41}$ can be fluorine, chlorine, hydrogen, or —CH$_3$; $R^{42}$ can be hydrogen, —CH$_3$, —CH$_2$CH$_3$, —OCH$_3$, CF$_3$, CF$_2$CH$_3$, CH$_2$OCH$_3$, or fluorine; provided that both $R^{41}$ and $R^{42}$ are not hydrogen; $R^2$ can be fluorine; and each $R^1$ can be independently hydrogen or fluorine. $R^6$ and $R^7$ can be as described herein. or example, $R^7$ can be optionally substituted C$_3$-C$_6$cycloalkylalkyl or $R^7$ can be selected from the group of methyl, ethyl, —CH$_2$CF$_3$, —CH$_2$-cyclopropyl, or —CH$_2$CH$_2$OCH$_3$, or $R^7$ can be selected from the group of methyl, ethyl, —CH$_2$CF$_3$, —CH$_2$-cyclopropyl, —CH$_2$-cyclobutyl, or —CH$_2$CH$_2$OCH$_3$; and $R^6$ is as described herein. $R^6$ can be hydrogen or C$_{1-4}$ alkyl or $R^6$ can be hydrogen or methyl. n can be 0; $R^4$ can be chlorine; q can be 0; and $R^1$ can be hydrogen. $R^6$ can be H or methyl and $R^7$ can be methyl, ethyl, CH$_2$CF$_3$, CH$_2$-cyclopropyl, or CH$_2$CH$_2$OCH$_3$. $R^6$ can be methyl and $R^7$ can be methyl, ethyl, CH$_2$CF$_3$, CH$_2$-cyclopropyl, or CH$_2$CH$_2$OCH$_3$. $R^6$ can be H and $R^7$ can be methyl. $R^6$ can be methyl and $R^7$ can be methyl. $R^{42}$ can be ethyl.

The compounds described herein can be a compound from Table 1 or a pharmaceutically salt thereof, or a solvate thereof.

Also provided is a method for treating fibrosis in a subject, the method comprising administering to the subject an effective amount of a compound from Table 1 or a pharmaceutically acceptable salt thereof, or a solvate thereof.

TABLE 1

| Ex. | Structure | Name |
|---|---|---|
| 23 | | N-(5-(2-(((1r,4r)-4-aminocyclohexyl)amino)-8-ethylquinazolin-6-yl)-4-methylpyrimidin-2-yl)-2-chlorobenzenesulfonamide |
| 24 | | N-(4-(2-(((1r,4r)-4-aminocyclohexyl)amino)-8-ethylquinazolin-6-yl)-2-fluorophenyl)-2-chlorobenzenesulfonamide |
| 25 | | N-(5-(2-(((1r,4r)-4-aminocyclohexyl)amino)-8-ethylquinazolin-6-yl)pyrazin-2-yl)-2-chlorobenzenesulfonamide |
| 26 | | N-(4-(2-(((1r,4r)-4-aminocyclohexyl)amino)quinazolin-6-yl)phenyl)-2-chlorobenzenesulfonamide |
| 27 | | N-(5-(2-(((1r,4r)-4-aminocyclohexyl)amino)-8-ethylquinazolin-6-yl)pyridin-2-yl)-2-chlorobenzenesulfonamide |

TABLE 1-continued

| Ex. | Structure | Name |
|---|---|---|
| 28 | | N-(6-(2-(((1r,4r)-4-aminocyclohexyl)amino)-8-ethylquinazolin-6-yl)pyridin-3-yl)-2-chlorobenzenesulfonamide |
| 29 | | N-(5-(2-(((1r,4r)-4-aminocyclohexyl)amino)-8-ethylquinazolin-6-yl)-1H-pyrazol-3-yl)-2-chlorobenzenesulfonamide |
| 30 | | N-(4-(2-(((1r,4r)-4-aminocyclohexyl)amino)-8-hydroxyquinazolin-6-yl)-3-methylphenyl)-2-chloro-N-methylbenzenesulfonamide |
| 31 | | N-(4-(2-(((1r,4r)-4-aminocyclohexyl)amino)-8-ethylquinazolin-6-yl)-3-methylphenyl)-2-chloro-N-methylbenzenesulfonamide |
| 32 | | N-(6-(2-(((1r,4r)-4-aminocyclohexyl)amino)-8-ethylquinazolin-6-yl)pyridazin-3-yl)-2-chlorobenzenesulfonamide |

TABLE 1-continued

| Ex. | Structure | Name |
|-----|-----------|------|
| 33 | | N-(2-(2-(((1r,4r)-4-aminocyclohexy)amino-8-ethylquinazolin-6-yl)pyrimidin-5-yl)-2-chlorobenzenesulfonamide |
| 34 | | N-(4-(2-(((1r,4r)-4-aminocyclohexyl)amino)-8-ethylquinazolin-6-yl)-3-ethylphenyl)-2-chlorobenzenesulfonamide |
| 35 | | N-(4-(2-(((1r,4r)-4-aminocyclohexyl)amino)-8-ethylquinazolin-6-yl)-3-fluorophenyl)-2-chlorobenzenesulfonamide |
| 36 | | N-(4-(2-(((1r,4r)-4-aminocyclohexyl)amino)-8-methoxyquinazolin-6-yl)-3-methylphenyl)-2-chlorobenzenesulfonamide |
| 37 | | N-(5-(2-(((1r,4r)-4-aminocyclohexyl)amino)-8-ethylquinazolin-6-yl)-6-methoxypyridin-2-yl)-2-chlorobenzenesulfonamide |

TABLE 1-continued

| Ex. | Structure | Name |
|---|---|---|
| 38 | | N-(5-(2-(((1r,4r)-4-aminocyclohexyl)amino)-8-ethylquinazolin-6-yl)-4-methylthiazol-2-yl)-2-chlorobenzenesulfonamide |
| 39 | | N-(5-(2-(((1r,4r)-4-aminocyclohexyl)amino)-8-ethylquinazolin-6-yl)pyrimidin-2-yl)-2-chlorobenzenesulfonamide |
| 40 | | N-(5-(2-(((1r,4r)-4-aminocyclohexyl)amino-8-isopropylquinazolin-6-yl)-1-methyl-1H-pyrazol-3-yl)-2-chlorobenzenesulfonamide |
| 41 | | N-(5-(2-(((1r,4r)-4-aminocyclohexyl)amino)-8-ethylquinazolin-6-yl)thiazol-2-yl)-2-chlorobenzenesulfonamide |
| 42 | | N-(4-(2-(((1r,4r)-4-aminocyclohexyl)amino)-8-ethylquinazolin-6-yl)-2-fluoro-5-methoxyphenyl)-2-chlorobenzenesulfonamide |

TABLE 1-continued

| Ex. | Structure | Name |
| --- | --- | --- |
| 43 | | N-(1-(2-(((1r,4r)-4-aminocyclohexyl)amino)-8-ethylquinazolin-6-yl)-1H-pyrazol-4-yl)-2-chlorobenzenesulfonamide |
| 44 | | N-(5-(2-(((1r,4r)-4-aminocyclohexyl)amino)-8-ethylquinazolin-6-yl)isoxazol-3-yl)-2-chlorobenzenesulfonamide |
| 45 | | N-(5-(2-(((1r,4r)-4-aminocyclohexyl)amino)-8-methoxyquinazolin-6-yl)-1-methyl-1H-pyrazol-3-yl)-2-chlorobenzenesulfonamide |
| 46 | | N-(5-(2-(((1r,4r)-4-aminocyclohexyl)amino)-8-ethylquinazolin-6-yl)-4-methoxypyrimidin-2-yl)-2-chlorobenzenesulfonamide |
| 47 | | N-(5-(2-(((1r,4r)-4-aminocyclohexyl)amino)-8-propylquinazolin-6-yl)-1-methyl-1H-pyrazol-3-yl)-2-chlorobenzenesulfonamide |

TABLE 1-continued

| Ex. | Structure | Name |
|---|---|---|
| 48 | | N-(4-(2-(((1r,4r)-4-aminocyclohexyl)amino)quinazolin-6-yl)-3-fluorophenyl)-2-chlorobenzenesulfonamide |
| 49 | | N-(6-(2-(((1r,4r)-4-aminocyclohexyl)amino)quinazolin-6-yl)pyridazin-3-yl)-2-chlorobenzenesulfonamide |
| 50 | | N-(4-(2-(((1r,4r)-4-aminocyclohexyl)amino)quinazolin-6-yl)-2-fluorophenyl)-2-chlorobenzenesulfonamide |
| 51 | | N-(6-(2-(((1r,4r)-4-aminocyclohexyl)amino)quinazolin-6-yl)-5-fluoropyridin-3-yl)-2-chlorobenzenesulfonamide |
| 52 | | N-(6-(2-(((1r,4r)-4-aminocyclohexyl)amino)-8-ethylquinazolin-6-yl)-5-fluoropyridin-3-yl)-2-chlorobenzenesulfonamide |

TABLE 1-continued

| Ex. | Structure | Name |
|---|---|---|
| 53 | | N-(4-(2-(((1r,4r)-4-aminocyclohexyl)amino)quinazolin-6-yl)-2,5-difluorophenyl)-2-chlorobenzenesulfonamide |
| 54 | | N-(5-(2-(((1r,4r)-4-aminocyclohexyl)amino)quinazolin-6-yl)-3-fluoropyridin-2-yl)-2-chlorobenzenesulfonamide |
| 55 | | N-(5-(2-(((1r,4r)-4-aminocyclohexyl)amino-8-ethylquinazolin-6-yl)-3-fluoropyridin-2-yl)-2-chlorobenzenesulfonamide |
| 56 | | N-(4-(2-(((1r,4r)-4-aminocyclohexyl)amino)quinazolin-6-yl)-2,3-difluorophenyl)-2-chlorobenzenesulfonamide |
| 57 | | N-(4-(3-(((1r,4r)-4-aminocyclohexyl)amino)isoquinolin-7-yl)-2-fluorophenyl)-2-chlorobenzenesulfonamide |

TABLE 1-continued

| Ex. | Structure | Name |
|---|---|---|
| 58 | | (S)-2-amino-N-(1r,4S)-4-(((6-(4-((2-chlorophenyl)sulfonamido)-3-fluorophenyl)-8-ethylquinazolin-2-yl)amino)cyclohexyl)-3-methylbutanamide |
| 59 | | N-((1r,4r)-4-((6-(4-((2-chlorophenyl)sulfonamido)-3-fluorophenyl)-8-ethylquinazolin-2-yl)amino)cyclohexyl)acetamide |
| 60 | | 2-chloro-N-(4-(8-ethyl-2-(((1r,4r)-4-(methylamino)cyclohexyl)amino)quinazolin-6-yl)-2-fluorophenyl)benzenesulfonamide |
| 61 | | 2-chloro-N-(6-(8-ethyl-2-(((1r,4r)-4-(methylamino)cyclohexyl)amino)quinazolin-6-yl)pyridazin-3-yl)benzenesulfonamide |
| 62 | | N-(4-(2-(((1r,4r)-4-aminocyclohexyl)amino)quinazolin-6-yl)-3,5-difluorophenyl)-2-chlorobenzenesulfonamide |

TABLE 1-continued

| Ex. | Structure | Name |
|---|---|---|
| 63 | | N-(4-(2-(((1r,4r)-4-aminocyclohexyl)amino)-8-ethylquinazolin-6-yl)-2,6-difluorophenyl)-2-chlorobenzenesulfonamide |
| 64 | | 2-chloro-N-(6-(2-(((1r,4r)-4-(dimethylamino)cyclohexyl)amino)-8-ethylquinazolin-6-yl)pyridazin-3-yl)benzenesulfonamide |
| 65 | | N-(6-(2-(((1r,4r)-4-aminocyclohexyl)amino)-8-ethylquinazolin-6-yl)-5-methoxypyridazin-3-yl)-2-chlorobenzenesulfonamide |
| 66 | | N-(6-(2-(((1r,4r)-4-aminocyclohexyl)amino)-8-ethylquinazolin-6-yl)-4-methoxypyridazin-3-yl)-2-chlorobenzenesulfonamide |
| 67 | | N-(6-(2-(((1r,4r)-4-aminocyclohexyl)amino)-8-ethylquinazolin-6-yl)-5-methylpyridazin-3-yl)-2-chlorobenzenesulfonamide |

TABLE 1-continued

| Ex. | Structure | Name |
|---|---|---|
| 68 | | N-(5-(2-(((1r,4r)-4-aminocyclohexyl)amino)quinazolin-6-yl-4-methylpyrimidin-2-yl)-2-chlorobenzenesulfonamide |
| 69 | | 2-chloro-N-(4-(2-(((1r,4r)-4-(dimethylamino)cyclohexyl)amino)-8-ethylquinazolin-6-yl)-2-fluorophenyl)benzenesolfonamide |
| 70 | | N-(4-(2-(((1R,3R,4S)-4-amino-3-methylcyclohexyl)amino)-8-ethylquinazolin-6-yl)-2-fluorophenyl)-2-chlorobenzenesulfonamide |
| 71 | | N-(4-(2-(((1r,4r)-4-aminocyclohexyl)amino)-8-ethylquinazolin-6-yl)-2-fluoro-3-methylphenyl)-2-chlorobenzenesulfonamide |
| 72 | | N-(4-(2-(((1R,3S)-3-aminocyclohexyl)amino)-8-ethylquinazolin-6-yl)-2-fluorophenyl)-2-chlorobenzenesulfonamide |

TABLE 1-continued

| Ex. | Structure | Name |
|---|---|---|
| 73 | 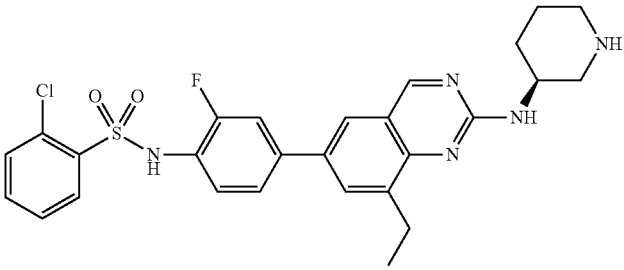 [SMILES: CCc1cc(-c2ccc(NS(=O)(=O)c3ccccc3Cl)c(F)c2)cc2cnc(N[C@H]3CCCNC3)nc12] | (S)-2-chloro-N-(4-(8-ethyl-2-(piperidin-3-ylamino)quinazolin-6-yl)-2-fluorophenyl)benzenesulfonamide |
| 74 | 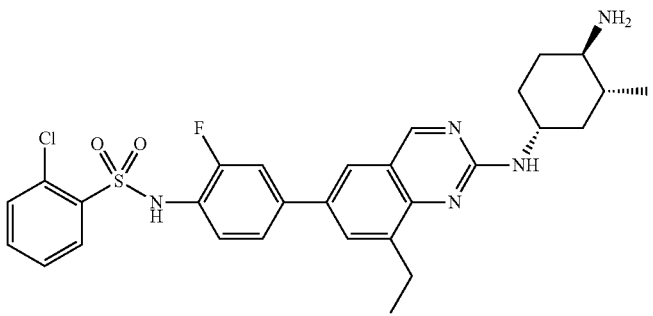 [SMILES: CCc1cc(-c2ccc(NS(=O)(=O)c3ccccc3Cl)c(F)c2)cc2cnc(N[C@@H]3CC[C@@H](N)[C@H](C)C3)nc12] | N-(4-(2-(((1R,3R,4R)-4-amino-3-methylcyclohexyl)amino)-8-ethylquinazolin-6-yl)-2-fluorophenyl)-2-chlorobenzenesulfonamide |
| 75 | 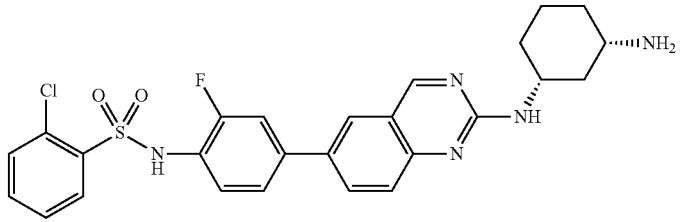 [SMILES: N[C@H]1CCC[C@@H](Nc2ncc3cc(-c4ccc(NS(=O)(=O)c5ccccc5Cl)c(F)c4)ccc3n2)C1] | N-(4-(2-(((1R,3S)-3-aminocyclohexyl)amino)quinazolin-6-yl)-2-fluorophenyl)-2-chlorobenzenesulfonamide |
| 76 | 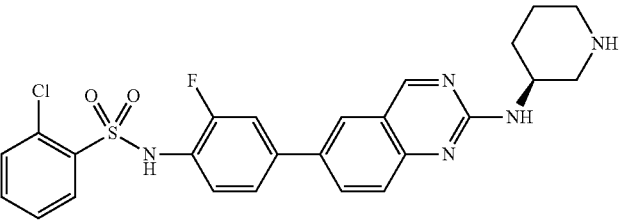 [SMILES: O=S(=O)(Nc1ccc(-c2ccc3nc(N[C@H]4CCCNC4)ncc3c2)cc1F)c1ccccc1Cl] | (S)-2-chloro-N-(2-fluoro-4-(2-(piperidin-3-ylamino)quinazolin-6-yl)phenyl)benzenesulfonamide |
| 77 | 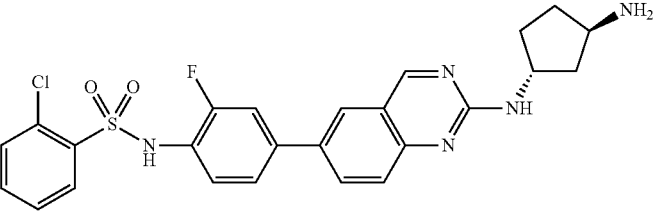 | N-(4-(2-(((,1R,3R)-3-aminocyclopentyl)amino)quinazolin-6-yl)-2-fluorophenyl)-2-chlorobenzenesulfonamide |
| 78 | 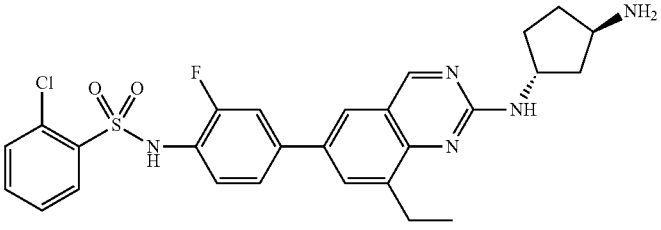 [SMILES: CCc1cc(-c2ccc(NS(=O)(=O)c3ccccc3Cl)c(F)c2)cc2cnc(N[C@@H]3CC[C@@H](N)C3)nc12] | N-(4-(2-(((1R,3R)-3-aminocyclopentyl)amino)-8-ethylquinazolin-6-yl)-2-fluorophenyl)-2-chlorobenzenesulfonamide |

TABLE 1-continued

| Ex. | Structure | Name |
|---|---|---|
| 79 | | N-(4-(2-(((1R,3S)-3-aminocyclopentyl)amino)-8-ethylquinazolin-6-yl)-2-fluorophenyl)-2-chlorobenzenesulfonamide |
| 80 | | N-(4-(2--(((1R,3S)-3-aminocyclopentyl)amino)quinazolin-6-yl)-2-fluorophenyl)-2-chlorobenzenesulfonamide |
| 81 | | N-(4-(2-((4-aminobicyclo[2.2.2]octan-1-yl)amino)quinazolin-6-yl)-2-fluorophenyl)-2-chlorobenzeuesulfonamide |
| 82 | | N-(4-(2-(((2r,5r)-aminooctahydropentalen-2-yl)amino)-8-ethylquinazolin-6-yl)-2-fluorophenyl)-2-chlorobenzenesulfonamide |
| 83 | | N-(4-(2-(((2r,5r)-5-aminooctahydropentalen-2-yl)amino)-8-ethylquinazolin-6-yl)-2-fluorophenyl)-2-chlorobenzenesulfonamide |

TABLE 1-continued

| Ex. | Structure | Name |
|---|---|---|
| 84 | | N-(4-(2-(((2s,5s)-5-aminooctahydropentalen-2-yl)amino)-8-ethylquinazolin-6-yl)-2-fluorophenyl)-2-chlorobenzenesulfonamide |
| 85 | | N-(4-(2-(((2s,5s)-5-aminooctahydropentalen-2-yl)amino)quinazolin-6-yl)-2-fluorophenyl)-chlorobenzenesulfonamide |
| 86 | | N-(4-(2-((4-aminobicyclo[2.2.2]heptan-1-yl)amino)quinazolin-6-yl)-2-fluorophenyl)-2-chlorobenzenesulfonamide |
| 87 | | N-(4-(2-(((4-aminobicyclo[2.2.2]octan-1-yl)amino)-8-ethylquinazolin-6-yl)-2-fluorophenyl)-2-chlorobenzenesulfonamide |
| 88 | | 2-chloro-N-(4-(8-ethyl-2-(((1r,4r)-4-(pyrrolidin-1-yl)cyclohexyl)amino)quinazolin-6-yl)-2-fluorophenyl)benzenesulfonamide |

TABLE 1-continued

| Ex. | Structure | Name |
|---|---|---|
| 89 | | N-(5-(2-4(1r,4r)-4-aminocyclohexyl)amino)quinazolin-6-yl)-1,3,4-thiadiazol-2-yl)-2-chlorobenzenesulfonamide |
| 90 | | N-(4-(2-(((1r,4r)-4-aminocyclohexyl)amino)-7-methylquinazolin-6-yl)-2-fluorophenyl)-2-chlorobenzenesulfonamide |
| 91 | | 2-chloro-N-(5-(2-(((1r,4r)-4-(dimethylamino)cyclohexyl)amino)-8-ethylquinazolin-6-yl)-6-methylpyridin-2-yl)benzenesulfonamide |
| 92 | | N-(5-(2-(((1r,4r)-4-aminocyclohexyl)amino)-8-ethylquinazolin-6-yl)-4-methoxypyridin-2-yl)-2-chlorobenzenesulfonamide |
| 93 | | N-(6-(2-(((1r,4r)-4-aminocyclohexyl)amino-8-ethylquinazolin-6-yl)-methoxypyridin-3-yl)-2-chlorobenzenesulfonamide |

TABLE 1-continued

| Ex. | Structure | Name |
|---|---|---|
| 94 | | N-(5-(2-(((1r,4r)-4-aminocyclohexyl)amino)-8-ethylquinazolin-6-yl)-6-methylpyrazin-2-yl)-2-chlorobenzenesulfonamide |
| 95 | | 2-chloro-N-(5-(2-(((1r,4r)-4-(dimethylamino)cyclohexyl)amino)-8-ethylquinazolin-6-yl)-3-fluoropyridin-2-yl)benzenesulfonamide |
| 96 | | N-(6-(2-(((1r,4r)-4-aminocyclohexyl)amino)-8-ethylquinazolin-6-yl)-5-ethylpyridazin-3-yl)-2-chlorobenzenesulfonamide |
| 97 | | 2-chloro-N-(5-(2-(((1r,4r)-4-(dimethylamino)cyclohexyl)amino)-8-ethylquinazolin-6-yl)-3-fluoro-6-methylpyridin-2-yl)benzenesulfonamide |
| 98 | | N-(5-(2-(((1r,4)-4-aminocyclohexyl)amino)-8-ethylquinazolin-6-yl)-6-methoxypyrazin-2-yl)-2-chlorobenzenesulfonamide |

TABLE 1-continued

| Ex. | Structure | Name |
|---|---|---|
| 99 | | 2-chloro-N-(5-(2-(((1r,4r)-4-(dimethylamino)cyclohexyl)amino)-8-ethylquinazolin-6-yl)-6-methoxypyridin-2-yl)benzenesulfonamide |
| 108 | | 2-chloro-N-(5-(2-(((1r,4r)-4-(dimethylamino)cyclohexyl)amino)-7-methylquinazolin-6-yl)-6-methoxypyridin-2-yl)benzenesulfonamide |
| 116 | | 2-chloro-N-(5-(8-ethyl-2-(((1r,4r)-4-methylamino)cyclohexyl)amino)quinazolin-6-yl)-6-methoxypyridin-2-yl)benzenesulfonamide |
| 117 | | 2-chloro-N-(5-(2-(((1r,4r)-4-(dimethylamino)cyclohexyl)amino)-8-ethylquinazolin-6-yl)-6-ethylpyridin-2-yl)benzenesulfonamide |
| 118 | | N-(5-(8-ethyl-2-(((1r,4r)-4-(methlylamino)cyclohexyl)amino)quinazolin-6-yl)-6-methoxypyridin-2-yl)-2-methylbenzenesulfonamide |

TABLE 1-continued

| Ex. | Structure | Name |
|---|---|---|
| 119 | | N-(5-(2-(((1r,4r)-4-(dimethylamino)cyclohexyl)amino)-8-ethylquinazolin-6-yl)-6-methoxypyridin-2-yl)-2-methylbenzenesulfonamide |
| 122 | | 2-chloro-N-(5-(8-ethyl-2-(((1r,4r)-4-(methylamino)cyclohexyl)amino)quinazolin-6-yl)-6-methylpyridin-2-yl)benzenesulfonamide |
| 124 | | 2-chloro-N-(5-(8-(1,1-difluoroethyl)-2-(((1r,4r)-4-(dimethylamino)cyclohexyl)amino)quinazolin-6-yl)-6-methoxypyridin-2-yl)benzenesulfonamide |
| 125 | | 2-chloro-N-(5-(8-ethyl-2-(((1r,4r)-4-(ethyl(methyl)amino)cyclohexyl)amino)quinazolin-6-yl)-6-methylpyridin-2-yl)benzenesulfonamide |
| 126 | | 2-chloro-N-(5-(8-ethyl-2-4(1r,4r)-4-(methyl(2,2,2-trifluoroethyl)amino)cyclohexyl)amino)quinazolin-6-yl)-6-methylpyridin-2-yl)benzenesulfonamide |

TABLE 1-continued

| Ex. | Structure | Name |
| --- | --- | --- |
| 127 | | 2-chloro-N-(5-(8-ethyl-2-(((1r,4r)-4-(methylamino)cyclohexyl)amino)quinazolin-6-yl)-3-fluoro-6-methoxpyridin-2-yl)benzenesulfonamide |
| 128 | | 2-chloro-N-(5-(2-(((1r,4r)-4-(dimethylamino)cyclohexyl)amino)-8-ethylquinazolin-6-yl)-3-fluoro-6-methoxypyridin-2-yl)benzenesulfonamide |
| 130 | | 2-chloro-N-(5-(2-(((1r,4r)-4-((cyclobutylmethyl)(methyl)amino)cyclohexyl)amino)-8-ethylquinazolin-6-yl)-6-methylpyridin-2-yl)benzenesulfonamide |
| 131 | | 2-chloro-N-(5-(8-(1,1-difluoroethyl)-2-(((1r,4r)-4-(dimethylamino)cyclohexyl)amino)quinazolin-6-yl)-6-methylpyridin-2-yl)benzenesulfonamide |
| 132 | | 2-chloro-N-(5-(8-ethyl-2-(((1r,4r)-4-((2-methoxyethyl)(methyl)amino)cyclohexyl)amino)quinazolin-6-yl)-6-methylpyridin-2-yl)benzenesulfonamide |

TABLE 1-continued

| Ex. | Structure | Name |
|---|---|---|
| 133 | | 2-chloro-N-(5-(2-(((1r,4r)-4-(dimethylamino)cyclohexyl)amino)-8-methylquinazolin-6-yl)-6-methoxypyridin-2-yl)benzenesulfonamide |
| 135 | | 2-chloro-N-(5-(2-(((1r,4r)-4-(dimethylamino)cyclohexyl)amino)-8-(trifluoromethyl)quinazolin-6-yl)-6-methoxypyridin-2-yl)benzenesulfonamide |
| 137 | | 2-chloro-N-(5-(2-(((1r,4r)-4-(dimethylamino)cyclohexyl)amino)-8-(methoxymethyl)quinazolin-6-yl)-6-methoxypyridin-2-yl)benzenesulfonamide |
| 139 | | 2-chloro-N-(5-(2-(((1s,4r)-4-(dimethylamino)cyclohexyl)amino)-8-methylquinazolin-6-yl)-6-methoxypyridin-2-yl)benzenesulfonamide |
| 141 | | 2-chloro-N-(5-(2-(((1s,4s)-4-(dimethylamino)cyclohexyl)amino)-8-ethylquinazolin-6-yl)-6-methoxypyridin-2-yl)benzenesulfonamide |

TABLE 1-continued

| Ex. | Structure | Name |
|---|---|---|
| 142 | | 2-chloro-N-(5-(2-(((1s,4s)-4-(dimethylamino)cyclohexyl)amino)-8-ethylquinazolin-6-yl)-3-fluoro-6-methoxypyridin-2-yl)benzenesulfonamide |
| 143 | | 2-chloro-N-(5-(2-(((1s,4s)-4-(dimethylamino)-4-methylcyclohexyl)amino)-8-ethylquinazolin-6-yl)-6-methoxypyridin-2-yl)benzenesulfonamide |
| 144 | | 2-chloro-N-(5-(2-(((1s,4s)-4-(dimethylamino)-4-methylcyclohexyl)amino)-8-ethylquinazolin-6-yl)-3-fluoro-6-methoxypyridin-2-yl)benzenesulfonamide |
| 145 | | 2-chloro-N-(5-(2-(((1r,4r)-4-(dimethylamino)cyclohexyl)amino-8-methylquinazolin-6-yl)-3-fluoro-6-methoxypyridin-2-yl)benzenesulfonamide |
| 147 | | 2-chloro-N-(5-(2-(((1s,4s)-4-(dimethylamino)cyclohexyl)amino)-8-methylquinazolin-6-yl)-3-fluoro-6-methoxypyridin-2-yl)benzenesulfonamide |

TABLE 1-continued

| Ex. | Structure | Name |
|---|---|---|
| 148 | | 2-chloro-N-(5-(2-(((1r,4r)-4-(dimethylamino)cyclohexyl)amino)-fluoroquinazolin-6-yl)-6-methoxypyridin-2-yl)benzenesulfonamide |
| 149 | | 2-chloro-N-(5-(2-(((1r,4r)-4-(dimethylamino)cyclohexyl)amino)quinazolin-6-yl)-3-fluoro-6-methoxypyridin-2-yl)benzenesulfonamide |
| 150 | | 2-chloro-N-(3-fluoro-6-methoxy-5-(2-(((1r,4r)-4-(methylamino)cyclohexyl)amino)quinazolin-6-yl)pyridin-2-yl)benzenesulfonamide |
| 151 | | 2-chloro-N-(5-(2-(((1S,2S,4S)-4-(dimethylamino)-2-fluorocyclohexyl)amino)-8-ethylquinazolin-6-yl)-6-methylpyridin-2-yl)benzenesulfonamide |
| 152 | | 2,3-dichloro-N-(5-(2-(((1r,4r)-4-(dimethylamino)cyclohexyl)amino)-8-ethylquinazolin-6-yl)-6-methylpyridin-2-yl)benzenesulfonamide |

TABLE 1-continued

| Ex. | Structure | Name |
|---|---|---|
| 153 | | 2-chloro-N-(5-(2-(((1r,4r)-4-(dimethylamino)cyclohexyl)amino)quinazolin-6-yl)-3-fluoro-6-methylpyridin-2-yl)benzenesulfonamide |
| 154 | | 2-chloro-N-(5-(2-(((1r,4r)-1-4-(dimethylamino)cyclohexyl)amino)-8-ethylquinazolin-6-yl)-4-methoxypyrimidin-2-yl)benzenesulfonamide |
| 155 | | 2-chloro-N-(5-(2-(((1r,4r)-4-(dimethylamino)cyclohexyl)amino)-8-fluoroquinazolin-6-yl)-3-fluoro-6-methoxypyridin-2-yl)benzenesulfonamide |
| 156 | | 2-chloro-N-(5-(2-(((1r,4)-4-(dimethylamino)cyclohexyl)amino)-8-fluoroquinazolin-6-yl)-3-fluoro-6-methylpyridin-2-yl)benzenesulfonamide |
| 157 | | 2-chloro-N-(5-(2-(((1r,4)-4-(dimethylamino)cyclohexyl)amino)-8-ethylquinazolin-6-yl)-6-methoxypyrazin-2-yl)benzenesulfonamide |

TABLE 1-continued

| Ex. | Structure | Name |
|---|---|---|
| 158 | | 2-chloro-N-(5-(2-(((1r,4)-4-(dimethylamino)cyclohexyl)amino)-8-ethylquinazolin-6-yl)-6-methylpyridin-2-yl)-3-fluorobenzenesulfonamide |
| 159 | | 2-chloro-N-(6-(2-(((1r,4)-4-(dimethylamino)cyclohexyl)amino)-8-ethylquinazolin-6-yl)-5-methoxypyridazin-3-yl)benzenesulfonamide |
| 160 | | 2-chloro-N-(5-(2-(((1r,4r)-4-(dimethylamino)cyclohexyl)amino)-8-ethylquinazolin-6-yl)-6-methylpyridin-2-yl)-3-methylbenzenesulfonamide |
| 161 | | 2-chloro-N-(5-(2-(((1r,4r)-4-(dimethylamino)cyclohexyl)amino)-8-ethyl-7-fluoroquinazolin-6-yl)-6-methylpyridin-2-yl)benzenesulfonamide |
| 162 | | 2-chloro-N-(5-(2-(((1r,4r)-4-(dimethylamino)cyclohexyl)amino)-8-ethyl-7-fluoroquinazolin-6-yl)-3-fluoro-6-methylpyridin-2-yl)benzenesulfonamide |

TABLE 1-continued

| Ex. | Structure | Name |
|---|---|---|
| 163 | | 2-chloro-N-(5-(2-(((1r,4r)-4-(dimethylamino)cyclohexyl)amino)-8-ethyl-7-fluoroquinazolin-6-yl)-3-fluoro-6-methoxypyridin-2-yl)benzenesulfonamide |

Provided herein is a pharmaceutically acceptable salt or solvate thereof of a compound described in Table 1. Any combination of the groups described above or below for the various variables is contemplated herein. Throughout the specification, groups and substituents thereof are chosen by one skilled in the field to provide stable moieties and compounds.

IRE1-Like Family of Proteins

A compound disclosed herein can selectively bind to a protein of the serine/threonine-protein kinase/endoribonuclease inositol-requiring enzyme 1 (IRE1) family of proteins. In humans, IRE1 is encoded by the ERN1 gene. Exemplary IRE1 family proteins include isoform IRE1a. Other exemplary IRE1 family proteins include IRE1 homologues or orthologues in other organisms. Exemplary organisms include human, non-human primate, mouse, rat, chicken, fruit fly, yeast, and others listed in Table 2. The IRE1 protein can be human IRE1a. Table 2

TABLE 2

| Organism | Accession # |
|---|---|
| Homo sapiens | NP_001424.3 |
| Mus musculus | NP_076402.1 |
| Rattus norvegicus | XP_006247696.1 |

Figure 2:
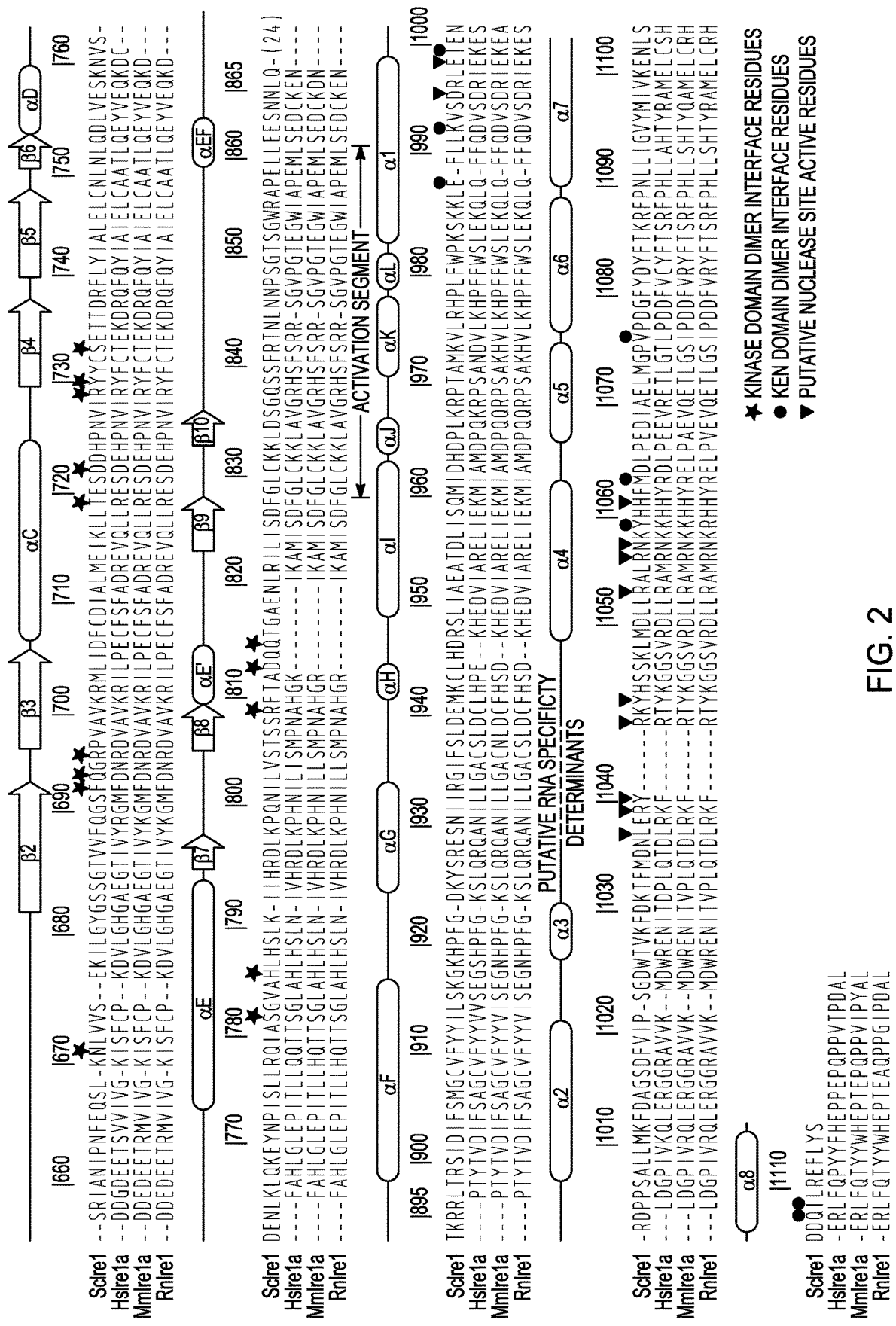
FIG. 2 shows an example alignment of the C-terminal half IRE1 orthologues from yeast (ScIre1), human (HsIre1), mouse (MmIre1), and rat (RnIRE1). Stars indicate kinase domain dimer interface residues. Circles indicate Kinase extension nuclease (KEN) domain dimer interface residues. Triangles indicate putative nuclease active site residues.

A compound disclosed herein selectively binds to an IRE1 family protein comprising a kinase domain and/or an RNase domain. The kinase domain can be a trans-autophosphorylation kinase domain. The IRE1 family protein can be IRE1a. An example arrangement of domains within an IRE1a protein is depicted in FIG. 1. An example alignment of IRE1 family protein orthologues is depicted in FIG. 2.

A compound disclosed herein can selectively bind to a trans-autophosphorylation kinase domain region of IRE1a. A compound disclosed herein can selectively bind to a trans-autophosphorylation kinase domain region of IRE1a, for example within amino acid residues 568-833 of SEQ ID NO: 1, or equivalent amino acid residues thereof.

A compound disclosed herein can selectively bind to an ATP-binding site of IRE1a. The ATP-binding site can be a binding pocket within a trans-autophosphorylation kinase domain region of IRE1a. A compound disclosed herein can selectively bind to an ATP-binding pocket within a trans-autophosphorylation kinase domain region of IRE1a, for example, one or more of amino acid resides 577-711, 577-586, 597, 599, 626, 642-643, 645, 648, 688, 692-693, 695, or 711 of SEQ ID NO: 1, or equivalent amino acid residues thereof.

A compound disclosed herein can selectively bind to an activation loop within a trans-autophosphorylation kinase domain region of IRE1a. A compound disclosed herein can selectively bind to an activation loop within a trans-autophosphorylation kinase domain region of IRE1a, for example, one or more of amino acid residues 710-736, 710-725, or 729-736 of SEQ ID NO: 1, or equivalent amino acid residues thereof.

A compound disclosed herein can selectively bind to an RNase domain region of IRE1a. A compound disclosed herein can selectively bind to an RNase domain region of IRE1a, for example within amino acid residues 835-963 of SEQ ID NO: 1, or equivalent amino acid residues thereof.

A compound disclosed herein can selectively bind to a kinase domain dimer interface amino acid residue. A compound disclosed herein can selectively bind to a kinase domain dimer interface amino acid residue, such as one or more of amino acid residues 569-701, 569, 591, 592, 594, 617, 620,627, 628, 631, 674, 678, or 701 of SEQ ID NO: 1.

A compound disclosed herein can selectively bind to a first IRE1a and blocks dimerization between kinase domain dimer interface amino acid residues of the first IRE1a and a second IRE1a. A compound disclosed herein can selectively binds to a first IRE1a and inhibits dimerization at one or more of amino acid residues 569-701, 569, 591, 592, 594, 617, 620,627, 628, 631, 674, 678, or 701 of SEQ ID NO: 1.

A compound disclosed herein can selectively bind to a kinase-extension nuclease (KEN) domain dimer interface amino acid residue of an IRE1a. A compound disclosed herein can selectively bind to a KEN domain dimer interface amino acid residue, such as one or more of amino acid residues 840-925, 840, 844, 851, 908, 912, or 925 of SEQ ID NO: 1.

A compound disclosed herein can selectively bind to amino acid residues of a nuclease active site. A compound disclosed herein can selectively bind to amino acid residues of a nuclease active site, such as one or more of amino acid residues 847-910, 847, 850, 886, 888, 889, 890, 892, 902, 905, 906, or 910 of SEQ ID NO: 1.

A compound disclosed herein can selectively bind to an RNase domain and a trans-autophosphorylation kinase domain region of IRE1a. A compound disclosed herein can selectively bind to an RNase domain and an ATP-binding pocket within a trans-autophosphorylation kinase domain region of IRE1a. A compound disclosed herein can selectively bind to an RNase domain and an activation loop within a trans autophosphorylation kinase domain region of IRE1a.

A compound disclosed herein can selectively bind to IRE1a at two sites located in an RNase domain, trans-autophosphorylation kinase domain region, ATP-binding pocket, activation loop, or any combination thereof. A compound disclosed herein can selectively bind to IRE1a at two or more sites. A compound disclosed herein can selectively bind to IRE1a at two or more sites located in an RNase domain, trans-autophosphorylation kinase domain region, ATP-binding pocket, activation loop, or any combination thereof. A compound disclosed herein can selectively bind to IRE1a at three sites located in an RNase domain, trans-autophosphorylation kinase domain region, ATP-binding pocket, activation loop, or any combination thereof.

A compound disclosed herein can selectively binds to IRE1a at a first site located in an RNase domain, trans-autophosphorylation kinase domain region, ATP-binding pocket, or activation loop. A first site can comprise one or more of any amino acid residue within amino acid residues 465-977 of SEQ ID NO: 1. A compound disclosed herein can selectively bind to IRE1a at a second site located in an RNase domain, trans-autophosphorylation kinase domain region, ATP-binding pocket, or activation loop. The first site can be located within the same domain or region as the second site. The first site can be located within a different domain or region as the second site.

A compound disclosed herein can selectively bind to first IRE1a, thereby blocking dimerization of the first IRE1a to a second IRE1a. A compound disclosed herein can selectively bind to first IRE1a, thereby blocking auto-transphosphorylation of the first IRE1a or a second IRE1a to which the first IRE1a is dimerized. A compound disclosed herein can selectively bind to a first IRE1a, thereby blocking activation of the first IRE1a or a second IRE1a to which the first IRE1a is dimerized. A compound disclosed herein can selectively bind to a first IRE1a, thereby blocking kinase activity of the first IRE1a or a second IRE1a to which the first IRE1a is dimerized. A compound disclosed herein can selectively bind to a first IRE1a, thereby blocking RNase activity of the first IRE1a or a second IRE1a to which the first IRE1a is dimerized.

A compound disclosed herein can selectively bind to IRE1a when in a homo-dimerized conformation. A compound disclosed herein can selectively bind to IRE1a when in an oligomerized conformation. A compound disclosed herein can selectively bind to IRE1a when in a non-oligomerized or non-dimerized conformation. A compound disclosed herein can selectively bind to IRE1a when in an ATP-bound state. A compound disclosed herein can selectively bind to an IRE1 family protein when in a non-ATP-bound state. The compound can be a pharmaceutically acceptable salt, or solvate thereof.

IRE1 Signaling Pathway

A compound disclosed herein can selectively bind to an IRE1 family protein and alters a downstream signaling pathway. A compound disclosed herein can selectively bind to an IRE1 family protein and alters expression of SEC24D, EDEM1 SEC61A1, SEC61B, SEC61G, P4HB, DNAJB9, FASN, AGPAT4, AGPAT6, HYOU1, STT3A, PDIA4, PDIA6, regulated IRE1-dependent decay (RIDD), transcriptionally active X-box binding protein (XBP1 or XBP1s), or unspliced XBP1 (XBP1u). A compound disclosed herein can selectively bind to an IRE1 family protein and alters a downstream cellular process. An IRE1 family protein can be IRE1a.

A compound disclosed herein can selectively bind to an IRE1 family protein and decreases or blocks a downstream IRE1 signaling pathway. A compound disclosed herein can selectively bind to an IRE1 family protein and decreases or blocks activity or signaling of TXNIP, Caspase 1, Interleukin 1-beta, JNK, Bim, cytochrome C, Caspase 3, Caspase 8, mRNA degradation, miRNA degradation, apoptosis-inducing proteins, or inflammation-inducing proteins. A compound disclosed herein can selectively bind to an IRE1 family protein and decreases XBP1 mRNA levels. A compound disclosed herein can selectively bind to an IRE1 family protein and decreases transcriptionally active XBP1 (XBP1s) mRNA levels. A compound disclosed herein can selectively bind to an IRE1 family protein and decreases spliced XBP1 mRNA levels. An IRE1 family protein can be IRE1a.

A compound disclosed herein can selectively bind to an IRE1 family protein and increases, activates, or removes a block of a downstream signaling pathway. A compound disclosed herein can selectively bind to an IRE1 family protein and increases, activates, or removes a block of activity or signaling of Bcl2, Bcl-XL, Mcl-1, Bax, Bak, other anti-apoptotic proteins, or an mRNA translocon proteins. An IRE1 family protein can be IRE1a.

A compound disclosed herein can selectively bind to an IRE1 family protein and disrupts binding with an effector protein. In some cases, the effector protein binds to the IRE1 family protein when in a dimerized or oligomerized state. In some cases, the effector protein binds to the IRE1 family protein when in a non-dimerized or non-oligomerized state. In some cases, the effector protein is immunoglobulin heavy-chain binding protein (BiP) (also known as glucose regulate protein 78 (Grp78)), protein kinase R (PKR)-like endoplasmic reticulum kinase (PERK), tumor necrosis factor receptor-associated factor 2 (TRAF2), JUN N-terminal kinase (JNK), transcriptionally active XBP1 (XBP1s), unspliced XBP1 (XBP1u), regulated IRE1-dependent decay (RIDD), Heat shock protein 90 kDa alpha (HSP 90-alpha), or misfolded protein. An IRE1 family protein can be IRE1a.

A compound disclosed herein can selectively bind to an IRE1 family protein and alters activity of a cellular process or cellular function, such as regulated IRE1-dependent decay (RIDD), RNA decay, translation, autophagy, cell survival, ER protein folding, ERAD, reactive oxygen species generation, transport, ER-associated protein degradation (ERAD), protein synthesis, lipid biosynthesis, pro-inflammatory and/or pro-survival cytokine secretion, or apoptosis. Where an altered or lack of a cellular process or cellular function is associate with a disease state, selective binding of a compound disclosed herein can result in inhibiting or alleviating the disease state, or inhibiting a deleterious activity associated with the disease state. An IRE1 family protein can be IRE1a.

Fibrosis and Fibrotic Diseases

The compounds described herein are useful in treating fibrosis. Fibrosis can be a lung fibrosis. Lung fibrosis can be idiopathic pulmonary fibrosis (IPF), an interstitial lung disease (ILD), a diffuse parenchymal lung disease (DPLD), cystic fibrosis, or progressive massive fibrosis (a type of fibrosis of the lungs, a complication of coal workers' pneumoconiosis). Fibrosis can be IPF.

Fibrosis can be liver fibrosis, cirrhosis, kidney fibrosis (including kidney fibrosis associated with, e.g., chronic kidney disease (CKD) including End-Stage Renal Disease (ESRD)), peritoneal fibrosis, chronic hepatic damage, fibrillogenesis, abnormal scarring (keloids or hypertrophic scars) associated skin injury (including accidental skin injury and iatrogenic injury from a medical treatment or surgery), scleroderma, cardiofibrosis, failure of glaucoma filtering operation, intestinal adhesions, aberrant wound healing, alcoholic liver damage-induced liver fibrosis, bridging fibrosis, Crohn's Disease (fibrosis of the intestine), cystic fibrosis of the pancreas or lungs, injection fibrosis (e.g., as a complication of intramuscular injections, especially in children), endomyocardial fibrosis, cardiac fibrosis, fibrosis resulting from Graft-Versus-Host Disease (GVHD), fibrosis of the spleen, fibrosis of the eye (such as subretinal fibrosis), glomerulonephritis, interstitial fibrosis, macular degeneration, mediastinal fibrosis (fibrosis of the soft tissue of the mediastinum), morphea, multifocal fibrosclerosis, myelofibrosis (fibrosis of the bone marrow), nephrogenic systemic fibrosis (fibrosis of the skin in advanced kidney failure patients), nodular subepidermal fibrosis (e.g., benign fibrous histiocytoma), pleural fibrosis, fibrosis as a consequence of surgery (e.g., surgical implants), proliferative fibrosis, pipestem fibrosis, postfibrinous fibrosis, old myocardial infarction (fibrosis of the heart), pancreatic fibrosis, progressive massive fibrosis, radiation fibrosis, renal fibrosis, renal fibrosis related to or arising from chronic kidney disease, retroperitoneal fibrosis (fibrosis of the soft tissue of the retroperitoneum), systemic sclerosis (fibrosis of the skin), subepithelial fibrosis, uterine fibrosis, viral hepatitis induced fibrosis, nonalcoholic fatty liver disease (NAFLD), or non-alcoholic steatohepatitis (NASH).

Second Therapeutic Agents in Combination Therapy

In the methods disclosed herein, a compound of Formula (I) or a compound of Table 1, or a pharmaceutically acceptable salt thereof, or a solvate thereof, may be administered in combination with a second therapeutic agent. The second therapeutic agent can be an anti-inflammatory drug, an antioxidant drug, an anti-fibrotic drug, a downregulator of a growth factor, a downregulator of procollagen (such as procollagen I or II), a tyrosine kinase inhibitor (such as an inhibitor of one or more of VEGF, FGFR3, PDGF-R, bcr-abl, c-kit, PDGF-R, ABL2, and DDR1), an autotaxin inhibitor, an inhibitor of connective tissue growth factor (CTGF), an immunomodulatory drug, an androgen receptor antagonist, an angiogenesis inhibitor, an anticoagulant drug, an immunosuppressant, a glucocorticoid, a mucolytic drug, a dual endothelin receptor antagonist, a PDE5 inhibitor, a smooth muscle vasodilator, a tumor necrosis factor (TNF) inhibitor, an antifolate drug (e.g., an inhibitor of dihydrofolate reductase), a DNA synthesis inhibitor, an HDAC inhibitor, TGFβ, a TGFβ receptor inhibitor, galectin-3, integrin αvβ6, or a bronchodilator. The second therapeutic agent can be an anti-inflammatory drug, an antioxidant drug, an anti-fibrotic drug, a downregulator of a growth factor or procollagens I and II, or a tyrosine kinase inhibitor (e.g., one or more of VEGF, FGFR3, and PDGF-R). The second therapeutic agent can be an immunosuppressant.

The second therapeutic drug can be a fusion protein, an antibody (such as a human or humanized monoclonal antibody), a biopharmaceutical, or a small molecule drug. The second therapeutic agent can be an antibody not directed against either CTLA-4 or PD-1. The second therapeutic agent cannot necessarily be a biologic therapeutic agent. The second therapeutic agent can be is a small molecule drug.

More than one second therapeutic agent can be co-administered (e.g., two or three). The second therapeutic agent can be pirfenidone, nintedanib, pentraxin (serum amyloid P), GLPG1690, pamreylumab (FG-3019, imatinib, thalidomide, lenalidomide, warfarin, azathioprine, prednisone, N-acetylcysteine, bosentan, macitentan, sildenafil, colchicine, cyclophosphamide, etanercept, or methotrexate. The second therapeutic agent can be pirfenidone, nintedanib, pentraxin (serum amyloid P), GLPG1690, pamreylumab, imatinib, or thalidomide. The second therapeutic agent can be pirfenidone or nintedanib. The second therapeutic agent can be azathioprine and prednisone, optionally in further combination with N-acetylcysteine.

Pharmaceutical Compositions

Also provided are pharmaceutical compositions comprising a compound described herein or a pharmaceutically acceptable salt thereof, or a solvate thereof, and a pharmaceutically acceptable excipient. A "pharmaceutical composition" refers to a preparation which is in such form as to permit the biological activity of the active ingredient(s) to be effective, and which contains no additional components which are unacceptably toxic to a subject to which the formulation would be administered. Such formulations may be sterile. The pharmaceutical composition can comprise a compound described herein or a pharmaceutically acceptable salt thereof, or a solvate thereof, and a second therapeutic agent. A kit comprising a first pharmaceutical composition comprising a compound described herein or a pharmaceutically acceptable salt thereof, or a solvate thereof, and a second pharmaceutical composition comprising the second therapeutic agent, is also provided.

A "pharmaceutically acceptable carrier" refers to a non-toxic solid, semisolid, or liquid filler, diluent, encapsulating material, formulation auxiliary, or carrier conventional in the art for use with a therapeutic agent that together comprise a "pharmaceutical composition" for administration to a subject. A pharmaceutically acceptable carrier is non-toxic to recipients at the dosages and concentrations employed and is compatible with other ingredients of the formulation. The pharmaceutically acceptable carrier is appropriate for the formulation employed.

A "sterile" formulation is aseptic or essentially free from living microorganisms and their spores.

Therapeutic agents are provided in formulations with a wide variety of pharmaceutically acceptable carriers (see, for example, Gennaro, Remington: The Science and Practice of Pharmacy with Facts and Comparisons: Drugfacts Plus, 20th ed. (2003); Ansel et al., Pharmaceutical Dosage Forms and Drug Delivery Systems, 7th ed., Lippencott Williams and Wilkins (2004); Kibbe et al., Handbook of Pharmaceutical Excipients, 3rd ed., Pharmaceutical Press (2000)). Various pharmaceutically acceptable carriers, which include vehicles, adjuvants, and diluents, are available. Moreover, various pharmaceutically acceptable auxiliary substances, such as pH adjusting and buffering agents, tonicity adjusting agents, stabilizers, wetting agents and the like, are also available. Non-limiting exemplary carriers include saline, buffered saline, dextrose, water, glycerol, ethanol, and combinations thereof.

The methods of treating described herein also include methods in which a pharmaceutical composition as described is administered to a subject in need of treatment.

Methods of Dosing and Treatment Regimens

A compound described herein, or a pharmaceutically acceptable salt thereof, or a solvate thereof, can be used in the preparation of a medicament for the treatment of fibrosis in a mammal. A compound described herein or a pharmaceutically acceptable salt thereof, or a solvate thereof, and a second therapeutic agent can be used in the preparation of such a medicament. Methods for treating any of the diseases or conditions described herein in a mammal in need of such treatment, involves administration of a pharmaceutical composition that includes at least one compound described herein or a metabolite or prodrug thereof, or a pharmaceutically acceptable salt thereof, or a pharmaceutically acceptable solvate thereof, in a therapeutically effective amount to said mammal. Such methods also involve administration of a pharmaceutical composition comprising a second therapeutic agent, in the same or a separate formulation.

The compositions containing the compound(s) described herein (alone or with a second therapeutic agent) are administered for prophylactic and/or therapeutic treatments. The compositions can be administered to a patient already suffering from a disease or condition, in amounts sufficient to cure or at least partially arrest at least one of the symptoms of the disease or condition. Amounts effective for this use depend on the severity and course of the disease or condition, previous therapy, the patient's health status, weight, and response to the drugs, and the judgment of the treating physician. Therapeutically effective amounts are optionally determined by methods including, but not limited to, a dose escalation and/or dose ranging clinical trial.

In prophylactic applications, a composition containing a compound described herein (and, optionally a composition comprising the second therapeutic agent) is administered to a patient susceptible to or otherwise at risk of a particular disease, disorder or condition. Such an amount is defined to be a "prophylactically effective amount or dose." In this use, the precise amounts also depend on the patient's state of health, weight, and the like. When used in patients, effective amounts for this use will depend on the severity and course of the disease, disorder or condition, previous therapy, the patient's health status and response to the drugs, and the judgment of the treating physician. Prophylactic treatments can include administering to a mammal, who previously experienced at least one symptom of the disease being treated and is currently in remission, a pharmaceutical composition comprising a compound described herein, or a pharmaceutically acceptable salt thereof, and, optionally, a pharmaceutical composition comprising a second therapeutic agent, in order to prevent a return of the symptoms of the disease or condition.

If the patient's condition does not improve, upon the doctor's discretion, the compounds and, optionally, a second therapeutic agent can be administered chronically, that is, for an extended period of time, including throughout the duration of the patient's life in order to ameliorate or otherwise control or limit the symptoms of the patient's disease or condition.

When a patient's status does improve, the doses of drugs being administered may be temporarily reduced or temporarily suspended for a certain length of time (e.g., a "drug holiday"). The length of the drug holiday can be between 2 days and 1 year, including by way of example only, 2 days, 3 days, 4 days, 5 days, 6 days, 7 days, 10 days, 12 days, 15 days, 20 days, 28 days, or more than 28 days. The dose reduction during a drug holiday can be, by way of example only, by 10%-100%, including by way of example only 10%, 15%, 20%, 25%), 30%, 35%, 40%, 45%, 50%, 55%, 60%, 65%, 70%, 75%, 80%, 85%, 90%, 95%, and 100%.

Once improvement of the patient's conditions has occurred, a maintenance dose is administered if necessary. Subsequently, the dosage or the frequency of administration, or both, can be reduced, as a function of the symptoms, to a level at which the improved disease, disorder or condition is retained. However, the patient may require intermittent treatment on a long-term basis upon any recurrence of symptoms.

The amount of a given agent that corresponds to such an amount varies depending upon factors such as the particular compound, disease condition and its severity, the identity (e.g., weight, sex) of the subject or host in need of treatment, but nevertheless is determined according to the particular circumstances surrounding the case, including, e.g., the specific agent being administered, the route of administration, the condition being treated, and the subject or host being treated.

As stated above, an "effective amount" refers to any amount that is sufficient to achieve a desired biological effect. Combined with the teachings provided herein, by choosing among the various active compounds and weighing factors such as potency, relative bioavailability, patient body weight, severity of adverse side-effects and mode of administration, an effective prophylactic or therapeutic treatment regimen can be planned which does not cause substantial unwanted toxicity and yet is effective to treat the particular subject. The effective amount for any particular application can vary depending on such factors as the disease or condition being treated, the particular compound of the disclosure being administered, the size of the subject, or the severity of the disease or condition. One of ordinary skill in the art can empirically determine the effective amount of a particular compound of the disclosure and/or other therapeutic agent without necessitating undue experimentation. A maximum dose may be used, that is, the highest safe dose according to some medical judgment. Multiple doses per day may be contemplated to achieve appropriate systemic levels of compounds. Appropriate systemic levels can be determined by, for example, measurement of the patient's peak or sustained plasma level of the drug. "Dose" and "dosage" are used interchangeably herein.

Dosage may be adjusted appropriately to achieve desired drug levels, local or systemic, depending upon the mode of administration. For example, intravenous administration may vary from one order to several orders of magnitude lower dose per day. In the event that the response in a subject is insufficient at such doses, even higher doses (or effective higher doses by a different, more localized delivery route) may be employed to the extent that patient tolerance permits. Multiple doses per day are contemplated to achieve appropriate systemic levels of the compound.

For any compound described herein the therapeutically effective amount can be initially determined from animal models. A therapeutically effective dose can also be determined from human data for compounds which have been tested in humans and for compounds which are known to exhibit similar pharmacological activities, such as other related active agents. Higher doses may be required for parenteral administration. The applied dose can be adjusted based on the relative bioavailability and potency of the administered compound. Adjusting the dose to achieve maximal efficacy based on the methods described above and other methods as are well-known in the art is well within the capabilities of the ordinarily skilled artisan.

For clinical use, any compound of the disclosure can be administered in an amount equal or equivalent to 0.2-2000 milligram (mg) of compound per kilogram (kg) of body weight of the subject per day. The compounds of the disclosure can be administered in a dose equal or equivalent to 2-2000 mg of compound per kg body weight of the subject per day. The compounds of the disclosure can be administered in a dose equal or equivalent to 20-2000 mg of compound per kg body weight of the subject per day. The compounds of the disclosure can be administered in a dose equal or equivalent to 50-2000 mg of compound per kg body weight of the subject per day. The compounds of the disclosure can be administered in a dose equal or equivalent to 100-2000 mg of compound per kg body weight of the subject per day. The compounds of the disclosure can be administered in a dose equal or equivalent to 200-2000 mg of compound per kg body weight of the subject per day.

Where a precursor or prodrug of the compounds of the disclosure is to be administered rather than the compound itself, it is administered in an amount that is equivalent to, i.e., sufficient to deliver, the above-stated amounts of the compounds of the invention.

The formulations of the compounds of the disclosure can be administered to human subjects in therapeutically effective amounts. In general, doses employed for adult human treatment are typically in the range of 0.01 mg to 5000 mg per day. Doses employed for adult human treatment can be from about 1 mg to about 1000 mg per day. The desired dose can be conveniently presented in a single dose or in divided doses administered simultaneously or at appropriate intervals, for example as two, three, four or more sub-doses per day.

The daily dosages appropriate for the compound described herein or a pharmaceutically acceptable salt thereof, or a solvate thereof, (and independently for a second therapeutic agent) is from about 0.01 mg/kg to about 50 mg/kg per body weight. The daily dosage or the amount of active in the dosage form can be lower or higher than the ranges indicated herein, based on a number of variables in regard to an individual treatment regime. The daily and unit dosages can be altered depending on a number of variables including, but not limited to, the activity of the compound used, the disease or condition to be treated, the mode of administration, the requirements of the individual subject, the severity of the disease or condition being treated, and the judgment of the practitioner.

The formulations of the compounds of the disclosure can be administered to human subjects in therapeutically effective amounts. Typical dose ranges are from about 0.01 microgram/kg to about 2 mg/kg of body weight per day. The dosage of drug to be administered is likely to depend on such variables as the type and extent of the disorder, the overall health status of the particular subject, the specific compound being administered, the excipients used to formulate the compound, and its route of administration. Routine experiments may be used to optimize the dose and dosing frequency for any particular compound.

The compounds of the disclosure can be administered at a concentration in the range from about 0.001 microgram/kg to greater than about 500 mg/kg. For example, the concentration may be 0.001 microgram/kg, 0.01 microgram/kg, 0.05 microgram/kg, 0.1 microgram/kg, 0.5 microgram/kg, 1.0 microgram/kg, 10.0 microgram/kg, 50.0 microgram/kg, 100.0 microgram/kg, 500 microgram/kg, 1.0 mg/kg, 5.0 mg/kg, 10.0 mg/kg, 15.0 mg/kg, 20.0 mg/kg, 25.0 mg/kg, 30.0 mg/kg, 35.0 mg/kg, 40.0 mg/kg, 45.0 mg/kg, 50.0 mg/kg, 60.0 mg/kg, 70.0 mg/kg, 80.0 mg/kg, 90.0 mg/kg, 100.0 mg/kg, 150.0 mg/kg, 200.0 mg/kg, 250.0 mg/kg, 300.0 mg/kg, 350.0 mg/kg, 400.0 mg/kg, 450.0 mg/kg, to greater than about 500.0 mg/kg or any incremental value thereof. It is to be understood that all values and ranges between these values and ranges are meant to be encompassed by the present invention.

The compounds of the disclosure can be administered at a dosage in the range from about 0.2 milligram/kg/day to greater than about 100 mg/kg/day. For example, the dosage may be 0.2 mg/kg/day to 100 mg/kg/day, 0.2 mg/kg/day to 50 mg/kg/day, 0.2 mg/kg/day to 25 mg/kg/day, 0.2 mg/kg/day to 10 mg/kg/day, 0.2 mg/kg/day to 7.5 mg/kg/day, 0.2 mg/kg/day to 5 mg/kg/day, 0.25 mg/kg/day to 100 mg/kg/day, 0.25 mg/kg/day to 50 mg/kg/day, 0.25 mg/kg/day to 25 mg/kg/day, 0.25 mg/kg/day to 10 mg/kg/day, 0.25 mg/kg/day to 7.5 mg/kg/day, 0.25 mg/kg/day to 5 mg/kg/day, 0.5 mg/kg/day to 50 mg/kg/day, 0.5 mg/kg/day to 25 mg/kg/day, 0.5 mg/kg/day to 20 mg/kg/day, 0.5 mg/kg/day to 15 mg/kg/day, 0.5 mg/kg/day to 10 mg/kg/day, 0.5 mg/kg/day to 7.5 mg/kg/day, 0.5 mg/kg/day to 5 mg/kg/day, 0.75 mg/kg/day to 50 mg/kg/day, 0.75 mg/kg/day to 25 mg/kg/day, 0.75 mg/kg/day to 20 mg/kg/day, 0.75 mg/kg/day to 15 mg/kg/day, 0.75 mg/kg/day to 10 mg/kg/day, 0.75 mg/kg/day to 7.5 mg/kg/day, 0.75 mg/kg/day to 5 mg/kg/day, 1.0 mg/kg/day to 50 mg/kg/day, 1.0 mg/kg/day to 25 mg/kg/day, 1.0 mg/kg/day to 20 mg/kg/day, 1.0 mg/kg/day to 15 mg/kg/day, 1.0 mg/kg/day to 10 mg/kg/day, 1.0 mg/kg/day to 7.5 mg/kg/day, 1.0 mg/kg/day to 5 mg/kg/day, 2 mg/kg/day to 50 mg/kg/day, 2 mg/kg/day to 25 mg/kg/day, 2 mg/kg/day to 20 mg/kg/day, 2 mg/kg/day to 15 mg/kg/day, 2 mg/kg/day to 10 mg/kg/day, 2 mg/kg/day to 7.5 mg/kg/day, or 2 mg/kg/day to 5 mg/kg/day.

The compounds of the disclosure can be administered at a dosage in the range from about 0.25 milligram/kg/day to about 25 mg/kg/day. For example, the dosage may be 0.25 mg/kg/day, 0.5 mg/kg/day, 0.75 mg/kg/day, 1.0 mg/kg/day, 1.25 mg/kg/day, 1.5 mg/kg/day, 1.75 mg/kg/day, 2.0 mg/kg/day, 2.25 mg/kg/day, 2.5 mg/kg/day, 2.75 mg/kg/day, 3.0 mg/kg/day, 3.25 mg/kg/day, 3.5 mg/kg/day, 3.75 mg/kg/day, 4.0 mg/kg/day, 4.25 mg/kg/day, 4.5 mg/kg/day, 4.75 mg/kg/day, 5 mg/kg/day, 5.5 mg/kg/day, 6.0 mg/kg/day, 6.5 mg/kg/day, 7.0 mg/kg/day, 7.5 mg/kg/day, 8.0 mg/kg/day, 8.5 mg/kg/day, 9.0 mg/kg/day, 9.5 mg/kg/day, 10 mg/kg/day, 11 mg/kg/day, 12 mg/kg/day, 13 mg/kg/day, 14 mg/kg/day, 15 mg/kg/day, 16 mg/kg/day, 17 mg/kg/day, 18 mg/kg/day, 19 mg/kg/day, 20 mg/kg/day, 21 mg/kg/day, 22 mg/kg/day, 23 mg/kg/day, 24 mg/kg/day, 25 mg/kg/day, 26 mg/kg/day, 27 mg/kg/day, 28 mg/kg/day, 29 mg/kg/day, 30 mg/kg/day, 31 mg/kg/day, 32 mg/kg/day, 33 mg/kg/day, 34 mg/kg/day, 35 mg/kg/day, 36 mg/kg/day, 37 mg/kg/day, 38 mg/kg/day, 39 mg/kg/day, 40 mg/kg/day, 41 mg/kg/day, 42 mg/kg/day, 43 mg/kg/day, 44 mg/kg/day, 45 mg/kg/day, 46 mg/kg/day, 47 mg/kg/day, 48 mg/kg/day, 49 mg/kg/day, or 50 mg/kg/day.

A compound or precursor thereof can be administered in concentrations that range from 0.01 micromolar to greater than or equal to 500 micromolar. For example, the dose may be 0.01 micromolar, 0.02 micromolar, 0.05 micromolar, 0.1 micromolar, 0.15 micromolar, 0.2 micromolar, 0.5 micromolar, 0.7 micromolar, 1.0 micromolar, 3.0 micromolar, 5.0 micromolar, 7.0 micromolar, 10.0 micromolar, 15.0 micromolar, 20.0 micromolar, 25.0 micromolar, 30.0 micromolar, 35.0 micromolar, 40.0 micromolar, 45.0 micromolar, 50.0 micromolar, 60.0 micromolar, 70.0 micromolar, 80.0 micromolar, 90.0 micromolar, 100.0 micromolar, 150.0 micromolar, 200.0 micromolar, 250.0 micromolar, 300.0 micromolar, 350.0 micromolar, 400.0 micromolar, 450.0 micromolar, to greater than about 500.0 micromolar or any incremental value thereof. It is to be understood that all values and ranges between these values and ranges are meant to be encompassed by the present invention.

A compound or precursor thereof can be administered at concentrations that range from 0.10 microgram/mL to 500.0 microgram/mL. For example, the concentration may be 0.10 microgram/mL, 0.50 microgram/mL, 1 microgram/mL, 2.0 microgram/mL, 5.0 microgram/mL, 10.0 microgram/mL, 20 microgram/mL, 25 microgram/mL, 30 microgram/mL, 35 microgram/mL, 40 microgram/mL, 45 microgram/mL, 50 microgram/mL, 60.0 microgram/mL, 70.0 microgram/mL, 80.0 microgram/mL, 90.0 microgram/mL, 100.0 microgram/mL, 150.0 microgram/mL, 200.0 microgram/mL, 250.0 g/mL, 250.0 micro gram/mL, 300.0 microgram/mL, 350.0 microgram/mL, 400.0 microgram/mL, 450.0 microgram/mL, to greater than about 500.0 microgram/mL or any incremental value thereof. It is to be understood that all values and ranges between these values and ranges are meant to be encompassed by the present invention.

Toxicity and therapeutic efficacy of such therapeutic regimens are determined by standard pharmaceutical procedures in cell cultures or experimental animals, including, but not limited to, the determination of the LD50 and the ED50. The dose ratio between the toxic and therapeutic effects is the therapeutic index and it is expressed as the ratio between LD50 and ED50. The data obtained from cell culture assays and animal studies can be used in formulating the therapeutically effective daily dosage range and/or the therapeutically effective unit dosage amount for use in mammals, including humans. The daily dosage amount of the compounds described herein can lie within a range of circulating concentrations that include the ED50 with minimal toxicity. The daily dosage range and/or the unit dosage amount can vary within this range depending upon the dosage form employed and the route of administration utilized.

The effective amounts of the compound described herein or a pharmaceutically acceptable salt thereof, or a solvate thereof, (and optionally and independently, a second therapeutic agent) may be: (a) systemically administered to the mammal; and/or (b) administered orally to the mammal; and/or (c) intravenously administered to the mammal; and/or (d) administered by injection to the mammal; and/or (e) administered topically to the mammal; and/or (f) administered non-systemically or locally to the mammal. In combination therapies, the compound described herein and the second therapeutic agent can be administered by the same route, or by different routes.

The compound of the invention can be administered via single administration. Single administrations of the effective amount of the compound (and, optionally, the second therapeutic agent), can be administered (i) once a day; or (ii) multiple times over the span of one day, e.g., two, three, four or more times daily. For combination therapies, the compound described herein and the second therapeutic agent may be dosed on the same schedule and frequency, or at different frequencies.

The compound of the invention can be administered via multiple administrations. Multiple administrations of the effective amount of the compound (and/or second therapeutic agent), can be (i) administered continuously or intermittently: as in a single dose; (ii) the time between multiple administrations is every 6 hours; (iii) administered to the mammal every 8 hours; (iv) administered to the mammal every 12 hours; (v) administered to the mammal every 24 hours. The method can comprise a drug holiday, wherein the administration of the compound and/or the second therapeutic agent is temporarily suspended or the dose of the compound and/or the second therapeutic agent being administered is temporarily reduced; at the end of the drug holiday, dosing of the compound and/or second therapeutic agent is resumed. The length of the drug holiday can vary from 2 days to 1 year.

In certain instances, it is appropriate to administer at least one compound described herein, or a pharmaceutically acceptable salt thereof, or a solvate thereof, in combination with one or more other therapeutic agents. The therapeutic effectiveness of one of the compounds described herein can be enhanced by administration of an adjuvant (i.e., by itself the adjuvant has minimal therapeutic benefit, but in combination with another therapeutic agent, the overall therapeutic benefit to the patient is enhanced). Or, the benefit experienced by a patient can be increased by administering one of the compounds described herein with another agent (which also includes a therapeutic regimen) that also has therapeutic benefit.

It is understood that the dosage regimen to treat, prevent, or ameliorate the condition(s) for which relief is sought, is modified in accordance with a variety of factors (e.g. the disease, disorder or condition from which the subject suffers; the age, weight, sex, diet, and medical condition of the subject). Thus, the dosage regimen actually employed can vary and, can deviate from the dosage regimens set forth herein.

For combination therapies described herein, dosages of the co-administered compounds vary depending on the type of second therapeutic agent employed, on the specific second therapeutic agent employed, on the disease or condition being treated and so forth. When co-administered with one or more second therapeutic agents, the compound provided herein can be administered either simultaneously with the one or more second therapeutic agents, or sequentially. If administration is simultaneous, the multiple second therapeutic agents are, by way of example only, provided in a single, unified form, or in multiple forms (e.g., as a single pill or injection, or as two separate pills or injections, or as one pill and one injection).

The compounds described herein, or a pharmaceutically acceptable salt thereof, or a solvate thereof, as well as combination therapies, are administered before, during or after the occurrence of a disease or condition, and the timing of administering the compound or composition containing a compound varies. The compounds described herein can be used as a prophylactic and are administered continuously to subjects with a propensity to develop conditions or diseases in order to prevent the occurrence of the disease or condition. The compounds and compositions can be administered to a subject during or as soon as possible after the onset of the symptoms. A compound described herein can be administered as soon as is practicable after the onset of a disease or condition is detected or suspected, and for a length of time necessary for the treatment of the disease. The length required for treatment can vary, and the treatment length can be adjusted to suit the specific needs of each subject. For example, a compound described herein or a formulation containing the compound can be administered for at least 2 weeks, about 1 month to about 5 years.

The compound described herein or a pharmaceutically acceptable salt thereof, or solvate thereof, can be given concurrently with the second therapeutic agent. For example, the compound and the second therapeutic agent can be administered with a time separation of no more than about 60 minutes, such as no more than about any of 30, 15, 10, 5, or 1 minutes. The compound described herein can be administered sequentially with the second therapeutic agent. For example, administration of the two or more therapeutic agents can be administered with a time separation of more than about 30 minutes, such as about any of 40, 50, or 60 minutes, 1 day, 2 days, 3 days, 1 week, 2 weeks, or 1 month, or longer.

The term "concurrently" is used herein to refer to administration of two or more therapeutic agents, where at least part of the administration overlaps in time or where the administration of one therapeutic agent falls within a short period of time relative to administration of the other therapeutic agent. For example, the two or more therapeutic agents are administered with a time separation of no more than about a specified number of minutes.

The term "sequentially" is used herein to refer to administration of two or more therapeutic agents where the administration of one or more agent(s) continues after discontinuing the administration of one or more other agent(s), or wherein administration of one or more agent(s) begins before the administration of one or more other agent(s). For example, administration of the two or more therapeutic agents are administered with a time separation of more than about a specified number of minutes.

The compounds (and, optionally, second therapeutic agents) described herein can be administered alone or with other modes of treatment, such as supportive interventions. They can be provided before, substantially contemporaneous with, and/or after other modes of treatment or supportive interventions, for example, supplemental oxygen or pulmonary transplantation.

EXAMPLES

The disclosure now being generally described, it will be more readily understood by reference to the following examples, which are included merely for purposes of illustration of the present disclosure, and are not intended to limit the disclosure.

I. Chemical Synthesis

Example 1A: Synthesis of tert-butyl ((1r,4r)-4-((6-(4,4,5,5-tetramethyl-1,3,2-dioxaborolan-2-yl)quinazolin-2-yl)amino)cyclohexyl)carbamate (1A)

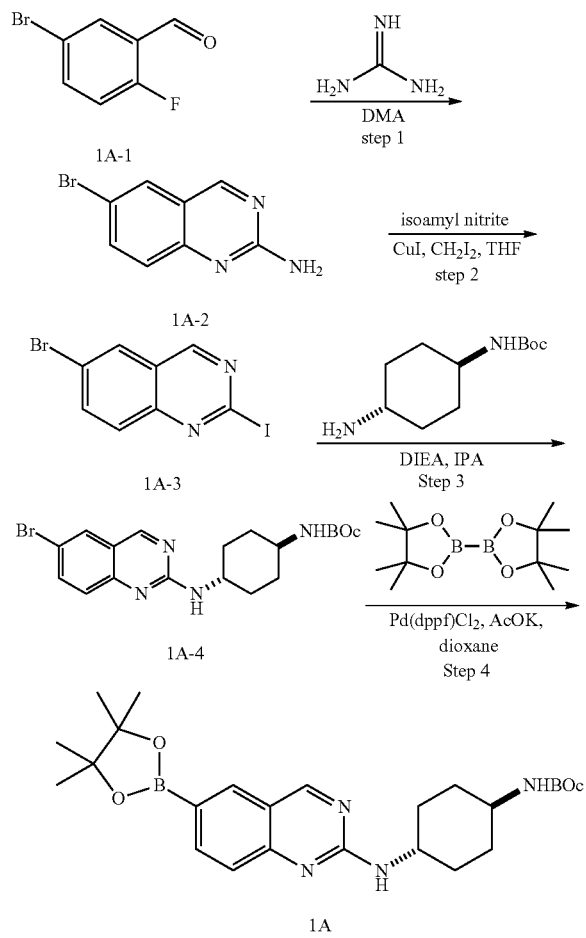

Step 1: 6-bromoquinazolin-2-amine (1A-2)

To a solution of 5-bromo-2-fluoro-benzaldehyde (20.0 g, 98.5 mmol) in DMA (700 mL) was added guanidinecarbonic acid (26.6 g, 147.7 mmol). The mixture was stirred at 160° C. for 0.5 h, cooled to rt and concentrated. The residue was diluted with $H_2O$ (300 mL) and extracted with ethyl acetate (200 mL×3). The combined organic layers were washed with brine (100 mL×3), dried over $Na_2SO_4$, filtered and concentrated under reduced pressure to give a residue. The residue was washed with DCM (300 mL) to get compound 1A-2 (4.0 g, crude).

Step 2: 6-bromo-2-iodoquinazoline (1A-3)

To a solution of compound 1A-2 (2.0 g, 8.9 mmol) in THF (20.0 mL) under $N_2$ were added of isoamylnitrite (3.1 g, 26.8 mmol, 3.6 mL), diiodomethane (11.9 g, 44.7 mmol, 3.6 mL) and CuI (1.7 g, 8.9 mmol). The mixture was stirred at 80° C. for 2 h, cooled to rt, quenched by addition of ice water (100 mL), and extracted with ethyl acetate (100 mL×3). The combined organic layers were washed with brine (100 mL×3), dried over anhydrous $Na_2SO_4$, filtered and concentrated. The residue was purified by column chromatography ($SiO_2$) to afford compound 1A-3 (2.1 g, crude).

Step 3: 1-tert-butyl ((1r, 4r)-4-((6-bromoquinazolin-2-yl)amino)cyclohexyl)carbamate (1A-4)

To a solution of compound 1A-3 (4.0 g, 11.9 mmol) in IPA (120.0 mL) was added DIEA (4.6 g, 35.8 mmol, 6.2 mL) and tert-butyl ((1r,4r)-4-aminocyclohexyl)carbamate (7.6 g, 35.8 mmol). The mixture was stirred at 80° C. for 12 h, cooled to rt and filtered. The collected solid was washed with Dichloromethane/Methanol (10/1, 60 mL). The combined filtrate was concentrated to give a residue which was purified by column chromatography ($SiO_2$) to afford compound 1A-4 (3.6 g, 6.8 mmol, 57.2% yield). $M+H^+=421.1$ (LCMS); $^1H$ NMR (CHLOROFORM-d, 400 MHz) δ 8.87 (s, 1H), 7.78 (d, J=1.8 Hz, 1H), 7.71 (dd, J=2.0, 9.0 Hz, 1H), 7.44 (d, J=9.2 Hz, 1H), 5.19 (br d, J=7.9 Hz, 1H), 4.43 (br s, 1H), 3.93 (br d, J=7.5 Hz, 1H), 3.49 (br s, 1H), 2.27-2.00 (m, 4H), 1.46 (s, 9H), 1.40-1.29 (in, 4H).

Step 4: tert-butyl ((1r,4r)-4-((6-(4,4,5,5-tetramethyl-1,3,2-dioxaborolan-2-yl)quinazolin-2-yl)amino)cyclohexyl)carbamate (1A)

A mixture of compound IA-4 (2.0 g, 4.7 mmol), 4,4,5,5-tetramethyl-2-(4,4,5,5-tetramethyl-1,3,2-dioxaborolan-2-yl)-1,3,2-dioxaborolane (1.3 g, 5.2 mmol), AcOK (1.4 g, 14.2 mmol) and Pd(dppf)Cl$_2$ (347 mg, 474.6 umol) in dioxane (50 mL) was degassed and purged with $N_2$ three times, and heated at 90° C. for 12 h under $N_2$. The reaction was cooled to rt and concentrated to give a residue. The residue was purified by column chromatography ($SiO_2$) to afford compound 1A (2.7 g, crude). $M+H^+=469.2$ (LCMS).

Example 2A: Synthesis of tert-butyl ((1r,4r)-4-((8-ethyl-6-(4,4,5,5-tetramethyl-1,3,2-dioxaborolan-2-yl)quinazolin-2-yl)amino)cyclohexyl)carbamate (2A)

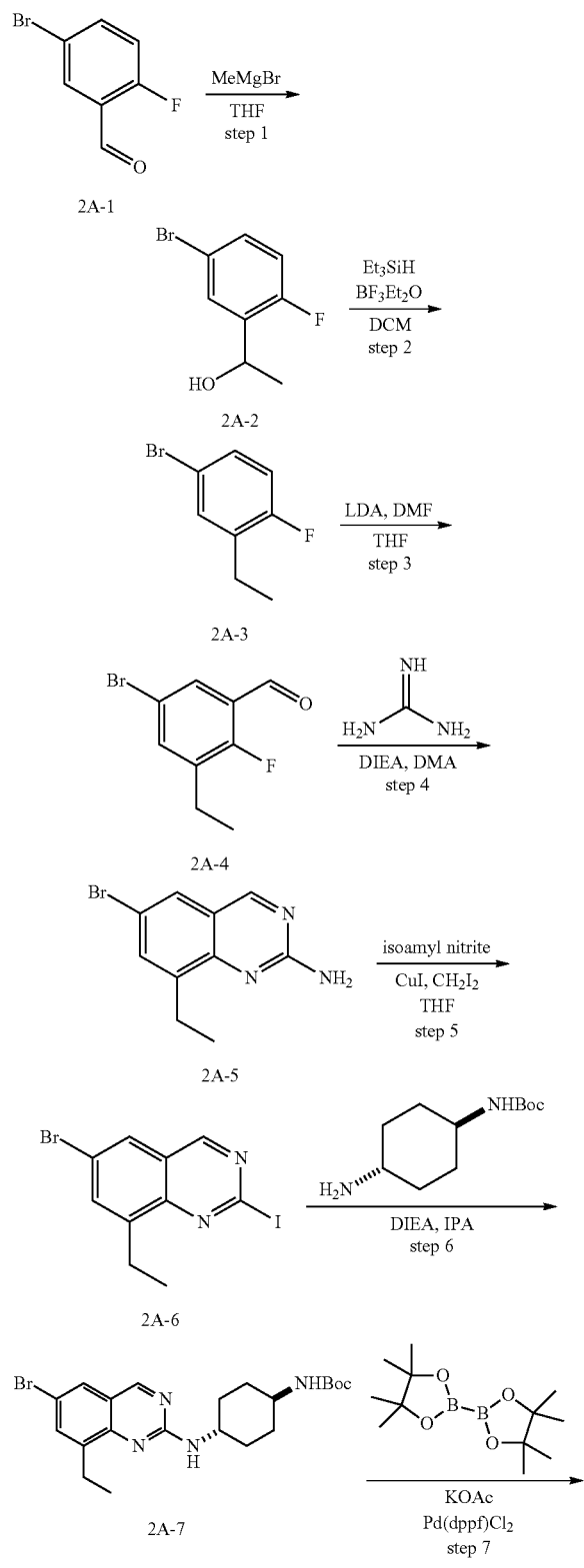

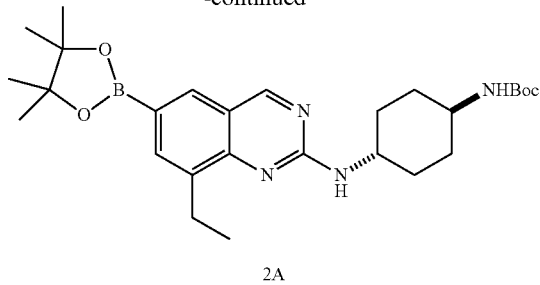

Step 1: 1-(5-bromo-2-fluorophenyl)ethan-1-ol (2A-2)

A solution of 5-bromo-2-fluoro-benzaldehyde (55.0 g, 270.9 mmol) in THF (500.0 mL) was cooled to 0° C. Then MeMgBr (3 M, 94.8 mL) was added. The mixture was stirred at 0° C. for 0.5 h, quenched with NH$_4$Cl (500 mL) and extracted with ethyl acetate (500 mL×3). The combined organic layers were washed with brine (500 mL×3), dried over Na$_2$SO$_4$, filtered and concentrated under reduced pressure to give a residue. The residue was purified by column chromatography (SiO$_2$) to afford compound 2A-2 (46.0 g, crude).

Step 2: 4-bromo-2-ethyl-1-fluorobenzene (2A-3)

To a solution of compound 2A-2 (46.0 g, 210.0 mmol) and triethylsilane (48.8 g, 420.0 mmol, 66.9 mL) in DCM (500.0 mL) was added BF$_3$.Et$_2$O (59.6 g, 420.0 mmol, 51.8 mL) at 0° C. The mixture was stirred at 25° C. for 2 h, concentrated, quenched by addition of Sat.NaHCO$_3$ (200 mL) at 0° C., and extracted with ethyl acetate (200 mL×3). The combined organic layers were washed with brine (200 mL×3), dried over Na$_2$SO$_4$, filtered and concentrated. The residue was purified by column chromatography (SiO$_2$) to afford compound 2A-3 (24.0 g, crude). $^1$H NMR (CHLOROFORM-d, 400 MHz) δ 7.31 (dd, J=2.2, 6.6 Hz, 1H), 7.27-7.21 (m, 11H), 6.87 (t, J=9.2 Hz, 11H), 2.62 (q, J=7.5 Hz, 2H), 1.20 (t, J=7.6 Hz, 3H).

Step 3: 5-bromo-3-ethyl-2-fluorobenzaldehyde (2A-4)

To a solution of compound 2A-3 (24.0 g, 82.7 mmol) in THF (500 mL) was added LDA (2 M, 49.6 mL) at −78° C. The mixture was stirred at −78° C. for 1 h. Then dimethyl formamide (7.8 g, 107.5 mmol, 8.3 mL) was added and stirred for 1 h at −78° C. The reaction mixture was quenched by addition of NH$_4$Cl (100 mL) and the resulting mixture was extracted with ethyl acetate (200 mL×3). The combined organic layers were washed with brine (100 mL×3), dried over Na$_2$SO$_4$, filtered and concentrated under reduced pressure to give a residue. The residue was purified by column chromatography (SiO$_2$) to afford compound 2A-4 (13.0 g, crude). $^1$H NMR (CDCl$_3$, 400 MHz) δ 10.30 (s, 1H), 7.81 (dd, J=2.6, 5.7 Hz, 1H), 7.58 (dd, J=2.6, 6.4 Hz, 1H), 2.73 (q, J=7.6 Hz, 2H), 1.30-1.25 (m, 3H).

Step 4: 6-bromo-8-ethylquinazolin-2-amine (2A-5)

To a solution of carbonic acid-guanidine (3.5 g, 19.4 mmol) and DIEA (5.0 g, 38.9 mmol, 6.8 mL) in DMA (20 mL) was added a solution of compound 2A-4 (3.0 g, 12.98 mmol) in DMA (5 mL). The mixture was stirred at 160° C. for 1 h, poured into ice water (30 mL) and extracted with ethyl acetate (40 mL×3). The combined organic layers were washed with brine (30 mL×3), dried over $Na_2SO_4$, filtered and concentrated under reduced pressure to give a residue. The residue was purified by column chromatography ($SiO_2$) to afford compound 2A-5 (1.2 g, crude). $^1H$ NMR (DMSO-$d_6$, 400 MHz) δ 9.03 (s, 1H), 7.85 (d, J=2.4 Hz, 1H), 7.60 (d, J=2.4 Hz, 1H), 6.94 (s, 2H), 2.98-2.88 (m, 2H), 1.22-1.17 (m, 3H).

Step 5: 6-bromo-8-ethyl-2-iodoquinazoline (2A-6)

To a mixture of compound 2A-5 (1.2 g, 4.76 mmol) and $CH_2I_2$ (6.3 g, 23.8 mmol, 1.92 mL) in tetrahydrofuran (24.0 mL) were added CuI (906 mg, 4.7 mmol) and isoamyl nitrite (1.6 g, 14.3 mmol, 2.0 mL). After the mixture was stirred at 80° C. for 2 h under $N_2$, $NH_3 \cdot H_2O$ (30 mL) was added. The resulting mixture was extracted with ethyl acetate (50 mL×3) and the combined organic layers were washed with brine (50 mL×3), dried over $Na_2SO_4$, filtered and concentrated. The residue was purified by column chromatography ($SiO_2$) to afford compound 2A-6 (400 mg, crude).

Step 6: tert-butyl ((1r,4r)-4-((6-bromo-8-ethylquinazolin-2-yl)amino)cyclohexyl)carbamate (2A-7)

To a mixture of compound 2A-6 (350 mg, 964.2 umol) and DIEA (373 mg, 2.8 mmol, 505.2 uL) in isopropanol (10 mL) was added tert-butyl ((1r,4r)-4-aminocyclohexyl)carbamate (413 mg, 1.9 mmol). The mixture was stirred at 80° C. for 12 h, cooled to rt and concentrated. The residue was purified by prep-TLC ($SiO_2$) to afford compound 2A-7 (350 mg, crude).

Step 7: tert-butyl ((1r,4r)-4-((8-ethyl-6-(4,4,5,5-tetramethyl-1,3,2-dioxaborolan-2-yl)quinazolin-2-yl)amino)cyclohexyl)carbamate (2A)

To a mixture of compound 2A-7 (150 mg, 333.7 umol) and KOAc (98 mg, 1.0 mmol) in dioxane (2 mL) were added 4,4,5,5-tetramethyl-2-(4,4,5,5-tetramethyl-1,3,2-dioxaborolan-2-yl)-1,3,2-dioxaborolane (101 mg, 400.5 umol) and $Pd(dppf)Cl_2$ (24 mg, 33.3 umol). The mixture was stirred at 90° C. for 12 h under $N_2$, cooled to rt and concentrated. The residue was purified by prep-TLC ($SiO_2$) to afford compound 2A (100 mg, crude).

Exemplary compounds were synthesized according to procedures described herein. For compounds that do not have a specific synthetic scheme described herein, such compounds can be routinely synthesized by a skilled artisan armed with the guidance presented herein and skill in the art.

| Comp ID | Structure | Chemical Name | Mass (M + H+) | $^1H$ NMR ($CD_3OD$, 400 MHz) |
|---|---|---|---|---|
| 23 | | N-(5-(2-(((1r,4r)-,4-aminocyelohexyl)amino)-8-ethylquinazolin-6-yl)-4-methylpyrimidin-2-yl)-2-ehlorobenzene-sulfonamide | Calc'd for $C_{27}H_{31}ClN_7O_2S$: 552.1; Found: 552.1 | δ 9.01 (s, 1H), 8.58 (br s, 1H), 8.34 (br d, J = 7.0 Hz, 1H), 8.23 (br s, 1H), 7.61-7.46 (m, 5H), 4.05-3.89 (m, 1H), 3.26-3.13 (m, 1H), 3.07 (q, J = 7.5 Hz, 2H), 2.31 (m, 5H), 2.16 (br d, J = 10.6 Hz, 2H), 1.71-1.43 (m, 4H), 1.33 (t, J = 7.5 Hz, 3H) |
| 24 | | N-(4-(2-(((1r,4r)-4-aminocyclohexyl)amino)-8-ethylquinazolin-6-yl)-2-fluorophenyl)-2-chlorobenzene-sulfonamide | Calc'd for $C_{28}H_{30}ClFN_5O_2S$: 554.2; Found: 554.1 | δ 9.03 (s, 1H), 8.56 (br s, 1H), 8.03 (dd, J = 1.3, 7.9 Hz, 1H), 7.80 (s, 2H), 7.68-7.54 (m, 2H), 7.54-7.34 (m, 4H), 4.05-3.91 (m, 1H), 3.25-3.15 (m, 1H), 3.09 (q, J = 7.4 Hz, 2H), 2.33 (br d, J = 11.5 Hz, 2H), 2.16 (br d, J = 11.7 Hz, 2H), 1.71-1.43 (m, 4H), 1.41-1.27 (m, 3H) |
| 25 | | N-(5-(2-(((1r,4r)-4-aminocyclohexyl)amino)-8-ethylquinazolin-6-yl)pyrazin-2-yl)-2-chlorobenzene-sulfonamide | Calc'd for $C_{26}H_{29}ClN_7O_2S$: 538.2 Found: 538.1 | δ 9.03 (s, 1H), 8.58 (br s, 2H), 8.33-8.23 (m, 2H), 8.13 (d, J = 1.7 Hz, 1H), 8.08 (d, J = 1.8 Hz, 1H), 7.57-7.44 (m, 3H), 4.06-3.91 (m, 1H), 3.26-3.14 (m, 1H), 3.08 (q, J = 7.4 Hz, 2H), 2.32 (br d, J = 10.5 Hz, 2H), 2.16 (br d, J = 13.0 Hz, 2H), 1.73-1.44 (m, 4H), 1.38-1.27 (m, 3H) |

| Comp ID | Structure | Chemical Name | Mass (M + H+) | 1H NMR (CD3OD, 400 MHz) |
|---|---|---|---|---|
| 26 | | N-(4-(2-(((1r,4r)-4-aminocyclohexyl)amino)quinazolin-6-yl)phenyl)-2-chlorobenzenesulfonamide | M + H+ = 508.1 (LCMS) | δ 9.06 (s, 1H), 8.41 (br s, 1H), 8.14-8.06 (m, 1H), 7.99-7.88 (m, 2H), 7.62-7.49 (m, 5H), 7.43 (m, 1H), 7.25 (d, J = 8.7 Hz, 2H), 4.02-3.89 (m, 1H), 3.21-3.10 (m, 1H), 2.23 (br d, J = 12.0 Hz, 2H), 2.12 (br d, J = 11.0 Hz, 2H), 1.67-1.55 (m, 2H), 1.53-1.41 (m, 2H) |
| 27 | | N-(5-(2-(((1r,4r)-4-aminocyclohexyl)amino)-8-ethylquinazolin-6-yl)pyridin-2-yl)-2-chlorobenzenesulfonamide | Calc'd for C27H30ClN6O2S: 537.2; Found: 537.1 | δ 9.03 (s, 1 H), 8.55 (br s, 1 H), 8.40 (d, J = 2.45 Hz, 1 H), 8.05-8.15 (m, 3 H), 7.80 (d, J = 8.80 Hz, 1 H), 7.68 (dd, J = 8.56, 2.69 Hz, 1 H), 7.53-7.61 (m, 2 H), 7.41-7.50 (m, 1 H), 3.92-4.03 (m, 1 H), 3.12-3.21 (m, 1 H), 3.08 (q, J = 7.34 Hz, 2 H), 2.31 (br d, J = 11.25 Hz, 2 H), 2.14 (br d, J = 11.74 Hz, 2 H), 1.42-1.64 (m, 4 H), 1.34 (t, J = 7.58 Hz, 3H) |
| 28 | | N-(6-(2-(((1r,4r)-4-aminocyclohexyl)amino)-8-ethylquinazolin-6-yl)pyridin-3-yl)-2-chlorobenzenesulfonamide | Calc'd for C27H30ClN6O2S: 537.2; Found: 537.2 | δ 9.00 (s, 1H), 8.53 (br s, 1H), 8.30 (s, 1H), 8.23 (d, J = 7.7 Hz, 1H), 8.06 (dd, J = 2.0, 8.8 Hz, 1H), 7.76 (s, 2H), 7.55-7.44 (m, 3H), 7.29 (d, J = 9.0 Hz, 1H), 4.01-3.90 (m, 1H), 3.21-3.11 (m, 1H), 3.07 (q, J = 7.4 Hz, 2H), 2.30 (br d, J = 10.8 Hz, 2H), 2.13 (br d, J = 12.1 Hz, 2H), 1.66-1.40 (m, 4H), 1.33 (t, J = 7.5 Hz, 3H) |
| 29 | | N-(5-(2-(((1r,4r)-4-aminocyclohexyl)amino)-8-ethylquinazolin-6-yl)-1H-pyrazol-3-yl)-2-chlorobenzenesulfonamide | Calc'd for C25H29ClN7O2S: 526.2; Found: 526.1 | δ 8.99 (s, 1H), 8.09 (d, J = 7.3 Hz, 1H), 7.78 (br s, 2H), 7.62-7.52 (m, 2H), 7.43 (t, J = 7.2 Hz, 1H), 6.37 (s, 1H), 3.96 (m, 1H), 3.17 (m, 1H), 3.05 (q, J = 7.3 Hz, 2H), 2.30 (br d, J = 11.5 Hz, 2H), 2.14 (br d, J = 11.9 Hz, 2H), 1.65-1.54 (m, 2H), 1.53-1.43 (m, 2H), 1.33 (t, J = 7.5 Hz, 3H) |
| 30 | | N-(2-(((1r,4r)-4-aminocyclohexyl)amino)-8-hydroxyquinazolin-6-yl)-3-methylphenyl)-2-chloro-N-methylbenzenesulfonamide | M + H+ = 552.2 | δ 8.99 (s, 1H), 8.51 (s, 1H), 7.92 (d, J = 7.9 Hz, 1H), 7.68-7.53 (m, 2H), 7.43 (t, J = 7.0 Hz, 1H), 7.22-7.06 (m, 4H), 7.01 (s, 1H), 4.09 (br s, 1H), 3.42 (s, 3H), 3.15 (br t, J = 11.6 Hz, 1H), 2.30-2.20 (m, 5H), 2.12 (br d, J = 12.7 Hz, 2H), 1.73-1.55 (m, 2H), 1.53-1.35 (m, 2H). |

| Comp ID | Structure | Chemical Name | Mass (M + H⁺) | ¹H NMR (CD₃OD, 400 MHz) |
|---|---|---|---|---|
| 31 | | N-(4-(2-(((1r,4r)-4-aminocyclohexyl)amino)-8-ethylquinazolin-6-yl)-3-methylphenyl)-2-chloro-N-methylbenzenesulfonamide | M + H⁺ = 564.2 | δ 8.98 (s, 1H), 8.51 (br s, 1H), 7.91 (d, J = 7.9 Hz, 1H), 7.65-7.55 (m, 2H), 7.49-7.39 (m, 3H), 7.19-7.14 (m, 2H), 7.12-7.07 (m, 1H), 3.98 (br t, J = 11.0 Hz, 1H), 3.42 (d, J = 1.8 Hz, 3H), 3.17 (br t, J = 11.4 Hz, 1H), 3.06 (q, J = 7.3 Hz, 2H), 2.32 (br d, J = 11.8 Hz, 2H), 2.20 (s, 3H), 2.15 (br d, J = 12.3 Hz, 2H), 1.69-1.43 (m, 4H), 1.37-1.28 (m, 3H). |
| 32 | | N-(6-2-(((1r,4r)-4-aminocyclohexyl)amino)-8-ethylquinazolin-6-yl)pyridazin-3-yl)-2-chlorobenzenesulfonamide | Calc'd for C₂₆H₂₉ClN₇O₂S: 538.2; Found: 538.2 | δ 9.03 (s, 1H), 8.53 (br s, 1H), 8.24-8.18 (m, 2H), 8.15 (d, J = 1.8 Hz, 1H), 8.10 (d, J = 2.2 Hz, 1H), 7.95 (d, J = 10.1 Hz, 1H), 7.56-7.43 (m, 3H), 4.03-3.91 (m, 1H), 3.23-3.11 (m, 1H), 3.06 (q, J = 7.5 Hz, 2H), 2.30 (br d, J = 10.1 Hz, 2H), 2.14 (br d, J = 11.8 Hz, 2H), 1.67-1.43 (m, 4H), 1.33 (t, J = 7.5 Hz, 3H) |
| 33 | | N-(2-(2-(((1r,4r)-4-aminocyclohexyl)amino)-8-ethylquinazolin-6-yl)pyrimidin-5-yl)-2-chlorobenzenesulfonamide | Calc'd for C₂₆H₂₉ClN₇O₂S: 538.2; Found: 538.1 | δ 9.06 (s, 1H), 8.61 (s, 2H), 8.55-8.43 (m, 3H), 8.20 - 8.12 (m, 1H), 7.66-7.54 (m, 2H), 7.54-7.45 (m, 1H), 4.06-3.95 (m, 1H), 3.24-3.14 (m, 1H), 3.09 (q, J = 7.5 Hz, 2H), 2.33 (br d, J = 12.5 Hz, 2H), 2.16 (br d, J = 10.8 Hz, 2H), 1.72-1.42 (m, 4H), 1.36 (t, J = 7.5 Hz, 3H) |
| 34 | | N-(4-(2-(((1r,4r)-4-aminocyclohexyl)amino)-8-ethylquinazolin-6-yl)-3-ethylphenyl)-2-chlorobenzenesulfonamide | M + H⁺ = 564.2 | δ 8.95 (s, 1H), 8.56 (br s, 1H), 8.14-8.06 (m, 1H), 7.60-7.52 (m, 2H), 7.45 (m, 1H), 7.40 (d, J = 2.9 Hz, 2H), 7.11 (d, J = 1.8 Hz, 1H), 7.08-6.99 (m, 2H), 4.03-3.85 (m, 1H), 3.16-2.97 (m, 3H), 2.51 (q, J = 7.5 Hz, 2H), 2.30 (br d, J = 10.6 Hz, 2H), 2.12 (br d, J = 12.1 Hz, 2H), 1.62-1.42 (m, 4H), 1.30 (t, J = 7.5 Hz, 3H), 0.98 (t, J = 7.5 Hz, 3H) |
| 35 | | N-(4-(2-(((1r,4r)-4-aminocyclohexyl)amino)-8-ethylquinazolin-6-yl)-3-fluorophenyl)-2-chlorobenzenesulfonamide | Calc'd for C₂₈H₃₀ClFN₅O₂S: 554.2; Found: 554.1 | δ 8.97 (br d, J = 3.1 Hz, 1H), 8.55 (br s, 1H), 8.15 (br dd, J = 2.6, 7.5 Hz, 1H), 7.64 (br s, 2H), 7.57 (br d, J = 3.1 Hz, 2H), 7.51-7.43 (m, 1H), 7.37 (dt, J = 3.5, 8.6 Hz, 1H), 7.07-6.97 (m, 2H), 4.02-3.90 (m, 1H), 3.20-3.11 (m, 1H), 3.04 (br dd, J = 3.1, 7.3 Hz, 2H), 2.30 (br d, J = 11.2 Hz, 2H), |

| Comp ID | Structure | Chemical Name | Mass (M + H+) | 1H NMR (CD3OD, 400 MHz) |
|---|---|---|---|---|
| | | | | 2.13 (br d, J = 11.2 Hz, 2H), 1.66-1.40 (m, 4H), 1.31 (dt, J = 3.6, 7.3 Hz, 3H) |
| 36 | | N-(4-(2-(((1r,4r)-4-aminocyclohexyl)amino)-8-methoxyquinazolin-6-yl)-3-methylphenyl)-2-chlorobenzenesulfonamide | M + H+ = 552.1 | δ 8.98 (s, 1H), 8.47 (s, 1H), 8.15-8.04 (m, 1H), 7.58-7.52 (m, 2H), 7.44 (ddd, J = 2.6, 5.9, 8.1 Hz, 1H), 7.16 (d, J = 1.8 Hz, 1H), 7.12-7.03 (m, 4H), 4.05 (br t, J = 11.2 Hz, 1H), 3.95 (s, 3H), 3.14 (ddd, J = 3.9, 7.7, 11.6 Hz, 1H), 2.27-2.17 (m, 5H), 2.11 (br d, J = 11.4 Hz, 2H), 1.67-1.53 (m, 2H), 1.52-1.38 (m, 2H) |
| 37 | | N-(5-(2-(((1r,4r)-4-aminocyclohexyl)amino)-8-ethylquinazolin-6-yl)-6-methoxypyridin-2-yl)-2-chlorobenzenesulfonamide | M + H+ = 567.2 | δ 8.95 (s, 1 H), 8.54 (br s, 1H), 8.31 (d, J = 7.72 Hz, 1 H), 7.65 (t, J = 7.50 Hz, 3 H), 7.56-7.60 (m, 2 H), 7.48-7.54 (m, 1 H), 6.63 (d, J = 7.94 Hz, 1 H), 3.91-4.01 (m, 1 H), 3.65 (s, 3 H), 3.10-3.21 (m, 1 H), 3.03 (q, J = 7.35 Hz, 2 H), 2.30 (br d, J = 12.13 Hz, 2H), 2.13 (br d, J = 12.13 Hz, 2 H), 1.44-1.65 (m, 4 H), 1.30 (t, J = 7.50 Hz, 3 H) |
| 38 | | N-(5-(2-(((1r,4r)-4-aminocyclohexyl)amino)-8-ethylquinazolin-6-yl)-4-methylthiazol-2-yl)-2-chlorobenzenesulfonamide | M + H+ = 557.2 | δ 9.02 (s, 1 H) 8.52 (br s, 1 H) 8.15 (d, J = 7.06 Hz, 1 H) 7.64 (s, 1 H) 7.51-7.59 (m, 3 H) 7.43-7.49 (m, 1 H) 3.92-4.04 (m, 1 H) 3.02-3.21 (m, 3 H) 2.30 (s, 5 H) 2.14 (br d, J = 12.13 Hz, 2 H) 1.44-1.64 (m, 4 H) 1.33 (t, J = 7.50 Hz, 3 H) |
| 39 | | (N-(5-(2-(((1r,4r)-4-aminocyclohexyl)amino)-8-ethylquinazolin-6-yl)pyrimidin-2-yl)-2-chlorobenzenesulfonamide | M + H+ = 538.1 | δ 9.02 (br s, 1H), 8.51 (br s, 2H), 8.19 (s, 1H), 8.04 (br s, 1H), 7.78 (br d, J = 6.8 Hz, 2H), 7.36 br s, 4H), 3.78 (br s, 1H), 3.03 (br s, 1H), 2.94 (q, J = 7.4 Hz, 2H), 2.09 (br s, 2H), 1.99 (br d, J = 10.8 Hz, 2H), 1.5 (br s, 2H), 1.42-1.30 (m, 2H), 1.23 (t, J = 7.4 Hz, 3H) |
| 40 | | N-(5-(2-(((-1r,4r)-4-aminocyclohexyl)amino)-8-isopropylquinazolin-6-yl)-1-methyl-1H-pyrazol-3-yl)-2-chlorobenzenesulfonamide | M + H+ = 554.2 | δ 9.01 (s, 1H), 8.53 (br s, 1H), 8.12-8.07 (m, 1H), 7.60 (dd, J = 1.8, 10.5 Hz, 2H), 7.57-7.54 (m, 1H), 7.52 (d, J = 1.8 Hz, 1H), 7.47-7.41 (m, 1H), 6.09 (s, 1H), 4.03-3.87 (m, 2H), 3.71 (s, 3H), 3.17 (br t, J = 11.4 Hz, 1H), 2.30 (br d, J = 11.8 Hz, 2H), 2.14 (br d, J = 11.0 Hz, 2H), 1.68-1.41 (m, 5H), 1.34 (d, J = 7.0 Hz, 6H) |

| Comp ID | Structure | Chemical Name | Mass (M + H⁺) | ¹H NMR (CD₃OD, 400 MHz) |
|---|---|---|---|---|
| 41 | | N-(5-(2-(((1r,4r)-4-aminocyclohexyl)amino)-8-ethylquinazolin-6-yl)thiazol-2-yl)-2-chlorobenzenesulfonamide | M + H⁺ = 543.1 | δ 8.98 (s, 1H), 8.51 (br s, 1H), 8.17 (d, J = 7.0 Hz, 1H), 7.73 (s, 1H), 7.65 (s, 1H), 7.58-7.40 (m, 4H), 4.01-3.89 (m, 1H), 3.19-2.98 (m, 3H), 2.30 (br d, J = 12.3 Hz, 2H), 2.13 (br d, J = 13.2 Hz, 2H), 1.66-1.41 (m, 4H), 1.33 (t, J = 7.5 Hz, 3H) |
| 42 | | N-(4-(2-(((1r,4r)-4-aminocyclohexyl)amino)-8-ethylquinazolin-6-yl)-2-fluoro-5-methoxyphenyl)-2-chlorobenzenesulfonamide | M + H⁺ = 584.2 | δ 8.95 (s, 1 H), 8.55 (br s, 1 H), 8.09 (d, J = 7.28 Hz, 1. H), 7.54-7.67 (m, 4 H), 7.41-7.47 (m, 1 H), 7.05-7.11 (m, 2 H), 3.96 (br t, J = 11.36 Hz, 1 H), 3.70 (s, 3 H), 3.10-3.19 (m, 1 H), 3.03 (q, J = 7.72 Hz, 2 H), 2.30 (br d, J = 12.57 Hz, 2 H), 2.13 (br d, J = 11.47 Hz, 2 H), 1.42-1.65 (m, 4 H), 1.31 (t, J = 7.39 Hz, 3 H) |
| 43 | | N-(1-(2-(((1r,4r)-4-aminocyclohexyl)amino)-8-ethylquinazolin-6-yl)-1H-pyrazol-4-yl)-2-chlorobenzenesulfonamide | M + H⁺ = 526.0 | δ 9.09 (br s, 1H), 8.40 (br s, 1H), 8.05 (s, 1H), 8.01-7.95 (m, 2H), 7.88 (d, J = 2.3 Hz, 1H), 7.65-7.47 (m, 2H), 7.44-7.34 (m, 2H), 3.77 (br s, 1H), 3.05-2.90 (m, 3H), 2.12-1.96 (m, 4H), 1.49-1.24 (m, 7H) |
| 44 | | N-(5-(2-(((1r,4r)-4-aminocyclohexyl)amino)-8-ethylquinazolin-6-yl)isoxazol-3-yl)-2-chlorobenzenesulfonamide | M + H⁺ = 527.1 | δ 9.13 (br s, 1H), 8.39 (br s, 1H), 8.06-7.90 (m, 2H), 7.79 (d, J = 1.6 Hz, 1H), 7.55 (br s, 1H), 7.46-7.40 (m, 1H.), 7.39-7.29 (m, 2H), 6.53 (s, 1H), 3.80 (br s, 1H), 2.98 (q, J = 7.4 Hz, 3H), 2.17-1.94 (m, 4H), 1.53-1.32 (m, 4H), 1.31-1.22 (m, 3H). |
| 45 | | N-(5-(2-(((1r,4r)-4-aminocyclohexyl)amino)-8-methoxyquinazolin-6-yl)-1-methyl-1H-pyrazol-3-yl)-2-chlorobenzenesulfonamide | M + H⁺ = 542.2 | δ 9.05 (br s, 1H), 8.33 (br s, 2H), 8.02 (d, J = 7.7 Hz, 1H), 7.60-7.34 (m, 5H), 7.10 (br s, 1H), 6.02 (s, 1H), 3.89 (br s,b 4H), 3.68 (s, 3H), 2.96 (br s, 1H), 1.97 (br s, 4H), 1.49-1.26 (m, 4H). |
| 46 | | N-(5-(2-(((1r,4r)-4-aminocyclohexyl)amino)-8-ethylquinazolin-6-yl)-4-methoxypyrimidin-2-yl)-2-chlorobenzenesulfonamide | M + H⁺ = 568.2 | δ 8.98 (s, 1 H), 8.50 (br s, 1 H), 8.33 (d, J = 7.94 Hz, 1 H), 8.14 (s, 1 H), 7.61-7.68 (m, 2 H), 7.48-7.58 (m, 3 H), 3.91-4.02 (m, 1 H), 3.71 (s, 3 H), 3.11-3.23 (m, 1 H), 3.04 (q, J = 7.72 Hz, 2 H), 2.31 (br d, J = 11.69 Hz, 2 H), 2.14 (br d, J = 11.47 Hz, 2 H), 1.43-1.66 (m, 4 H), 1.31 (t, J = 7.50 Hz, 3H) |

| Comp ID | Structure | Chemical Name | Mass (M + H+) | 1H NMR (CD3OD, 400 MHz) |
|---|---|---|---|---|
| 47 | | N-(5-(2-(((1r,4r)-4-aminocyclohexyl)amino)-8-propylquinazolin-6-yl)-1-methyl-1H-pyrazol-3-yl)-2-chlorobenzene-sulfonamide | M + H+ = 554.2 | 9.02 (s, 1H), 8.48 (br s, 1H), 8.09 (dd, J = 1.3, 7.9 Hz, 1H), 7.62 (d, J = 2.0 Hz, 1H), 7.61-7.54 (m, 2H), 7.52 (d, J = 2.0 Hz, 1H), 7.44 (ddd, J = 1.9, 6.7, 8.1 Hz, 1H), 6.10 (s, 1H), 4.00-3.90 (m, 1H), 3.72 (s, 3H), 3.23-3.12 (m, 1H), 3.05-2.96 (m, 2H), 2.32 (br d, J = 11.7 Hz, 2H), 2.15 (br d, J = 11.2 Hz, 2H), 1.76 (qd, J = 7.4, 15.0 Hz, 2H), 1.67-1.41 (m, 4H), 1.01 (t, J = 7.3 Hz, 3H) |
| 48 | | N-(4-(2-(((1r,4r)-4-aminocyclohexyl)amino)quinazolin-6-yl)-3-fluorophenyl)-2-chlorobenzene-sulfonamide | M + H+ = 526.1 | δ 9.06 (s, 1H), 8.50 (br s, 1H), 8.18 (d, J = 7.6 Hz, 1H), 7.91-7.80 (m, 2H), 7.62-7.56 (m, 3H), 7.53-7.48 (m, 1H), 7.46-7.40 (m, 1H), 7.11-7.02 (m, 2H), 4.04-3.93 (m, 1H), 3.22-3.11 (m, 1H), 2.25 (br d, J = 13.0 Hz, 2H), 2.14 (br d, J = 11.9 Hz, 2H), 1.71-1.40 (m, 4H) |
| 49 | | N-(6-(2-(((1r,4r)-4-aminocyclohexyl)amino)quinazolin-6-yl)pyridazin-3-yl)-2-chlorobenzene-sulfonamide | M + H+ = 510.1 | δ 9.13 (s, 1H), 8.42 (br s, 1H), 8.37-8.27 (m, 3H), 8.23 (d, J = 6.7 Hz, 1H), 8.07 (d, J = 10.0 Hz, 1H), 7.68-7.44 (m, 4H), 4.01 (br t, J = 11.2 Hz, 1H), 3.24-3.11 (m, 1.H), 2.33-2.10 (m, 4H), 1.72-1.44 (m, 4H) |
| 50 | | N-(4-(2-(((1r,4r)-4-aminocyclohexyl)amino)quinazolin-6-yl)-2-fluorophenyl)-2-chlorobenzene-sulfonamide | M + H+ = 526.1 | δ 9.08 (br s, 1H), 8.25 (s, 1H), 8.00-7.91 (m, 3H), 7.50-7.29 (m, 5H), 7.24-7.12 (m, 2H), 3.81 (br d, J = 8.1 Hz, 1H), 3.03 (br d, J = 10.9 Hz, 1H), 2.11-1.92 (m, 4H), 1.53-1.29 (m, 4H) |
| 51 | | N-(6-(2-(((1r,4r)-4-aminocyclohexyl)amino)quinazolin-6-yl)-5-fluoropyridin-3-yl)-2-chlorobenzene-sulfonamide | M + H+ = 527.1 | δ 9.08 (s, 1H), 8.45 (br s, 1H), 8.29 (s, 1H), 8.24-8.15 (m, 3H), 7.64-7.55 (m, 3H), 7.54-7.45 (m, 2H), 3.98 (br t, J = 11.4 Hz, 1H), 3.21-3.09 (m, 1H), 2.24 (br d, J = 11.7 Hz, 2H), 2.13 (br d, J = 11.7 Hz, 2H), 1.71-1.41 (m, 4H) |
| 52 | | N-(6-(2-(((1r,4r)-4-aminocyclohexyl)amino)-8-ethylquinazolin-6-yl)-5-fluoropyridin-3-yl)-2-chlorobenzene-sulfonamide | M + H+ = 555.2 | δ 9.02 (s, 1H), 8.51 (br s, 1H), 8,28 (s, 1H), 8.19 (d, J = 7.9 Hz, 1H), 8.05 (br d, J = 7.5 Hz, 2H), 7.64-7.56 (m, 2H), 7.54-7.42 (m, 2H), 3.99 (br t, J = 11.0 Hz, 1H), 3.18 (br t, J = 11.5 Hz, 1H), 3.08 (q, J = 7.5 Hz, 2H), 2.32 (br d, J = 11.2 Hz, 2H), 2.15 (br d, |

| Comp ID | Structure | Chemical Name | Mass (M + H⁺) | ¹H NMR (CD₃OD, 400 MHz) |
|---|---|---|---|---|
| | | | | J = 11.2 Hz, 2H), 1.70-1.43 (m, 4H), 1.34 (t, J = 7.4 Hz, 3H). |
| 53 | | N-(4-(2-(((1r,4r)-4-aminocyclohexyl)amino)quinazolin-6-yl)-2,5-difluorophenyl)-2-chlorobenzenesulfonamide | M + H⁺ = 544.1 | δ 9.10 (br s, 1 H), 8.17 (br s, 1 H), 7.97 (dd, J = 7.28, 1.98 Hz, 1 H), 7.85-7.89 (m, 1 H), 7.80 (br d, J = 8.82 Hz, 1 H), 7.36-7.47 (m, 4 H), 7.13-7.23 (m, 1 H), 6.98 (br dd, J = 14.33, 7.50 Hz, 1 H), 3.80 (br s, 1 H), 3.03 (br s, 1 H), 1.88-2.12 (m, 4 H), 1.22-1.57 (m, 4 H) |
| 54 | | N-(5-(2-(((1r,4r)-4-aminocyclohexyl)amino)quinazolin-6-yl)-3-fluoropyridin-2-yl)-2-chlorobenzenesulfonamide | M + H⁺ = 527.1 | δ 9.10 (s, 1H), 8.29 (br dd, J = 2.1, 5.6 Hz, 3H), 8.23 (d, J = 1.8 Hz, 1H), 8.02-7.91 (m, 2H), 7.63-7.57 (m, 2H), 7.57-7.51 (m, 1H), 3.99 (br t, J = 11.2 Hz, 1H), 3.21-3.09 (m, 1H), 2.25 (br d, J = 12.3 Hz, 2H), 2.14 (br d, J = 12.0 Hz, 2H), 1.71-1.41 (m, 4H) |
| 55 | | N-(5-(2-(((1r,4r)-4-aminocyclohexyl)amino)-8-ethylquinazolin-6-yl)-3-fluoropyridin-2-yl)-2-chlorobenzenesulfonamide | M + H⁺ = 555.2 | ) δ 9.00 (s, 1H), 8.49 (br s, 1H), 8,25 (d, J = 8.1 Hz, 1H), 8.16 (s, 1H), 7.85 (br d, J = 11.6 Hz, 1H), 7.76 (br s, 2H), 7.57-7.51 (m, 2H), 7.51-7.44 (m, 1H), 4.01-3.87 (m, 1H), 3.22-3.12 (m, 1H), 3.06 (q, J = 7.5 Hz, 2H), 2.30 (br d, J = 11.5 Hz, 2H), 2.14 (br d, J = 12.2 Hz, 2H), 1.72-1.41 (m, 4H), 1.32 (t, J = 7.5 Hz, 3H) |
| 56 | | N-(4-(2-(((1r,4r)-4-aminocyclohexyl)amino)quinazolin-6-yl)-2,3-difluorophenyl)-2-chlorobenzenesulfonamide | M + H⁺ = 544.1 | δ 9.06 (s, 1H), 8.42 (br s, 1H), 8.08-8.02 (m, 1H), 7.89 (s, 1H), 7.83 (br d, J = 9.0 Hz, 1H), 7.65-7.55 (m, 3H), 7.48-7.41 (m, 1H), 7.32-7.20 (m, 2H), 4.04-3.91 (m, 1H), 3.21-3.08 (m, 1H), 2.23 (br d, J = 11.2 Hz, 2H), 2.12 (br d, J = 12.3 Hz, 2H), 1.68-1.38 (m, 4H) |
| 57 | | N-(4-(3-(((1r,4r)-4-aminocyclohexyl)amino)isoquinolin-7-yl)-2-fluorophenyl)-2-chlorobenzenesulfonamide | M + H⁺ = 525.1 | δ 8.83 (s, 1H), 8.46 (br s, 1H), 8.05-7.93 (m, 2H), 7.71 (dd, J = 1.9, 8.7 Hz, 1H), 7.62-7.53 (m, 3H), 7.50-7.44 (m, 1H), 7.44-7.37 (m, 3H), 6.68 (s, 1H), 3.68 (tt, J = 3.8, 11.2 Hz, 1H), 3.16 (tt, J = 3.9, 11.7 Hz, 1H), 2.29-2.18 (m, 2H), 2.12 (br d, J = 12.1 Hz, 2H), 1.61 (dq, J = 3.1, 12.6 Hz, 2H), 1.48-1.33 (m, 2H) |

| Comp ID | Structure | Chemical Name | Mass (M + H⁺) | ¹H NMR (CD₃OD, 400 MHz) |
|---|---|---|---|---|
| 58 | | (S)-2-amino-N-((1r,4S)-4-((6-(4-((2-chlorophenyl)sulfonamido)-3-fluorophenyl)-8-ethylquinazolin-2-yl)amino)cyclohexyl)-3-methylbutanamide | M + H⁺ = 653.2 | δ 8.98 (s, 1H), 8.54 (br s, 1H), 8.02 (dd, J = 1.2, 7.9 Hz, 1H), 7.73 (br d, J = 4.3 Hz, 2H), 7.64-7.52 (m, 2H), 7.50-7.44 (m, 1H), 7.44-7.34 (m, 3H), 3.96 (br s, 1H), 3.80 (br s, 1H), 3.52 (br d, J = 6.0 Hz, 1H), 3.06 (q, J = 7.3 Hz, 2H), 2.24 (br s, 2H), 2.15 (br dd, J = 6.6, 13.2 Hz, 1H), 2.05 (br s, 2H), 1.50 (br d, J = 8.6 Hz, 4H), 1.33 (br t, J = 7.4 Hz, 3H), 1.07 (br dd, J = 4.0, 6.7 Hz, 6H). |
| 59 | | N-((1r,4)-4-((6-(4-((2-chlorophenyl)sulfonamido)-3-fluorophenyl)-8-ethylquinazolin-2-yl)amino)cyclohexyl)acetamide | M + H+ = 596.1 | δ 8.98 (s, 1H), 8.00 (dd, J = 1.5, 7.9 Hz, 1H), 7.75 (s, 2H), 7.63-7.52 (m, 2H), 7.50-7.44 (m, 1H), 7.43-7.36 (m, 3H), 3.98-3.88 (m, 1H), 3.68 (br d, J = 15.7 Hz, 1H), 3.06 (q, J = 7.4 Hz, 2H), 2.20 (br d, J = 11.7 Hz, 2H), 1.99 (br d, J = 9.3 Hz, 2H), 1.93 (s, 3H), 1.50-1.37 (m, 4H), 1.33 (t, J = 7.5 Hz, 3H). |
| 60 | | 2-chloro-N-(4-(8-ethyl-2-(((1r,4)-4-(methylamino)cyclohexyl)amino)quinazolin-6-yl)-2-fluorophenyl)benzenesulfonamide | M + H⁺ = 568.2 | δ 9.05 (br s, 1H), 8.25 (br s, 1H), 7.95 (dd, J = 2.0, 7.5 Hz, 1H), 7.80 (d, J = 1.3 Hz, 2H), 7.47-7.43 (m, 1H), 7.41-7.30 (m, 4H), 7.20-7.13 (m, 2H), 3.79 (br s, 1H), 2.98 (q, J = 7.6 Hz, 2H), 2.91 (br s, 1H), 2.55 (s, 3H), 2.09 (br d, J = 9.3 Hz, 4H), 1.46-1.33 (m, 4H), 1.28 (t, J = 7.4 Hz, 3H) |
| 61 | | 2-chloro-N-(6-(8-ethyl-2-(((1r,4r)-4-(methylamino)cyclohexyl)amino)quinazolin-6-yl)pyridazin-3-yl)benzenesulfonamide | M + H+ = 552.2 | δ ppm 9.06 (s, 1H), 8.53 (br s, 1H), 8.58-8.47 (m, 1H), 8.29-8.13 (m, 4H), 7.99 (d, J = 9.8 Hz, 1H), 7.58-7.43 (m, 3H), 4.04-3.95 (m, 1H), 3.08 (q, J = 7.4 Hz, 3H), 2.73 (s, 3H), 2.39-2.20 (m, 4H), 1.64-1.42 (m, 4H), 1.34 (t, J = 7.5 Hz, 3H). |
| 62 | | N-(4-(2-(((1r,4r)-4-aminocyclohexyl)amino)quinazolin-6-yl)-3,5-difluorophenyl)-2-chlorobenzenesulfonamide | M + H⁺ = 544.1 | δ 8.93 (s, 1H), 8.42 (br s, 1H), 8.18 - 8.04 (m, 1H), 7.67 (s, 1H), 7.61-7.55 (m, 1H), 7.53-7.50 (m, 2H), 7.48-7.39 (m, 2H), 6.82-6.75 (m, 2H), 3.96-3.83 (m, 1H), 3.06 (tt, J = 3.9, 11.6 Hz, 1H), 2.15 (br d, J = 11.0 Hz, 2H), 2.03 (br d, J = 12.2 Hz, 2H), 1.59-1.46 (m, 2H), 1.44-1.31 (m, 2H). |

| Comp ID | Structure | Chemical Name | Mass (M + H⁺) | ¹H NMR (CD₃OD, 400 MHz) |
|---|---|---|---|---|
| 63 | | N-(4-(2-(((1r,4r)-4-aminocyclohexyl)amino)-8-ethylquinazolin-6-yl)-2,6-difluorophenyl)-2-chlorobenzenesulfonamide | M + H⁺ = 572.2 | δ 9.04 (br s, 1H), 8.43 (br s, 2H), 7.95 (br d, J = 7.8 Hz, 1H), 7.82 (br d, J = 15.6 Hz, 2H), 7.70-7.57 (m, 2H), 7.43 (br t, J = 7.4 Hz, 1H), 7.33 (br d, J = 8.9 Hz, 2H), 3.99 (br s, 1H), 3.25-3.03 (m, 3H), 2.33 (br d, J = 10.3 Hz, 2H), 2.17 (br d, J = 9.8 Hz, 2H), 1.70-1.46 (m, 4H), 1.36 (br t, J = 7.2 Hz, 3H). |
| 64 | | 2-chloro-N-(6-(2-(((1r,4r)-4-(dimethylamino)cyclohexyl)amino)-8-ethylquinazolin-6-yl)pyridazin-3-yl)benzenesulfonamide | M + H⁺ = 566.2 | δ 9.06 (s, 1H), 8.53 (br s, 1H), 8.30-8.21 (m, 2H), 8.20-8.11 (m, 2H), 8.02 (d, J = 9.9 Hz, 1H), 7.60-7.47 (m, 3H), 4.06-3.96 (m, 1H), 3.30-3.22 (m, 1H), 3.10 (q, J = 7.5 Hz, 2H), 2.93-2.85 (m, 6H), 2.41 (br d, J = 11.0 Hz, 2H), 2.21 (br d, J = 12.2 Hz, 2H), 1.82-1.69 (m, 2H), 1.59-1.45 (m, 2H), 1.36 (t, J = 7.5 Hz, 3H). |
| 65 | | N-(6-(2-(((1r,4r)-4-aminocyclohexyl)amino)-8-ethylquinazolin-6-yl)-5-methoxypyridazin-3-yl)-2-chlorobenzenesulfonamide | M + H⁺ = 568.2 (LCMS) | δ 9.04 (s, 1H), 8.52 (br s, 1H), 8.24 (dd, J = 1.5, 7.7 Hz, 1H), 8.06 (d, J = 2.0 Hz, 1H), 7.98-7.91 (m, 1H), 7.61-7.45 (m, 3H), 7.34 (s, 1H), 4.05-3.95 (m, 4H), 3.19 (br t, J = 11.4 Hz, 1H), 3.07 (q, 1 = 7.5 Hz, 2H), 2.32 (br d, J = 11.1 Hz, 2H), 2.17 (br d, J = 11.4 Hz, 2H), 1.70-1.43 (m, 4H), 1.39-1.27 (m, 3H) |
| 66 | | N-(6-(2-(((1r,4r)-4-aminocyclohexyl)amino)-8-ethylquinazolin-6-yl)-4-methoxypyridazin-3-yl)-2-chlorobenzenesulfonamide | M + H⁺ = 568.2 (LCMS) | δ 8.96 (s, 1H), 8.35 (br s, 1H), 8.19-8.05 (m, 3H), 7.52-7.32 (m, 4H), 4.03-3.79 (m, 4H), 3.14-2.93 (m, 3H), 2.21 (br d, J = 11.0 Hz, 2H), 2.05 (br d, J = 10.6 Hz, 2H), 1.61-1.33 (m, 4H), 1.25 (t, J = 7.5 Hz, 3H) |
| 67 | | N-(6-(2-(((1r,4r)-4-aminocyclohexyl)amino)-8-ethylquinazolin-6-yl)-5-methylpyridazin-3-yl)-2-chlorobenzenesulfonamide | M + H⁺ = 524 | δ 9.04 (s, 1H), 8.56 (br s, 1H), 8.22 (br d, J = 7.3 Hz, 1H), 7.75 (s, 1H), 7.68 (br s, 2H), 7.57-7.41 (m, 3H), 3.98 (br t, J = 11.0 Hz, 1H), 3.22-3.01 (m, 3H), 2.41-2.25 (m, 5H), 2.14 (br d, J = 11.5 Hz, 2H), 1.70-1.42 (m, 4H), 1.33 (br t, J = 7.5 Hz, 3H) |

-continued

| Comp ID | Structure | Chemical Name | Mass (M + H⁺) | ¹H NMR (CD₃OD, 400 MHz) |
|---|---|---|---|---|
| 68 | | N-(5-(2-(((1r,4r)-4-aminocyclohexyl)amino)quinazolin-6-yl)-4-methylpyrimidin-2-yl)-2-chlorobenzenesulfonamide | M + H⁺ = 524 | δ = 9.04 (s, 1H), 8.50 (br s, 1H), 8.31 (dd, J =1.3, 7.7 Hz, 1H), 8.22 (s, 1H), 7.71-7.61 (m, 2H), 7.60-7.47 (m, 4H), 4.03-3.90 (m, 1H), 3.15 (tt, J = 3.9, 11.6 Hz, 1H), 2.29 (s, 3H), 2.23 (br d, J = 11.5 Hz, 2H), 2.12 (br d, J = 12.6 Hz, 2H), 1.66-1.40 (m, 4H). |
| 69 | | 2-chloro-N-(4-(2-(((1r,4r)-4-(dimethylamino)cyclohexyeamino)-8-ethylquinazolin-6-yl)-2-fluorophenyl)benzenesulfonamide | M + H⁺ = 582.2 (LCMS) | δ 9.01 (s, 1H), 8.56 (br s, 1H), 8.03 (d, J = 7.7 Hz, 1H), 7.77 (br s, 2H), 7.66-7.54 (m, 2H), 7.51-7.34 (m, 4H), 3.98 (br t, J = 11.6 Hz, 1H), 3.22-3.02 3H), 2.82 (s, 6H), 2.39 (br d, J = 12.0 Hz, 2H), 2.18 (br d, J = 12.1 Hz, 2H), 1.78-1.63 (m, 2H), 1.57-1.41 (m, 2H), 1.34 (t, J = 7.5 Hz, 2H) |
| 70 | | N-(4-(2-(((1R,3R,4S)-4-amino-3-methylcyclohexyl)amino)-8-ethylquinazolin-6-yl)-2-fluorophenyl)-2-chlorobenzenesulfonamide | M + H⁺ = 568.2 (LCMS) | δ 9.04 (s, 1H), 8.55 (br s, 1H), 8.03 (dd, J = 1.3, 7.9 Hz, 1H), 7.79 (s, 2H), 7.65-7.55 (m, 2H), 7.52-7.32 (m, 4H), 4.07 (ddd, J = 3.9, 7.6, 11.4 Hz, 1H), 3.46 (br s, 1H), 3.16-3.02 (m, 2H), 2.27-2.04 (m, 4H), 2.03-1.88 (m, 1H), 1.52-1.26 (m, 5H), 1.11 (d, J = 6.8 Hz, 3H) |
| 71 | | N-(4-(2-(((1r,4r)-4-aminocyclohexyl)amino)-8-ethylquinazolin-6-yl)-2-flouro-3-methylphenyl)-2-chlorobenzenesulfonamide | M + H⁺ = 568.0 (LCMS) | δ 8.98 (s, 1H), 8.53 (br s, 1H), 8.03 (dd, J = 1.2, 8.0 Hz, 1H), 7.66-7.53 (m, 2H), 7.49-7.39 (m, 3H), 7.28 (t, J = 8.2 Hz, 1H), 6.97 (d, J = 8.4 Hz, 1H), 4.04-3.91 (m, 1H), 3.23-3.12 (m, 1H), 3.06 (q, J = 7.5 Hz, 2H), 2.32 (br d, J = 11.9 Hz, 2H), 2.20-2.05 (m, 5H), 1.67-1.42 (m, 4H), 1.31 (t, J = 7.4 Hz, 3H). |
| 72 | | N-(4-(2-(((1R,3S)-3-aminocyclohexyl)amino)-8-ethylquinazolin-6-yl)-2-fluorophenyl)-2-chlorobenzenesulfonamide | M + H⁺ = 554.3 (LCMS) | δ 9.00 (s, 1H), 8.55 (br s, 1H), 8.02 (dd, J = 1.4, 8.0 Hz, 1H), 7.79-7.71 (m, 2H), 7.64-7.50 (m, 2H), 7.49-7.27 (m, 4H), 4.08 (ddd, J = 4.0, 7.7, 11.5 Hz, 1H), 3.23 (ddd, J = 3.9, 8.2, 11.8 Hz, 1H), 3.17-2.97 (m, 2H), 2.52 (br d, J = 11.2 Hz, 1H), 2.27-1.88 (m, 3H), 1.66-1.46 (m, 1H), 1.43-1.26 (m, 6H) |

-continued

| Comp ID | Structure | Chemical Name | Mass (M + H+) | 1H NMR (CD3OD, 400 MHz) |
|---|---|---|---|---|
| 73 | | (S)-2-chloro-N-(4-(8-ethyl-2-(piperidin-3-ylamino)quinazolin-6-yl)-2-fluorophenyl)benzenesulfonamide | M + H+ = 540.2 (LCMS) | δ 9.08 (s, 1H), 8.51 (br s, 1H), 8.01 (dd, J = 1.3, 7.9 Hz, 1H), 7.81 (s, 2H), 7.66-7.34 (m, 6H), 4.45-4.24 (m, 1H), 3.66 (br dd, J = 3.3, 12.1 Hz, 1H), 3.20-2.97 (m, 4H), 2.24-2.06 (m, 2H), 1.97-1.76 (m, 2H), 1.34 (t, J = 7.5 Hz, 3H) |
| 74 | | N-(4-(2-(((1R,3R,4R)-4-amino-3-methylcyclohexyl)amino)-8-ethylquilin-6-yl)-2-fluorophenyl-2-chlorobenzenesulfonamide | M + H+ = 568.2 (LCMS) | δ 9.04 (s, 1H), 8.56 (br s, 1H), 8.09-7.99 (m, 1H), 7.80 (s, 2H), 7.66-7.54 (m, 2H), 7.54-7.38 (m, 4H), 4.05 (br t, J = 11.6 Hz, 1H), 3.17-3.04 (m, 2H), 2.83 (dt, J = 3.9, 10.9 Hz, 1H), 2.37-2.25 (m, 2H), 2.16 (br dd, J = 3.5, 12.3 Hz, 1H), 1.76 (br s, 1H), 1.67-1.41 (m, 2H), 1.38-1.19 (m, 4H), 1.14 (d, J = 6.5 Hz, 3H). |
| 75 | | (N-(4-(2-(((1R,3S)-3-aminocyclohexyl)amino)quinazolin-6-yl)-2-fluorophenyl)-2-chlorobenzenesulfonamide | M + H+ = 526.1 (LCMS) | 1H NMR (400 MHz, DMSO-d6) δ 9.08 (s, 1H), 8.22 (br s, 1H), 7.98-7.88 (m, 3H), 7.46-7.28 (m, 5H), 7.18-7.11 (m, 2H), 3.93 (brs, 1H), 2.27 (br s,1H), 1.91 (br s, 2H), 1.79 (br d, J = 12.8 Hz, 1H), 1.49-1.11 (m, 4H) |
| 76 | | (S)-2-chloro-N-(2-fluoro-4-(2-(piperidin-3-ylamino)quinazolin-6-yl)phenyl)benzenesulfonamide | M + H+ = 512.1 (LCMS) | δ 9.11 (s, 1H), 8.56 (br s, 1H), 8.06-7.91 (m, 3H), 7.62-7.52 (m, 3H), 7.50-7.44 (m, 1H), 7.44-7.38 (m, 3H), 4.42-4.24 (m, 1H), 3.60 (br dd, J = 3.1, 12.1 Hz, 1H), 3.30 (br s, 1H), 3.04-2.94 (m, 2H), 2.24-2.01 (m, 2H), 1.95-1.67 (m, 2H). |
| 77 | | N-(4-(2-(((1R,3R)-3-aminocyclopentyl)amino)quinazolin-6-yl)-2-fluorophenyl)-2-chlorobenzenesulfonamide | M + H + = 512.1 (LCMS) | δ 9.05 (s, 1H), 8.52 (br s, 1H), 8.00 (dd, J = 1.3, 7.9 Hz, 1H), 7.95-7.88 (m, 2H), 7.61-7.51 (m, 3H), 7.50-7.43 (m, 1H), 7.43-7.34 (m, 3H), 4.66-4.56 (m, 1H), 3.81 (quin, J = 6.9 Hz, 1H), 2.40-2.25 (m, 2H), 2.15 (t, J = 6.9 Hz, 2H), 1.84-1.66 (m, 2H). |
| 78 | | N-4-(2-(((1R,3R)-3-aminocyclopentyl)amino)-8-ethylquinazolin-6-yl)-2-fluorophenyl)-2-chlorobenzenesulfonamide | M + H+ = 540.1 (LCMS) | δ 9.00 (s, 1H), 8.48 (br s, 1H), 8.00 (dd, J = 1.3, 7.9 Hz, 1H), 7.75 (s, 2H), 7.61-7.51 (m, 2H), 7.49-7.34 (m, 4H), 4.60 (quin, J = 6.6 Hz, 1H), 3.80 (quin, J = 7.1 Hz, 1H), 3.08 (q, J = 7.4 Hz, 2H), 2.41-2.28 |

-continued

| Comp ID | Structure | Chemical Name | Mass (M + H⁺) | ¹H NMR (CD₃OD, 400 MHz) |
|---|---|---|---|---|
| | | | | (m, 2H), 2.27-2.12 (m, 2H), 1.88-1.67 (m, 2H), 1.32 (t, J = 7.5 Hz, 3H) |
| 79 | 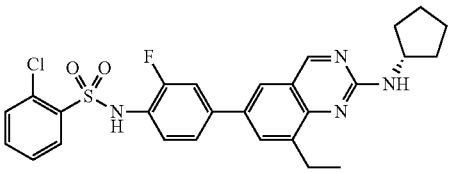 | N-(4-(2-(((1R,3S)-3-aminocyclopentyl)amino)-8-ethylquinazolin-6-yl)-2-fluorophenyl)-2-chlorobenzenesulfonamide | M + H⁺ = 540.1 (LCMS) | δ 9.05 (s, 1H), 8.56 (br s, 1H), 8.03 (d, J = 7.9 Hz, 1H), 7.83-7.78 (m, 2H), 7.66-7.53 (m, 2H), 7.52-7.37 (m, 4H), 4.48 (quirt, J = 7.0 Hz, 1H), 3.72 (quirt, J = 7.2 Hz, 1H), 3.11 (q, J = 7.4 Hz, 2H), 2.85-2.71 (m, 1H), 2.33-2.14 (m, 2H), 2.01-1.81 (m, 2H), 1.76-1.64 (m, 1H), 1.39-1.31 (m, 3H) |
| 80 | 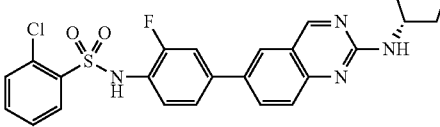 | N-(4-(2-(((1R,3))-3-aminocyclopentyl)amino)quinazolin-6-yl)-2-fluorophenyl)-2-chlorobenzenesulfonamide | M + H⁺ = 512.1 (LCMS) | δ 9.11 (s, 1H), 8.54 (br s, 1H), 8.08-7.95 (m, 3H), 7.67-7.37 (m, 7H), 4.55-4.39 (m, 1H), 3.80-3.66 (m, 1H), 2.77-2.61 (m, 1H), 2.29-2.11 (m, 2H), 2.05-1.83 (m, 2H), 1.77-1.63 (m, 1H) |
| 81 | 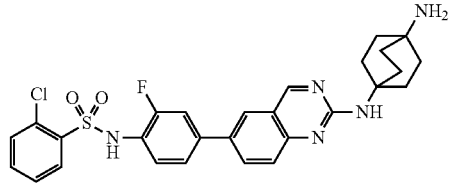 | N-(4-(2-((4-aminobicyclo[2.2.2]octan-1-yl)amino)quinazolin-6-yl)-2-fluorophenyl)-2-chlorobenzenesulfonamide | M + H⁺ = 552.1 (LCMS) | δ 9.02 (s, 1H), 8.44 (br s, 1H), 8.00 (d, J = 7.9 Hz 1H), 7.93 (br s, 2H), 7.62-7.52 (m, 3H), 7.51-7.44 (m, 1H), 7.41 (br d, J = 8.2 Hz, 3H), 2.35-2.27 (m, 6H), 1.99-1.92 (m, 6H) |
| 82 | 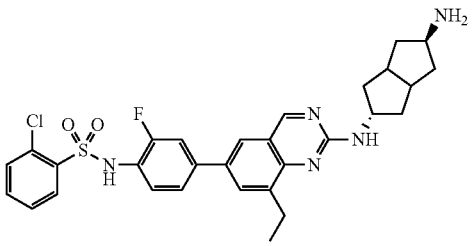 | N-(4-(2-(((2r,5r)-5-aminooctahydropentalen-2-yl)amino-8-ethylquinazolin-6-yl)-2-fluorophenyl)-2-chlorobenzenesulfonamide | M + H⁺ = 580.1 (LCMS) | δ 8.91 (s, 1H), 8.40 (br s, 1H), 7.91 (dd, J = 1.3, 7.9 Hz, 1H), 7.68 (s, 2H), 7.54-7.44 (m, 2H), 7.41-7.25 (m, 4H), 4.50-4.41 (m, 2H), 3.00 (q, J = 7.4 Hz, 2H), 2.68-2.55 (m, 2H), 2.36-2.22 (m, 2H), 1.97 (br dd, J = 5.9, 12.5 Hz, 2H), 1.66 (td, J = 9.0, 12.5 Hz, 2H), 1.38-1.21 (m, 5H) |
| 83 | 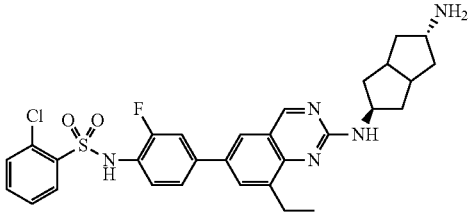 | N-(4-(2-(((2r,5r)-5-aminooctahydropentalen-2-yl)amino)-8-ethylquinazolin-6-yl)-2-fluorophenyl)-2-chlorobenzenesulfonamide | M + H⁺ = 580.2 (LCMS) | δ 8.99 (s, 1H), 8.54 (br s, 1H), 8.00 (d, J = 7.9 Hz, 1H), 7.76 (s, 2H), 7.62-7.52 (m, 2H), 7.49-7.36 (m, 4H), 4.38-4.17 (m, 1H), 3.83-3.66 (m, 1H), 3.13-3.00 (m, 2H), 2.73 (br s, 2H), 2.55-2.46 (m, 2H), 1.94 (br dd, J = 6.4, 12.5 Hz, 2H), 1.85-1.74 (m, 2H), 1.32 (t, J = 7.5 Hz, 3H), 1.28-1.21 (m, 2H) |

| Comp ID | Structure | Chemical Name | Mass (M + H⁺) | ¹H NMR (CD₃OD, 400 MHz) |
|---|---|---|---|---|
| 84 | | N-(4-(2-(((2s,5s)-5-aminoocta-hydropentalen-2-yl)amino)-8-ethylquinazolin-6-yl)-2-fluorophenyl)-2-chlorobenzene-sulfonamide | M + H⁺ = 580.1 (LCMS) | δ 8.99 (s, 1H), 8.48 (br s, 1H), 8.00 (dd, J = 1.3, 7.9 Hz, 1H), 7.75 (s, 2H), 7.62-7.52 (m, 2H), 7.50-7.36 (m, 4H), 4.50-4.38 (m, 1H), 3.57-3.45 (m, 1H), 3.06 (q, J = 7.6 Hz, 2H), 2.67-2.57 (m, 2H), 2.52 (br dd, J = 6.4, 12.5 Hz, 2H), 2.44-2.33 (m, 2H), 1.59-1.39 (m, 4H), 1.32 (t, J = 7.5 Hz, 3H) |
| 85 | | N-(4-(2-(((2s,5s)-5-aminoocta-hydropentalen-2-yl)amino)quinazolin-6-yl)-2-fluorophenyl)-2-chlorobenzene-sulfonamide | M + H⁺ = 552.1 (LCMS) | δ 9.06 (s, 1H), 8.47 (br s, 1H), 8.06-7.89 (m, 3H), 7.64-7.53 (m, 3H), 7.52-7.36 (m, 4H), 4.52-4.38 (m, 1H), 3.60-3.44 (m, 1H), 2.72-2.53 (m, 2H), 2.53-2.31 (m, 4H), 1.55-1.37 (m, 4H). |
| 86 | | N-(4-(2-((4-aminobicyclo[2.2.1]heptan-1-yl)amino)quinazolin-6-yl)-2-fluorophenyl)-2-chlorobenzene-sulfonamide | M + H⁺ = 538.1 (LCMS) | δ 9.06 (s, 1H), 8.59-8.47 (m, 1H), 8.08-7.87 (m, 3H), 7.63-7.34 (m, 7H), 2.48-2.28 (m, 4H), 2.06-1.85 (m, 6H) |
| 87 | | N-(4-(2-((4-aminobicyclo[2.2.2]octan-1-yl)-amino)-8-ethylquinazolin-6-yl)-2-fluorophenyl)-2-chlorobenzene-sulfonamide | M + H⁺ = 580.2 (LCMS) | δ 8.98 (s, 1H), 8.49 (br s, 1H), 8.02 (dd, J = 1.4, 7.9 Hz, 1H), 7.77 (dd, J = 1.9, 12.2 Hz, 2H), 7.63-7.55 (m, 2H), 7.51-7.38 (m, 4H), 3.10 (q, J = 7.5 Hz, 2H), 2.42-2.32 (m, 6H), 2.04-1.94 (m, 6H), 1.36 (t, J = 7.5 Hz, 3H) |
| 88 | | 2-chloro-N-(4-(8-ethyl-2-(((1r,4r)-4-(pyrrolidin-1-yl)cyclohexyl)amino)quinazolin-6-yl)-2-fluorophenyl)benzene-sulfonamide | M + H⁺ = 608.3 (LCMS) | δ 9.02 (s, 1H), 8.57 (br s, 1H), 8.03 (d, J = 7.9 Hz, 1H), 7.79 (s, 2H), 7.64-7.54 (m, 2H), 7.51-7.39 (m, 4H), 3.98 (br t, J = 11.4 Hz, 1H), 3.33-3.29 (m, 4H), 3.12-3.01 (m, 3H), 2.44-2.24 (m, 4H), 2.07 (br s, 4H), 1.73-1.59 (m, 2H), 1.54-1.42 (m, 2H), 1.35 (t, J = 7.5 Hz, 3H) |
| 89 | | N-(5-(2-(((1r,4r)-4-aminocyclohexyl)amino)quinazolin-6-yl)-1,3,4-thiadiazol-2-yl)-2-chlorobenzene-sulfonamide | M + H⁺ = 516.1 (LCMS) | δ 9.13 (br s, 1H), 8.19 (s, 1H), 8.10 (br d, J = 9.3 Hz, 1H), 8.02 (d, J = 2.0 Hz, 1H), 7.96 (dd, J = 1.9, 7.6 Hz, 1H), 7.50-7.31 (m, 5H), 3.80 (br d, J = 12.1 Hz, 1H), 2.98 (br s, 1H), 2.05-1.90 (m, 4H), 1.48-1.27 (m, 4H). |

| Comp ID | Structure | Chemical Name | Mass (M + H+) | 1H NMR (CD3OD, 400 MHz) |
|---|---|---|---|---|
| 90 | | N-(4-(2-(((1r,4r)-4-aminocyclohexyl)amino)-7-methylquinazolin-6-yl)-2-fluorophenyl)-2-chlorobenzenesulfonamide | M + H+ = 540.3 (LCMS) | δ 8.95 (s, 1H), 8.07 (dd, J = 1.6, 7.8 Hz, 1H), 7.60-7.47 (m, 3H), 7.43-7.32 (m, 3H), 7.07-6.94 (m, 2H), 4.00-3.89 (m, 1H), 3.04-2.93 (m, 1H), 2.34 (s, 3H), 2.23-2.16 (m, 2H), 2.12-2.03 (m, 2H), 1.59-1.41 (m, 4H) |
| 91 | | 2-chloro-N-(5-(2-(((1r,4r)-4-(dimethylamino)cyclohexyl)amino)-8-ethylipinazolin-6-yl)-6-methylpyridin-2-yl)benzenesulfonamide | M + H+ = (LCMS) | δ 8.99 (s, 1H), 8.40 (br s, 1H), 8.31-8.21 (m, 1H), 7.84 (s, 1H), 7.66-7.45 (m, 5H), 6.83 (s, 1H), 4.03-3.92 (m, 1H), 3.88 (s, 3H), 3.23-3.12 (m, 1H), 3.05 (q, J = 7.4 Hz, 2H). 2.31 (br d, J = 12.3 Hz, 2H), 2.14 (br d, J = 12.1 Hz, 2H), 1.68-1.42 (m, 4H), 1.31 (t, J = 7.5 Hz, 3H) |
| 92 | | N-(5-(2-(((1r,4r)-4-aminocyclohexyl)amino)-8-ethylquinazolin-6-yl)-4-methoxypyridin-2-yl)-2-chlorobenzenesulfonamide | M + H+ = 567.2 (LCMS) | δ 8.98 (s, 1H), 8.48 (br s, 1H), 8.20-8.12 (m, 1H), 8.06-7.91 (m, 3H), 7.64-7.54 (m, 2H), 7.49 (ddd, J = 2.6, 5.8, 8.0 Hz, 1H), 7.34 (d, J = 2.2 Hz, 1H), 4.02-3.92 (m, 1H), 3.84 (s, 3H), 3.24-3.12 (m, 1H), 3.05 (q, J = 7.6 Hz, 2H), 2.30 (br d, J = 11.0 Hz, 2H), 2.14 (br d, J = 11.9 Hz, 2H), 1.66-1.41 (m, 4H), 1.32 (t, J = 7.4 Hz, 3H) |
| 93 | | N-(6-(2-(((1r,4r)-4-aminocyclohexyl)amino)-8-ethylquinazolin-6-yl)-5-methoxypyridin-3-yl)-2-chlorobenzenesulfonamide | M + H+ = 552.2 (LCMS) | δ 9.00 (s, 1H), 8.50 (br s, 1H), 8.30 (d, J = 7.3\ Hz, 1H), 8.15 (s, 1H), 7.68 (s, 2H), 7.59-7.47 (m, 3H), 4.03-3.92 (m, 1H), 3.22-3.12 (m, 1H), 3.06 (q, J = 7.5 Hz, 2H), 2.37 (s, 3H), 2.30 (br d, J = 11.0 Hz, 2H), 2.14 (br d, J = 11.9 Hz, 2H), 1.66-1.42 (m, 4H), 1.31 (t, J = 7.5 Hz, 3H) |
| 94 | | N-(5-(2-(((1r,4r)-4-aminocyclohexyl)amino)-8-ethylquinazolin-6-yl)-6-methylpyrazin-2-yl)-2-chlorobenzenesulfonamide | M + H+ = 582.2 (LCMS) | δ 9.01 (s, 1H), 8.56 (br s, 1H), 8.03 (d, J = 7.7 Hz, 1H). 7.77 (br s, 2H), 7.66-7.54 (m, 2H), 7.51-7.34 (m, 4H), 3.98 (br t, J = 11.6 Hz, 1H), 3.22-3.02 (m, 3H), 2.82 (s, 6H), 2.39 (br d, J = 12.0 Hz, 2H), 2.18 (br d, J = 12.1 Hz, 2H), 1.78-1.63 (m, 2H), 1.57-1.41 (m, 2H), 1.34 (t, J = 7.5 Hz, 2H) |

Example 1: Synthesis of 2-chloro-N-(5-(2-(((1r,4r)-4-(dimethylamino)cyclohexyl)amino)-8-ethylquinazolin-6-yl)-6-methylpyridin-2-yl)benzenesulfonamide (91)

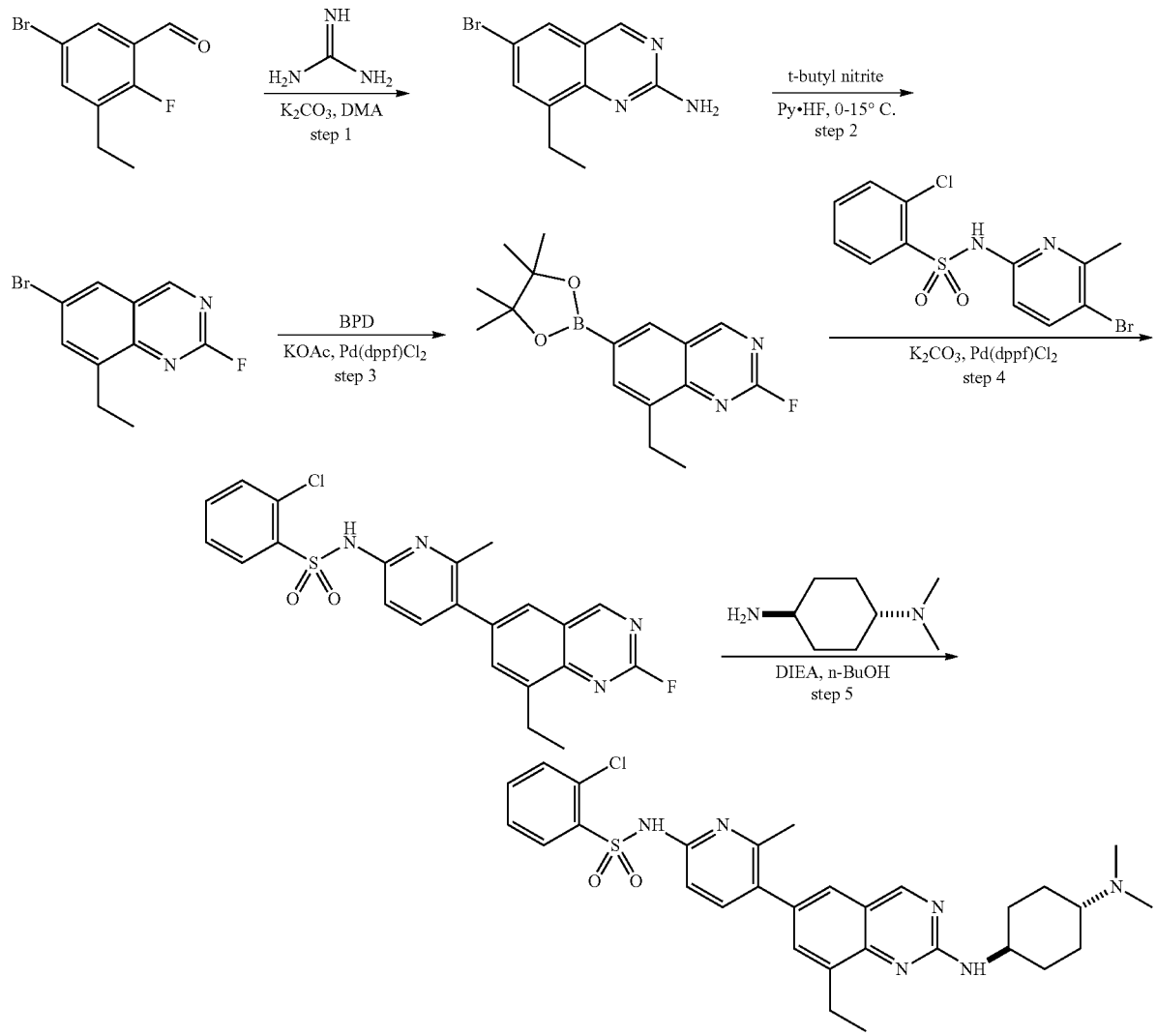

Step 1

To a solution of guanidine (1.7 g, 13.8 mmol, $H_2CO_3$) and $K_2CO_3$ (5.7 g, 41.4 mmol) in DMA (60.0 mL) was dropwise added 5-bromo-3-ethyl-2-fluorobenzaldehyde (3.0 g, 13.8 mmol) in DMA (9.0 ml). The mixture was stirred at 160° C. for 1 h. The reaction mixture was concentrated under reduced pressure to give a residue. The residue was purified by column chromatography (SiO$_2$, Petroleum ether/Ethyl acetate=50/1 to 10/1) to give 6-bromo-8-ethylquinazolin-2-amine (1.4 g, 3.4 mmol, 24.7% yield). M+H$^+$=257.8 (LCMS).

Step 2

To a solution of 6-bromo-8-ethylquinazolin-2-amine (10 g, 39.6 mmol) in pyridine (100.0 mL) was added pyridine hydrofluoride (220.0 g, 2.2 mol, 200.0 mL) at −40° C. The mixture was stirred at −40° C. for 15 min. Then tert-butyl nitrite (8.2 g, 79.3 mmol, 9.4 mL) was added. The mixture was stirred at 20° C. for 12 h. The mixture was poured into ice water and adjusted pH=7 with sat. NaHCO$_3$, extracted with ethyl acetate (500.0 mL×3). The combined organic layers were washed with brine (200.0 mL×3), dried over Na$_2$SO$_4$, filtered and concentrated under reduced pressure to give a residue. The residue was purified by column chromatography (SiO$_2$, Petroleum ether/Ethyl acetate=1/0 to 10/1) to afford 6-bromo-8-ethyl-2-fluoroquinazoline (11.4 g, 43.9 mmol, 55.4% yield). M+H$^+$=257.0 (LCMS); $^1$H NMR (400 MHz, CHLOROFORM-d) δ 9.26 (d, J=2.6 Hz, 1H), 8.00 (d, J=2.2 Hz, 1H), 7.87 (d, J=1.1 Hz, 1H), 3.18 (q, J=7.5 Hz, 2H), 1.37 (t, J=7.5 Hz, 3H).

Step 3

To a solution of 6-bromo-8-ethyl-2-fluoroquinazoline (6.0 g, 23.5 mmol) and KOAc (3.5 g, 35.3 mmol) in dioxane (100.0 mL) were added 4,4,4',4',5,5,5',5'-octamethyl-2,2'-bi(1,3,2-dioxaborolane) (7.2 g, 28.2 mmol) and Pd(dppf)Cl$_2$ (1.7 g, 2.3 mmol). The mixture was stirred at 90° for 12 h under N$_2$. The mixture was concentrated to get crude residue. The residue was purified by column chromatography (SiO$_2$, Petroleum ether/Ethyl acetate=1/0 to 3/1) to give 8-ethyl-2-fluoro-6-(4,4,5,5-tetramethyl-1,3,2-dioxaborolan-2-yl)quinazoline (7.1 g, 23.5 mmol, 99.9% yield).

Step 4

To a solution of 8-ethyl-2-fluoro-6-(4,4,5,5-tetramethyl-1,3,2-dioxaborolan-2-yl)quinazoline (7.1 g, 23.5 mmol) and K$_2$CO$_3$ (9.7 g, 70.4 mmol) in dioxane (150.0 mL) and H$_2$O (15.0 mL) were added N-(5-bromo-6-methylpyridin-2-yl)-2-chlorobenzenesulfonamide (10.2 g, 28.2 mmol) and Pd(dppf)Cl$_2$ (859 mg, 1.1 mmol). The mixture was stirred at 90° C. for 12 h under N$_2$. The mixture was concentrated to get a crude residue. The residue was purified by column chromatography (SiO$_2$, Petroleum ether/Ethyl acetate=1/0 to 0/1) to afford 2-chloro-N-(5-(8-ethyl-2-fluoroquinazolin-6-yl)-6-methylpyridin-2-yl)benzenesulfonamide (8.5 g, 15.3 mmol, 65.2% yield). M+H$^+$=457.1 (LCMS)

Step 5

To a solution of 2-chloro-N-(5-(8-ethyl-2-fluoroquinazolin-6-yl)-6-methylpyridin-2-yl)benzenesulfonamide (8.5 g, 18.6 mmol) in n-BuOH (60.0 mL) was added (1r,4r)-N1,N1-dimethylcyclohexane-1,4-diamine(13.3 g, 74.4 mmol, HCl) and DIEA (16.8 g, 130.2 mmol, 22.6 mL). The mixture was stirred at 100° C. for 12 h. The mixture was concentrated to get crude residue. The residue was purified by prep-HPLC (FA condition) to afford 2-chloro-N-(5-(2-(((1r,4r)-4-(dimethylamino)cyclohexyl)amino)-8-ethylquinazolin-6-yl)-6-methylpyridin-2-yl)benzenesulfonamide (3.6 g, 5.7 mmol, 30.7% yield, formic acid salt (FA)). M+H$^+$=579.2 (LCMS); $^1$H NMR (400 MHz, METHANOL-d$_4$) δ 8.99 (s, 1H), 8.32 (s, 2H), 8.22 (d, J=7.5 Hz, 1H), 7.67 (d, J=8.9 Hz, 1H), 7.56-7.42 (m, 5H), 7.20 (d, J=8.9 Hz, 1H), 4.04-3.92 (m, 1H), 3.30-3.22 (m, 1H), 3.07 (q, J=7.4 Hz, 2H), 2.89 (s, 6H), 2.37 (s, 5H), 2.19 (br d, J=11.7 Hz, 2H), 1.81-1.66 (m, 2H), 1.56-1.41 (m, 2H), 1.31 (t, J=7.5 Hz, 3H).

Example 2: Synthesis of 2-chloro-N-(5-(2-(((1r,4r)-4-(dimethylamino)cyclohexyl)amino)-8-ethylquinazolin-6-yl)-3-fluoropyridin-2-yl)benzenesulfonamide (95)

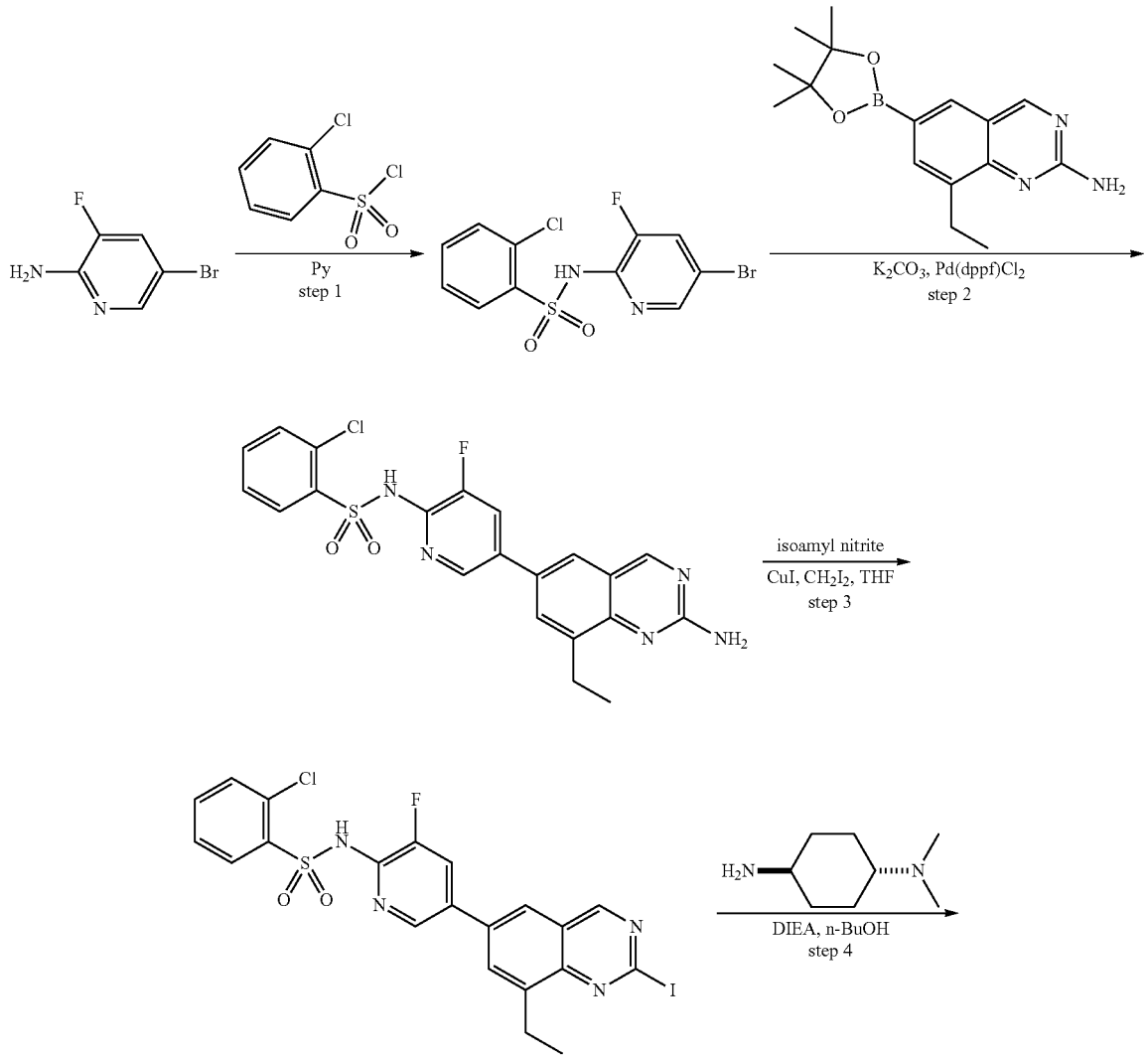

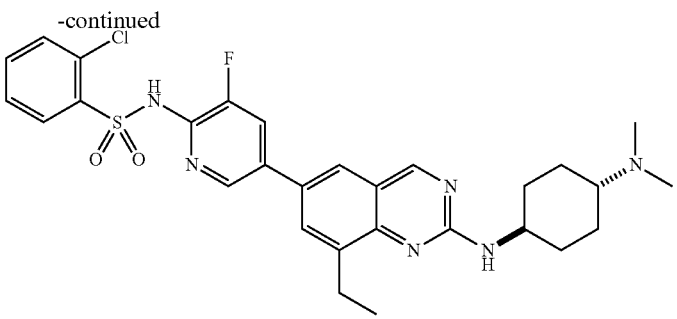

Step 1

To a solution of 5-bromo-3-fluoropyridin-2-amine (815 mg, 4.2 mmol) in pyridine (20.0 mL) was added 2-chlorobenzene-1-sulfonyl chloride (1.4 g, 6.4 mmol, 871.5 uL). The mixture was stirred at 45° C. for 24 h. The mixture was concentrated under reduced pressure to give a residue. The residue was purified by column chromatography (SiO$_2$) to give N-(5-bromo-3-fluoropyridin-2-yl)-2-chlorobenzenesulfonamide (1.2 g, 2.0 mmol, 47.6% yield). M+H$^+$=366.8 (LCMS).

Step 2

To a solution of N-(5-bromo-3-fluoropyridin-2-yl)-2-chlorobenzenesulfonamide (1.2 g, 3.2 mmol) and 8-ethyl-6-(4,4,5,5-tetramethyl-1,3,2-dioxaborolan-2-yl)quinazolin-2-amine (1.2 g, 3.8 mmol) in dioxane (30.0 mL) and H$_2$O (3.0 mL) was added K$_2$CO$_3$ (1.3 g, 9.6 mmol) and Pd(dppf)Cl$_2$ (236 mg, 322.7 umol). The mixture was stirred at 90° C. for 12 h under N$_2$. The reaction mixture was concentrated in reduced pressure to give a residue. The residue was washed with H$_2$O (20.0 mL×3) and ethyl acetate (20.0 mL×3). Then the residue was added MeOH (30.0 mL), THF (30.0 mL) and stirred at 25° C. for 12 h. Then the mixture was filtered. The filtrate was concentrated in reduced pressure to give a residue. The residue was purified by column chromatography (SiO$_2$) to give N-(5-(2-amino-8-ethylquinazolin-6-yl)-3-fluoropyridin-2-yl)-2-chlorobenzenesulfonamide (429 mg, crude). M+H$^+$=458.2 (LCMS).

Step 3

To a solution of N-(5-(2-amino-8-ethylquinazolin-6-yl)-3-fluoropyridin-2-yl)-2-chlorobenzenesulfonamide (200 mg, 436.7 umol) and CuI (83 mg, 436.7 umol) in THF (5.0 mL) was added CH$_2$I$_2$ (584 mg, 2.1 mmol, 176.1 uL) and isopentyl nitrite (153 mg, 1.3 mmol, 176.4 uL). The mixture was stirred at 80° C. for 12 h. The reaction mixture was basified pH to 8-9 with NH$_3$·H$_2$O (25% solution). Then the mixture was added water (20.0 mL) and extracted with ethyl acetate (40.0 mL×4). The combined organic phase was washed with brine (10.0 mL×3), dried with anhydrous Na$_2$SO$_4$, filtered and concentrated in vacuum to get a residue. The residue was purified by prep-HPLC (FA condition) to give 2-chloro-N-(5-(8-ethyl-2-iodoquinazolin-6-yl)-3-fluoropyridin-2-yl)benzeneesulfonamide (42 mg, 61.4 umol, 15.1% yield, FA). M+H$^+$=569.0 (LCMS).

Step 4

To a solution of 2-chloro-N-(5-(8-ethyl-2-iodoquinazolin-6-yl)-3-fluoropyridin-2-yl)benzeneesulfonamide (37 mg, 65.0 umol) and (1r,4r)-N1,N1-dimethylcyclohexane-1,4-diamine (133 mg, 520.4 umol, TFA) in n-BuOH (2.0 mL) was basified pH to 8 with DIEA and added DIEA (25 mg, 195.1 umol, 33.9 uL). The mixture was taken up into a microwave tube. The sealed tube was heated at 150° C. for 6 h under microwave. The mixture was concentrated under reduced pressure to give a residue. The residue was purified by pre-HPLC (FA condition) to give 2-chloro-N-(5-(2-(((1r,4r)-4-(dimethylamino)cyclohexyl)amino)-8-ethylquinazolin-6-yl)-3-fluoropyridin-2-yl)benzenesulfonamide (5.2 mg, 7.6 umol, 11.7% yield, FA). M+H$^+$=583.2 (LCMS); $^1$H NMR (400 MHz, DMSO-d$_6$) δ 9.03 (br s, 1H), 8.17 (br s, 1H), 8.09-7.94 (m, 2H), 7.79 (s, 2H), 7.60 (br d, J=13.0 Hz, 1H), 7.41-7.23 (m, 4H), 3.79 (br s, 1H), 3.03-2.86 (m, 3H), 2.61 (s, 6H), 2.16 (br s, 2H), 2.00 (br d, J=10.4 Hz, 2H), 1.58-1.44 (m, 2H), 1.42-1.22 (m, 5H).

Example 3: Synthesis of N-(6-(2-(((1r,4r)-4-aminocyclohexyl)amino)-8-ethylquinazolin-6-yl)-5-ethylpyridazin-3-yl)-2-chlorobenzenesulfonamide (96)

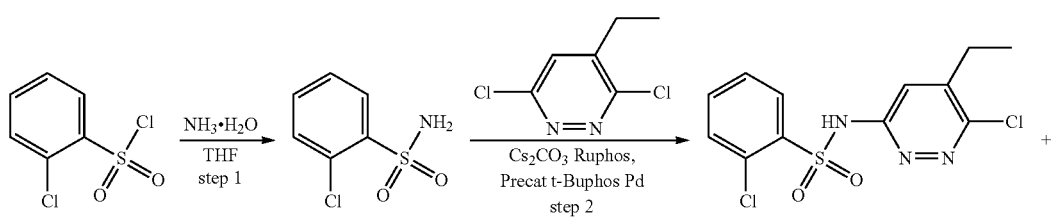

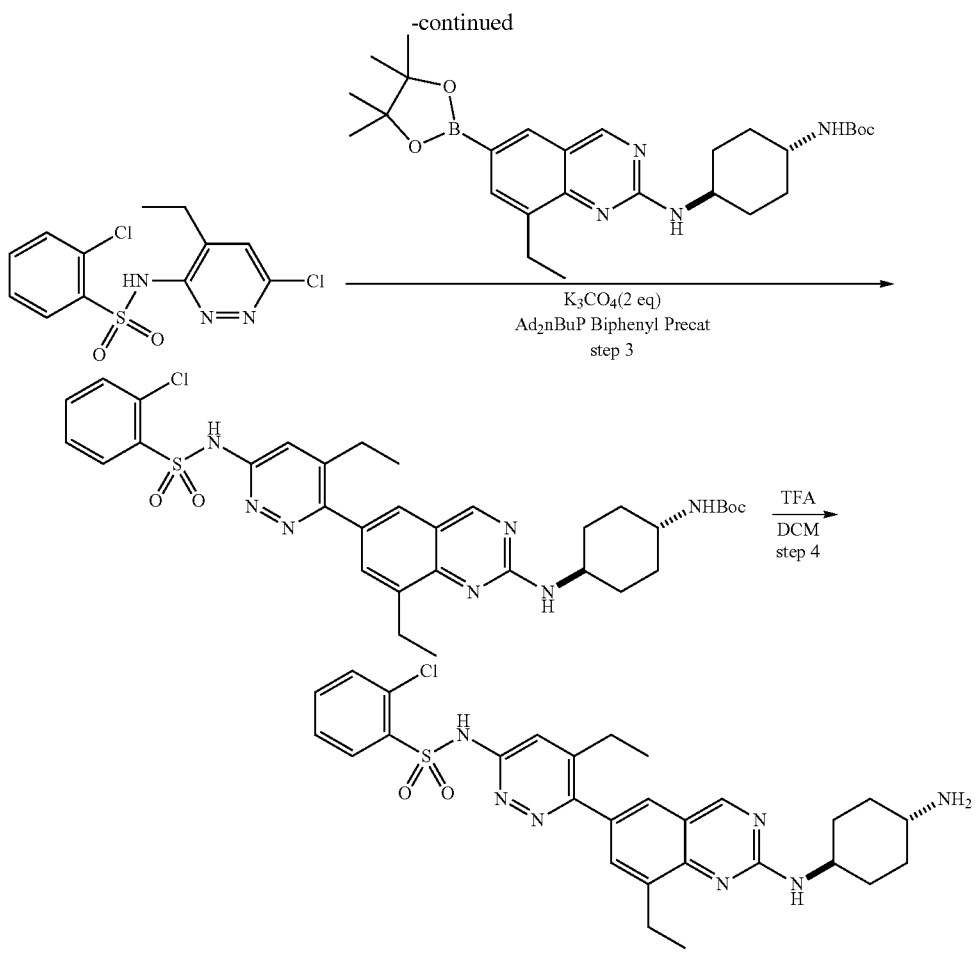

Step 1

To a solution of 2-chlorobenzene-1-sulfonyl chloride (2.0 g, 9.5 mmol, 1.3 mL) in THF (20.0 mL) was added NH₃·H₂O (3.3 g, 28.4 mmol, 3.7 mL, 25% solution) at 0° C. The mixture was stirred at 0° C. for 10 min and then warmed to 20° C. for 2 h. The reaction mixture was concentrated to afford 2-chlorobenzenesulfonamide (1.8 g, 9.4 mmol, 99.1% yield). 1H NMR (400 MHz, DMSO-d6) δ 7.96 (dd, J=1.4, 7.8 Hz, 1H), 7.65-7.55 (m, 2H), 7.54-7.34 (m, 7H).

Step 2

A mixture of 3,6-dichloro-4-ethylpyridazine (500 mg, 2.8 mmol), 2-chlorobenzenesulfonamide (595 mg, 3.1 mmol), Cs₂CO₃ (2.7 g, 8.5 mmol), dicyclohexyl-[2-(2,6-diisopropoxyphenyl)phenyl]phosphane (132 mg, 282.4 umol) and [2-(2-aminoethyl)phenyl]-chloro-palladium; ditert-butyl-[2-(2,4,6-triisopropylphenyl)phenyl]phosphane (194 mg, 282.4 umol) in THF (30.0 mL) was degassed and purged with N₂ for 3 times, and then the mixture was stirred at 80° C. for 12 h under N₂ atmosphere. The reaction was concentrated to give a residue. The residue was purified by column chromatography (SiO₂) to give a crude product (280 mg). The crude product was purified by prep-HPLC (TFA condition) to afford 2-chloro-N-(6-chloro-5-ethylpyridazin-3-yl)benzenesulfonamide (20 mg, 54.2 umol, 1.9% yield). ¹H NMR (400 MHz, METHANOL-d₄) δ 8.20 (d, J=7.7 Hz, 1H), 7.64 (br s, 1H), 7.57-7.53 (m, 2H), 7.52-7.46 (m, 1H), 2.71 (q, J=7.5 Hz, 2H), 1.23 (t, J=7.4 Hz, 3H); and 2-chloro-N-(6-chloro-4-ethylpyridazin-3-yl)benzenesulfonamide (100 mg, 270.9 umol, 10.7% yield). ¹H NMR (400 MHz, METHANOL-d₄) δ 8.21 (d, J=7.6 Hz, 1H), 7.60-7.56 (m, 2H), 7.56-7.48 (m, 2H), 2.61 (br d, J=6.7 Hz, 2H), 1.18 (br t, J=7.2 Hz, 3H).

Step 3

A mixture of 2-chloro-N-(6-chloro-4-ethylpyridazin-3-yl)benzenesulfonamide (54 mg, 161.1 umol), tert-butyl ((1r,4r)-4-((8-ethyl-6-(4,4,5,5-tetramethyl-1,3,2-dioxaborolan-2-yl)quinazolin-2-yl)amino)cyclohexyl)carbamate (80 mg, 161.1 umol), K₃PO₄ (0.5 M, 644.6 uL) and [2-(2-aminophenyl)phenyl]-chloro-palladium; bis(1-adamantyl)-butylphosphane (11 mg, 16.1 umol) were degassed and purged with N₂ for 3 times and taken up into a microwave tube in 2-methyltetrahydrofuran (2.5 mL). The sealed tube was heated at 120° C. for 180 min under microwave. The reaction was concentrated to give a residue. The residue was purified by prep-TLC (SiO₂) to give tert-butyl ((1r,4r)-4-((6-(6-((2-chlorophenyl)sulfonamido)-4-ethylpyridazin-3-yl)-8-ethylquinazolin-2-yl)amino)cyclohexyl)carbamate (60 mg, crude). M+H⁺=666.3 (LCMS).

Step 4

To a solution of tert-butyl ((1r,4r)-4-((6-(6-(2-chlorophenylsulfonamido)-4-ethylpyridazin-3-yl)-8-ethylquinazolin- 2-yl)amino)cyclohexyl)carbamate (60 mg, 90.1 umol) in DCM (2.0 mL) was added TFA (1.0 mL). The mixture was stirred at 20° C. for 0.5 h. The reaction was concentrated to give a residue. The residue was dissolved in MeOH (1.0 mL) and basified pH to 7 with $NH_3 \cdot H_2O$ (25% solution). The residue was purified by prep-HPLC (FA condition) to afford N-(6-(2-(((1r,4r)-4-aminocyclohexyl)amino)-8-ethylquinazolin-6-yl)-5-ethylpyridazin-3-yl)-2-chlorobenzenesulfonamide (5.1 mg, 7.9 umol, 8.8% yield, FA). $M+H^+=566.2$ (LCMS); $^1H$ NMR (400 MHz, METHANOL-$d_4$) δ 9.08 (br s, 1H), 8.23 (br s, 1H), 8.03-7.38 (m, 7H), 3.99 (br s, 1H), 3.23-3.01 (m, 3H), 2.67 (br s, 2H), 2.31 (br d, J=10.1 Hz, 2H), 2.14 (br d, J=11.0 Hz, 2H), 1.66-1.44 (m, 4H), 1.33 (br t, J=7.4 Hz, 3H), 1.10 (br t, J=7.1 Hz, 3H).

Example 4: Synthesis of 2-chloro-N-(5-(2-(((1r,4r)-4-(dimethylamino)cyclohexyl)amino)-8-ethylquinazolin-6-yl)-3-fluoro-6-methylpyridin-2-yl)benzenesulfonamide (97)

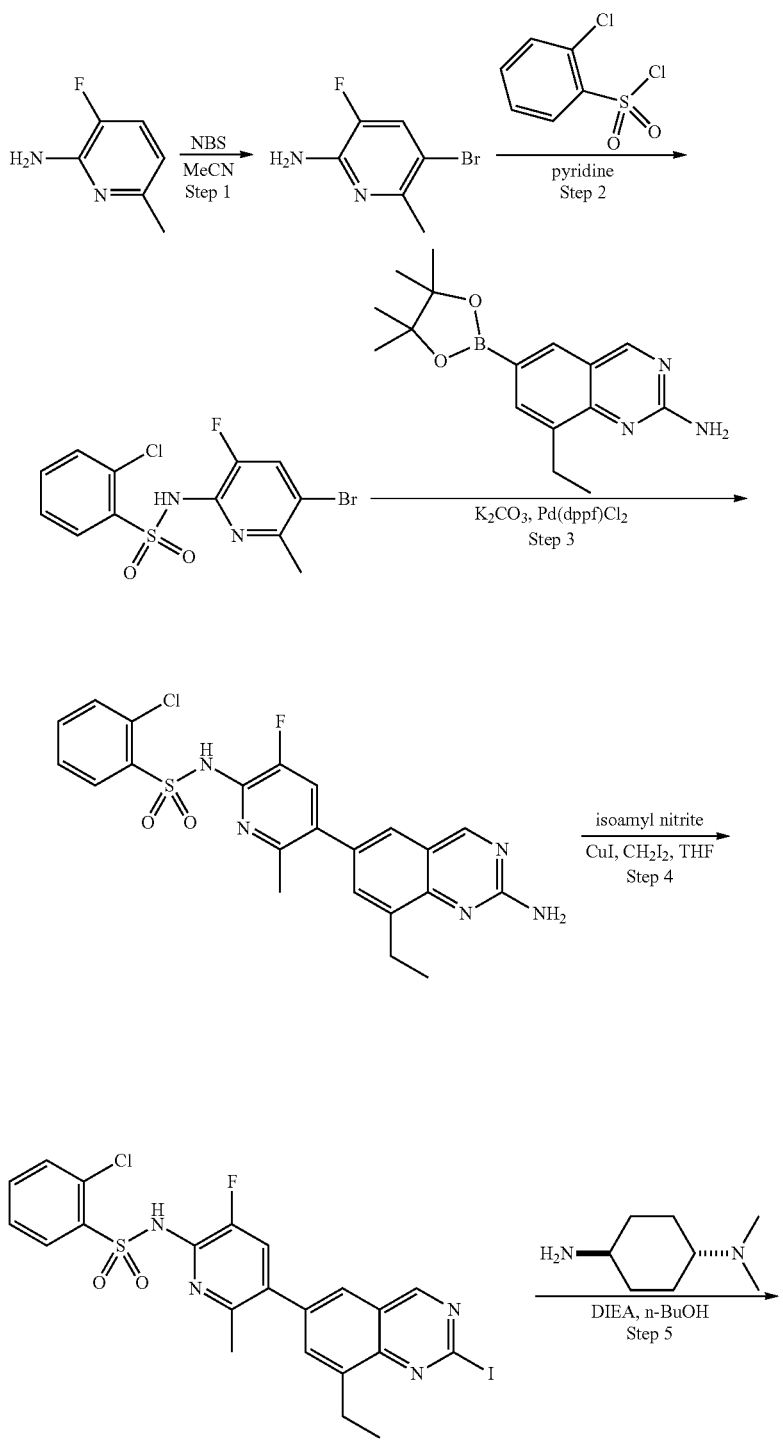

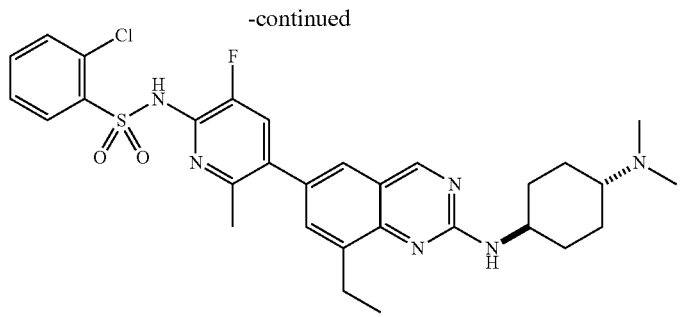

Step 1

To a solution of 3-fluoro-6-methyl-pyridin-2-amine (500 mg, 3.9 mmol) in MeCN (15.0 mL) was added NBS (705 mg, 3.9 mmol) at 0° C. After addition, the resulting mixture was stirred at 25° C. for 2 h. The reaction mixture was concentrated under reduced pressure. The residue was purified by column chromatography (SiO$_2$) to afford 5-bromo-3-fluoro-6-methylpyridin-2-amine (750 mg, 3.1 mmol, 78.4% yield). $^1$H NMR (CHLOROFORM-d, 400 MHz): δ 7.33 (d, J=9.5 Hz, 1H), 4.81-4.57 (m, 2H), 2.44 (d, J=1.1 Hz, 3H).

Step 2

To a mixture of 5-bromo-3-fluoro-6-methylpyridin-2-amine (700 mg, 3.41 mmol), 2-chlorobenzenesulfonyl chloride (720 mg, 3.4 mmol, 464.9 uL) in pyridine (20.0 mL) was stirred at 45° C. for 12 h. The reaction mixture was concentrated under reduced pressure. The residue was purified by column chromatography (SiO$_2$) to afford N-(5-bromo-3-fluoro-6-methylpyridin-2-yl)-2-chlorobenzenesulfonamide (500 mg, 1.1 mmol, 34.7% yield). $^1$H NMR (CHLOROFORM-d, 400 MHz): δ 8.27 (d, J=7.9 Hz, 1H), 7.53-7.33 (m, 4H), 2.24 (s, 3H).

Step 3

A mixture of N-(5-bromo-3-fluoro-6-methylpyridin-2-yl)-2-chlorobenzenesulfonamide (200 mg, 526.8 umol), 8-ethyl-6-(4,4,5,5-tetramethyl-1,3,2-dioxaborolan-2-yl)quinazolin-2-amine (131 mg, 439.0 umol), K2CO3 (60 mg, 439.0 umol), Pd(dppf)Cl2 (32 mg, 43.9 umol) in dioxane (3.0 mL) and H$_2$O (0.3 mL) was degassed and purged with N2 for 3 times, and then the mixture was stirred at 90° C. for 12 h under N2 atmosphere. The reaction mixture was concentrated under reduced pressure. The residue was purified by prep-TLC (SiO$_2$) to afford N-(5-(2-amino-8-ethylquinazolin-6-yl)-3-fluoro-6-methylpyridin-2-yl)-2-chlorobenzenesulfonamide (116 mg, 196.6 umol, 44.7% yield).

Step 4

To a solution of N-(5-(2-amino-8-ethylquinazolin-6-yl)-3-fluoro-6-methylpyridin-2-yl)-2-chlorobenzenesulfonamide (116 mg, 245.8 umol), CuI (46 mg, 245.8 umol) in THF (5.0 mL) was added CH$_2$I$_2$ (329 mg, 1.2 mmol, 99.1 uL) and isoamyl nitrite (86 mg, 737.3 umol, 99.2 uL). The mixture was stirred at 80° C. for 12 h. The reaction mixture was concentrated under reduced pressure. The residue was purified by prep-TLC (SiO$_2$) to afford 2-chloro-N-(5-(8-ethyl-2-iodoquinazolin-6-yl)-3-fluoro-6-methylpyridin-2-yl)benzenesulfonamide (46 mg, 62.5 umol, 25.4% yield). M+H$^+$=582.9 (LCMS).

Step 5

To a solution of 2-chloro-N-(5-(8-ethyl-2-iodoquinazolin-6-yl)-3-fluoro-6-methylpyridin-2-yl)benzenesulfonamide (46 mg, 78.9 umol), (1r,4r)-N1,N1-dimethylcyclohexane-1,4-diamine (161 mg, 631.4 umol, TFA) in n-BuOH (2.0 mL) was adjusted pH to 8-9 with DIEA. Then DIEA (30 mg, 236.7 umol, 41.2 uL) was added. The mixture was stirred at 100° C. for 12 h. (1r,4r)-N1,N1-dimethylcyclohexane-1,4-diamine (161 mg) was added. The reaction stirred for another 12 h at 100° C. The reaction mixture was concentrated under reduced pressure. The residue was purified by prep-HPLC (FA condition) to afford 2-chloro-N-(5-(2-(((1r,4r)-4-(dimethylamino)cyclohexyl)amino)-8-ethylquinazolin-6-yl)-3-fluoro-6-methylpyridin-2-yl)benzenesulfonamide (2.1 mg, 3.1 umol, 4.0% yield, FA). M+H$^+$=597.2 (LCMS); $^1$H NMR (METHANOL-d$_4$, 400 MHz) δ 8.97 (s, 1H), 8.50 (s, 1H), 8.30 (d, J=7.5 Hz, 1H), 7.61-7.43 (m, 4H), 7.38 (d, J=10.8 Hz, 1lH), 3.96 (br t, J=11.8 Hz, 1H), 3.18-3.09 (m, 1H), 3.07-3.00 (m, 2H), 2.81 (s, 6H), 2.37 (br d, J=13.2 Hz, 2H), 2.22-2.11 (m, 5H), 1.75-1.61 (m, 2H), 1.53-1.41 (m, 2H), 1.30 (t, J=7.5 Hz, 3H).

Example 5: Synthesis of 2-chloro-N-(5-(2-(((1r,4r)-4-(dimethylamino)cyclohexyl)amino)-8-ethylquinazolin-6-yl)-6-methoxypyridin-2-yl)benzenesulfonamide (99)

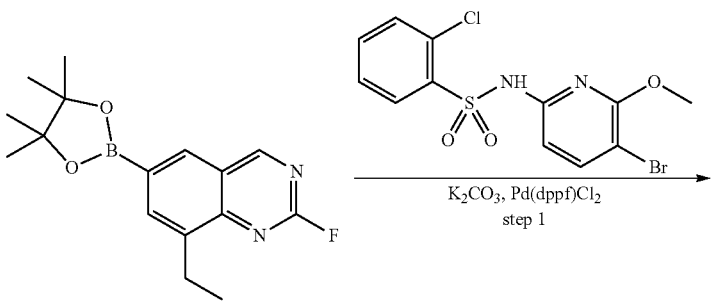

step 1

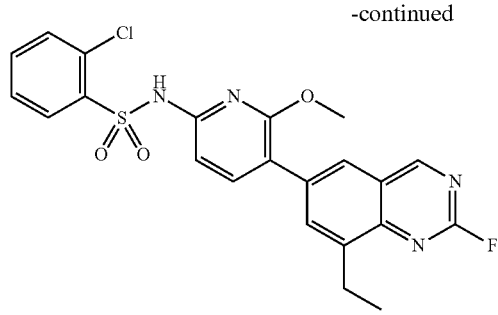
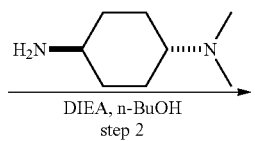

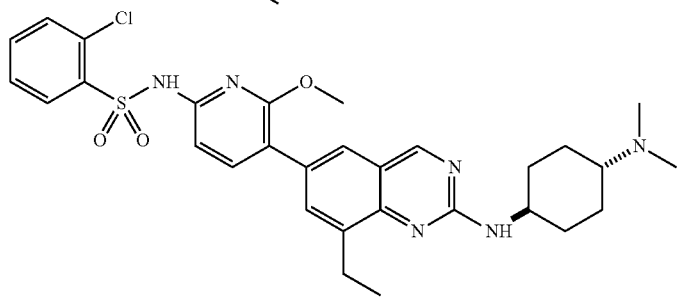

Step 1

A mixture of N-(5-bromo-6-methoxy-2-pyridyl)-2-chloro-benzenesulfonamide (2.5 g, 6.6 mmol), 8-ethyl-2-fluoro-6-(4,4,5,5-tetramethyl-1,3,2-dioxaborolan-2-yl)quinazoline (2.0 g, 6.6 mmol), K₂CO₃ (2.7 g, 19.8 mmol), Pd(dppf)Cl₂ (484 mg, 661.9 umol) in H₂O (2.0 mL) and dioxane (20.0 mL) was degassed and purged with N₂ for 3 times, and then the mixture was stirred at 90° C. for 12 h under N₂ atmosphere. The reaction mixture was concentrated under reduced pressure to give a residue. The residue was purified by column chromatography (SiO₂, Petroleum ether/Ethyl acetate=10/1 to 0/1) to afford 2-chloro-N-(5-(8-ethyl-2-fluoroquinazolin-6-yl)-6-methoxypyridin-2-yl)benzenesulfonamide (2.0 g, 3.6 mmol, crude). M+H⁺=473.1 (LCMS)

Step 2

To a solution of 2-chloro-N-(5-(8-ethyl-2-fluoroquinazolin-6-yl)-6-methoxypyridin-2-yl)benzenesulfonamide (1.5 g, 3.1 mmol) in n-BuOH (30.0 mL) was added DIEA (2.9 g, 22.2 mmol, 3.9 mL) and (1r,4r)-N1,N1-dimethylcyclohexane-1,4-diamine (2.3 g, 12.7 mmol, HCl). The mixture was stirred at 100° C. for 24 h. The reaction mixture was concentrated under reduced pressure to give a residue. The residue was purified by prep-HPLC (FA condition) to afford 2-chloro-N-(5-(2-(((1r,4r)-4-(dimethylamino)cyclohexyl)amino)-8-ethylquinazolin-6-yl)-6-methoxypyridin-2-yl)benzenesulfonamide (1.13 g, 1.6 mmol, 52.1% yield, FA). M+H⁺=595.2 (LCMS); ¹H NMR (400 MHz, METHANOL-d₄) δ 8.96 (s, 1H), 8.41 (br s, 1H), 8.35-8.30 (m, 1H), 7.71-7.64 (m, 3H), 7.62-7.57 (m, 2H), 7.55-7.50 (m, 1H), 6.66 (d, J=7.9 Hz, 1H), 3.99 (tt, J=3.9, 11.6 Hz, 1H), 3.68 (s, 3H), 3.31-3.24 (m, 1H), 3.05 (q, J=7.4 Hz, 2H), 2.90 (s, 6H), 2.41 (br d, J=11.6 Hz, 2H), 2.20 (br d, J=12.1 Hz, 2H), 1.81-1.66 (m, 2H), 1.57-1.44 (m, 2H), 1.32 (t, J=7.5 Hz, 3H).

Example 6: Synthesis of 2-chloro-N-(5-(2-(((1r,4r)-4-(dimethylamino)cyclohexyl)amino)-7-methylquinazolin-6-yl)-6-methoxypyridin-2-yl)benzenesulfonamide (108)

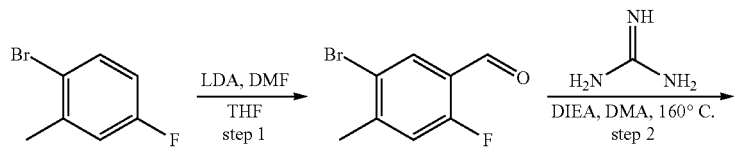

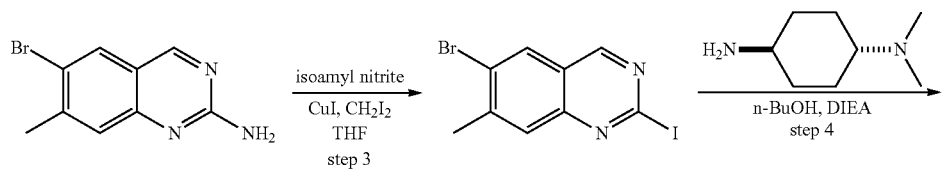

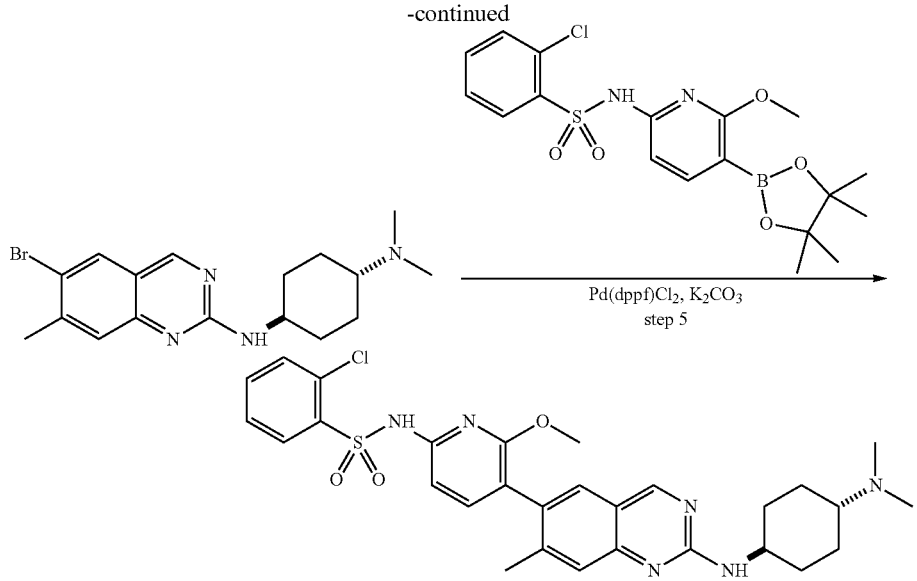

The title compound was synthesized according to the synthetic procedure reported for the preparation of N-(5-(2-(((1r,4r)-4-aminocyclohexyl)amino)-7-ethylquinazolin-6-yl)-6-methoxypyridin-2-yl)-2-chlorobenzenesulfonamide (7.5 mg, 11.2 umol, 4.5% yield, FA). M+H$^+$=581.2 (LCMS); $^1$H NMR (400 MHz, METHANOL-$d_4$) δ 8.93 (s, 1H), 8.57 (br s, 1H), 8.33 (d, J=7.3 Hz, 1H), 7.63-7.58 (m, 2H), 7.52 (ddd, J=3.1, 5.4, 8.1 Hz, 1H), 7.46-7.41 (m, 2H), 7.37 (s, 1H), 6.64 (d, J=7.8 Hz, 1H), 4.04-3.89 (m, 1H), 3.59 (s, 3H), 3.19-3.08 (m, 1H), 2.89-2.65 (m, 6H), 2.30 (br d, J=12.1 Hz, 2H), 2.23-2.09 (m, 5H), 1.79-1.62 (m, 2H), 1.57-1.39 (m, 2H).

Example 7: Synthesis of 2-chloro-N-(5-(2-(((1r,4r)-4-(dimethylamino)cyclohexyl)amino)-8-ethylquinazolin-6-yl)-6-ethylpyridin-2-yl)benzenesulfonamide (117)

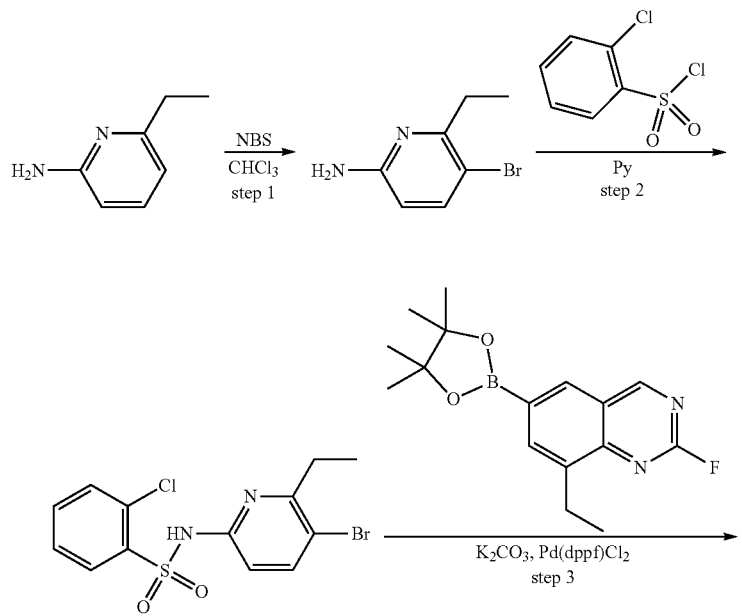

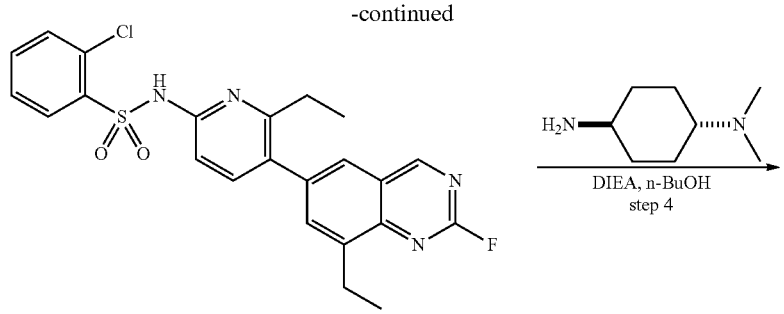

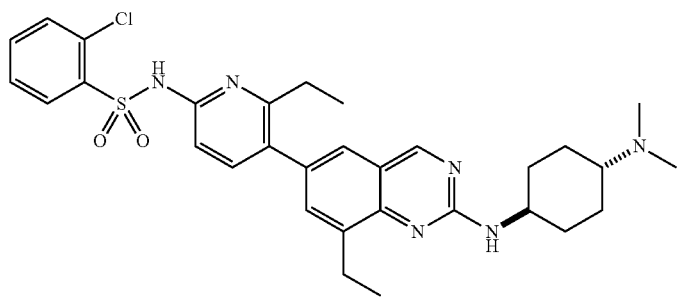 [SMILES: CCc1nc(NS(=O)(=O)c2ccccc2Cl)ccc1-c1cc(CC)c2nc(N[C@H]3CC[C@H](N(C)C)CC3)ncc2c1]

Step 1

To a solution of 6-ethylpyridin-2-amine (1.8 g, 15.1 mmol) in CHCl$_3$ (50.0 mL) was added NBS (2.7 g, 15.1 mmol) at 0° C. The mixture was stirred at 25° C. for 0.5 h. The reaction mixture was concentrated under reduced pressure. The residue was purified by column chromatography (SiO$_2$) to give 5-bromo-6-ethylpyridin-2-amine (3 g, 14.7 mmol, 97.5% yield). M+H$^+$=201.0 (LCMS); $^1$H NMR (400 MHz, DMSO-d6) δ 7.43 (d, J=8.6 Hz, 1H), 6.22 (d, J=8.6 Hz, 1H), 6.03 (s, 2H), 2.62 (q, J=7.6 Hz, 2H), 1.15-1.08 (m, 3H).

Step 2

To a solution of 5-bromo-6-ethylpyridin-2-amine (1.0 g, 5.0 mmol) in pyridine (20.0 mL) was added 2-chlorobenzene-1-sulfonyl chloride (1.3 g, 5.9 mmol, 812.7 uL). The mixture was stirred at 45° C. for 12 h. The reaction mixture was concentrated under reduced pressure. The residue was purified by column chromatography (SiO$_2$) to give N-(5-bromo-6-ethylpyridin-2-yl)-2-chlorobenzenesulfonamide (1.0 g, 2.3 mmol, 47.5% yield). M+H$^+$=375.0 (LCMS).

Step 3

A mixture of N-(5-bromo-6-ethylpyridin-2-yl)-2-chlorobenzenesulfonamide (149 mg, 397.1 umol), 8-ethyl-2-fluoro-6-(4,4,5,5-tetramethyl-1,3,2-dioxaborolan-2-yl)quinazoline (100 mg, 330.9 umol), K$_2$CO$_3$ (137.2 mg, 992.9 umol), Pd(dppf)Cl$_2$ (24 mg, 33.1 umol) in dioxane (4.0 mL) and H$_2$O (0.4 mL) was degassed and purged with N$_2$ for 3 times, and then the mixture was stirred at 90° C. for 12 h under N$_2$ atmosphere. The reaction mixture was concentrated under reduced pressure. The residue was purified by column chromatography (SiO$_2$) to afford 2-chloro-N-(6-ethyl-5-(8-ethyl-2-fluoroquinazolin-6-yl)pyridin-2-yl)benzenesulfonamide (110 mg, 217.2 umol, 65.6% yield). M+H$^+$= 471.2 (LCMS).

Step 4

To a solution of 2-chloro-N-(6-ethyl-5-(8-ethyl-2-fluoroquinazolin-6-yl)pyridin-2-yl)benzenesulfonamide (110 mg, 233.6 umol) in n-BuOH (4.0 mL) was added DIEA (242 mg, 1.9 mmol, 325.5 uL) and (1r,4r)-N1,N1-dimethylcyclohexane-1,4-diamine (133 mg, 934.3 umol, HCl). The mixture was stirred at 100° C. for 12 h. The reaction mixture was concentrated under reduced pressure. The residue was purified by prep-HPLC (FA condition) to afford 2-chloro-N-(5-(2-(((1r,4r)-4-(dimethylamino)cyclohexyl)amino)-8-ethylquinazolin-6-yl)-6-ethylpyridin-2-yl)benzenesulfonamide (27.1 mg, 42.2 umol, 18.1% yield, FA). M+H$^+$=593.2 (LCMS); $^1$H NMR (400 MHz, METHANOL-d$_4$) δ 9.01 (s, 11H), 8.42 (br s, 1H), 8.26 (d, J=7.6 Hz, 1H), 7.63 (d, J=8.8 Hz, 1H), 7.56 (d, J=3.9 Hz, 2H), 7.54-7.46 (m, 3H), 7.12 (d, J=8.8 Hz, 1H), 4.06-3.95 (m, 1H), 3.31-3.25 (m, 1H), 3.09 (q, J=7.3 Hz, 2H), 2.91 (s, 6H), 2.66 (q, J=7.5 Hz, 2H), 2.41 (br d, J=11.6 Hz, 2H), 2.21 (br d, J=11.5 Hz, 2H), 1.84-1.67 (m, 2H), 1.60-1.44 (m, 2H), 1.33 (t, J=7.5 Hz, 3H), 1.11 (t, J=7.5 Hz, 3H).

Example 8: Synthesis of N-(5-(8-ethyl-2-(((1r,4r)-4-(methylamino)cyclohexyl)amino)quinazolin-6-yl)-6-methoxypyridin-2-yl)-2-methylbenzenesulfonamide (118)

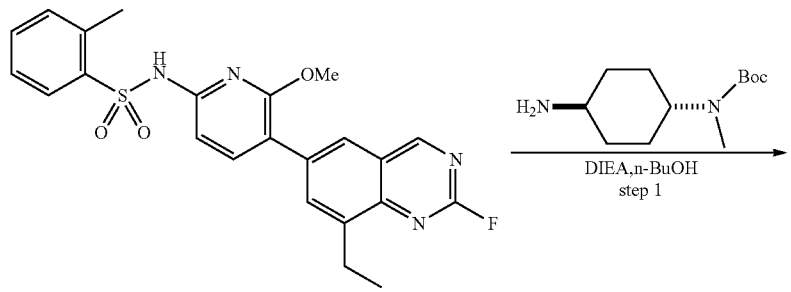

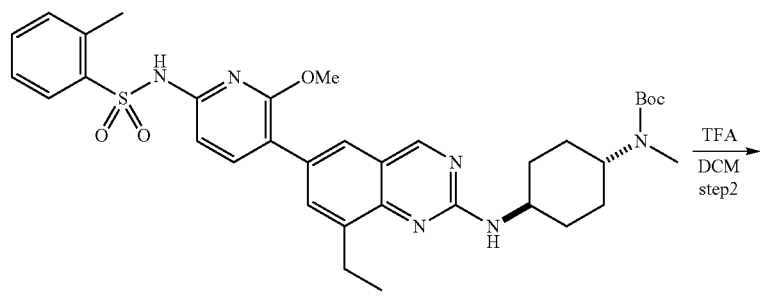

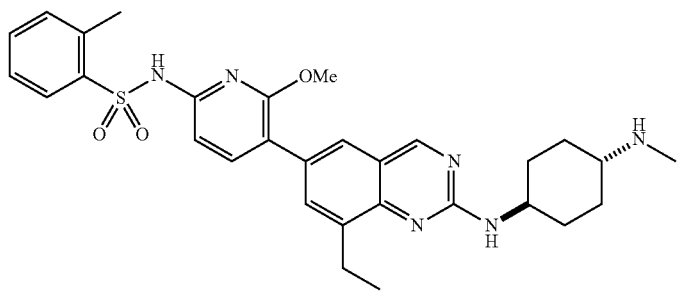 [SMILES: CCc1cc(-c2ccc(NS(=O)(=O)c3ccccc3C)nc2OC)cc2cnc(N[C@H]3CC[C@H](N(C)C)CC3)nc12]

Step 1

To a solution of N-(5-(8-ethyl-2-fluoroquinazolin-6-yl)-6-methoxypyridin-2-yl)-2-methylbenzenesulfonamide (0.4 g, 883.9 umol) in n-BuOH (5.0 mL) was added DIEA (799 mg, 6.1 mmol, 1.0 mL) and (1r,4r)-N1,N1-dimethylcyclohexane-1,4-diamine (403 mg, 1.7 mmol). The mixture was stirred at 100° C. for 12 h. The reaction mixture was concentrated under reduced pressure. The residue was purified by column chromatography (SiO$_2$) to afford tert-butyl ((1r,4r)-4-((8-ethyl-6-(2-methoxy-6-(2-methylphenylsulfonamido)pyridin-3-yl)quinazolin-2-yl)amino)cyclohexyl)(methyl)carbamate (260 mg, 330.5 umol, 37.3% yield). M+H$^+$=661.3 (LCMS).

Step 2

To a solution of tert-butyl ((1r,4r)-4-((8-ethyl-6-(2-methoxy-6-(2-methylphenylsulfonamido)pyridin-3-yl)quinazolin-2-yl)amino)cyclohexyl)(methyl)carbamate (260 mg, 393.4 umol) in DCM (5.0 mL) was added TFA (2.0 mL). The mixture was stirred at 25° C. for 10 min. The reaction mixture was concentrated under reduced pressure. The residue was added dichloromethane (2.0 mL) and NH$_3$·H$_2$O (25% solution) to pH 7, concentrated under reduced pressure again. The residue was purified by prep-HPLC (FA condition) to afford N-(5-(8-ethyl-2-(((1r,4r)-4-(methylamino)cyclohexyl)amino)quinazolin-6-yl)-6-methoxypyridin-2-yl)-2-methylbenzenesulfonamide (116.8 mg, 185.5 umol, 47.1% yield, FA). M+H$^+$=561.2 (LCMS); $^1$H NMR (400 MHz, METHANOL-d$_4$) δ 8.93 (s, 1H), 8.49 (br s, 1H), 8.15 (d, J=7.7 Hz, 1H), 7.62 (dd, J=9.0, 11.7 Hz, 3H), 7.52-7.45 (m, 1H), 7.39-7.32 (m, 2H), 6.64 (d, J=7.9 Hz, 1H), 4.01-3.88 (m, 1H), 3.70 (s, 3H), 3.15-2.96 (m, 3H), 2.71 (d, J=10.6 Hz, 6H), 2.33 (br d, J=11.9 Hz, 2H), 2.23 (br d, J=12.1 Hz, 2H), 1.66-1.38 (m, 4H), 1.29 (t, J=7.4 Hz, 3H).

Example 9: Synthesis N-(5-(2-(((1r,4r)-4-(dimethylamino)cyclohexyl)amino)-8-ethylquinazolin-6-yl)-6-methoxypyridin-2-yl)-2-methylbenzenesulfonamide (119)

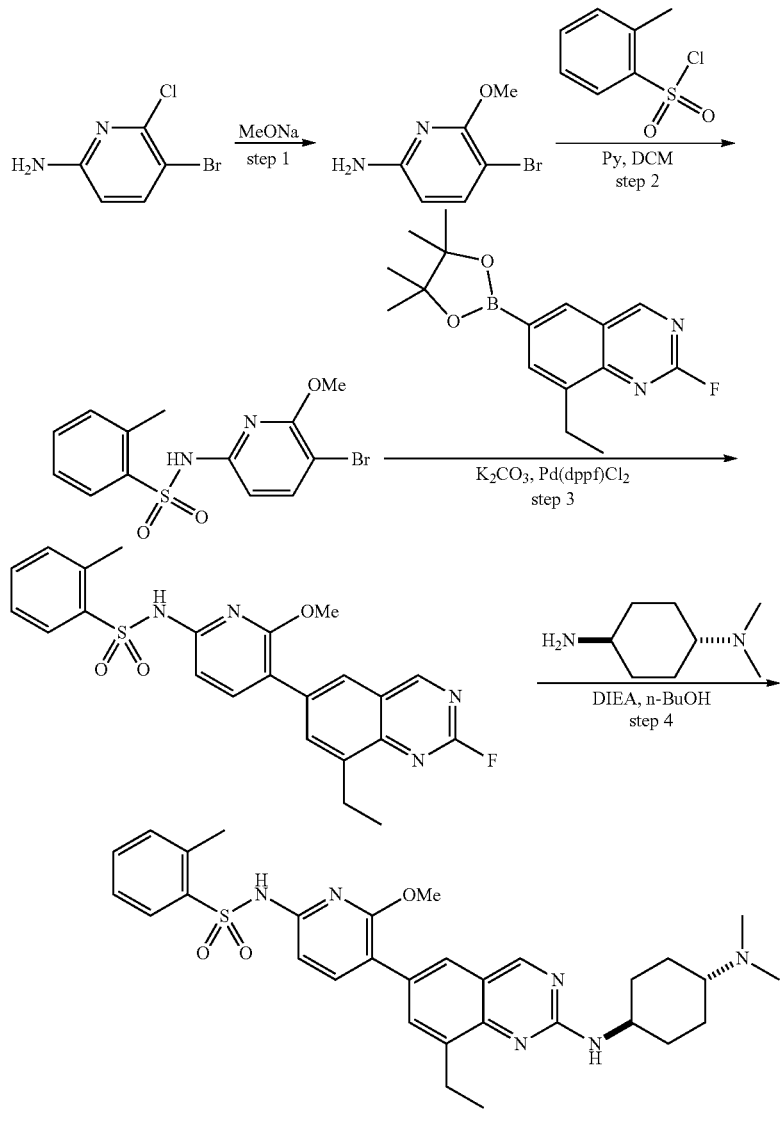

Step 1

To a solution of 5-bromo-6-chloro-pyridin-2-amine (500 mg, 2.4 mmol) in NaOMe (7.0 mL, 30% solution) was stirred at 70° C. for 12 h. The residue was added water (25.0 mL) and extracted with ethyl acetate (30.0 ml×3). The combined organic phase was washed with brine (15.0 mL×2), dried with anhydrous $Na_2SO_4$, filtered and concentrated in vacuum to afford 5-bromo-6-methoxypyridin-2-amine (480 mg, crude).

Step 2

To a solution of 5-bromo-6-methoxypyridin-2-amine (1.0 g, 4.9 mmol) in DCM (20.0 mL) was added 2-methylbenzenesulfonyl chloride (1.1 g, 5.9 mmol, 853.6 uL) and pyridine (1.2 g, 14.8 mmol, 1.2 mL). The mixture was stirred at 45° C. for 12 h. The reaction mixture was concentrated under reduced pressure. The residue was purified by column chromatography ($SiO_2$, Petroleum ether/Ethyl acetate=100/1 to 50/1) to afford N-(5-bromo-6-methoxypyridin-2-yl)-2-methylbenzenesulfonamide (1.0 g, 2.5 mmol, 52.2% yield). $M+H^+=357.0$ (LCMS).

Step 3

A mixture of 8-ethyl-2-fluoro-6-(4,4,5,5-tetramethyl-1,3,2-dioxaborolan-2-yl)quinazoline (0.5 g, 1.6 mmol), N-(5-bromo-6-methoxypyridin-2-yl)-2-methylbenzenesulfonamide (591 mg, 1.6 mmol), $K_2CO_3$ (686 mg, 4.9 mmol), Pd(dppf)$Cl_2$ (121 mg, 165.4 umol) in $H_2O$ (1.0 mL) and dioxane (10.0 mL) was degassed and purged with $N_2$ for 3 times, and then the mixture was stirred at 90° C. for 12 h under N₂ atmosphere. The reaction mixture was concentrated under reduced pressure. The residue was purified by column chromatography (SiO₂, Petroleum ether/Ethyl acetate=10/1 to 0/1) to afford N-(5-(8-ethyl-2-fluoroquinazolin-6-yl)-6-methoxypyridin-2-yl)-2-methylbenzenesulfonamide (0.6 g, 464.0 umol, 28.0% yield). M+H⁺=452.9 (LCMS).

Step 4

To a solution of N-(5-(8-ethyl-2-fluoroquinazolin-6-yl)-6-methoxypyridin-2-yl)-2-methylbenzenesulfonamide (200 mg, 441.9 umol) in n-BuOH (5.0 mL) was added DIEA (399 mg, 3.0 mmol, 538.8 uL) and (1r,4r)-N1,N1-dimethylcyclohexane-1,4-diamine (315 mg, 1.7 mmol, HCl). The mixture was stirred at 100° C. for 12 h. The reaction mixture was concentrated under reduced pressure. The residue was purified by prep-HPLC (FA condition) to give N-(5-(2-(((1r,4r)-4-(dimethylamino)cyclohexyl)amino)-8-ethylquinazolin-6-yl)-6-methoxypyridin-2-yl)-2-methylbenzenesulfonamide (46.4 mg, 72.3 umol, 16.3% yield, FA). M+H⁺=575.3 (LCMS); ¹H NMR (400 MHz, METHANOL-d₄) δ 8.93 (s, 1H), 8.49-8.29 (m, 1H), 8.15 (d, J=7.7 Hz, 1H), 7.71-7.58 (m, 3H), 7.52-7.43 (m, 1H), 7.42-7.27 (m, 2H), 6.64 (d, J=7.9 Hz, 1H), 4.02-3.90 (m, 1H), 3.70 (s, 3H), 3.28-3.20 (m, 1H), 3.07-2.96 (m, 2H), 2.88 (s, 6H), 2.69 (s, 3H), 2.39 (br d, J=14.3 Hz, 2H), 2.18 (br d, J=11.9 Hz, 2H), 1.81-1.63 (m, 2H), 1.55-1.39 (m, 2H), 1.29 (t, J=7.5 Hz, 3H).

Example 10: Synthesis of 2-chloro-N-(5-(8-ethyl-2-(((1r,4r)-4-(methylamino)cyclohexyl)amino)quinazolin-6-yl)-6-methylpyridin-2-yl)benzenesulfonamide (122)

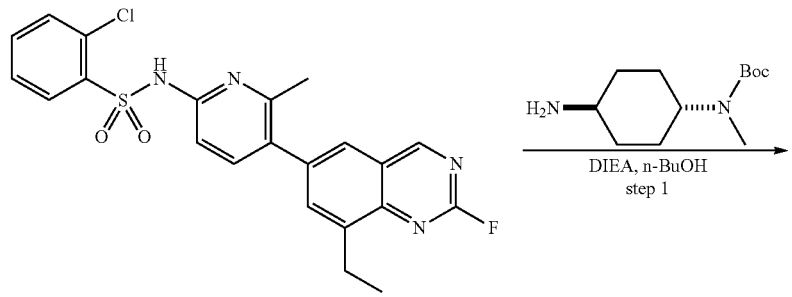

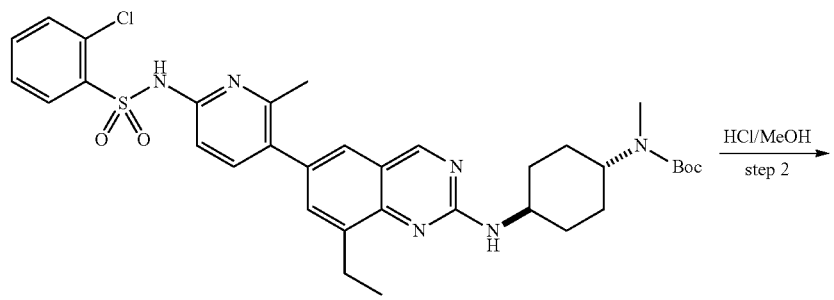

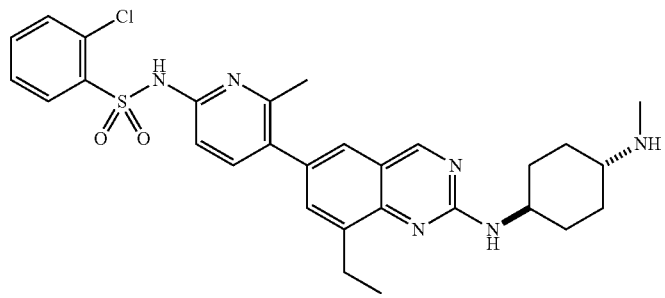 [SMILES: CCc1cc(-c2ccc(NS(=O)(=O)c3ccccc3Cl)nc2C)cc2cnc(N[C@H]3CC[C@H](NC)CC3)nc12]

Step 1

To a solution of 2-chloro-N-(5-(8-ethyl-2-fluoroquinazolin-6-yl)-6-methylpyridin-2-yl)benzenesulfonamide (0.6 g, 1.3 mmol) in n-BuOH (15.0 mL) was added DIEA (509 mg, 3.9 mmol, 686.0 uL) and tert-butyl ((1r,4r)-4-aminocyclohexyl)(methyl)carbamate (600 mg, 2.6 mmol). The mixture was stirred at 100° C. for 12 h. The reaction was concentrated to give a residue. The residue was purified by flash silica gel chromatography (SiO$_2$) to afford tert-butyl ((1r,4r)-4-((6-(6-(2-chlorophenylsulfonamido)-2-methylpyridin-3-yl)-8-ethylquinazolin-2-yl)amino)cyclohexyl)(methyl)carbamate (700 mg, 1.1 mmol, 80.1% yield).

Step 2

The mixture of tert-butyl ((1r,4r)-4-((6-(6-(2-chlorophenylsulfonamido)-2-methylpyridin-3-yl)-8-ethylquinazolin-2-yl)amino)cyclohexyl)(methyl)carbamate (700 mg, 1.1 mmol) in HCl/MeOH (4M, 15.0 mL) was stirred at 20° C. for 0.5 h. The reaction was concentrated to give a residue. The residue (30 mg) was dissolved in MeOH (2.0 mL), basified pH to 7 with NH$_3$·H$_2$O (25% solution) and then was purified by prep-HPLC (FA condition) to afford 2-chloro-N-(5-(8-ethyl-2-(((1r,4r)-4-(methylamino)cyclohexyl)amino)quinazolin-6-yl)-6-methylpyridin-2-yl)benzenesulfonamide (19 mg, 31.2 umol, FA). M+H$^+$=565.2 (LCMS); $^1$H NMR (400 MHz, METHANOL-d$_4$) δ 9.00 (s, 1H), 8.56 (br s, 1H), 8.28-8.20 (m, 1H), 7.68 (d, J=8.9 Hz, 1H), 7.58-7.44 (m, 5H), 7.22 (d, J=8.9 Hz, 1H), 4.06-3.93 (m, 1H), 3.17-3.00 (m, 3H), 2.74 (s, 3H), 2.39 (m, 5H), 2.26 (br d, J=12.2 Hz, 2H), 1.67-1.42 (m, 4H), 1.33 (t, J=7.5 Hz, 3H). The residue (500 mg) was dissolved in MeOH (10.0 mL), basified pH to 7 with NH$_3$·H$_2$O (25% solution) and then was purified by prep-HPLC (FA condition) to afford 2-chloro-N-(5-(8-ethyl-2-(((1r,4r)-4-(methylamino)cyclohexyl)amino)quinazolin-6-yl)-6-methylpyridin-2-yl)benzenesulfonamide (270 mg, 397.61 umol, 37.79% yield, FA).

Example 11: 2-chloro-N-(5-(8-ethyl-2-(((1r,4r)-4-(ethyl(methyl)amino)cyclohexyl)amino)quinazolin-6-yl)-6-methylpyridin-2-yl)benzenesulfonamide (125)

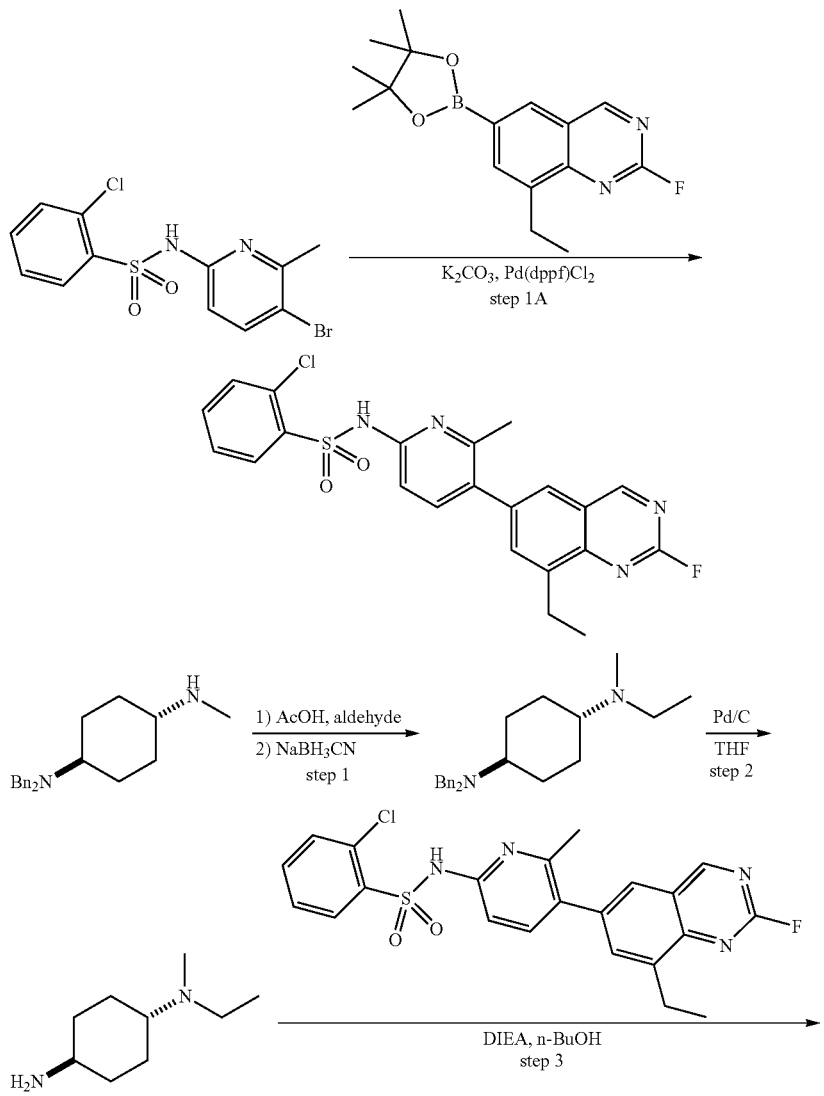

-continued

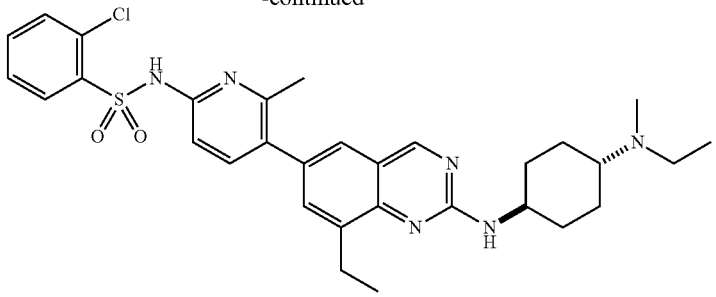

Step 1A

A mixture of 8-ethyl-2-fluoro-6-(4,4,5,5-tetramethyl-1,3,2-dioxaborolan-2-yl)quinazoline (2.0 g, 6.6 mmol), N-(5-bromo-6-methylpyridin-2-yl)-2-chlorobenzenesulfonamide (2.8 g, 7.9 mmol), K$_2$CO$_3$ (2.7 g, 19.86 mmol), Pd(dppf)Cl$_2$ (484 mg, 661.9 umol) in dioxane (45.0 mL) and H$_2$O (4.5 mL) was degassed and purged with N$_2$ for 3 times, and then the mixture was stirred at 90° C. for 12 h under N$_2$ atmosphere. The reaction mixture was concentrated under reduced pressure. The residue was purified by column chromatography (SiO$_2$) to afford 2-chloro-N-(5-(8-ethyl-2-fluoroquinazolin-6-yl)-6-methylpyridin-2-yl)benzene sulfonamide (1.2 g, 1.8 mmol, 27.7% yield). M+H$^+$=457.1 (LCMS).

Step 1

To a solution of (1r,4r)-N1,N1-dibenzyl-N4-methylcyclohexane-1,4-diamine (447 mg, 1.4 mmol, HCl) in MeOH (15.0 mL) was adjusted pH=7 by adding TEA (146 mg, 1.4 mmol, 201.7 uL) and adjusted pH=5 by adding CH$_3$COOH (87 mg, 1.4 mmol, 82.9 uL), and then added acetaldehyde (798 mg, 7.2 mmol, 1.0 mL, 40% in H$_2$O), the mixture was stirred at 30° C. for 1 h. And then added NaBH$_3$CN (455 mg, 7.2 mmol), the mixture was stirred at 30° C. for 12 h. The reaction mixture was concentrated under reduced pressure. The residue was diluted with NaHCO$_3$ (10.0 mL) and extracted with ethyl acetate (5.0 mL×3). The combined organic layers were concentrated under reduced pressure to give a residue to give crude (1r,4r)-N1,N1-dibenzyl-N4-ethyl-N4-methylcyclohexane-1,4-diamine (440 mg, crude).

Step 2

To a solution of (1r,4r)-N1,N1-dibenzyl-N4-ethyl-N4-methylcyclohexane-1,4-diamine (440 mg, 1.3 mmol) in THF (10.0 mL) was added Pd/C (0.4 g, 10% Pd basis) under N$_2$ atmosphere. The suspension was degassed and purged with H$_2$ (50 psi) for 3 times. The mixture was stirred at 60° C. for 24 h. The reaction mixture was filtrated with methanol (60.0 mL), and the filter liquor concentrated under reduced pressure to afford crude (1r,4r)-N1-ethyl-N1-methylcyclohexane-1,4-diamine (200 mg, crude).

Step 3

To a solution of (1r,4r)-N1-ethyl-N1-methylcyclohexane-1,4-diamine (51 mg, 328.2 umol) in n-BuOH (2.0 mL) was added DIEA (42 mg, 328.2 umol, 57.1 uL) and 2-chloro-N-(5-(8-ethyl-2-fluoroquinazolin-6-yl)-6-methylpyridin-2-yl)benzene sulfonamide (50 mg, 109.4 umol). The mixture was stirred at 100° C. for 12 h. The reaction mixture was concentrated under reduced pressure. The residue was purified by prep-HPLC (FA condition) to afford 2-chloro-N-(5-(8-ethyl-2-(((1r,4r)-4-(ethyl(methyl)amino)cyclohexyl)amino)quinazolin-6-yl)-6-methylpyridin-2-yl)benzenesulfonamide (16.1 mg, 25.2 umol, 23.0% yield, FA). M+H$^+$=593.2 (LCMS); $^1$H NMR (400 MHz, METHANOL-d$_4$) δ 8.98 (s, 1H), 8.54 (s, 1H), 8.26-8.18 (m, 1H), 7.66 (d, J=8.8 Hz, 1H), 7.56-7.42 (m, 5H), 7.20 (d, J=9.0 Hz, 1H), 4.04-3.90 (m, 1H), 3.34 (br d, J=2.9 Hz, 1H), 3.23 (q, J=7.2 Hz, 2H), 3.13-2.99 (m, 2H), 2.81 (s, 3H), 2.37 (s, 5H), 2.14 (br d, J=11.7 Hz, 2H), 1.83-1.69 (m, 2H), 1.58-1.38 (m, 2H), 1.33 (td, J=7.4, 17.4 Hz, 6H).

Example 12: Synthesis of 2-chloro-N-(5-(8-ethyl-2-(((1 r,4r)-4-(methyl(2,2,2-trifluoroethyl)amino)cyclohexyl)amino)quinazolin-6-yl)-6-methylpyridin-2-yl)benzenesulfonamide (126)

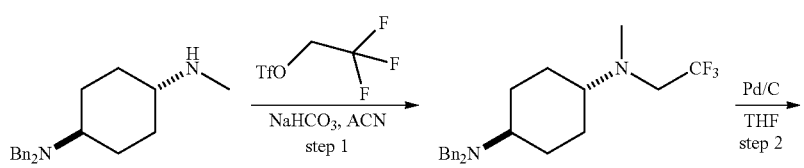

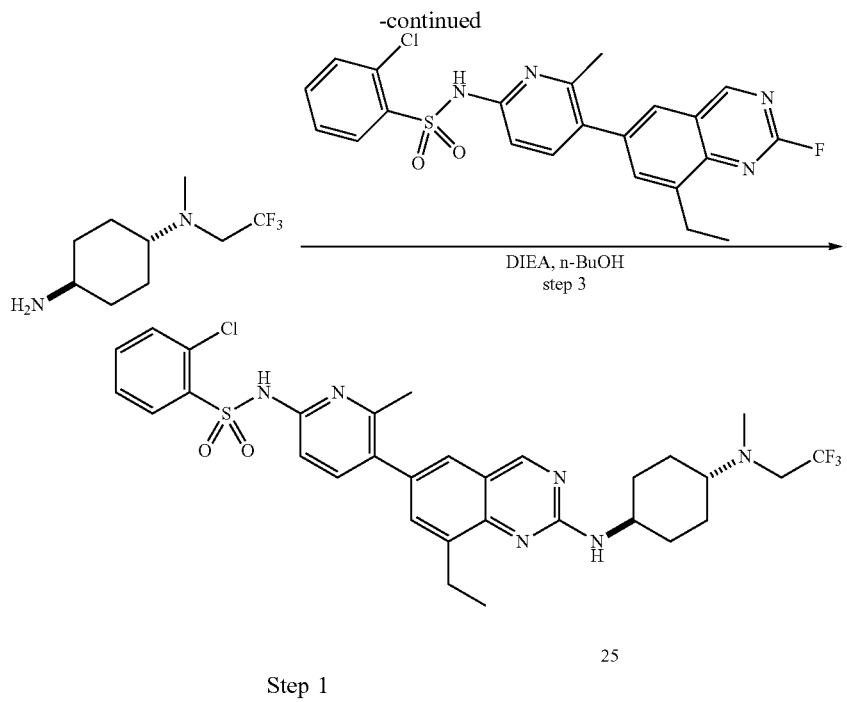

Step 1

To a solution of (1r,4r)-N1,N1-dibenzyl-N4-methylcyclohexane-1,4-diamine (0.7 g, 2.3 mmol, HCl) in MeCN (20.0 mL) was added NaHCO$_3$ (763 mg, 9.1 mmol, 353.1 uL) and 2,2,2-trifluoroethyl trifluoromethanesulfonate (790 mg, 3.4 mmol). The mixture was stirred at 70° C. for 12 h. The reaction was filtered and concentrated to give a residue. The residue was purified by column chromatography (SiO$_2$) to afford (1r,4r)-N1,N1-dibenzyl-N4-methyl-N4-(2,2,2-trifluoroethyl)cyclohexane-1,4-diamine (800 mg, 1.1 mmol, 47.0% yield). M+H$^+$=391.3 (LCMS).

Step 2

To a solution of (1r,4r)-N1,N1-dibenzyl-N4-methyl-N4-(2,2,2-trifluoroethyl)cyclohexane-1,4-diamine (0.8 g, 2.1 mmol) in THF (15.0 mL) was added Pd/C (0.8 g, 10% Pd basis) under N$_2$ atmosphere. The suspension was degassed and purged with H$_2$ for 3 times. The mixture was stirred under H$_2$ (50 Psi) at 60° C. for 24 h. The reaction was filtered and concentrated to give (1r,4r)-N1-methyl-N1-(2,2,2-trifluoroethyl)cyclohexane-1,4-diamine (350 mg, crude).

Step 3

To a solution of (1r,4r)-N1-methyl-N1-(2,2,2-trifluoroethyl)cyclohexane-1,4-diamine (69 mg, 328.3 umol) in n-BuOH (4.0 mL) was added 2-chloro-N-(5-(8-ethyl-2-fluoroquinazolin-6-yl)-6-methylpyridin-2-yl)benzenesulfonamide (50 mg, 109.4 umol) and DIEA (42 mg, 328.3 umol, 57.2 uL). The mixture was stirred at 90° C. for 12 h. The reaction was concentrated to give a residue. The residue was purified by prep-HPLC (FA condition) to afford 2-chloro-N-(5-(8-ethyl-2-(((1r,4r)-4-(methyl(2,2,2-trifluoroethyl)amino)cyclohexyl)amino)quinazolin-6-yl)-6-methylpyridin-2-yl)benzenesulfonamide (29.8 mg, 42.4 umol, 38.8% yield, FA). M+H$^+$=647.2 (LCMS); $^1$H NMR (400 MHz, METHANOL-d$_4$) δ 8.96 (s, 1H), 8.22 (d, J=7.5 Hz, 1H), 7.68 (br d, J=9.0 Hz, 1H), 7.57-7.42 (m, 5H), 7.21 (br s, 1H), 3.89 (br t, J=11.1 Hz, 1H), 3.16-3.02 (m, 4H), 2.57 (br t, J=11.0 Hz, 1H), 2.47 (s, 3H), 2.37 (s, 3H), 2.25 (br d, J=11.9 Hz, 2H), 1.92 (br d, J=11.9 Hz, 2H), 1.52-1.35 (m, 4H), 1.31 (t, J=7.5 Hz, 3H).

Example 13: Synthesis of 2-chloro-N-(5-(8-ethyl-2-(((1r,4r)-4-(methylamino)cyclohexyl)amino)quinazolin-6-yl)-3-fluoro-6-methoxypyridin-2-yl)benzenesulfonamide (127)

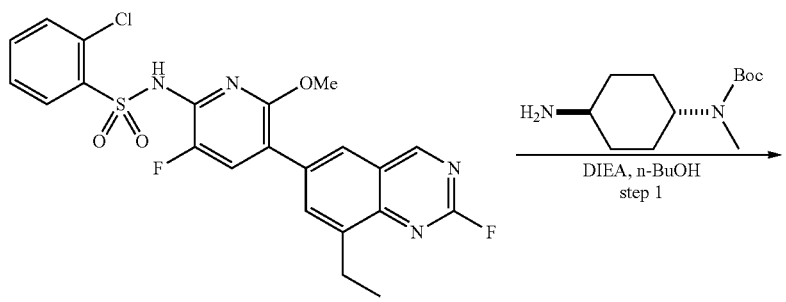

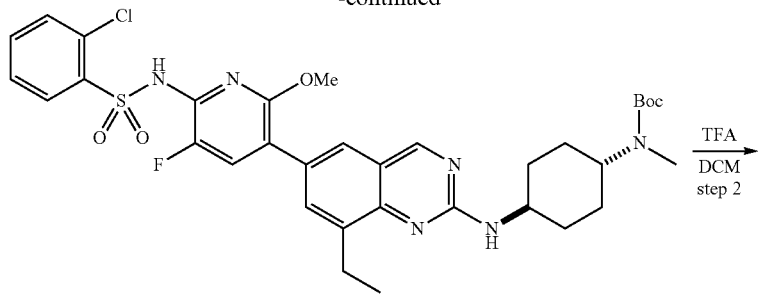

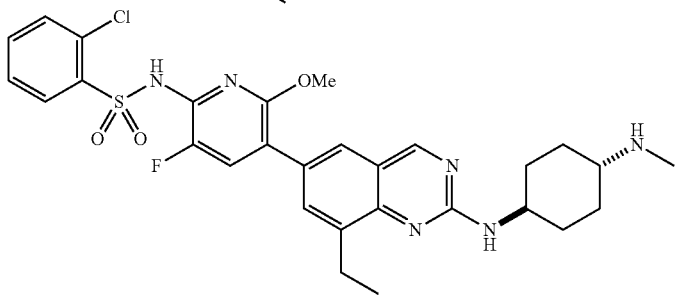

Step 1

To a solution of 2-chloro-N-(5-(8-ethyl-2-fluoroquinazolin-6-yl)-3-fluoro-6-methoxypyridin-2-yl)benzenesulfonamide (130 mg, 264.8 umol) in n-BuOH (6.0 mL) was added tert-butyl ((1r,4r)-4-aminocyclohexyl)(methyl)carbamate (181 mg, 794.4 umol) and DIEA (103 mg, 794.4 umol, 138.4 uL). The mixture was stirred at 90° C. for 12 h. The reaction was concentrated to give a residue. The residue was purified by column chromatography (SiO$_2$) to afford tert-butyl ((1r,4r)-4-((6-(6-(2-chlorophenylsulfonamido)-5-fluoro-2-methoxypyridin-3-yl)-8-ethylquinazolin-2-yl)amino)cyclohexyl)(methyl)carbamate (170 mg, 243.12 umol, 91.81% yield).

Step 2

To a solution of tert-butyl ((1r,4r)-4-((6-(6-(2-chlorophenylsulfonamido)-5-fluoro-2-methoxypyridin-3-yl)-8-ethylquinazolin-2-yl)amino)cyclohexyl)(methyl)carbamate (170 mg, 243.1 umol) in DCM (3.0 mL) was added TFA (1.5 mL). The mixture was stirred at 20° C. for 0.5 h. The reaction was concentrated to give a residue. The residue was dissolved in MeOH (2.0 mL) and basified pH to 7 with NH$_3$·H$_2$O (25% solution). The residue was purified by prep-HPLC (FA condition) to afford 2-chloro-N-(5-(8-ethyl-2-(((1r,4r)-4-(methylamino)cyclohexyl)amino)quinazolin-6-yl)-3-fluoro-6-methoxypyridin-2-yl)benzenesulfonamide (26.8 mg, 40.3 umol, 16.6% yield, FA). M+H$^+$=599.2 (LCMS); 1H NMR (400 MHz, DMSO-d$_6$) δ 8.99 (br s, 1H), 8.19-8.07 (m, 2H), 7.64 (s, 2H), 7.39-7.31 (m, 4H), 7.26 (br s, 1H), 3.77 (br s, 1H), 3.20 (s, 3H), 3.03-2.86 (m, 3H), 2.57 (s, 3H), 2.09 (br d, J=11.0 Hz, 4H), 1.47-1.27 (m, 4H), 1.22 (br t, J=7.4 Hz, 3H).

Example 14: Synthesis of 2-chloro-N-(5-(2-(((1r,4r)-4-(dimethylamino)cyclohexyl)amino)-8-ethylquinazolin-6-yl)-3-fluoro-6-methoxypyridin-2-yl)benzenesulfonamide (128)

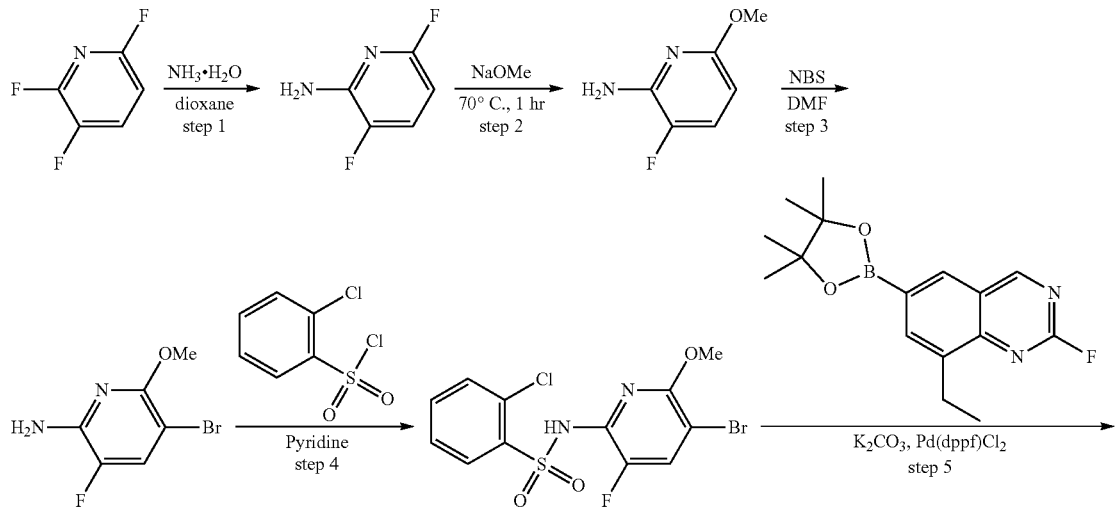

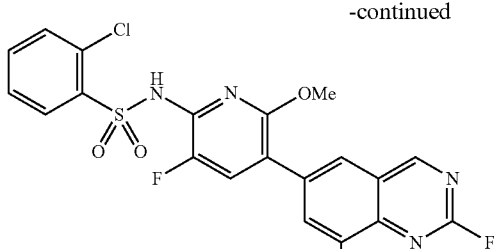
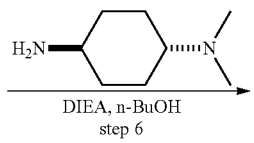

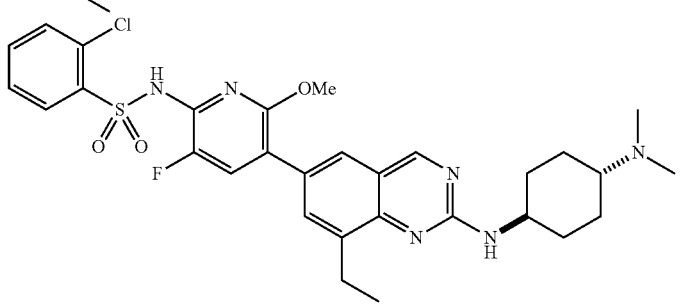

Step 1

To a solution of 2,3,6-trifluoropyridine (2.4 g, 18.0 mmol) in dioxane (12.0 mL) was added NH$_3$·H$_2$O (12.0 mL, 25% solution). The mixture was stirred at 100° C. for 12 h. The reaction was extracted with ethyl acetate (15.0 mL×3). The combined organic phase was washed with brine (15.0 mL×3), dried over anhydrous Na$_2$SO$_4$, filtered and concentrated to give 3,6-difluoropyridin-2-amine (2.0 g, 15.4 mmol, 85.2% yield).

Step 2

The mixture of 3,6-difluoropyridin-2-amine (2.0 g, 15.4 mmol) in NaOMe (30.0 mL, 30% solution) was stirred at 70° C. for 1 h. Water (30.0 mL) was added to the reaction mixture and extracted with ethyl acetate (30 mL×3). The combined organic phase was washed with brine (30 mL×3), dried over anhydrous Na$_2$SO$_4$, filtered and concentrated to give a residue. The residue was purified by prep-HPLC (neutral condition) to give 3-fluoro-6-methoxypyridin-2-amine (0.8 g, 5.1 mmol, 33% yield). $^1$H NMR (400 MHz, CHLOROFORM-d) δ 7.17 (dd, J=8.7, 9.6 Hz, 1H), 6.01 (dd, J=2.1, 8.4 Hz, 1H), 4.42 (br s, 2H), 3.82 (s, 3H).

Step 3

To a solution of 3-fluoro-6-methoxypyridin-2-amine (300 mg, 2.1 mmol) in DMF (12.0 mL) was added NBS (376 mg, 2.1 mmol) at 0° C. The mixture was stirred at 0° C. for 2 h. Cold H$_2$O (10.0 mL) was added to the reaction mixture and extracted with ethyl acetate (10.0 mL×3). The combined organic phase was washed with brine (10.0 mL×3), dried over anhydrous Na$_2$SO$_4$, filtered and concentrated to give residue. The residue was purified by column chromatography (SiO$_2$) to afford 5-bromo-3-fluoro-6-methoxypyridin-2-amine (420 mg, 1.7 mmol, 81.0% yield). $^1$H NMR (400 MHz, CHLOROFORM-d) δ 7.41 (d, J=9.0 Hz, 1H), 4.45 (br s, 2H), 3.90 (s, 3H).

Step 4

To a solution of 5-bromo-3-fluoro-6-methoxypyridin-2-amine (400 mg, 1.8 mmol) in pyridine (10.0 mL) was added 2-chlorobenzenesulfonyl chloride (420 mg, 2.0 mmol, 271.1 uL). The mixture was stirred at 45° C. for 12 h. The reaction was concentrated to give a residue. The residue was purified by column chromatography (SiO$_2$) to give N-(5-bromo-3-fluoro-6-methoxypyridin-2-yl)-2-chlorobenzenesulfonamide (680 mg). M+H$^+$=396.9 (LCMS).

Step 5

A mixture of 8-ethyl-2-fluoro-6-(4,4,5,5-tetramethyl-1,3,2-dioxaborolan-2-yl)quinazoline (300 mg, 992.9 umol), N-(5-bromo-3-fluoro-6-methoxypyridin-2-yl)-2-chlorobenzenesulfonamide (471 mg, 1.2 mmol), K$_2$CO$_3$ (206 mg, 1.5 mmol) and Pd(dppf)Cl$_2$ (73 mg, 99.3 umol) in dioxane (15.0 mL) and H$_2$O (1.5 mL) was degassed and purged with N$_2$ for 3 times, and then the mixture was stirred at 90° C. for 12 h under N$_2$ atmosphere. The reaction was concentrated to give a residue. The residue was purified by flash silica gel chromatography (SiO$_2$) to afford 2-chloro-N-(5-(8-ethyl-2-fluoroquinazolin-6-yl)-3-fluoro-6-methoxypyridin-2-yl)benzenesulfonamide (230 mg, 364.2 umol, 36.7% yield). M+H$^+$=491.2 (LCMS).

Step 6

To a solution of 2-chloro-N-(5-(8-ethyl-2-fluoroquinazolin-6-yl)-3-fluoro-6-methoxypyridin-2-yl)benzenesulfonamide (100 mg, 203.7 umol) in n-BuOH (4.0 mL) was added (1r,4r)-N1,N1-dimethylcyclohexane-1,4-diamine (109 mg, 611.1 umol, HCl) and DIEA (210.6 mg, 1.6 mmol, 283.9 uL). The mixture was stirred at 90° C. for 12 h. The reaction was concentrated to give a residue. The residue was purified by prep-HPLC (FA condition) to afford 2-chloro-N-(5-(2-(((1r,4r)-4-(dimethylamino)cyclohexyl)amino)-8-ethylquinazolin-6-yl)-3-fluoro-6-methoxypyridin-2-yl)benzenesulfonamide (37.2 mg, 54.6 umol, 26.8% yield, FA). M+H$^+$=613.2 (LCMS); $^1$H NMR (400 MHz, METHANOL-d$_4$) δ 8.93 (br s, 1H), 8.32 (br d, J=7.5 Hz, 3H), 7.71-7.43 (m, 6H), 3.95 (br s, 1H), 3.47 (s, 3H), 3.27-3.19 (m, 1H), 3.01 (br d, J=7.1 Hz, 2H), 2.88 (br s, 6H), 2.37 (br d, J=9.8 Hz, 2H), 2.18 (br d, J=8.7 Hz, 2H), 1.72 (br d, J=10.5 Hz, 2H), 1.47 (br d, J=12.3 Hz, 2H), 1.28 (br t, J=7.0 Hz, 3H), 1.20 (s, 1H).

Example 15: Synthesis of 2-chloro-N-(5-(2-(((1r,4r)-4-((cyclobutylmethyl)(methyl)amino)cyclohexyl)amino)-8-ethylquinazolin-6-yl)-6-methylpyridin-2-yl)benzenesulfonamide (130)

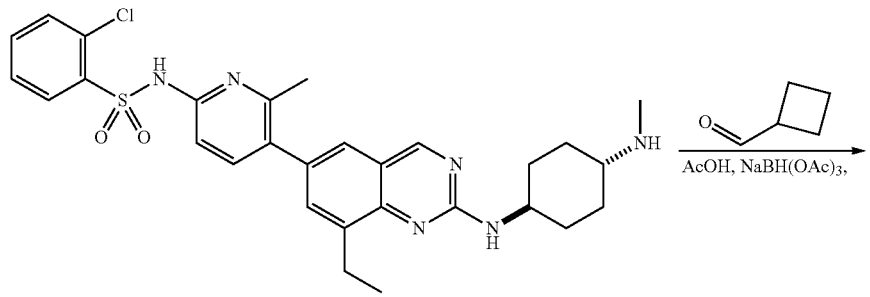

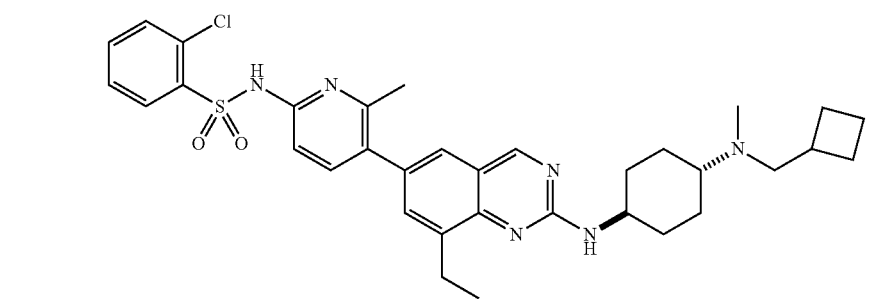 [SMILES: CCc1cc(-c2ccc(NS(=O)(=O)c3ccccc3Cl)nc2C)cc2cnc(N[C@H]3CC[C@H](N(C)CC4CCC4)CC3)nc12]

To a solution of 2-chloro-N-(5-(8-ethyl-2-(((1r,4r)-4-(methylamino)cyclohexyl)amino)quinazolin-6-yl)-6-methylpyridin-2-yl)benzenesulfonamide (60 mg, 98.2 umol, FA) in DCE (2.0 mL) and DCM (2.0 mL) was added TEA to basify pH to 7 and then cyclobutanecarbaldehyde (33 mg, 294.5 umol, 128.6 uL) was added. AcOH (0.05 mL) was added to above mixture to adjusted pH to 5 and the mixture was stirred at 30° C. for 2 h. NaBH(OAc)₃ (104 mg, 490.9 umol) was added to the mixture and the reaction was stirred at 30° C. for 12 h. The reaction was concentrated to give a residue. The residue was purified by prep-HPLC (FA condition) to afford 2-chloro-N-(5-(2-(((1r,4r)-4-((cyclobutylmethyl)(methyl)amino)cyclohexyl)amino)-8-ethylquinazolin-6-yl)-6-methylpyridin-2-yl)benzenesulfonamide (34.8 mg, 51.2 umol, 52.1% yield, FA). M+H⁺=633.2 (LCMS); ¹H NMR (400 MHz, METHANOL-d₄) δ 8.98 (s, 1H), 8.50 (br s, 1H), 8.22 (d, J=7.7 Hz, 1H), 7.66 (d, J=8.8 Hz, 1H), 7.56-7.41 (m, 5H), 7.20 (br d, J=8.6 Hz, 1H), 3.98 (br t, J=11.4 Hz, 11H), 3.23 (br d, J=7.1 Hz, 3H), 3.06 (q, J=7.4 Hz, 2H), 2.79 (m, 411), 2.43-2.32 (m, 5H), 2.26-2.09 (m, 4H), 2.08-1.97 (m, 1H), 1.96-1.84 (m, 311), 1.77 (q, J=12.4 Hz, 2H), 1.55-1.42 (m, 2H), 1.31 (t, J=7.4 Hz, 3H).

Example 16: Synthesis of 2-chloro-N-(5-(8-(1,1-difluoroethyl)-2-(((1r,4r)-4-(dimethylamino)cyclohexyl)amino)quinazolin-6-yl)-6-methylpyridin-2-yl)benzenesulfonamide (131)

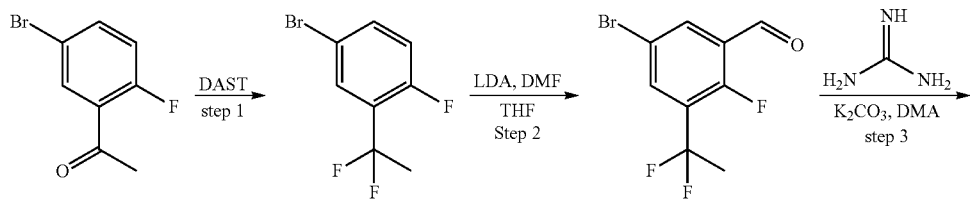

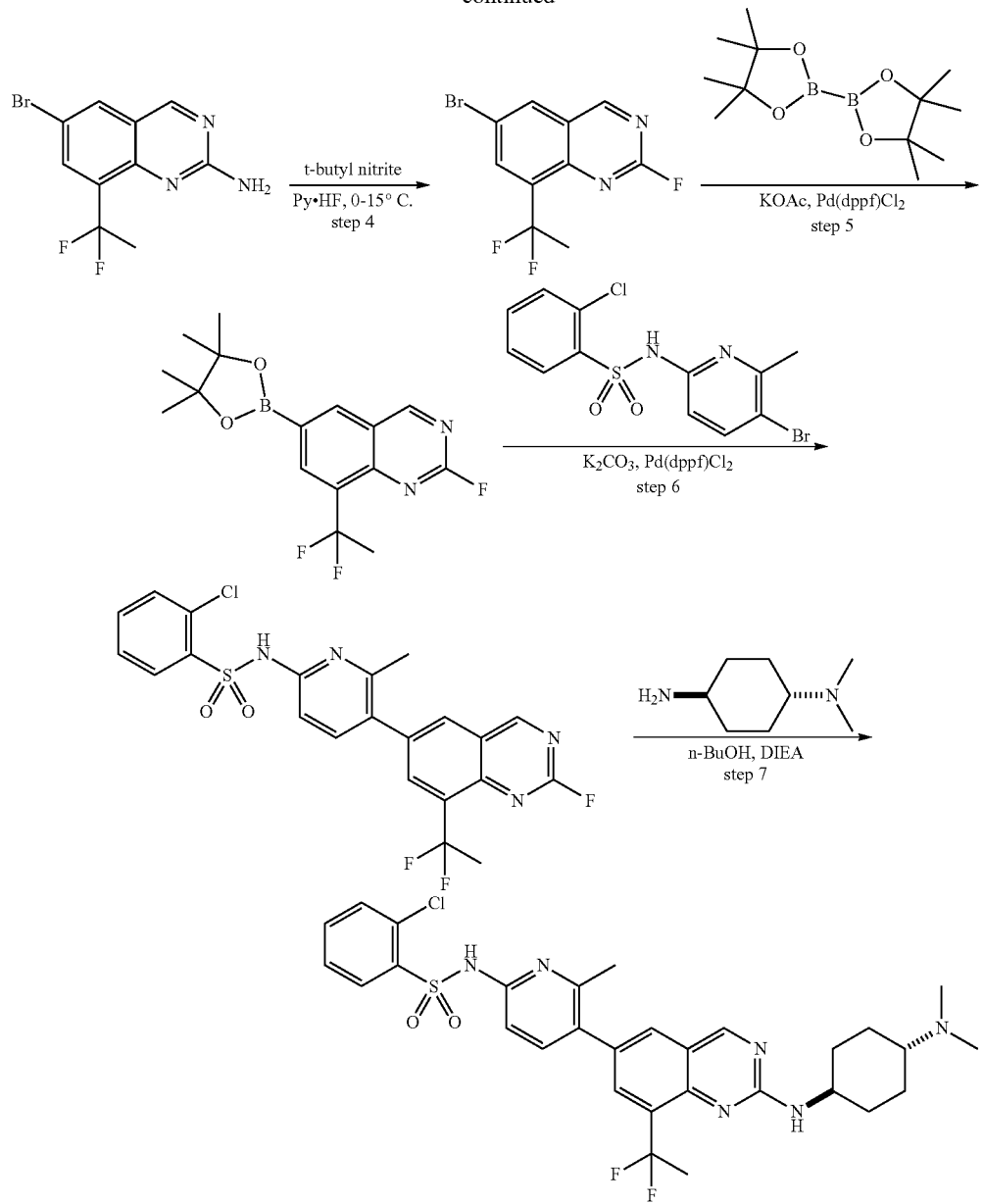

Step 1

To a solution of 1-(5-bromo-2-fluoro-phenyl)ethanone (1.0 g, 4.6 mmol) in DAST (12.2 g, 75.6 mmol, 10.0 mL) was stirred at 45° C. for 12 h. The mixture was poured into ice Sat. NaHCO₃ (100.0 mL) and extracted with ethyl acetate (10.0 mL×3). The combined organic layers were washed with brine (10.0 mL×3), dried over Na₂SO₄, filtered and concentrated under reduced pressure to give a residue. The residue was purified by column chromatography (SiO₂) to afford 4-bromo-2-(1,1-difluoroethyl)-1-fluorobenzene (1.0 g, 4.1 mmol, 90.8% yield). ¹H NMR (CHLOROFORM-d, 400 MHz): δ 7.68 (dd, J=2.4, 6.6 Hz, 1H), 7.57-7.50 (m, 1H), 7.07-6.98 (m, 1H), 1.99 (dt, J=1.1, 18.5 Hz, 3H).

Step 2

To a solution of 4-bromo-2-(1,1-difluoroethyl)-1-fluorobenzene (450 mg, 1.8 mmol) in THF (10.0 mL) was added LDA (2 M, 1.2 mL) at −78° C. The mixture was stirred at −78° C. for 1 h. Then DMF (165 mg, 2.2 mmol, 173.8 uL) was added and stirred for 1 h at −78° C. The mixture was poured into Sat NH₄Cl (10.0 mL) and extracted with ethyl acetate (10.0 mL×3). The combined organic layers were washed with brine (10.0 mL×3), dried over Na₂SO₄, filtered and concentrated under reduced pressure to give a residue. The residue was purified by column chromatography (SiO₂) to afford 5-bromo-3-(1,1-difluoroethyl)-2-fluorobenzaldehyde (0.4 g, 1.5 mmol, 79.5% yield). ¹H NMR (CHLOROFORM-d, 400 MHz): δ 10.33 (s, 1H), 8.07 (dd, J=2.4, 5.5 Hz, 1H), 7.92 (dd, J=2.4, 6.4 Hz, 1H), 2.05 (t, J=18.6 Hz, 3H).

Step 3

To a solution of guanidine (181 mg, 1.5 mmol, $H_2CO_3$) and $K_2CO_3$ (621 mg, 4.4 mmol, 4.8 mL) in DMA (10.0 mL) was added a solution of 5-bromo-3-(1,1-difluoroethyl)-2-fluorobenzaldehyde (0.4 g, 1.5 mmol) in DMA (1.5 mL). Then the mixture was stirred at 160° C. for 1 h. The mixture was concentrated to get crude residue add $H_2O$ (30.0 mL) and extracted with Ethyl acetate (30.0 mL×3). The combined organic layers were washed with brine (20.0 mL×3), dried over $Na_2SO_4$, filtered and concentrated under reduced pressure to give a residue. The residue was purified by column chromatography ($SiO_2$) to afford 6-bromo-8-(1,1-difluoroethyl)quinazolin-2-amine (0.4 g, 1.39 mmol, 92.69% yield).

Step 4

To a solution of 6-bromo-8-(1,1-difluoroethyl)quinazolin-2-amine (0.4 g, 1.3 mmol) in pyridine (3.5 mL) was added pyridine; hydrofluoride (7.7 g, 77.7 mmol, 7.00 mL) at −40° C. The mixture was stirred at −40° C. for 15 min. Then tert-butyl nitrite (286 mg, 2.7 mmol, 330.2 uL) was added. The mixture was stirred at 20° C. for 12 h. The mixture was poured into ice water and adjusted pH=7 with sat $NaHCO_3$ extracted with ethyl acetate (50.0 mL×3). The combined organic layers were washed with brine (20.0 mL×3), dried over $Na_2SO_4$, filtered and concentrated under reduced pressure to give a residue. The residue was purified by column chromatography ($SiO_2$) to afford 6-bromo-8-(1,1-difluoroethyl)-2-fluoroquinazoline (0.3 g, 1.0 mmol, 74.2% yield). $^1$H NMR (CHLOROFORM-d, 400 MHz): δ 9.35 (d, J=2.4 Hz, 1H), 8.31 (s, 1H), 8.25 (d, J=2.1 Hz, 1H), 2.30 (t, J=19.0 Hz, 3H).

Step 5

To a solution of 6-bromo-8-(1,1-difluoroethyl)-2-fluoroquinazoline (0.3 g, 1.03 mmol) and KOAc (151 mg, 1.5 mmol) in dioxane (6.0 mL) were added 4,4,4',4',5,5,5',5'-octamethyl-2,2'-bi(1,3,2-dioxaborolane) (314 mg, 1.2 mmol) and Pd(dppf)Cl$_2$ (75 mg, 103.0 umol). The mixture was stirred at 90° C. for 12 h under $N_2$. The mixture was concentrated to get crude residue. The residue was purified by column chromatography ($SiO_2$) to afford 8-(1,1-difluoroethyl)-2-fluoro-6-(4,4,5,5-tetramethyl-1,3,2-dioxaborolan-2-yl)quinazoline (0.3 g, crude).

Step 6

To a solution of 8-(1,1-difluoroethyl)-2-fluoro-6-(4,4,5,5-tetramethyl-1,3,2-dioxaborolan-2-yl)quinazoline (150 mg, 443.6 umol) and $K_2CO_3$ (183 mg, 1.3 mmol) in dioxane (2.0 mL) and $H_2O$ (0.2 mL) were added N-(5-bromo-6-methylpyridin-2-yl)-2-chlorobenzenesulfonamide (192 mg, 532.3 umol) and Pd(dppf)Cl$_2$ (32 mg, 44.3 umol). The mixture was stirred at 90° C. for 12 h under $N_2$. The mixture was concentrated to get crude residue. The residue was purified by column chromatography ($SiO_2$) to afford 2-chloro-N-(5-(8-(1,1-difluoroethyl)-2-fluoroquinazolin-6-yl)-6-methylpyridin-2-yl)benzenesulfonamide (90 mg, crude).

Step 7

To a solution of 2-chloro-N-(5-(8-(1,1-difluoroethyl)-2-fluoroquinazolin-6-yl)-6-methylpyridin-2-yl)benzenesulfonamide (90 mg, 182.5 umol) in n-BuOH (2.0 mL) was added (1r,4r)-N1,N1-dimethylcyclohexane-1,4-diamine (103 mg, 730.3 umol, HCl) and DIEA (188 mg, 1.4 mmol, 254.4 uL). The mixture was stirred at 100° C. for 12 h. The mixture was concentrated to get crude residue. The residue was purified by prep-HPLC (FA condition) to afford 2-chloro-N-(5-(8-(1,1-difluoroethyl)-2-(((1r,4r)-4-(dimethylamino)cyclohexyl)amino)quinazolin-6-yl)-6-methylpyridin-2-yl)benzenesulfonamide (6.8 mg, 10.4 umol, 5.7% yield, FA). M+H$^+$= 615.2 (LCMS); $^1$H NMR (DMSO-d$_6$, 400 MHz) δ 9.13 (s, 1H), 8.24 (s, 1H), 8.17-8.08 (m, 1H), 7.87 (s, 1H), 7.79 (s, 1H), 7.74-7.62 (m, 2H), 7.59-7.45 (m, 3H), 7.06 (br d, J=9.0 Hz, 1H), 3.69 (br s, 1H), 2.38-2.22 (m, 13H), 2.17-2.05 (m, 2H), 1.91 (br s, 2H), 1.33 (br d, J=6.4 Hz, 4H).

Example 17: Synthesis of 2-chloro-N-(5-(8-(1,1-difluoroethyl)-2-(((1r,4r)-4-(dimethylamino)cyclohexyl)amino)quinazolin-6-yl)-6-methoxypyridin-2-yl)benzenesulfonamide (124)

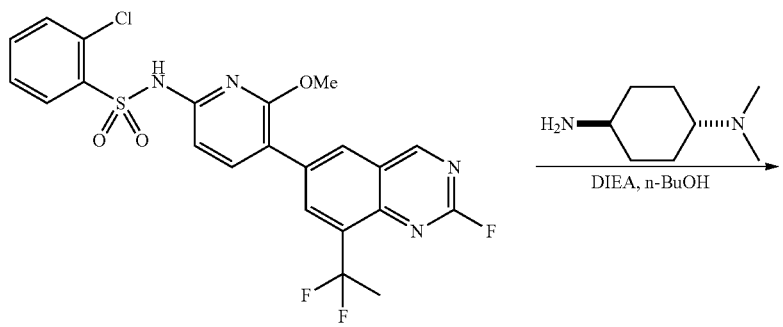

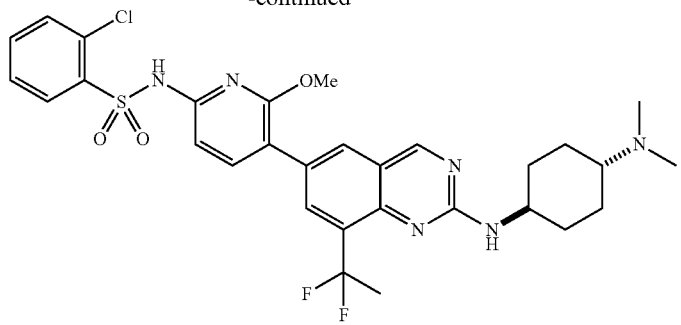

The title compound was synthesized according to the synthetic procedure reported for the preparation of 2-chloro-N-(5-(8-(1,1-difluoroethyl)-2-(((1r,4r)-4-(dimethylamino)cyclohexyl)amino)quinazolin-6-yl)-6-methylpyridin-2-yl)benzenesulfonamide. (5.4 mg, 7.7 umol, 7.8% yield, FA). M+H$^+$=631.2 (LCMS); $^1$H NMR (400 MHz, METHANOL-d$_4$) δ 9.02 (s, 1H), 8.47 (br s, 1H), 8.31 (d, J=7.7 Hz, 1H), 8.04 (s, 1H), 7.89 (d, J=1.5 Hz, 1H), 7.67 (d, J=7.9 Hz, 1H), 7.63-7.55 (m, 2H), 7.55-7.49 (m, 1H), 6.65 (d, J=7.9 Hz, 1H), 3.90 (br s, 1H), 3.67 (s, 3H), 3.29-3.21 (m, 1H), 2.88 (s, 6H), 2.39 (br d, J=10.6 Hz, 2H), 2.32-2.12 (m, 5H), 1.77-1.60 (m, 2H), 1.57-1.41 (m, 2H).

Example 18: Synthesis of 2-chloro-N-(5-(8-ethyl-2-(((1r,4r)-4-((2-methoxyethyl)(methyl)amino)cyclohexyl)amino)quinazolin-6-yl)-6-methylpyridin-2-yl)benzenesulfonamide (132)

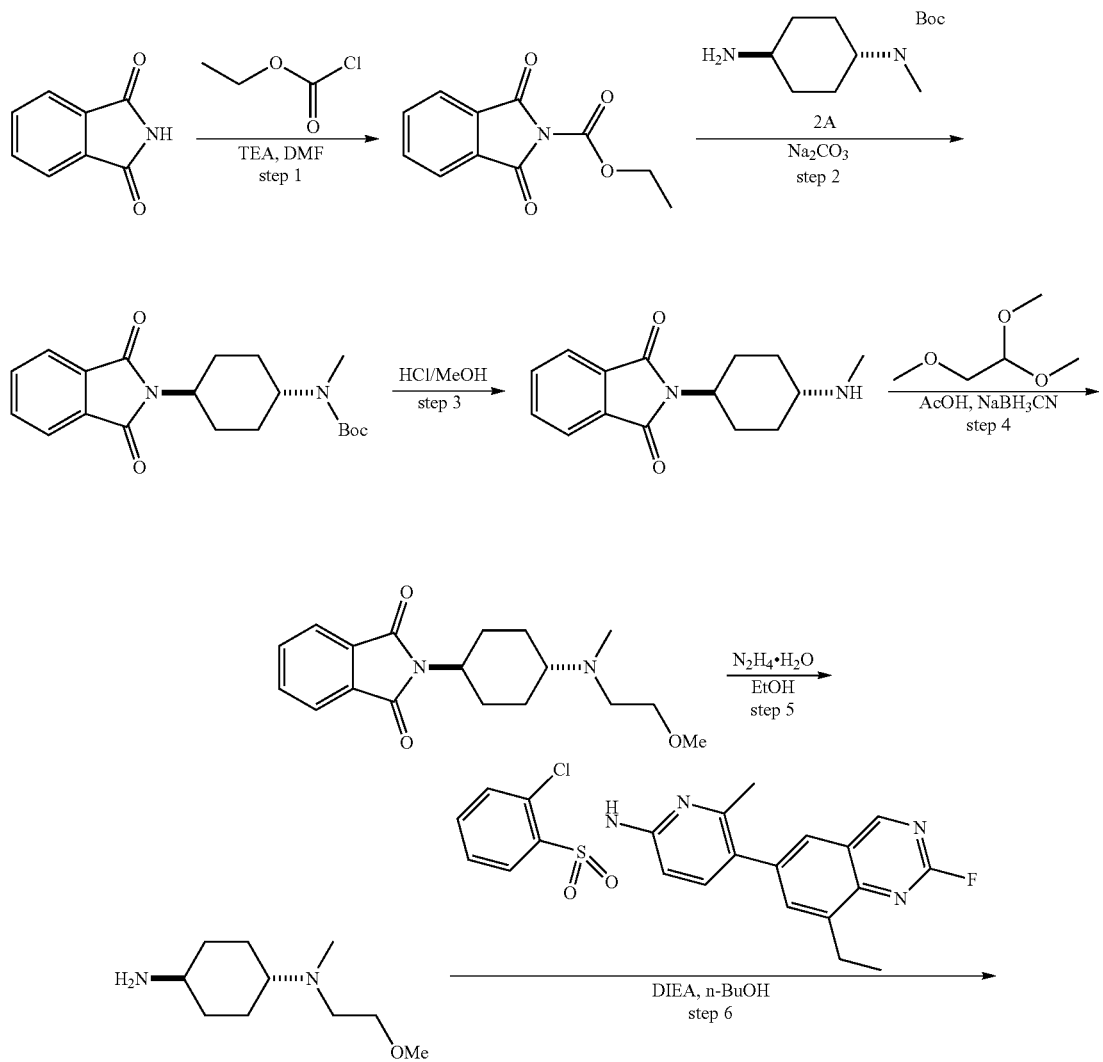

-continued

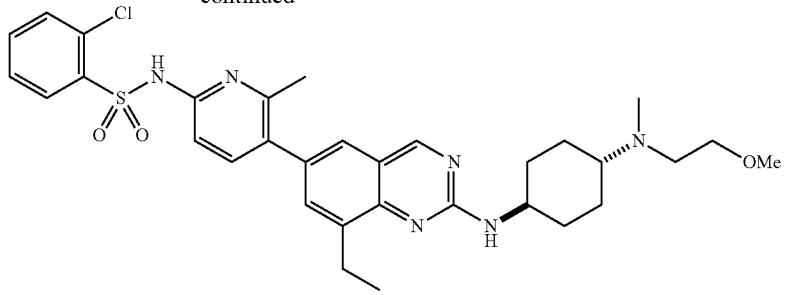

To a solution of isoindoline-1,3-dione (10.0 g, 67.9 mmol), TEA (8.9 g, 88.3 mmol, 12.3 mL) in DMF (60.0 mL) was added ethyl carbonochloridate (8.8 g, 81.5 mmol, 7.7 mL). The mixture was stirred at 25° C. for 12 h. The reaction mixture was filtered to give ethyl 1,3-dioxoisoindoline-2-carboxylate (700 mg, crude). $^1$H NMR (400 MHz, CHLOROFORM-d) δ 8.03-7.93 (m, 2H), 7.88-7.78 (m, 2H), 4.50 (q, J=7.2 Hz, 2H), 1.45 (t, J=7.2 Hz, 3H).

Step 2

To a solution of ethyl 1,3-dioxoisoindoline-2-carboxylate (700 mg, 3.1 mmol), tert-butyl ((1r,4r)-4-aminocyclohexyl)(methyl)carbamate (875 mg, 3.8 mmol) in H$_2$O (20.0 mL) was added Na$_2$CO$_3$ (406 mg, 3.8 mmol). The mixture was stirred at 15° C. for 12 h. The reaction mixture was filtered to get a cake, the cake was washed by MeOH (20.0 mL×3) to give tert-butyl ((1r,4r)-4-(1,3-dioxoisoindolin-2-yl)cyclohexyl)(methyl)carbamate (800 mg, crude). $^1$H NMR (400 MHz, DMSO-d$_6$) δ 7.91-7.76 (m, 4H), 4.10-3.94 (m, 1H), 2.70 (s, 3H), 2.19 (br s, 2H), 1.77 (br d, J=12.1 Hz, 2H), 1.65 (br s, 4H), 1.41 (s, 9H), 1.38 (s, 1H).

Step 3

To a solution of tert-butyl ((1r,4r)-4-(1,3-dioxoisoindolin-2-yl)cyclohexyl)(methyl)carbamate (767 mg, 2.1 mmol) in HCl/MeOH (40.0 mL, 4M) was stirred at 25° C. for 30 min. The reaction mixture was concentrated under reduced pressure to give 2-((1r,4r)-4-(methylamino)cyclohexyl)isoindoline-1,3-dione (600 mg, crude, HCl). $^1$H NMR (400 MHz, DMSO-d$_6$) δ 7.88-7.78 (m, 4H), 4.04-3.90 (m, 1H), 3.57 (br s, 2H), 3.16 (s, 2H), 3.08-2.93 (m, 1H), 2.24-2.13 (m, 3H), 2.13-2.05 (m, 1H), 1.83 (br d, J=10.8 Hz, 2H), 1.59-1.42 (m, 2H).

Step 4

To a solution of 1,1,2-trimethoxyethane (4.9 g, 40.8 mmol, 5.2 mL) in H$_2$O (40.0 mL) and HCl (1.0 mL, 1M) was stirred at 60° C. for 2 h. Then the reaction mixture was extracted with dichloromethane (30.0 mL×3). The combined organic layers were washed with brine (30.0 mL×3), dried over Na$_2$SO$_4$, filtered to give a filtrate. To the filtrate was added the solution of 2-((1r,4r)-4-(methylamino)cyclohexyl)isoindoline-1,3-dione (600 mg, 2.0 mmol, HCl) which was added TEA to adjust pH=7 in MeOH (100.0 mL). Then CH$_3$COOH (183 mg, 3.0 mmol, 175.0 uL) was added to adjust pH=5. And then NaBH$_3$CN (256 mg, 4.0 mmol) was added to above reaction mixture. The mixture was stirred at 45° C. for 12 h. The reaction mixture was extracted with dichloromethane (30.0 mL×3). The combined organic layers were washed with brine (30.0 mL×3), dried over Na$_2$SO$_4$, filtered and concentrated under reduced pressure to give 2-((1r,4r)-4-((2-methoxyethyl)(methyl)amino)cyclohexyl)isoindoline-1,3-dione (800 mg, crude). $^1$H NMR (400 MHz, CHLOROFORM-d) δ 7.84-7.78 (m, 2H), 7.74-7.69 (m, 2H), 4.14 (tt, J=4.1, 12.1 Hz, 1H), 3.94-3.86 (m, 2H), 3.70-3.63 (m, 1H), 3.48 (s, 3H), 3.31-3.21 (m, 2H), 2.81 (s, 3H), 2.48-2.32 (m, 4H), 1.94 (br d, J=10.8 Hz, 2H), 1.74-1.58 (m, 2H).

Step 5

To a solution of 2-((1r,4r)-4-((2-methoxyethyl)(methyl)amino)cyclohexyl)isoindoline-1,3-dione (400 mg, 1.2 mmol) in EtOH (5.0 mL) was added N$_2$H$_4$·H$_2$O (645 mg, 12.6 mmol, 626.9 uL). The mixture was stirred at 80° C. for 2 h. The reaction mixture was concentrated under reduced pressure. The residue was washed with DCM (50.0 mL×3). The combined organic layers was concentrated under reduced pressure to give (1r,4r)-N1-(2-methoxyethyl)-N1-methylcyclohexane-1,4-diamine (150 mg, crude).

Step 6

To a solution of 2-chloro-N-(5-(8-ethyl-2-fluoroquinazolin-6-yl)-6-methylpyridin-2-yl)benzenesulfonamide (50 mg, 109.4 umol) in n-BuOH (2.0 mL) was added DIEA (42 mg, 328.2 umol, 57.1 uL) and (1r,4r)-N1-(2-methoxyethyl)-N1-methylcyclohexane-1,4-diamine (40.7 mg, 218.8 umol). The mixture was stirred at 100° C. for 12 h. The mixture was concentrated under reduced pressure to give a residue. The residue was purified by pre-HPLC (FA condition) to afford 2-chloro-N-(5-(8-ethyl-2-(((1r,4r)-4-((2-methoxyethyl)(methyl)amino)cyclohexyl)amino)quinazolin-6-yl)-6-methylpyridin-2-yl)benzenesulfonamide (6.5 mg, 9.6 umol, 8.8% yield, FA). M+H$^+$=623.2 (LCMS); $^1$H NMR (400 MHz, METHANOL-d$_4$) δ 8.99 (s, 1H), 8.53 (br s, 1H), 8.28-8.17 (m, 1H), 7.67 (d, J=8.8 Hz, 1H), 7.58-7.42 (m, 5H), 7.20 (d, J=8.8 Hz, 1H), 3.98 (tt, J=4.0, 11.4 Hz, 1H), 3.71 (t, J=5.0 Hz, 2H), 3.44 (s, 3H), 3.36-3.32 (m, 3H), 3.13-3.02 (m, 2H), 2.85 (s, 3H), 2.37 (s, 5H), 2.14 (br d, J=12.1 Hz, 2H), 1.84-1.67 (m, 2H), 1.57-1.42 (m, 2H), 1.32 (t, J=7.5 Hz, 3H).

Example 19: Synthesis 2-chloro-N-(5-(2-(((1r,4r)-4-(dimethylamino)cyclohexyl)amino)-8-methylquinazolin-6-yl)-6-methoxypyridin-2-yl)benzenesulfonamide (133)

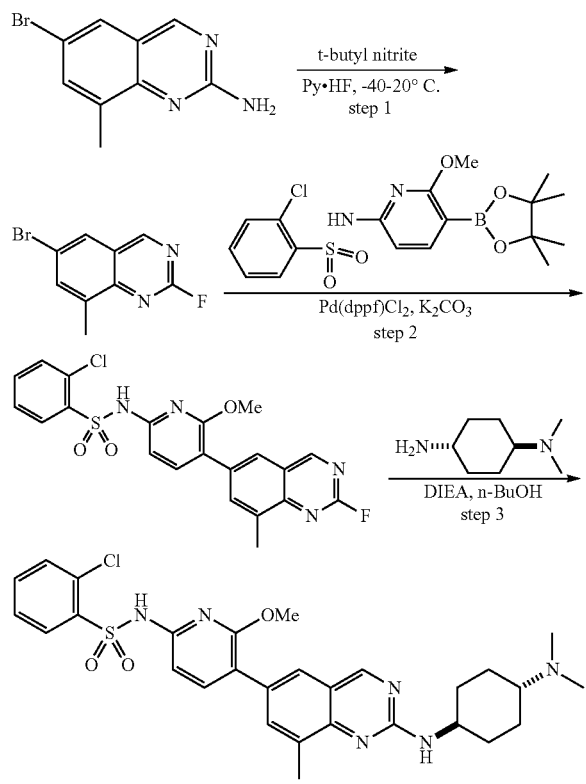

To a solution of 6-bromo-8-methylquinazolin-2-amine (0.5 g, 2.1 mmol) in pyridine (5.0 mL) was added pyridine; hydrofluoride (11.0 g, 110.9 mmol, 10.0 mL) at −40° C. The mixture was stirred at −40° C. for 15 min. Then tert-butyl nitrite (866 mg, 8.4 mmol, 999.1 uL) was added. The mixture was stirred at 20° C. for 4 h. The reaction mixture was quenched by addition NaHCO$_3$ (50.0 mL) to pH 7, and then diluted with ethyl acetate (20.0 mL×3). The combined organic layers were washed with brine (20.0 mL×3), dried over Na$_2$SO$_4$, filtered and concentrated under reduced pressure to give a residue. The residue was purified by column chromatography (SiO$_2$) to afford 6-bromo-2-fluoro-8-methylquinazoline (130 mg, 534.5 umol, 25.4% yield). M+H$^+$= 243.1 (LCMS)

Step 2

A mixture of 6-bromo-2-fluoro-8-methylquinazoline (130 mg, 539.2 umol), 2-chloro-N-(6-methoxy-5-(4,4,5,5-tetramethyl-1,3,2-dioxaborolan-2-yl)pyridin-2-yl)benzenesulfonamide (229 mg, 539.2 umol), K$_2$CO$_3$ (223 mg, 1.6 mmol), Pd(dppf)Cl$_2$ (39 mg, 53.9 umol) in dioxane (4.0 mL) and H$_2$O (0.4 mL) was degassed and purged with N$_2$ for 3 times, and then the mixture was stirred at 90° C. for 12 h under N$_2$ atmosphere. The reaction mixture was concentrated under reduced pressure. The residue was purified by column chromatography (SiO$_2$) to afford 2-chloro-N-(5-(2-fluoro-8-methylquinazolin-6-yl)-6-methoxypyridin-2-yl) benzenesulfonamide (130 mg, 181.3 umol, 33.6% yield). M+H$^+$= 458.9 (LCMS).

Step 3

To a solution of 2-chloro-N-(5-(2-fluoro-8-methylquinazolin-6-yl)-6-methoxypyridin-2-yl) benzenesulfonamide (130 mg, 283.2 umol) in n-BuOH (2.0 mL) was added DIEA (292 mg, 2.2 mnol, 394.7 uL), (1r,4r)-N1,N1-dimethylcyclohexane-1,4-diamine (253 mg, 1.4 mmol, HCQ). The mixture was stirred at 100° C. for 12 h. The reaction mixture was concentrated under reduced pressure. The residue was purified by prep-HPLC (FA condition) to afford 2-chloro-N-(5-(2-(((1r,4r)-4-(dimethylamino)cyclohexyl)amino)-8-methylquinazolin-6-yl)-6-methoxypyridin-2-yl)benzenesulfonamide (25.7 mg, 39.9 umol, 14.1% yield, FA). M+H$^+$= 581.2 (LCMS); $^1$H NMR (400 MHz, METHANOL-d$_4$) δ 8.96 (s, 1H), 8.50 (br s, 1H), 8.37-8.31 (m, 1H), 7.73-7.58 (m, 5H), 7.57-7.51 (m, 1H), 6.65 (d, J=7.9 Hz, 1H), 4.01 (br t, J=11.7 Hz, 1H), 3.67 (s, 3H), 3.28-3.20 (m, 1H), 2.89 (s, 6H), 2.55 (s, 3H), 2.40 (br d, J=12.1 Hz, 2H), 2.19 (br d, J=11.6 Hz, 2H), 1.86-1.66 (m, 2H), 1.60-1.43 (m, 2H).

Example 20: Synthesis of 2-chloro-N-(5-(2-(((1r,4r)-4-(dimethylamino)cyclohexyl)amino)-8-(trifluoromethyl)quinazolin-6-yl)-6-methoxypyridin-2-yl) benzenesulfonamide (135)

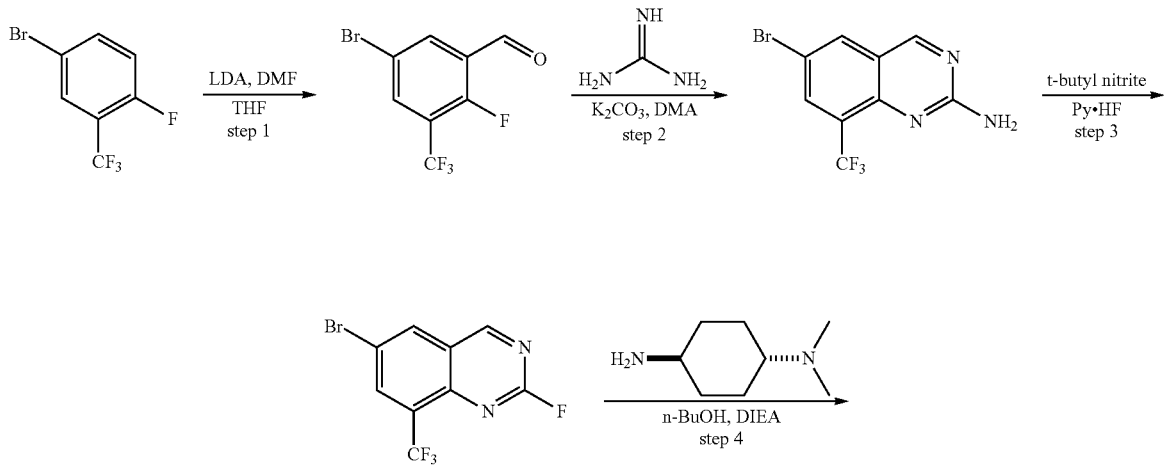

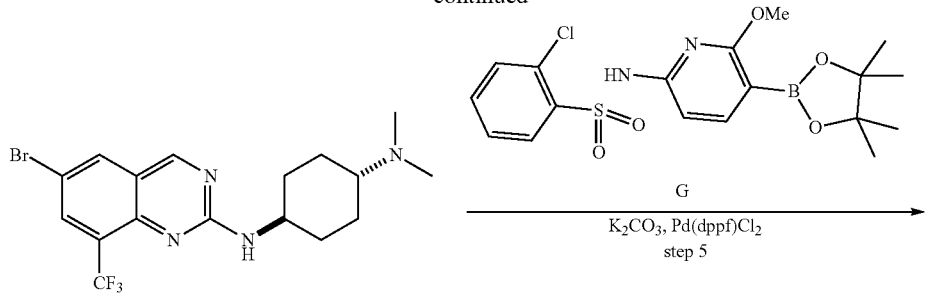

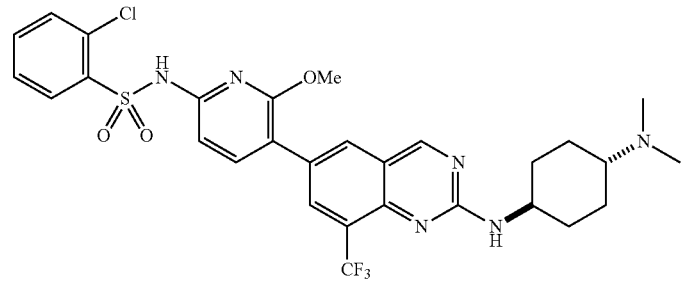

Step 1

To a solution of 4-bromo-1-fluoro-2-(trifluoromethyl)benzene (5.0 g, 20.5 mmol, 2.9 mL) in THF (50.0 mL) was added LDA (2 M, 13.3 mL) at −78° C. The mixture was stirred at −78° C. for 1 hr. Then DMF (1.8 g, 24.6 mmol, 1.9 mL) was added and stirred for 1 h at −78° C. The mixture was poured into Sat NH$_4$Cl (20.0 mL) and extracted with ethyl acetate (20.0 mL×3). The combined organic layers were washed with brine (20.0 mL×3), dried over Na$_2$SO$_4$, filtered and concentrated under reduced pressure to give a residue. The residue was purified by column chromatography (SiO$_2$) to afford 5-bromo-2-fluoro-3-(trifluoromethyl)benzaldehyde (4 g, 14.7 mmol, 71.7% yield). $^1$H NMR (CHLOROFORM-d, 400 MHz): δ 10.35 (s, 1H), 8.19 (dd, J=2.5, 5.4 Hz, 1H), 7.98 (dd, J=2.1, 6.1 Hz, 1H)

Step 2

To a solution of guanidine (1.3 g, 11.0 mmol, H$_2$CO$_3$) and K$_2$CO$_3$ (4.5 g, 33.2 mmol) in DMA (60.0 mL) was added a solution of 5-bromo-2-fluoro-3-(trifluoromethyl)benzaldehyde (3.0 g, 11.0 mmol) in DMA (9.0 mL). Then the mixture was stirred at 160° C. for 1 h. The mixture was concentrated to get crude residue add H$_2$O (30.0 mL) and extracted with ethyl acetate (30.0 mL×3). The combined organic layers were washed with brine (20.0 mL×3), dried over Na$_2$SO$_4$, filtered and concentrated under reduced pressure to give a residue. The residue was purified by column chromatography (SiO$_2$) to afford 6-bromo-8-(trifluoromethyl)quinazolin-2-amine (1.6 g, 4.6 mmol, 42.0% yield). $^1$H NMR (DMSO-d6, 400 MHz) δ 9.19 (s, 1H), 8.34 (d, J=2.2 Hz, 1H), 8.12 (d, J=2.0 Hz, 1H), 7.42 (s, 2H).

Step 3

To a solution of 6-bromo-8-(trifluoromethyl)quinazolin-2-amine (1.5 g, 5.1 mmol) in pyridine (13.0 mL) was added pyridine; hydrofluoride (28.6 g, 288.5 mmol, 26.0 mL) at −40° C. The mixture was stirred at −40° C. for 15 min. Then tert-butyl nitrite (1.0 g, 10.2 mmol, 1.2 mL) was added. The mixture was stirred at 20° C. for 12 h. The mixture was poured into ice water and adjusted pH=7 with sat NaHCO$_3$ extracted with ethyl acetate (50.0 mL×3). The combined organic layers were washed with brine (20.0 mL×3), dried over Na$_2$SO$_4$, filtered and concentrated under reduced pressure to give a residue. The residue was purified by column chromatography (SiO$_2$) to afford 6-bromo-2-fluoro-8-(trifluoromethyl)quinazoline (1.0 g, 3.3 mmol, 64.9% yield). M+H$^+$=294.9 (LCMS);

Step 4

To a solution of 6-bromo-2-fluoro-8-(trifluoromethyl)quinazoline (0.5 g, 1.69 mmol) in n-BuOH (20.0 mL) were added (1r,4r)-N1,N1-dimethylcyclohexane-1,4-diamine (363 mg, 2.0 mmol, HCQ). DIEA (1.1 g, 8.4 mmol, 1.4 mL). The mixture was stirred at 100° C. for 4 h. The mixture was concentrated to get crude residue and added MTBE (20.0 mL). The mixture was stirred at 25° C. for 1 h. Then the mixture was filtered to afford (1r,4r)-N1-(6-bromo-8-(trifluoromethyl)quinazolin-2-yl)-N4,N4-dimethylcyclohexane-1,4-diamine (0.4 g, crude).

Step 5

To a solution of (1r,4r)-N1-(6-bromo-8-(trifluoromethyl)quinazolin-2-yl)-N4,N4-dimethylcyclohexane-1,4-diamine (0.2 g, 479.3 umol) and K$_2$CO$_3$ (198 mg, 1.4 mmol) in dioxane (2.0 mL) and H$_2$O (0.2 mL) were added 2-chloro-N-(6-methoxy-5-(4,4,5,5-tetramethyl-1,3,2-dioxaborolan-2-yl)pyridin-2-yl)benzenesulfonamide (244 mg, 575.1 umol) and Pd(dppf)Cl$_2$ (35 mg, 47.9 umol). The mixture was stirred at 90° C. for 12 h under N$_2$. The mixture was concentrated to get crude residue. The residue was purified by prep-HPLC (FA condition) to afford 2-chloro-N-(5-(2-(((1r,4r)-4-(dimethylamino)cyclohexyl)amino)-8-(trifluoromethyl)quinazolin-6-yl)-6-methoxypyridin-2-yl)benzenesulfonamide (144 mg, 207.0 umol, 43.2% yield, FA). M+H$^+$= 635.2 (LCMS); $^1$H NMR (METHANOL-d$_4$, 400 MHz) δ 9.07 (br s, 1H), 8.55 (s, 1H), 8.36-8.29 (m, 1H), 8.15 (d, J=1.3 Hz, 1H), 8.02 (s, 1H), 7.70 (d, J=8.1 Hz, 1H), 7.64-7.56 (m, 2H), 7.56-7.49 (m, 1H), 6.66 (d, J=7.9 Hz, 1H), 3.91 (br s, 1H), 3.68 (s, 3H), 3.26-3.08 (m, 1H), 2.82 (br s, 6H), 2.39 (br s, 2H), 2.18 (br d, J=8.3 Hz, 2H), 1.80-1.59 (m, 2H), 1.56-1.39 (m, 2H).

Example 21: Synthesis of 2-chloro-N-(5-(8-ethyl-2-(((1r,4r)-4-(methylamino)cyclohexyl)amino)quinazolin-6-yl)-6-methoxypyridin-2-yl)benzenesulfonamide (116)
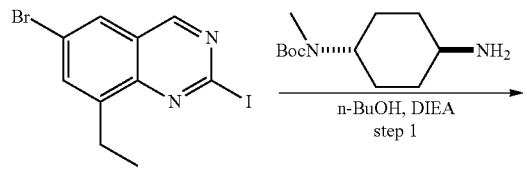
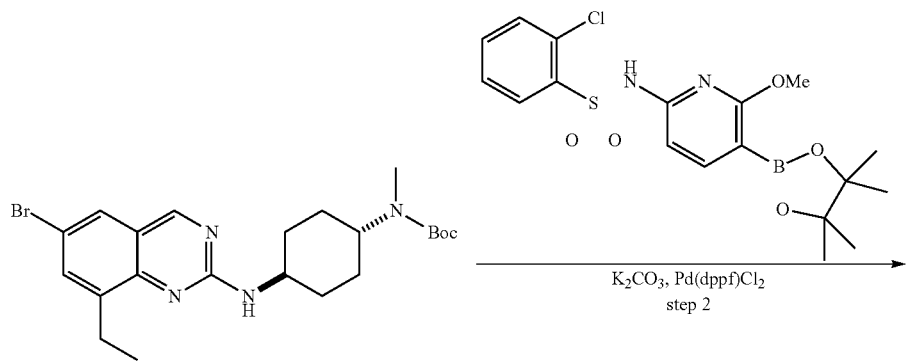
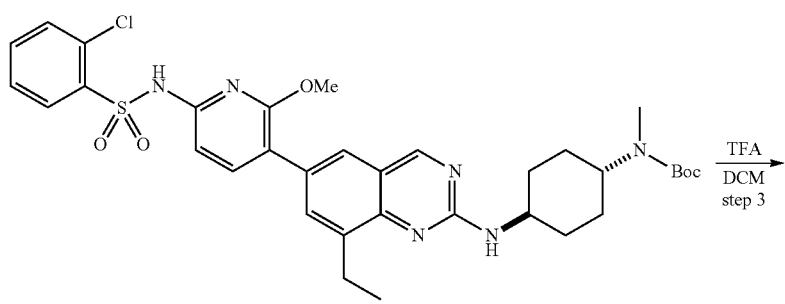
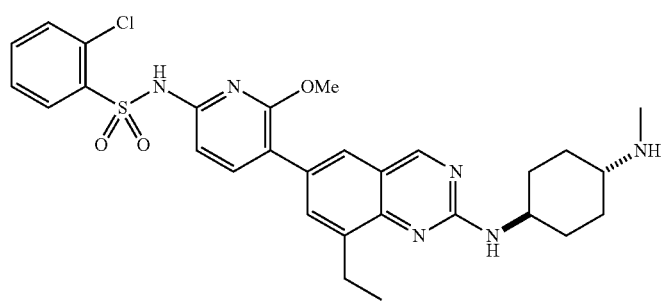

The title compound was synthesized according to the synthetic procedure reported for the preparation of 2-chloro-N-(5-(2-(((1r,4r)-4-(dimethylamino)cyclohexyl)amino)-8-(trifluoromethyl)quinazolin-6-yl)-6-methoxypyridin-2-yl)benzenesulfonamide (114 mg, FA). M+H+=581.2 (LCMS); $^1$H NMR (400 MHz, METHANOL-$d_4$) δ 8.96 (s, 1H), 8.54 (s, 1H), 8.33 (d, J=7.3 Hz, 1H), 7.70-7.63 (m, 3H), 7.62-7.56 (m, 2H), 7.56-7.49 (m, 1H), 6.65 (d, J=7.9 Hz, 1H), 4.06-3.91 (m, 1H), 3.67 (s, 3H), 3.18-2.99 (m, 3H), 2.74 (s, 3H), 2.45-2.16 (m, 4H), 1.64-1.43 (m, 4H), 1.32 (t, J=7.5 Hz, 3H).

Example 21A: Synthesis of (1r,4r)-N1,N1-dimethylcyclohexane-1,4-diamine

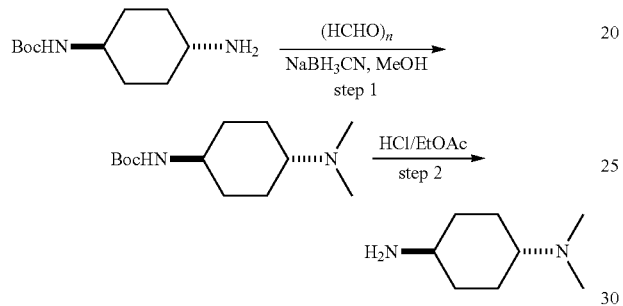

The title compound was synthesized according to the synthetic procedure reported for the preparation of N1,N1-dimethylbicyclo[2.2.2]octane-1,4-diamine (8.3 g, 46.4 mmol, 99.6% yield, HCl). $^1$H NMR (400 MHz, DMSO-$d_6$) δ 11.02 (br s, 1H), 8.31 (br s, 3H), 3.62-3.36 (m, 1H), 3.15-3.03 (m, 1H), 2.96 (br d, J=4.0 Hz, 1H), 2.65 (d, J=4.9 Hz, 6H), 2.09 (br s, 4H), 1.65-1.31 (m, 4H).

Example 21B: Synthesis of (1s,4s)-N1,N1-dimethylcyclohexane-1,4-diamine

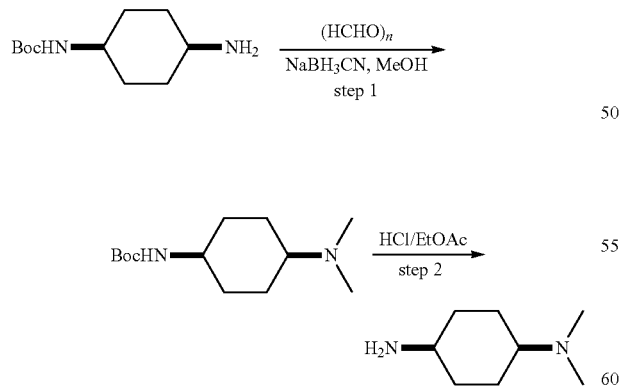

The title compound was synthesized according to the synthetic procedure reported for the preparation of N1,N1-dimethylbicyclo[2.2.2]octane-1,4-diamine (1.7 g, crude, HCl). $^1$H NMR (400 MHz, METHANOL-$d_4$) δ 3.53 (br s, 1H), 3.41-3.33 (m, 1H), 2.89 (s, 6H), 2.13-1.88 (m, 9H).

Example 22: Synthesis 2-chloro-N-(5-(2-(((1r,4r)-4-(dimethylamino)cyclohexyl)amino)-8-(methoxymethyl)quinazolin-6-yl)-6-methoxypyridin-2-yl)benzenesulfonamide (137)

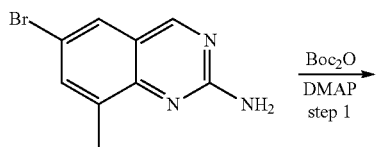

-continued

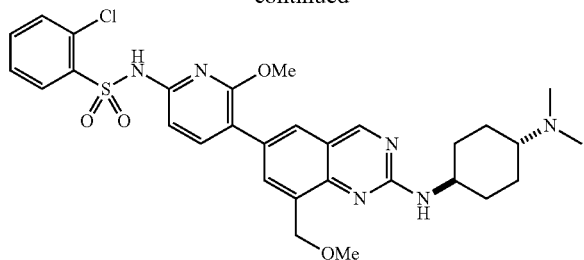

Step 1

To a solution of 6-bromo-8-methylquinazolin-2-amine (6.6 g, 27.8 mmol) in Boc₂O (100.0 mL) was added DMAP (3.4 g, 27.8 mmol). The mixture was stirred at 100° C. for 12 h. The reaction mixture was concentrated under reduced pressure to give a residue. The residue was purified by column chromatography (SiO₂) to afford tert-butyl N-(6-bromo-8-methyl-quinazolin-2-yl)-N-tert-butoxycarbonyl-carbamate (4.1 g, 6.6 mmol, 24.0% yield). $^1$H NMR (400 MHz, DMSO-$d_6$) δ 9.59 (s, 1H), 8.33 (d, J=1.8 Hz, 1H), 8.12-8.06 (m, 1H), 2.63 (s, 3H), 1.39 (s, 22H).

Step 2

To a solution of tert-butyl N-(6-bromo-8-methyl-quinazolin-2-yl)-N-tert-butoxycarbonyl-carbamate (3.5 g, 8.1 mmol) and NBS (4.3 g, 24.5 mmol) in ACN (90.0 mL) was added AIBN (1.3 g, 8.1 mmol). The mixture was stirred at 90° C. for 12 h. The reaction mixture was concentrated under reduced pressure to give a residue. The residue was purified by column chromatography (SiO₂) to afford tert-butyl N-[6-bromo-8-(bromomethyl)quinazolin-2-yl]-N-tert-butoxycarbonyl-carbamate (2.3 g, 3.1 mmol, 38.1% yield).

Step 3

To a solution of tert-butyl N-[6-bromo-8-(bromomethyl)quinazolin-2-yl]-N-tert-butoxycarbonyl-carbamate (0.5 g, 966.7 umol) in NaOMe (10.0 mL, 30% solution) was stirred at 30° C. for 12 h. The reaction mixture was added into H₂O (10 mL), then was filtered and the solid was desired tert-butyl N-[6-bromo-8-(methoxymethyl)quinazolin-2-yl]carbamate (0.3 g, crude).

Step 4

To a solution of tert-butyl N-[6-bromo-8-(methoxymethyl)quinazolin-2-yl]carbamate (0.3 g, 814.7 umol) in HCl/EtOAc (10.0 mL, 4M) was stirred at 25° C. for 0.5 h. The reaction mixture was concentrated under reduced pressure. The residue was added DCM (10.0 mL) and TFA (4.0 mL). The mixture was stirred at 25° C. for 4 h. The reaction mixture was concentrated under reduced pressure. The reaction mixture was quenched by addition NaHCO₃ (9.0 mL), and then extracted with ethyl acetate (3.0 mL×3). The combined organic layers were washed with brine (3.0 mL×3), dried over Na₂SO₄, filtered and concentrated under reduced pressure to give 6-bromo-8-(methoxymethyl)quinazolin-2-amine (200 mg, crude).

Step 5

To a solution of 6-bromo-8-(methoxymethyl)quinazolin-2-amine (170 mg, 634.0 umol) in pyridine (2.0 mL) was added pyridine; hydrofluoride (4.4 g, 44.4 mmol, 4.0 mL) at −40° C. The mixture was stirred at −40° C. for 15 min. Then tert-butyl nitrite (261 mg, 2.5 mmol, 301.6 uL) was added. The mixture was stirred at 20° C. for 1 h. The reaction mixture was quenched by addition NaHCO₃ (5.0 mL) to pH 7, and then diluted with ethyl acetate (3.0 mL×3). The combined organic layers were washed with brine (3.0 mL×3), dried over Na₂SO₄, filtered and concentrated under reduced pressure to give a residue. The residue was purified by column chromatography (SiO₂) to afford 6-bromo-2-fluoro-8-(methoxymethyl)quinazoline (100 mg). M+H⁺= 271.0 (LCMS).

Step 6

A mixture of 6-bromo-2-fluoro-8-(methoxymethyl)quinazoline (100 mg, 368.8 umol), 2-chloro-N-(6-methoxy-5-(4,4,5,5-tetramethyl-1,3,2-dioxaborolan-2-yl)pyridin-2-yl)benzenesulfonamide (172 mg, 405.7 umol), K₂CO₃ (152 mg, 1.1 mmol), Pd(dppf)Cl₂ (26 mg, 36.8 umol) in dioxane (2.0 mL) and H₂O (0.2 mL) was degassed and purged with N₂ for 3 times, and then the mixture was stirred at 90° C. for 12 h under N₂ atmosphere. The reaction mixture was concentrated under reduced pressure. The residue was purified by prep-TLC (SiO₂) to afford 2-chloro-N-(5-(2-fluoro-8-(methoxymethyl)quinazolin-6-yl)-6-methoxypyridin-2-yl)benzenesulfonamide (0.1 g, 188.1 umol, 51.0% yield). M+H⁺=489.0 (LCMS).

Step 7

To a solution of 2-chloro-N-(5-(2-fluoro-8-(methoxymethyl)quinazolin-6-yl)-6-methoxypyridin-2-yl)benzenesulfonamide (100 mg, 204.5 umol) in n-BuOH (2.0 mL) was added DIEA (158 mg, 1.2 mmol, 213.7 uL) and (1r,4r)-N1,N1-dimethylcyclohexane-1,4-diamine (73 mg, 409.0 umol, HCl). The mixture was stirred at 100° C. for 12 h. The reaction mixture was concentrated under reduced pressure. The residue was purified by prep-HPLC (FA condition) to afford 2-chloro-N-(5-(2-(((1r,4r)-4-(dimethylamino)cyclohexyl)amino)-8-(methoxymethyl)quinazolin-6-yl)-6-methoxypyridin-2-yl)benzenesulfonamide (33.3 mg, 44.8 umol, 21.9% yield, FA). M+H⁺=611.2 (LCMS); $^1$H NMR (400 MHz, METHANOL-$d_4$) δ 8.95 (s, 1H), 8.43 (br s, 1H), 8.34-8.23 (m, 1H), 7.84 (d, J=2.0 Hz, 1H), 7.72 (d, J=2.0 Hz, 1H), 7.63 (d, J=7.9 Hz, 11H), 7.59-7.54 (m, 2H), 7.53-7.45 (m, 1H), 6.63 (d, J=7.9 Hz, 1H), 3.94 (tt, J=3.8, 11.5 Hz, 1H), 3.64 (s, 3H), 3.46 (s, 3H), 3.29-3.19 (m, 1H), 2.87 (s, 5H), 2.36 (br d, J=12.1 Hz, 2H), 2.23-2.12 (m, 2H), 1.81-1.62 (m, 2H), 1.55-1.36 (m, 2H); $^1$H NMR (400 MHz, DMSO-$d_6$) δ 9.06 (br s, 1H), 8.29-8.15 (m, 2H), 7.75 (dd, J=2.0, 9.7 Hz, 211), 7.64-7.47 (m, 4H), 7.37 (br s, 1H), 6.53 (br d, J=7.9 Hz, 1H), 4.80 (s, 2H), 3.76 (br s, 1H), 3.48 (s, 3H), 3.39 (s, 3H), 2.74-2.62 (m, 1H), 2.48 (br s, 6H), 2.14 (br s, 2H), 1.96 (br d, J=8.9 Hz, 2H), 1.56-1.20 (m, 4H).

Example 23: Synthesis of 2-chloro-N-(5-(2-(((1r,4r)-4-(dimethylamino)cyclohexyl)amino)-8-methylquinazolin-6-yl)-3-fluoro-6-methoxypyridin-2-yl)benzenesulfonamide (145)

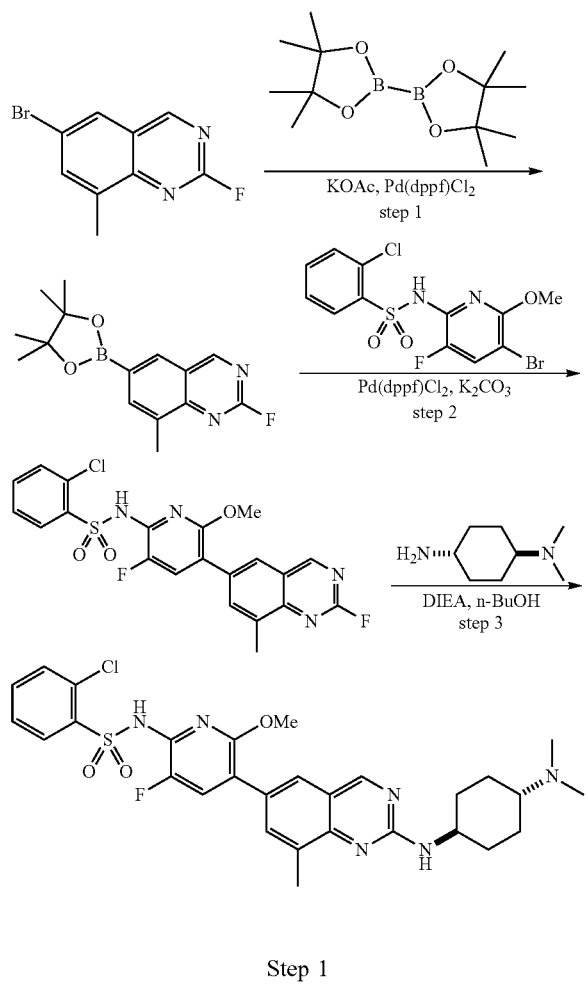

Step 1

A mixture of 6-bromo-2-fluoro-8-methylquinazoline (500 mg, 2.0 mmol), 4,4,4',4',5,5,5',5'-octamethyl-2,2'-bi(1,3,2-dioxaborolane) (632 mg, 2.4 mmol), KOAc (610 mg, 6.22 mmol), Pd(dppf)Cl$_2$ (151 mg, 207.4 umol) in dioxane (20.0 mL) was degassed and purged with N$_2$ for 3 times, and then the mixture was stirred at 90° C. for 12 h under N$_2$ atmosphere. The reaction mixture was concentrated under reduced pressure. The residue was purified by column chromatography (SiO$_2$) to afford 2-fluoro-8-methyl-6-(4,4,5,5-tetramethyl-1,3,2-dioxaborolan-2-yl)quinazoline (590 mg, 1.9 mmol, 95.7% yield). M+H$^+$=289.2 (LCMS).

Step 2

A mixture of 2-fluoro-8-methyl-6-(4,4,5,5-tetramethyl-1,3,2-dioxaborolan-2-yl)quinazoline (349 mg, 1.2 mmol), N-(5-bromo-3-fluoro-6-methoxypyridin-2-yl)-2-chlorobenzenesulfonamide (400 mg, 1.0 mmol), K$_2$CO$_3$ (419 mg, 3.0 mmol), Pd(dppf)Cl$_2$ (73 mg, 101 umol) in dioxane (15.0 mL) and H$_2$O (1.5 mL) was degassed and purged with N$_2$ for 3 times, and then the mixture was stirred at 90° C. for 12 h under N$_2$ atmosphere. The reaction mixture was concentrated under reduced pressure. The residue was purified by column chromatography (SiO$_2$) to afford 2-chloro-N-(3-fluoro-5-(2-fluoro-8-methylquinazolin-6-yl)-6-methoxypyridin-2-yl)benzenesulfonamide (450 mg, 802 umol, 79.3% yield). M+H$^+$=477.2 (LCMS).

Step 3

To a solution of (1r,4r)-N1,N1-dimethylcyclohexane-1,4-diamine (281 mg, 1.5 mmol, HCl) in n-BuOH (7.0 mL) was added DIEA (325 mg, 2.5 mmol, 438.3 uL) and 2-chloro-N-(3-fluoro-5-(2-fluoro-8-methylquinazolin-6-yl)-6-methoxypyridin-2-yl)benzenesulfonamide (150 mg, 314.5 umol). The mixture was stirred at 100° C. for 24 h. The reaction mixture was concentrated under reduced pressure. The residue was purified by prep-HPLC (FA condition) to afford 2-chloro-N-(5-(2-(((1r,4r)-4-(dimethylamino)cyclohexyl)amino)-8-methylquinazolin-6-yl)-3-fluoro-6-methoxypyridin-2-yl)benzenesulfonamide (54.9 mg, 82.9 umol, 26.3% yield, FA). M+H$^+$=599.2 (LCMS); $^1$H NMR (400 MHz, DMSO-d$_6$) δ 9.00 (br s, 1H), 8.19-8.09 (m, 2H), 7.67 (br d, J=7.7 Hz, 2H), 7.36 (br d, J=7.6 Hz, 4H), 7.27 (br s, 1H), 3.82 (br s, 1H), 3.22 (s, 3H), 3.09 (br s, 1H), 2.70 (s, 6H), 2.46 (s, 3H), 2.19 (br s, 2H), 2.01 (br d, J=11.7 Hz, 2H), 1.64-1.47 (m, 2H), 1.36 (q, J=11.5 Hz, 2H).

Example 24: Synthesis of 2-chloro-N-(5-(2-(((1s,4s)-4-(dimethylamino)cyclohexyl)amino)-8-methylquinazolin-6-yl)-6-methoxypyridin-2-yl)benzenesulfonamide (139)

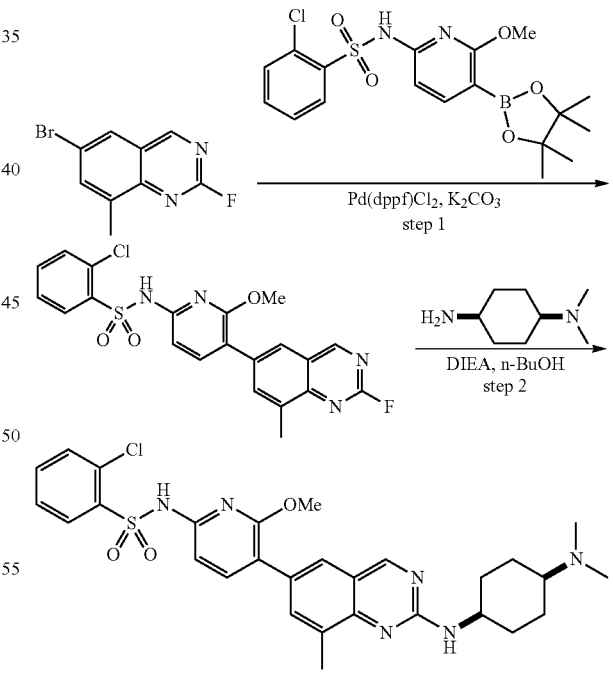

The title compound was synthesized according to the synthetic procedure reported for the preparation of 2-chloro-N-(5-(2-(((1r,4r)-4-(dimethylamino)cyclohexyl)amino)-8-methylquinazolin-6-yl)-3-fluoro-6-methoxypyridin-2-yl)benzenesulfonamide (64.6 mg, 100.7 umol, 29.6% yield, FA). M+H$^+$=581.1 (LCMS); $^1$H NMR (400 MHz, METHANOL-d$_4$) δ 8.95 (s, 1H), 8.55 (br s, 1H), 8.30 (d, J=7.6 Hz, 1H), 7.71-7.53 (m, 5H), 7.53-7.44 (m, 1H), 6.61 (d, J=7.9 Hz, 1H), 4.28 (br s, 1H), 3.63 (s, 3H), 3.25-3.10 (m, 1H), 2.82 (s, 6H), 2.51 (s, 3H), 2.28 (br d, J=12.8 Hz, 2H), 2.00-1.67 (m, 6H).

Example 25: Synthesis of 2-chloro-N-(5-(2-(((1s, 4s)-4-(dimethylamino)cyclohexyl)amino)-8-methylquinazolin-6-yl)-3-fluoro-6-methoxypyridin-2-yl)benzenesulfonamide (147)

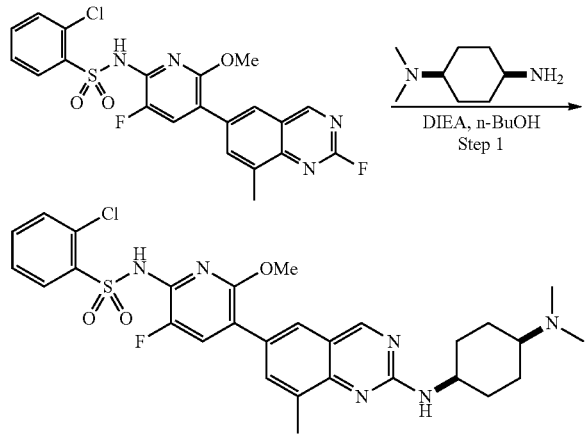

The title compound was synthesized according to the synthetic procedure reported for the preparation of 2-chloro-N-(5-(2-(((1r,4r)-4-(dimethylamino)cyclohexyl)amino)-8-methylquinazolin-6-yl)-3-fluoro-6-methoxypyridin-2-yl)benzenesulfonamide (72.4 mg, 111.1 umol, 35.3% yield, FA). M+H⁺=599.1 (LCMS); ¹H NMR (400 MHz, DMSO-d₆) δ 9.03 (s, 1H), 8.18-8.11 (m, 2H), 7.68 (s, 2H), 7.43-7.37 (m, 3H), 7.36 (br d, J=2.6 Hz, 1H), 4.21 (br s, 1H), 3.22 (s, 3H), 3.11 (br s, 1H), 2.77-2.62 (m, 6H), 2.46 (s, 3H), 2.07 (br d, J=12.1 Hz, 2H), 1.94-1.54 (m, 6H).

Example 26: Synthesis of 2-chloro-N-(5-(2-(((1s, 4s)-4-(dimethylamino)cyclohexyl)amino)-8-ethylquinazolin-6-yl)-3-fluoro-6-methoxypyridin-2-yl)benzenesulfonamide (142)

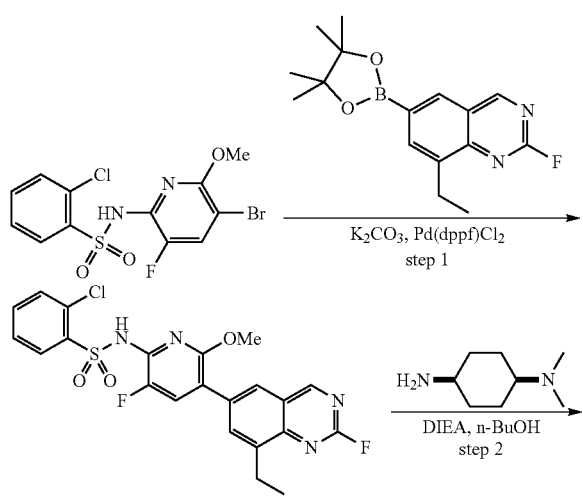

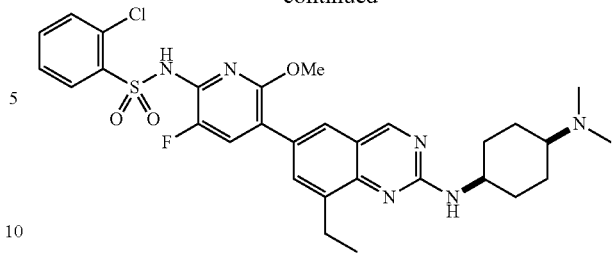

Step 1

A mixture of 8-ethyl-2-fluoro-6-(4,4,5,5-tetramethyl-1,3,2-dioxaborolan-2-yl)quinazoline (100 mg, 331 umol), N-(5-bromo-3-fluoro-6-methoxypyridin-2-yl)-2-chlorobenzenesulfonamide (131 mg, 331 umol), K₂CO₃ (69 mg, 496.4 umol) and Pd(dppf)Cl₂ (24 mg, 33.1 umol) in dioxane (15.0 mL) and H₂O (1.5 mL) was degassed and purged with N₂ for 3 times, and then the mixture was stirred at 90° C. for 12 h under N₂ atmosphere. The reaction was concentrated to give a residue. The residue was purified by prep-TLC (SiO₂) to afford 2-chloro-N-(5-(8-ethyl-2-fluoroquinazolin-6-yl)-3-fluoro-6-methoxypyridin-2-yl)benzenesulfonamide (90 mg, 47.7 umol, 14.4% yield). M+H⁺=491.0 (LCMS).

Step 2

To a solution of 2-chloro-N-(5-(8-ethyl-2-fluoroquinazolin-6-yl)-3-fluoro-6-methoxypyridin-2-yl)benzenesulfonamide (90 mg, 183.3 umol) in n-BuOH (4.0 mL) was added DIEA (190 mg, 1.5 mmol, 255.5 uL) and (1s,4s)-N1,N1-dimethylcyclohexane-1,4-diamine (131 mg, 733.3 umol, HCl). The mixture was stirred at 120° C. for 12 h. The reaction was concentrated to give a residue. The residue was purified by prep-HPLC (FA condition) to afford 2-chloro-N-(5-(2-(((1s,4s)-4-(dimethylamino)cyclohexyl)amino)-8-ethylquinazolin-6-yl)-3-fluoro-6-methoxypyridin-2-yl)benzenesulfonamide (60.3 mg, 85.3 umol, 46.5% yield, FA). M+H⁺=613.2 (LCMS); ¹H NMR (400 MHz, DMSO-d₆) δ 9.04 (s, 1H), 8.19-8.12 (m, 1H), 7.68 (d, J=2.9 Hz, 2H), 7.44-7.33 (m, 5H), 4.18 (br s, 1H), 3.23 (s, 3H), 3.10 (br s, 1H), 2.95 (q, J=7.4 Hz, 2H), 2.74-2.65 (m, 6H), 2.08 (br d, J=13.1 Hz, 2H), 1.92-1.58 (m, 61H), 1.24 (t, J=7.5 Hz, 3H).

Example 27: Synthesis of 2-chloro-N-(5-(2-(((1s, 4s)-4-(dimethylamino)cyclohexyl)amino)-8-ethylquinazolin-6-yl)-6-methoxypyridin-2-yl)benzenesulfonamide (141)

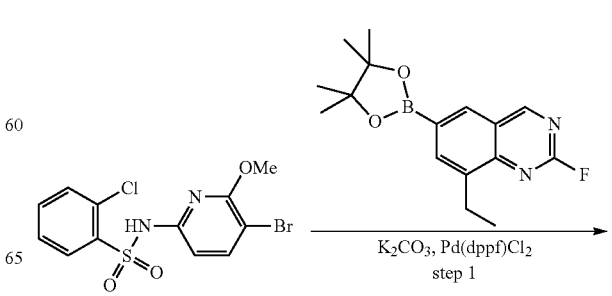

-continued

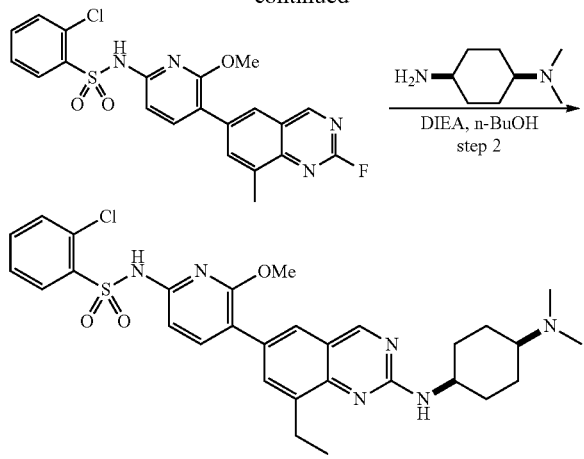

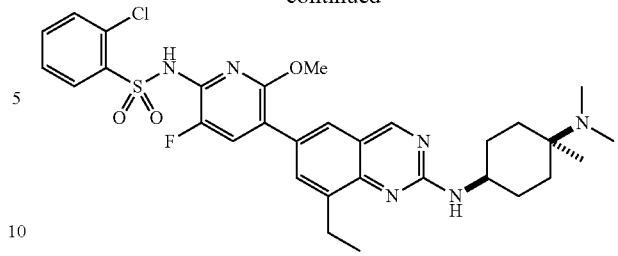

The title compound was synthesized according to the synthetic procedure reported for the preparation of 2-chloro-N-(5-(2-(((1s,4s)-4-(dimethylamino)cyclohexyl)amino)-8-ethylquinazolin-6-yl)-3-fluoro-6-methoxypyridin-2-yl)benzenesulfonamide. (51.8 mg, 74.5 umol, 17.6% yield, FA). M+H$^+$=595.1 (LCMS); $^1$H NMR (400 MHz, METHANOL-d$_4$) δ 8.97 (s, 1H), 8.42 (s, 1H), 8.34-8.27 (m, 1H), 7.70-7.46 (m, 6H), 6.63 (d, J=7.9 Hz, 11H), 4.28 (br t, J=2.9 Hz, 1H), 3.65 (s, 3H), 3.33 (t, 1H), 3.02 (q, J=7.5 Hz, 2H), 2.87 (s, 6H), 2.30 (br d, J=13.0 Hz, 2H), 2.02-1.71 (m, 6H), 1.28 (t, J=7.4 Hz, 3H).

Example 28: Synthesis of 2-chloro-N-(5-(2-(((1s,4s)-4-(dimethylamino)-4-methylcyclohexyl)amino)-8-ethylquinazolin-6-yl)-3-fluoro-6-methoxypyridin-2-yl)benzenesulfonamide (144)

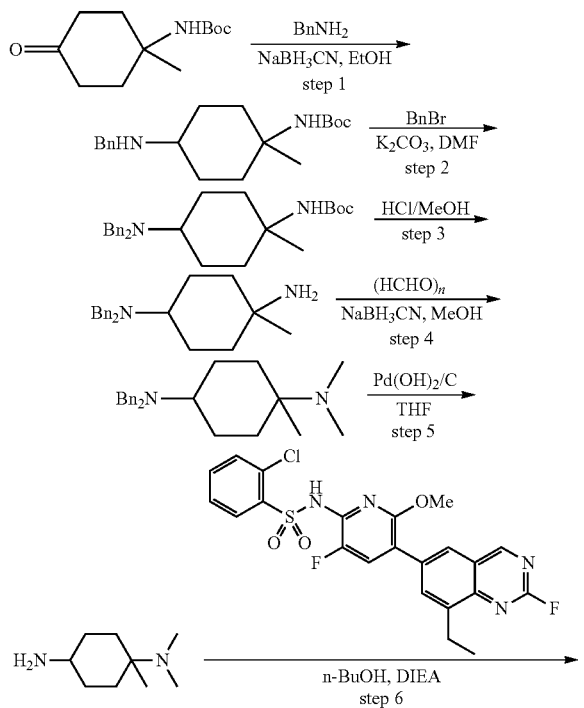

To a solution of tert-butyl (1-methyl-4-oxocyclohexyl)carbamate (900 mg, 4 mmol) in EtOH (20.0 mL) was added phenylmethanamine (509 mg, 4.7 mmol, 517.9 uL) and AcOH (238 mg, 4 mmol, 226.5 uL) at 0° C. The resulting mixture was stirred at 0° C. for 15 min. Follow by successive addition of NaBH$_3$CN (498 mg, 7.9 mmol), the mixture was stirred at 20° C. for 12 h. The reaction was concentrated to give a residue. The residue was dissolved in saturated aqueous NaHCO$_3$ (20.0 mL) and extracted with ethyl acetate (20.0 mL×3). The combined organic phase was dried over anhydrous Na$_2$SO$_4$, filtered and concentrated to give tert-butyl (4-(benzylamino)-1-methylcyclohexyl)carbamate (1.3 g, crude).

Step 2

To a solution of tert-butyl (4-(benzylamino)-1-methylcyclohexyl)carbamate (1.2 g, 3.7 mmol) in DMF (20.0 mL) was added K$_2$CO$_3$ (1.6 g, 11.3 mmol) and bromomethylbenzene (773 mg, 4.5 mmol, 537.1 uL). The mixture was stirred at 40° C. for 12 h. The reaction was quenched with H$_2$O (30.0 mL) and extracted with ethyl acetate (20 mL×3). The combined organic was washed with brine (20 mL×3), dried over anhydrous Na$_2$SO$_4$, filtered and concentrated to give a residue. The residue was purified by flash silica gel chromatography (SiO$_2$) to afford tert-butyl (4-(dibenzylamino)-1-methylcyclohexyl)carbamate (1.5 g, 3.4 mmol, 90% yield). $^1$H NMR (400 MHz, CHLOROFORM-d) δ 7.42-7.35 (m, 4H), 7.34-7.29 (m, 4H), 7.26-7.19 (m, 2H), 3.69-3.63 (m, 4H), 2.60-2.46 (m, 1H), 2.13 (br d, J=11.9 Hz, 1H), 1.94 (br d, J=9.3 Hz, 1H), 1.84-1.66 (m, 2H), 1.61-1.50 (m, 3H), 1.47-1.39 (m, 9H), 1.36-1.24 (m, 4H).

Step 3

The mixture of tert-butyl (4-(dibenzylamino)-1-methylcyclohexyl)carbamate (500 mg, 1.2 mmol) in HCl/MeOH (4M, 10.0 mL) was stirred at 20° C. for 1 h. The reaction was concentrated to give N$^1$,N$^1$-dibenzyl-4-methylcyclohexane-1,4-diamine (400 mg, crude, HCl).

Step 4

To a solution of N$^1$,N$^1$-dibenzyl-4-methylcyclohexane-1,4-diamine (350 mg, 1 mmol, HCl) in MeOH (10.0 mL) was added TEA to basify pH to 7 and then (HCHO)n (274 mg, 3 mmol) was added. AcOH (61 mg, 1 mmol, 58 uL,) was added to adjust pH to 5 and then the mixture was stirred at 60° C. for 2 h. NaBH$_3$CN (255 mg, 4.1 mmol) was added and the mixture was stirred at 60° C. for 12 h. The reaction was concentrated to give a residue. The residue was dissolved in saturated NaHCO$_3$ (10.0 mL) and extracted with ethyl acetate (10.0 mL×3). The combined organic phase was dried over anhydrous Na$_2$SO$_4$, filtered and concentrated to give N$^4$,N$^4$-dibenzyl-N$^1$,N$^1$,1-trimethylcyclohexane-1,4-diamine (330 mg, crude).

Step 5

To a solution of N$^4$,N$^4$-dibenzyl-N$^1$,N$^1$,1-trimethylcyclohexane-1,4-diamine (330 mg, 980.6 umol) in THF (10.0 mL) and AcOH (0.1 mL) was added Pd(OH)$_2$/C (400 mg, 980.6 umol, 10% Pd basis) under N$_2$ atmosphere. The suspension was degassed and purged with H$_2$ for 3 times. The mixture was stirred under H$_2$ (50 Psi) at 50° C. for 12 h. The reaction was filtered and concentrated to give N$^1$,N$^1$,1-trimethylcyclohexane-1,4-diamine (150 mg, crude).

Step 6

To a solution of 2-chloro-N-(5-(8-ethyl-2-fluoroquinazolin-6-yl)-3-fluoro-6-methoxypyridin-2-yl)benzenesulfonamide (30 mg, 61.1 umol) in n-BuOH (3.0 mL) was added DIEA (63 mg, 488.9 umol, 85.2 uL) and N$^1$,N$^1$,1-trimethylcyclohexane-1,4-diamine (38 mg, 244.4 umol). The mixture was stirred at 120° C. for 12 h. The reaction was concentrated to give a residue. The residue was purified by prep-HPLC (FA condition) to afford 2-chloro-N-(5-(2-(((1s,4s)-4-(dimethylamino)-4-methylcyclohexyl)amino)-8-ethylquinazolin-6-yl)-3-fluoro-6-methoxypyridin-2-yl)benzenesulfonamide (3.7 mg, 5.4 umol, 8.9% yield, FA). M+H$^+$= 627.3 (LCMS); $^1$H NMR (400 MHz, METHANOL-d$_4$) δ 8.98 (br s, 1H), 8.53 (br s, 1H), 8.32 (br d, J=7.8 Hz, 1H), 7.69 (s, 2H), 7.62-7.47 (m, 4H), 4.16 (br s, 1H), 3.46 (s, 3H), 3.03 (q, J=7.4 Hz, 2H), 2.85 (s, 6H), 2.13-1.92 (m, 6H), 1.86 (br d, J=5.7 Hz, 2H), 1.41 (s, 3H), 1.29 (br t, J=7.4 Hz, 3H); $^1$H NMR (400 MHz, DMSO-d$_6$) δ 8.98 (s, 1H), 8.18-8.12 (m, 1H), 7.66 (s, 2H), 7.44-7.32 (m, 4H), 3.99 (br s, 1H), 3.31 (s, 3H), 2.96 (q, J=7.5 Hz, 2H), 2.51 (br s, 6H), 2.01-1.75 (m, 6H), 1.58-1.47 (m, 2H), 1.24 (t, J=7.5 Hz, 3H), 1.13 (s, 3H).

Example 29: Synthesis of 2-chloro-N-(5-(2-(((1s,4s)-4-(dimethylamino)-4-methylcyclohexyl)amino)-8-ethylquinazolin-6-yl)-6-methoxypyridin-2-yl)benzenesulfonamide (143)

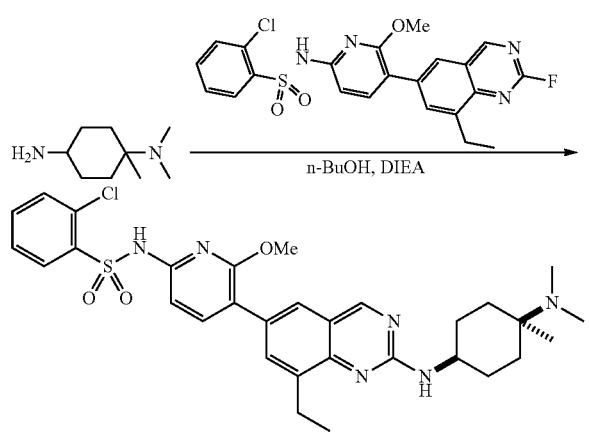

The title compound was synthesized according to the synthetic procedure reported for the preparation of 2-chloro-N-(5-(2-(((1s,4s)-4-(dimethylamino)-4-methylcyclohexyl)amino)-8-ethylquinazolin-6-yl)-3-fluoro-6-methoxypyridin-2-yl)benzenesulfonamide (6.4 mg, 9.4% yield). M+H$^+$= 609.3 (LCMS); $^1$H NMR (400 MHz, METHANOL-d$_4$) δ 8.94 (s, 1H), 8.33-8.27 (m, 1H), 7.64 (dd, J=1.9, 13.4 Hz, 2H), 7.60 (d, J=8.1 Hz, 1H), 7.58-7.54 (m, 2H), 7.52-7.46 (m, 1H), 6.60 (d, J=7.9 Hz, 1H), 4.10 (br t, J=5.3 Hz, 1H), 3.62 (s, 3H), 3.02 (q, J=7.5 Hz, 2H), 2.68-2.59 (m, 6H), 2.06-1.89 (m, 6H), 1.73-1.62 (m, 2H), 1.31-1.22 (m, 6H).

Example 30: Synthesis of 2-chloro-N-(5-(2-(((1r,4r)-4-(dimethylamino)cyclohexyl)amino)-8-fluoroquinazolin-6-yl)-6-methoxypyridin-2-yl)benzenesulfonamide (148)

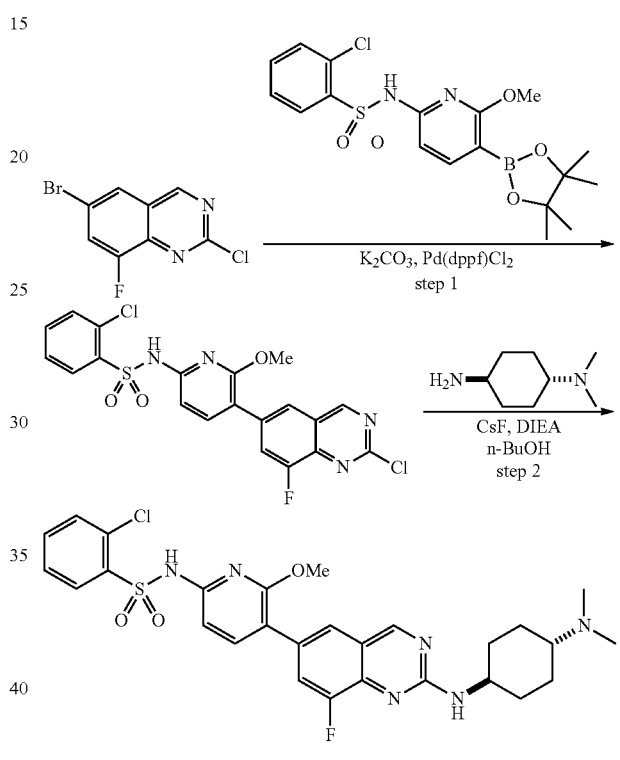

Step 1

A mixture of 6-bromo-2-chloro-8-fluoroquinazoline (90 mg, 344.2 umol), 2-chloro-N-(6-methoxy-5-(4,4,5,5-tetramethyl-1,3,2-dioxaborolan-2-yl)pyridin-2-yl)benzenesulfonamide (146 mg, 344.2 umol), K$_2$CO$_3$ (142 mg, 1.0 mmol, Pd(dppf)Cl$_2$ (25 mg, 34.4 umol) in dioxane (4.0 mL) and H$_2$O (0.4 mL) was degassed and purged with N$_2$ for 3 times, and then the mixture was stirred at 90° C. for 12 h under N$_2$ atmosphere. The reaction mixture was concentrated under reduced pressure to give a residue. The residue was purified by prep-TLC (S102) to afford 2-chloro-N-(5-(2-chloro-8-fluoroquinazolin-6-yl)-6-methoxypyridin-2-yl)benzenesulfonamide (95 mg, 29.9% yield) as a yellow solid. M+H$^+$= 479.1.

Step 2

To a solution of (1r,4r)-N1,N1-dimethylcyclohexane-1,4-diamine (55 mg, 312.9 umol, HCl) in n-BuOH (3.0 mL) were added DIEA (60 mg, 469.4 umol, 81.7 uL), 2-chloro-N-(5-(2-chloro-8-fluoroquinazolin-6-yl)-6-methoxypyridin-2-yl)benzenesulfonamide (75 mg, 156.4 umol) and CsF (23 mg, 156.4 umol, 5.7 uL). The reaction vessel was sealed and heated under microwave at 140° C. for 2 h. The reaction mixture was concentrated under reduced pressure to give a residue. The residue was purified by prep-HPLC (FA condition) to afford 2-chloro-N-(5-(2-(((1r,4r)-4-(dimethylamino)cyclohexyl)amino)-8-fluoroquinazolin-6-yl)-6-methoxypyridin-2-yl)benzenesulfonamide (13.2 mg, 13.1% yield, FA) as a yellow solid. M+H$^+$=585.1; $^1$H NMR (400 MHz, METHANOL-d$_4$) δ 9.03 (br s, 1H), 8.55 (br s, 1H), 8.33-8.28 (m, 1H), 7.71-7.54 (m, 5H), 7.54-7.46 (m, 1H), 6.63 (d, J=7.9 Hz, 1H), 4.07-3.95 (m, 1H), 3.67 (s, 3H), 3.09 (br t, J=12.1 Hz, 1H), 2.77 (s, 6H), 2.29 (br d, J=10.8 Hz, 2H), 2.13 (br d, J=11.2 Hz, 2H), 1.76-1.61 (m, 2H), 1.53-1.39 (m, 2H).

Example 31: Synthesis of 2-chloro-N-(3-fluoro-6-methoxy-5-(2-(((1r,4r)-4-(methylamino)cyclohexyl)amino)quinazolin-6-yl)pyridin-2-yl)benzenesulfonamide (150)

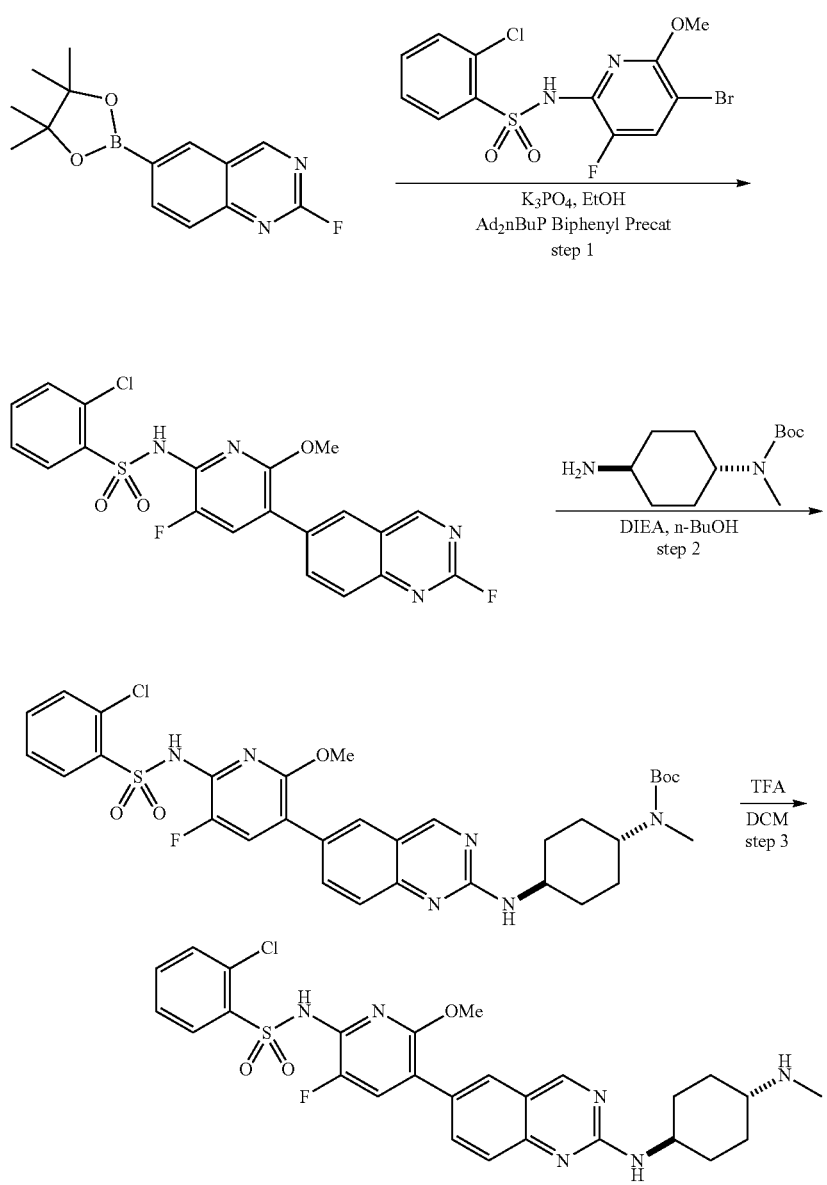

Step 1

To a solution of compound 2-fluoro-6-(4,4,5,5-tetramethyl-1,3,2-dioxaborolan-2-yl)quinazoline (200 mg, 729.6 umol) and $K_3PO_4$ (0.5 M, 2.9 mL) in EtOH (12.0 mL) were added N-(5-bromo-3-fluoro-6-methoxypyridin-2-yl)-2-chlorobenzenesulfonamide (317 mg, 802.6 umol) and [2-(2-aminophenyl)phenyl]-chloro-palladium; bis(1-adamantyl)-butyl-phosphane (48 mg, 72.9 umol). The mixture was stirred at 80° C. for 12 h under $N_2$. The mixture was concentrated to afford 2-chloro-N-(3-fluoro-5-(2-fluoroquinazolin-6-yl)-6-methoxypyridin-2-yl)benzenesulfonamide (200 mg, crude) as a yellow oil.

Step 2

To a solution of compound 2-chloro-N-(3-fluoro-5-(2-fluoroquinazolin-6-yl)-6-methoxypyridin-2-yl)benzenesulfonamide (150 mg, 324.0 umol) in n-BuOH (4.0 mL) was added DIEA (209 mg, 1.6 mmol, 282.2 uL) and compound 2A (147 mg, 648.1 umol). The mixture was stirred at 100° C. for 12 h. The mixture was concentrated and the residue was purified by flash silica gel chromatography to afford compound tert-butyl ((1r,4r)-4-((6-(6-((2-chlorophenyl)sulfonamido)-5-fluoro-2-methoxypyridin-3-yl)quinazolin-2-yl)amino)cyclohexyl)(methyl)carbamate (50 mg, 22.9% yield) as a yellow oil.

Step 3

A solution of tert-butyl ((1r,4r)-4-((6-(6-((2-chlorophenyl)sulfonamido)-5-fluoro-2-methoxypyridin-3-yl)quinazolin-2-yl)amino)cyclohexyl)(methyl)carbamate (50 mg, 74.5 umol) in DCM (2.0 mL) and TFA (1.0 mL) was stirred at 25° C. for 10 min. The mixture was concentrated to give a residue. The residue was dissolved in MeOH (2.0 mL) and basified pH to 8 with $NH_3 \cdot H_2O$ (25% purity), concentrated to give a residue. The residue was purified by prep-HPLC (FA condition) to afford 2-chloro-N-(3-fluoro-6-methoxy-5-(2-(((1r,4r)-4-(methylamino)cyclohexyl)amino)quinazolin-6-yl)pyridin-2-yl)benzenesulfonamide (31.5 mg, 68.5% yield, FA) as a yellow solid. M+H$^+$=571.2 (LCMS); $^1$H NMR (400 MHz, DMSO-d$_6$) δ 9.04 (s, 1H), 8.18-8.12 (m, 2H), 7.85-7.79 (m, 2H), 7.42-7.32 (m, 5H), 7.29 (br d, J=8.1 Hz, 1H), 3.82 (br s, 1H), 3.23 (s, 3H), 2.98 (br s, 1H), 2.58 (s, 3H), 2.08 (br d, J=9.9 Hz, 4H), 1.53-1.25 (m, 4H).

Example 32: Synthesis of 2-chloro-N-(5-(2-(((1r,4r)-4-(dimethylamino)cyclohexyl)amino)quinazolin-6-yl)-3-fluoro-6-methoxypyridin-2-yl)benzenesulfonamide (149)

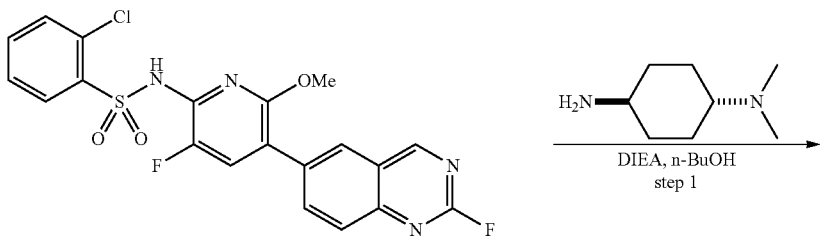

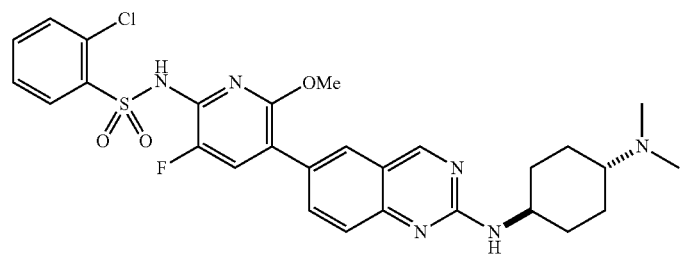

The title compound was synthesized according to the synthetic procedure described in Example 31 to afford 2-chloro-N-(5-(2-(((1r,4r)-4-(dimethylamino)cyclohexyl)amino)quinazolin-6-yl)-3-fluoro-6-methoxypyridin-2-yl)benzenesulfonamide (12.6 mg, 19.9 umol, 18.4% yield, FA) as a yellow solid. M+H$^+$=585.2 (LCMS); $^1$H NMR (400 MHz, DMSO-d$_6$) δ 9.04 (s, 1H), 8.17-8.10 (m, 2H), 7.81 (q, J=2.2, 4.6 Hz, 2H), 7.42-7.32 (m, 5H), 7.29 (br d, J=7.9 Hz, 1H), 3.92-3.78 (m, 1H), 3.23 (s, 3H), 3.13-3.01 (m, 1H), 2.69 (s, 6H), 2.10 (br d, J=10.4 Hz, 2H), 1.99 (br d, J=11.5 Hz, 2H), 1.57 (q, J=12.1 Hz, 2H), 1.35 (q, J=11.5 Hz, 2H).

Example 33: Synthesis of 2-chloro-N-(5-(2-(((1R,2S,4R)-4-(dimethylamino)-2-fluorocyclohexyl)amino)-8-ethylquinazolin-6-yl)-6-methylpyridin-2-yl)benzenesulfonamide (151)

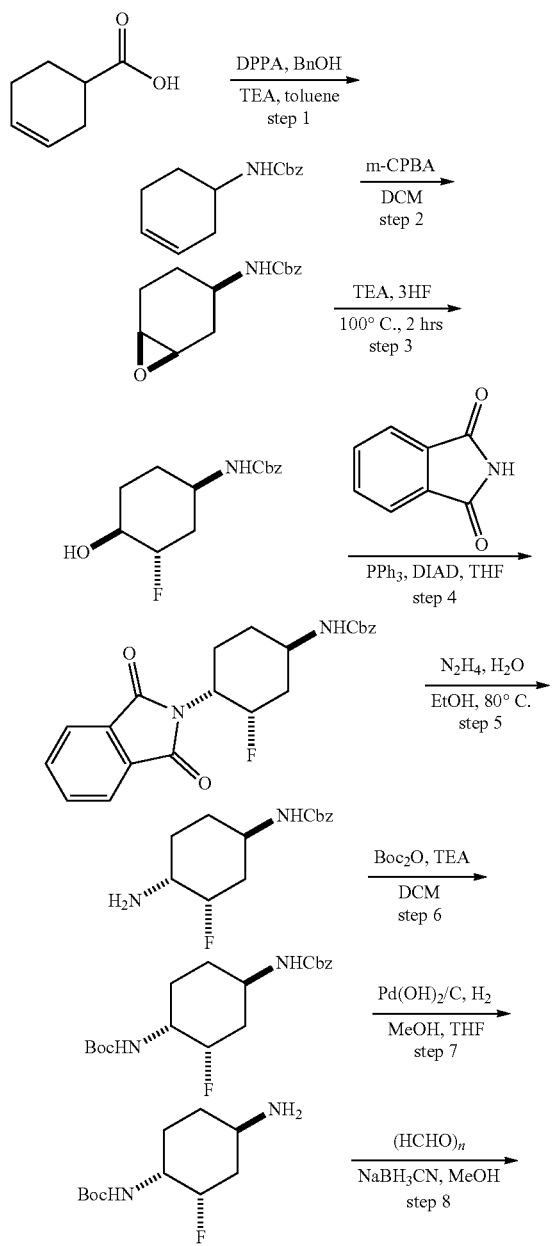

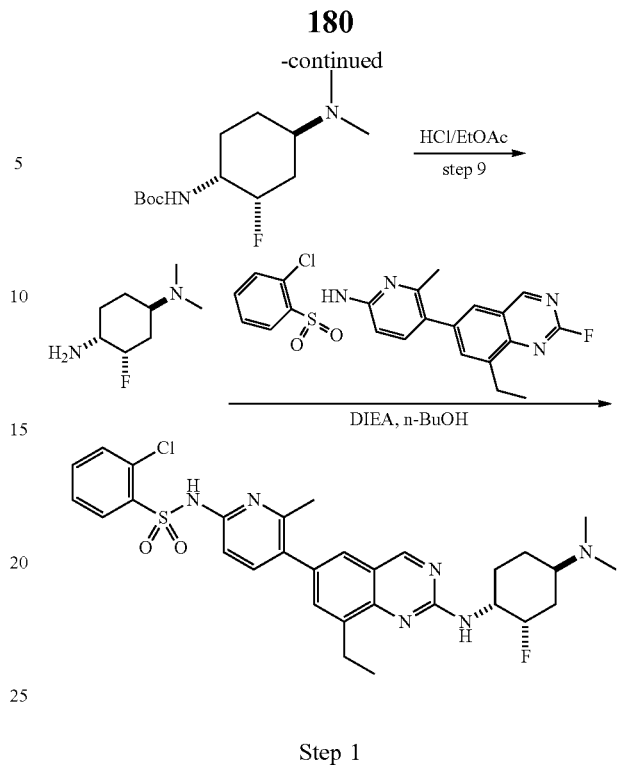

Step 1

To a solution of cyclohex-3-enecarboxylic acid (20.0 g, 158.5 mmol) in toluene (360.0 mL) was added TEA (17.6 g, 174.3 mmol, 24.2 mL) and DPPA (45.8 g, 166.4 mmol, 36.0 mL). The mixture was degassed and purged with N$_2$ for 3 times, it was stirred at 25° C. for 1.5 h under N$_2$ atmosphere. Then it was warmed to 110° C. and stirred for another 2.5 h. BnOH (18.8 g, 174.3 mmol, 18.1 mL) was added to the mixture and the resulting mixture was stirred at 110° C. for 12 h. The reaction was concentrated under reduced pressure to give a residue. The residue was purified by flash silica gel chromatography to afford benzyl cyclohex-3-en-1-ylcarbamate (33.0 g, 81.0% yield) as a white solid. $^1$H NMR (400 MHz, CHLOROFORM-d) δ 7.44-7.29 (m, 5H), 5.73-5.65 (m, 1H), 5.63-5.56 (m, 1H), 5.11 (s, 2H), 4.81 (br s, 1H), 3.88 (br s, 1H), 2.41 (br d, J=17.2 Hz, 1H), 2.19-2.09 (m, 2H), 1.96-1.84 (m, 2H), 1.66-1.52 (m, 1H).

Step 2

To a solution of benzyl cyclohex-3-en-1-ylcarbamate (15.0 g, 64.8 mmol) in DCM (180.0 mL) was added m-CPBA (18.1 g, 84.3 mmol, 80% purity) portion wise at 25° C. The mixture was stirred at 25° C. for 3 h. The reaction mixture was filtered and the filtrated was washed with Na$_2$SO$_3$ (100 mL×2) aqueous solution, and then the organic phase washed with saturated NaHCO$_3$ (100 mL×2) aqueous solution, dried over Na$_2$SO$_4$, filtered and concentrated to give a residue. The residue was purified by flash silica gel chromatography to afford benzyl ((1R,3R,6S)-7-oxabicyclo[4.1.0]heptan-3-yl)carbamate (10.6 g, 52.8% yield) as a white solid. $^1$H NMR (400 MHz, CHLOROFORM-d) δ 7.39-7.29 (m, 5H), 5.18-5.03 (m, 3H), 3.74 (br s, 1H), 3.18 (br s, 2H), 2.30-2.18 (m, 1H), 2.04-1.81 (m, 2H), 1.58-1.43 (m, 2H)

Step 3

A mixture of benzyl ((1R,3R,6S)-7-oxabicyclo[4.1.0]heptan-3-yl)carbamate (10.6 g, 42.8 mmol) and N,N-diethylethanamine; trihydrofluoride (34.5 g, 214.3 mmol, 34.9 mL) was stirred at 100° C. for 2 h. The reaction mixture was cooled to 20° C. and slowly poured into $K_2CO_3$ (29.6 g, 214.3 mmol) in $H_2O$ (600.0 ml). Then the mixture was extracted with ethyl acetate (50 ml×3). The combined organic layer was washed with saturated brine (50 ml×2), dried over $Na_2SO_4$, filtered and concentrated to give a residue. The residue was purified by HPLC (TFA condition) to afford benzyl ((1R,3S,4S)-3-fluoro-4-hydroxycyclohexyl)carbamate (3 g) as a pale yellow oil.

Step 4

To a solution of isoindoline-1,3-dione (1.6 g, 11.2 mmol), benzyl ((1R,3S,4S)-3-fluoro-4-hydroxycyclohexyl)carbamate (3.0 g, 11.2 mmol) and $PPh_3$ (3.8 g, 14.5 mmol) in THF (100.0 mL) was added DIAD (2.9 g, 14.5 mmol, 2.8 mL) under $N_2$ atmosphere. The mixture was stirred at 45° C. for 12 h. The reaction was concentrated under reduced pressure to give a residue. MeCN (50 mL) was added to the residue. The resulting mixture was filtered and the filter cake was washed with MeCN (20 mL×3), dried in vacuum to give benzyl ((1R,3S,4R)-4-(1,3-dioxoisoindolin-2-yl)-3-fluorocyclohexyl)carbamate (2.3 g, crude) as a white solid. M+Na$^+$=419.1 (LCMS); $^1$HNMR (400 MHz, DMSO-d$_6$) δ 7.94-7.79 (m, 4H), 7.42-7.29 (m, 5H), 5.02 (s, 2H), 4.96-4.76 (m, 1H), 4.23-4.03 (m, 1H), 3.75-3.58 (m, 1H), 3.01-2.82 (m, 1H), 2.18 (br s, 1H), 1.98 (br d, J=12.3 Hz, 1H), 1.84-1.54 (m, 2H), 1.48-1.32 (m, 1H).

Step 5

To a solution of benzyl ((1R,3S,4R)-4-(1,3-dioxoisoindolin-2-yl)-3-fluorocyclohexyl)carbamate (0.8 g, 2.0 mmol) in EtOH (10.0 mL) was added $N_2H_4·H_2O$ (2.5 mL, purity 98%). The mixture was stirred at 80° C. for 3 h. The reaction was concentrated under reduced pressure to give a residue. DCM (30.0 mL) was added to the residue. The resulting mixture was filtered and the filter cake was washed with DCM (10 mL×3). The combined organic layers were concentrated to give benzyl ((1R,3S,4R)-4-amino-3-fluorocyclohexyl)carbamate (530 mg, crude) as a white solid. $^1$H NMR (400 MHz, METHANOL-d$_4$) δ 7.38-7.25 (m, 5H), 5.06 (s, 2H), 4.81-4.65 (m, 1H), 3.76-3.65 (m, 1H), 2.76-2.60 (m, 1H), 2.31-2.19 (m, 1H), 1.98-1.89 (m, 1H), 1.81-1.71 (m, 1H), 1.66-1.41 (m, 2H), 1.33 (dq, J=3.7, 12.4 Hz, 1H).

Step 6

To a solution of benzyl ((1R,3S,4R)-4-amino-3-fluorocyclohexyl)carbamate (430 mg, 1.61 mmol) in DCM (15 mL) was added Boc$_2$O (704 mg, 3.2 mmol, 741.8 uL) and TEA (490 mg, 4.8 mmol, 674.2 uL). The mixture was stirred at 25° C. for 3 h. The reaction was concentrated under reduced pressure to give a residue. The residue was purified by flash silica gel chromatography to afford benzyl tert-butyl ((1R,2S,4R)-2-fluorocyclohexane-1,4-diyl)dicarbamate (530 mg, 1.1 mmol, 71.6% yield) as a white solid. $^1$H NMR (400 MHz, METHANOL-d$_4$) δ 7.48-7.22 (m, 5H), 5.06 (s, 2H), 4.71 (br s, 1H), 3.72 (tt, J=4.1, 12.0 Hz, 1H), 3.58-3.39 (m, 1H), 2.31-2.19 (m, 1H), 2.01-1.89 (m, 1H), 1.76-1.66 (m, 2H), 1.63-1.34 (m, 11H).

Step 7

To a solution of benzyl tert-butyl ((1R,2S,4R)-2-fluorocyclohexane-1,4-diyl)dicarbamate (530 mg, 1.4 mmol) in MeOH (10.0 mL) and THF (10.0 mL) was added Pd(OH)$_2$/C (400 mg, 20% purity) under $N_2$ atmosphere. The suspension was degassed and purged with $H_2$ for 3 times. The mixture was stirred under $H_2$ (15 Psi) at 25° C. for 4 h. The suspension was filtered through a pad of Celite and filter cake was washed with MeOH (20.0 mL×3). The combined filtrates were concentrated to dryness to give benzyl tert-butyl ((1R,2S,4R)-2-fluorocyclohexane-1,4-diyl)dicarbamate (330 mg, crude) as a yellow oil.

Step 8

To a solution of benzyl tert-butyl ((1R,2S,4R)-2-fluorocyclohexane-1,4-diyl)dicarbamate (330 mg, 1.4 mmol) in MeOH (15.0 mL) was added (HCHO)n (570 mg, 6.3 mmol) and AcOH (8 mg, 142.0 umol, 8.1 uL) at 25° C. for 1 h. NaBH$_3$CN (446 mg, 7.1 mmol) was then added and the mixture was stirred at 45° C. for 12 h. The reaction mixture was concentrated under reduced pressure. The residue was diluted with saturated aqueous NaHCO$_3$ (20.0 mL) and extracted with DCM (10×3). The combined organic solution was dried over Na$_2$SO$_4$, filtered and concentrated under reduced pressure to give tert-butyl ((1R,2S,4R)-4-(dimethylamino)-2-fluorocyclohexyl)carbamate (300 mg, crude) as a white solid. $^1$H NMR (400 MHz, METHANOL-d$_4$) δ 4.89 (br s, 0.5H), 4.77 (br s, 0.5H), 3.55-3.39 (m, 1H), 2.68-2.58 (m, 1H), 2.27 (s, 6H), 2.22 (td, J=4.2, 8.8 Hz, 1H), 1.98-1.89 (m, 1H), 1.84-1.73 (m, 1H), 1.63 (dq, J=3.9, 12.7 Hz, 2H), 1.56-1.31 (m, 10H).

Step 9

A solution of tert-butyl ((1R,2S,4R)-4-(dimethylamino)-2-fluorocyclohexyl)carbamate (300 mg, 1.1 mmol) in HCl/EtOAc (5.0 mL, 4 M) was stirred at 25° C. for 1 h. The reaction mixture was concentrated under reduced pressure to give (1R,3S,4R)-3-fluoro-N1,N1-dimethylcyclohexane-1,4-diamine (226 mg, crude, HC) as a white solid.

Step 10

To a solution of (1R,3S,4R)-3-fluoro-N1,N1-dimethylcyclohexane-1,4-diamine (50 mg, 254.2 umol, HCl) in n-BuOH (3.0 mL) was added DIEA (98 mg, 762.6 umol, 132.8 uL) and 2-chloro-N-(5-(8-ethyl-2-fluoroquinazolin-6-yl)-6-methylpyridin-2-yl)benzenesulfonamide (116 mg, 254.2 umol). The mixture was stirred at 100° C. for 12 h. The reaction was concentrated under reduced pressure to give a residue. The residue was purified by prep-HPLC (FA condition) to afford 2-chloro-N-(5-(2-(((1R,2S,4R)-4-(dimethylamino)-2-fluorocyclohexyl)amino)-8-ethylquinazolin-6-yl)-6-methylpyridin-2-yl)benzenesulfonamide (37.7 mg, 55.8 umol, 21.9% yield, FA) as a white solid. M+H$^+$=597.2 (LCMS); $^1$H NMR (400 MHz, METHANOL-d$_4$) δ 9.03 (s, 1H), 8.43 (br s, 1H), 8.25-8.20 (m, 1H), 7.66 (d, J=8.9 Hz, 1H), 7.56-7.43 (m, 5H), 7.20 (d, J=8.8 Hz, 1H), 5.38-5.17 (m, 1H), 4.34-4.18 (m, 1H), 3.62-3.51 (m, 1H), 3.07 (q, J=7.5 Hz, 2H), 2.88 (s, 6H), 2.55 (dt, J=3.9, 8.5 Hz, 1H), 2.37 (s, 3H), 2.27-2.14 (m, 2H), 2.13-1.75 (m, 3H), 1.31 (t, J=7.5 Hz, 3H).

Example 34: Synthesis of 2-chloro-N-(5-(2-(((1r,4r)-4-(dimethylamino)cyclohexyl)amino)-8-ethylquinazolin-6-yl)-6-methylpyridin-2-yl)-3-fluorobenzenesulfonamide (158)
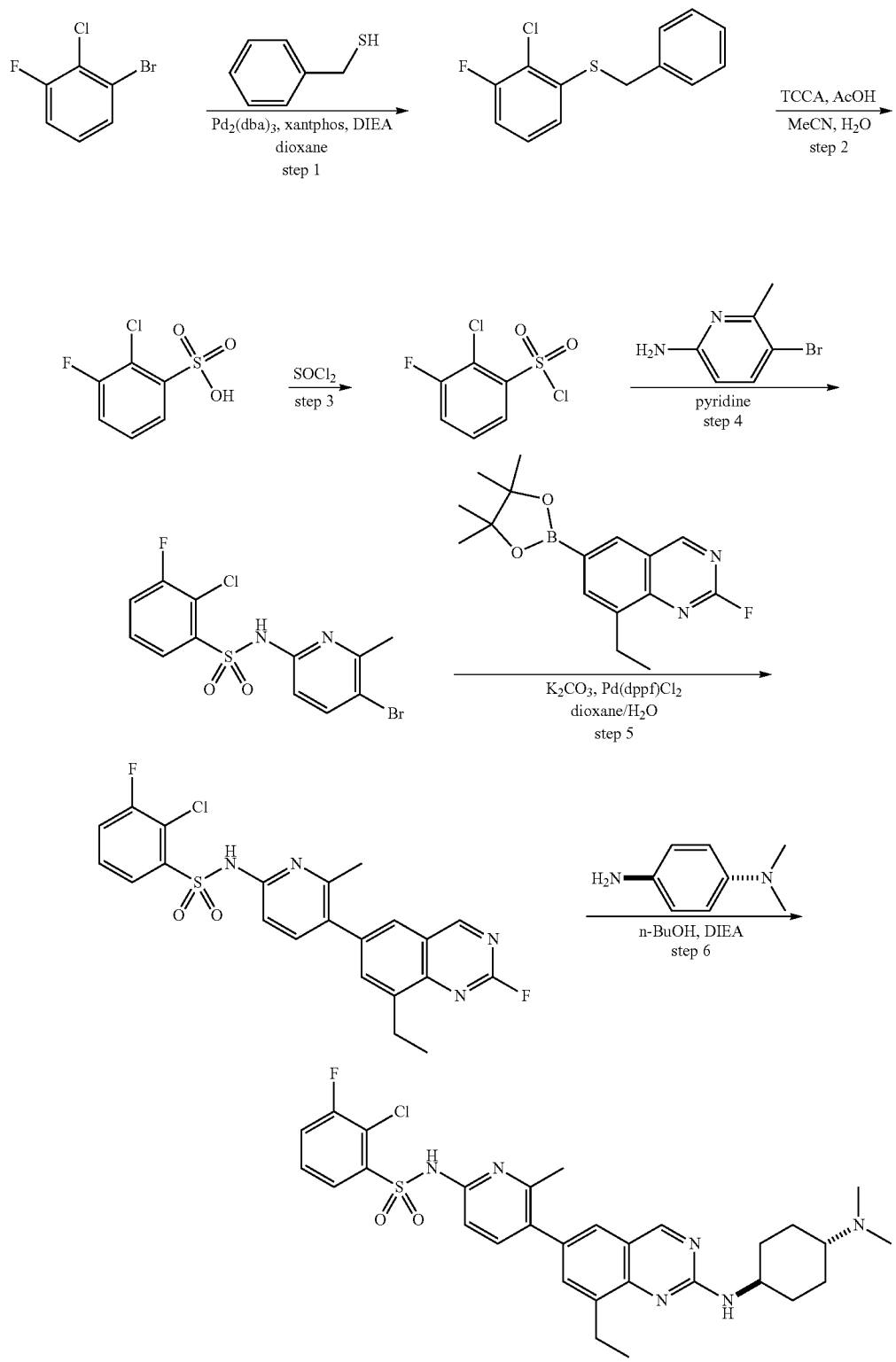

Step 1

A mixture of 1-bromo-2-chloro-3-fluoro-benzene (1 g, 4.7 mmol), phenylmethanethiol (712 mg, 5.7 mmol), Pd$_2$(dba)$_3$ (875 mg, 954.9 umol), DIEA (1.9 g, 14.3 mmol) and Xantphos (552.5 mg, 954.9 umol,) in dioxane (20.0 mL) was degassed and purged with N$_2$ for 3 times, and then the mixture was stirred at 100° C. for 12 h under N$_2$ atmosphere. The reaction mixture was concentrated under reduced pressure. The residue was purified by column chromatography (SiO$_2$) to give benzyl(2-chloro-3-fluorophenyl)sulfane (800 mg, 46.4% yield) as a yellow oil. $^1$H NMR (400 MHz, CHLOROFORM-d) δ 7.28-7.16 (m, 5H), 7.06-7.01 (m, 1H), 6.95-6.93 (m, 1H), 6.87 (dt, J=1.3, 8.4 Hz, 1H), 4.08 (s, 2H).

Step 2

To a solution of benzyl(2-chloro-3-fluorophenyl)sulfane (550 mg, 2.2 mmol) in MeCN (10.0 mL) was added TCCA (505 mg, 2.2 mmol) and AcOH (13 mg, 217.6 umol), H$_2$O (7 mg, 435.2 umol). The mixture was stirred at 0° C. for 1 h. The reaction mixture was diluted with H$_2$O (10.0 mL) and extracted with ethyl acetate (10.0 mL×3). The combined organic layers were washed with brine (5.0 mL×2), dried over Na$_2$SO$_4$, filtered and concentrated under reduced pressure to give a residue. The residue was purified by column chromatography (SiO$_2$) to afford 2-chloro-3-fluorobenzenesulfonic acid (300 mg, 30.1% yield) as a colorless oil. M−H$^+$=208.9 (LCMS).

Step 3

A solution of 2-chloro-3-fluorobenzenesulfonic acid (400 mg, 1.9 mmol) in SOCl$_2$ (5.0 mL) was stirred at 60° C. for 12 h. The reaction mixture was concentrated under reduced pressure to afford 2-chloro-3-fluorobenzenesulfonyl chloride (360 mg, crude) as a brown oil.

Step 4

To a solution of 2-chloro-3-fluorobenzenesulfonyl chloride (100 mg, 436.6 umol) in pyridine (2.0 mL) was added 5-bromo-6-methyl-pyridin-2-amine (81 mg, 436.6 umol). The mixture was stirred at 45° C. for 12 h. The reaction mixture was concentrated under reduced pressure to give a residue. The residue was purified by column chromatography (SiO$_2$) to give N-(5-bromo-6-methylpyridin-2-yl)-2-chloro-3-fluorobenzenesulfonamide (50 mg, 24.8% yield) as a yellow oil. M+H$^+$=381.0 (LCMS).

Step 5

A mixture of N-(5-bromo-6-methylpyridin-2-yl)-2-chloro-3-fluorobenzenesulfonamide (50 mg, 65.9 umol), 8-ethyl-2-fluoro-6-(4,4,5,5-tetramethyl-1,3,2-dioxaborolan-2-yl)quinazoline (29.9 mg, 988 umol), K$_2$CO$_3$ (27 mg, 197.6 umol), Pd(dppf)Cl$_2$ (4.8 mg, 6.6 umol) and H$_2$O (0.2 mL) in dioxane (2.0 mL) was degassed and purged with N$_2$ for 3 times, and then the mixture was stirred at 90° C. for 12 h under N$_2$ atmosphere. The reaction mixture was concentrated under reduced pressure to give a residue. The residue was purified by prep-TLC (SiO$_2$) to give 2-chloro-N-(5-(8-ethyl-2-fluoroquinazolin-6-yl)-6-methylpyridin-2-yl)-3-fluorobenzenesulfonamide as a pale yellow solid (50 mg). M+H$^+$=475.1 (LCMS).

Step 6

To a solution of 2-chloro-N-(5-(8-ethyl-2-fluoroquinazolin-6-yl)-6-methylpyridin-2-yl)-3-fluorobenzenesulfonamide (50 mg, 105.3 umol) in n-BuOH (2.0 mL) was added DIEA (68.0 mg, 526.4 umol) and (1r,4r)-N1,N1-dimethylcyclohexane-1,4-diamine (37 mg, 210.6 umol, HCl). The mixture was stirred at 100° C. for 12 h. The reaction mixture was concentrated under reduced pressure to give a residue. The residue was purified by prep-HPLC (FA condition) to afford 2-chloro-N-(5-(2-(((1r,4r)-4-(dimethylamino)cyclohexyl)amino)-8-ethylquinazolin-6-yl)-6-methylpyridin-2-yl)-3-fluorobenzenesulfonamide (9.9 mg, 14.7% yield, FA) as a white solid. M+H$^+$=597.2 (LCMS); $^1$H NMR (400 MHz, METHANOL-d$_4$) δ 9.01 (s, 1H), 8.57 (s, 1H), 8.06 (d, J=7.5 Hz, 1H), 7.73 (d, J=8.9 Hz, 1H), 7.57-7.43 (m, 4H), 7.27 (d, J=9.0 Hz, 1H), 4.04-3.92 (m, 1H), 3.16-3.04 (m, 2H), 2.94 (br t, J=11.6 Hz, 1H), 2.70 (s, 6H), 2.41 (s, 3H), 2.37 (br d, J=11.7 Hz, 2H), 2.15 (br d, J=11.7 Hz, 2H), 1.71-1.58 (m, 2H), 1.54-1.42 (m, 2H), 1.34 (t, J=7.5 Hz, 3H).

Example 35: Synthesis of 2,3-dichloro-N-(5-(2-(((1r,4r)-4-(dimethylamino)cyclohexyl)amino)-8-ethylquinazolin-6-yl)-6-methylpyridin-2-yl)benzenesulfonamide (152)

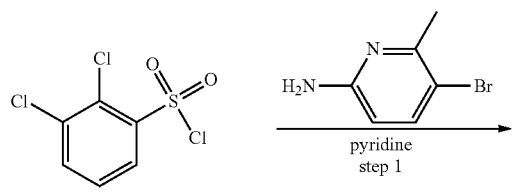

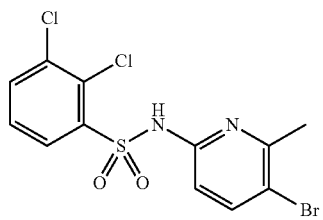 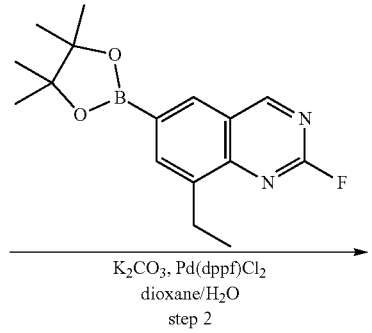

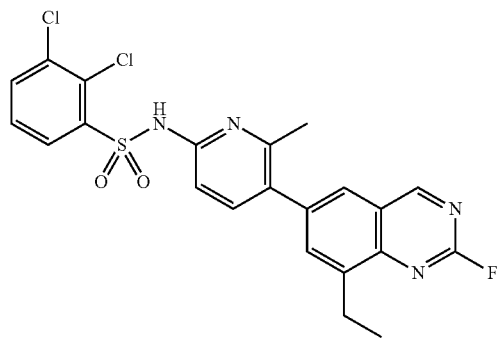 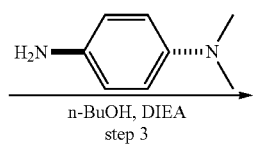

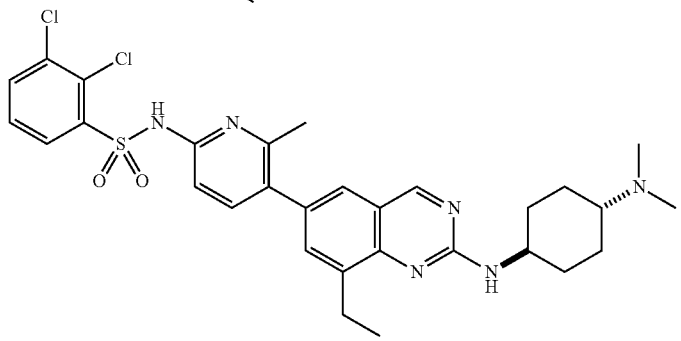

The title compound was synthesized according to the synthetic procedure described in Example 34 to afford 2,3-dichloro-N-(5-(2-(((1r,4r)-4-(dimethylamino)cyclohexyl)amino)-8-ethylquinazolin-6-yl)-6-methylpyridin-2-yl)benzenesulfonamide (37.7 mg, 31.1% yield, FA) as a pale yellow solid. M+H$^+$=613.2 (LCMS); $^1$H NMR (400 MHz, METHANOL-$d_4$) δ 8.99 (s, 1H), 8.37 (br s, 1H), 8.18 (dd, J=1.3, 7.9 Hz, 1H), 7.77-7.69 (m, 2H), 7.55-7.48 (m, 2H), 7.45 (t, J=7.9 Hz, 1H), 7.25 (d, J=9.0 Hz, 1H), 4.03-3.93 (m, 1H), 3.29-3.23 (m, 1H), 3.07 (q, J=7.4 Hz, 2H), 2.89 (s, 6H) 2.39 (s, 5H), 2.19 (br d, J=12.1 Hz, 2H), 1.80-1.66 (m, 2H), 1.55-1.43 (m, 2H), 1.31 (t, J=7.5 Hz, 3H).

Example 36: Synthesis of 2-chloro-N-(5-(2-(((1r,4r)-4-(dimethylamino)cyclohexyl)amino)quinazolin-6-yl)-3-fluoro-6-methylpyridin-2-yl)benzenesulfonamide (153)

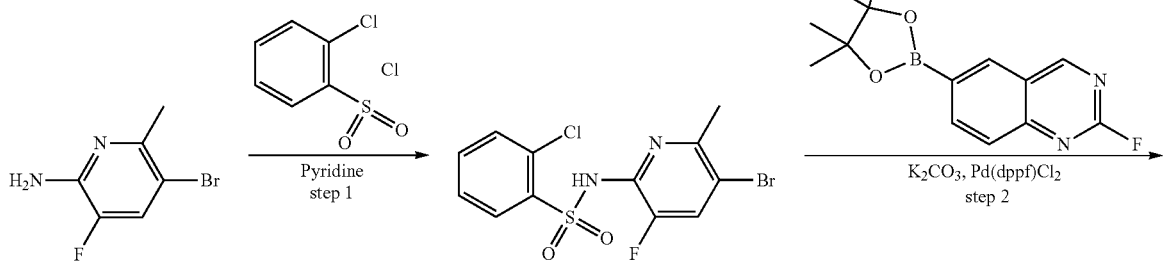

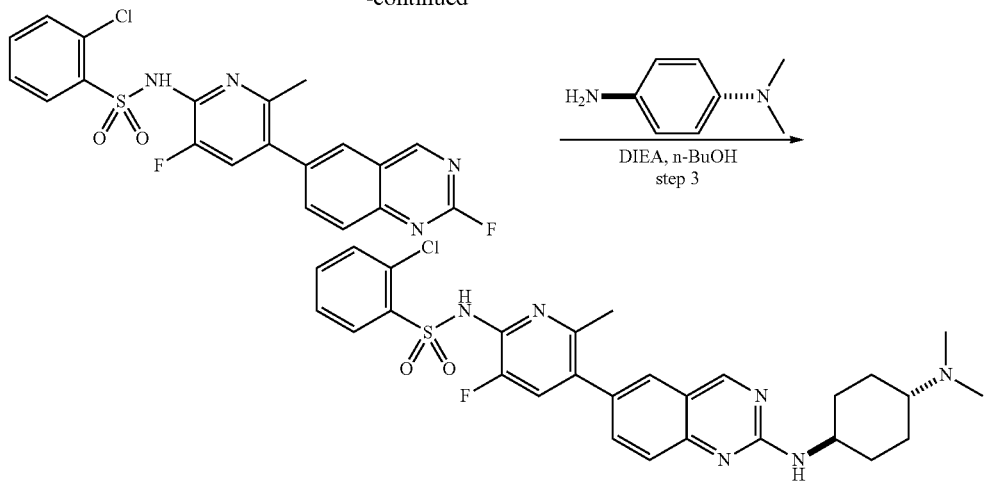

The title compound was synthesized according to the synthetic procedure described in Example 34 to afford 2-chloro-N-(5-(2-(((1r,4r)-4-(dimethylamino)cyclohexyl)amino)quinazolin-6-yl)-3-fluoro-6-methylpyridin-2-yl)benzenesulfonamide (18.9 mg, 16.9% yield, FA) as a pale yellow solid. M+H⁺=569.2 (LCMS). ¹H NMR (400 MHz, METHANOL-$d_4$) δ 9.05 (s, 1H), 8.55 (br s, 1H), 8.33 (dd, J=1.4, 7.6 Hz, 1H), 7.75-7.62 (m, 2H), 7.61-7.50 (m, 4H), 7.43 (d, J=10.6 Hz, 1H), 4.10-3.91 (m, 1H), 3.28-3.15 (m, 1H), 2.87 (s, 6H), 2.38-2.26 (m, 2H), 2.23-2.15 (m, 5H), 1.80-1.67 (m, 2H), 1.57-1.43 (m, 2H).

Example 37: Synthesis of 2-chloro-N-(5-(2-(((1r, 4r)-4-(dimethylamino)cyclohexyl)amino)-8-ethylquinazolin-6-yl)-4-methoxypyrimidin-2-yl)benzenesulfonamide (154)

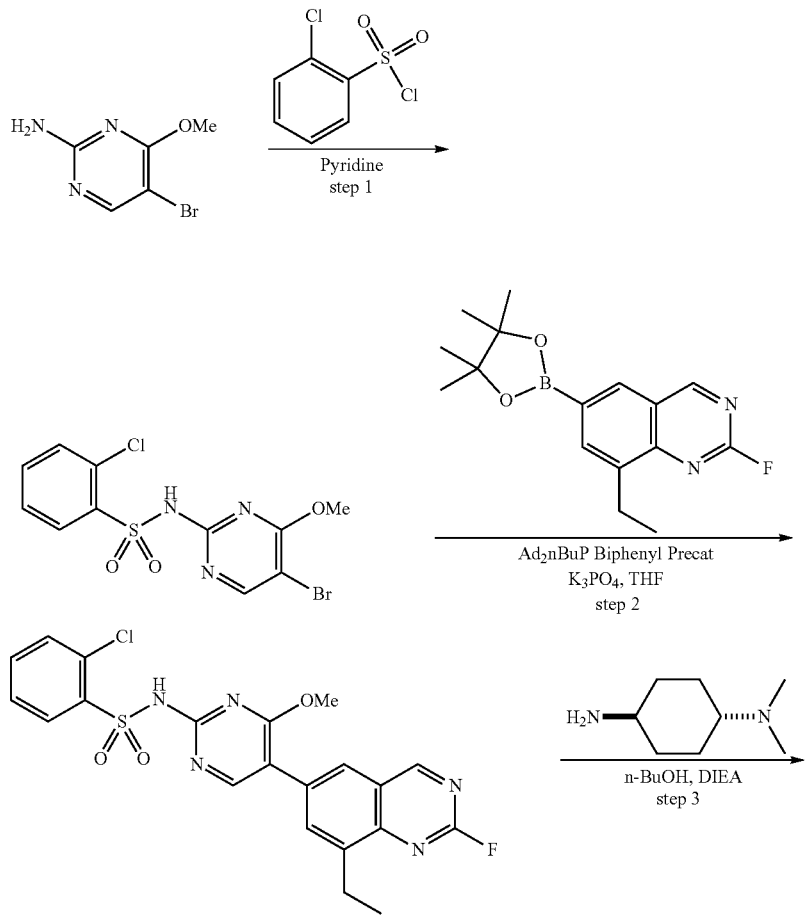

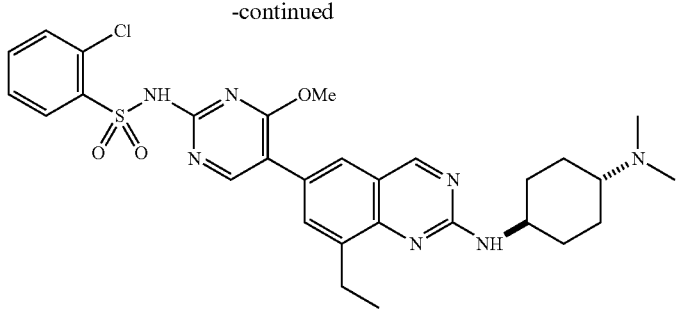

Step 1

To a solution of 5-bromo-4-methoxypyrimidin-2-amine (400 mg, 1.9 mmol) in pyridine (6.0 mL) was added 2-chlorobenzenesulfonyl chloride (620 mg, 2.9 mmol, 400.4 uL). The mixture was stirred at 45° C. for 16 h. Additional 2-chlorobenzenesulfonyl chloride (827 mg, 3.9 mmol, 533.9 uL) was added and the mixture was stirred at 45° C. for 5 h. The reaction mixture was concentrated under reduced pressure. The crude product was triturated with MTBE (5.0 mL), ethyl acetate (5.0 mL), and methanol (2.0 mL) at 25° C. for 15 min. Then the mixture was filtered to give N-(5-bromo-4-methoxypyrimidin-2-yl)-2-chlorobenzenesulfonamide (170 mg, 17.7% yield) as a yellow solid. M+H$^+$=379.8 (LCMS).

Step 2

A mixture of N-(5-bromo-4-methoxypyrimidin-2-yl)-2-chlorobenzenesulfonamide (90 mg, 237.7 umol), 8-ethyl-2-fluoro-6-(4,4,5,5-tetramethyl-1,3,2-dioxaborolan-2-yl)quinazoline (71 mg, 237.7 umol), K$_3$PO$_4$ (0.5 M, 1.4 mL), and [2-(2-aminophenyl)phenyl]-chloro-palladium; bis(1-adamantyl)-butyl-phosphane (15 mg, 23.7 umol) in THF (5.0 mL) was degassed and purged with N$_2$ for 3 times, and then the mixture was stirred at 80° C. for 12 h under N$_2$ atmosphere. The reaction mixture was concentrated under reduced pressure. The residue was purified by prep-TLC (SiO$_2$) to afford 2-chloro-N-(5-(8-ethyl-2-fluoroquinazolin-6-yl)-4-methoxypyrimidin-2-yl)benzenesulfonamide (104 mg, 28.2% yield) as a yellow solid. M+H$^+$=474.3 (LCMS).

Step 3

A mixture of (1r,4r)-N1,N1-dimethylcyclohexane-1,4-diamine (62 mg, 438.9 umol, HCl), 2-chloro-N-(5-(8-ethyl-2-fluoroquinazolin-6-yl)-4-methoxypyrimidin-2-yl)benzenesulfonamide (104 mg, 219.4 umol), DIEA (141.8 mg, 1.1 mmol, 191.1 uL) in n-BuOH (2.0 mL), and then the mixture was stirred at 100° C. for 12 h. The reaction mixture was concentrated under reduced pressure. The residue was purified by prep-HPLC (FA condition) to afford 2-chloro-N-(5-(2-(((1r,4r)-4-(dimethylamino)cyclohexyl)amino)-8-ethylquinazolin-6-yl)-4-methoxypyrimidin-2-yl)benzenesulfonamide (10.2 mg, 7.1% yield, FA) as a pale yellow solid. M+H$^+$=596.2; $^1$H NMR (400 MHz, METHANOL-d$_4$) δ 8.94 (s, 1H), 8.53 (br s, 1H), 8.30 (d, J=7.7 Hz, 1H), 8.12 (s, 1H), 7.62 (d, J=8.2 Hz, 2H), 7.55-7.44 (m, 3H), 4.02-3.88 (m, 1H), 3.67 (s, 3H), 3.15 (br d, J=6.0 Hz, 1H), 3.02 (q, J=7.4 Hz, 2H), 2.87-2.77 (m, 6H), 2.36 (br d, J=10.8 Hz, 2H), 2.16 (br d, J=11.9 Hz, 2H), 1.76-1.62 (m, 2H), 1.54-1.40 (m, 2H), 1.32-1.24 (m, 3H).

Example 38: Synthesis of 2-chloro-N-(5-(2-(((1r,4r)-4-(dimethylamino)cyclohexyl)amino)-8-fluoroquinazolin-6-yl)-3-fluoro-6-methylpyridin-2-yl)benzenesulfonamide (156)

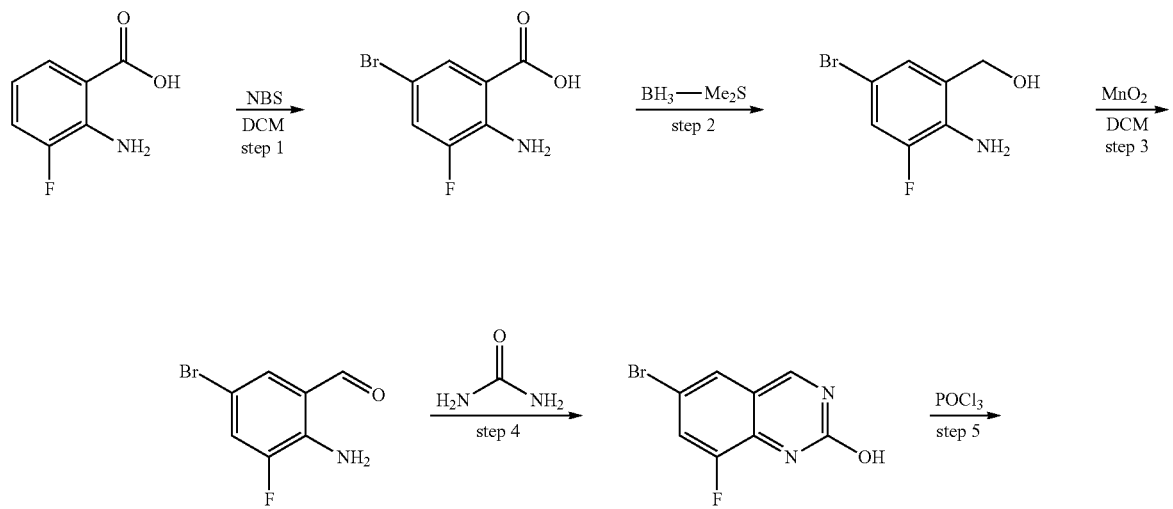

-continued

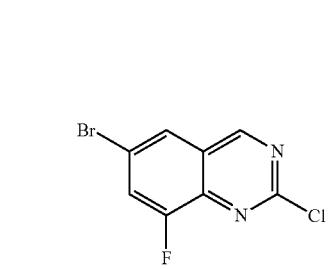
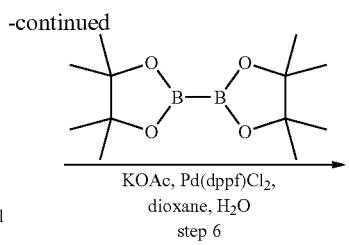

KOAc, Pd(dppf)Cl₂,
dioxane, H₂O
step 6

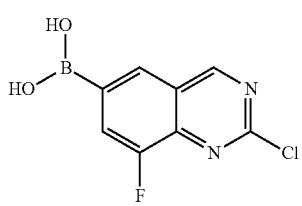
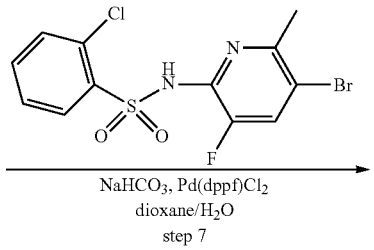

NaHCO₃, Pd(dppf)Cl₂
dioxane/H₂O
step 7

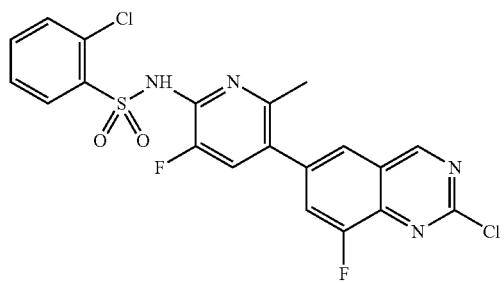
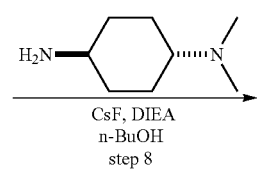

CsF, DIEA
n-BuOH
step 8

Step 1

To a solution of 2-amino-3-fluoro-benzoic acid (10.0 g, 64.4 mmol) in DCM (100.0 mL) was added NBS (11.4 g, 64.4 mmol) in small portions at 20° C. The resulting mixture was stirred at 20° C. for 3 h. The reaction mixture was filtered. The cake was collected and dried to give 2-amino-5-bromo-3-fluorobenzoic acid (14.9 g, crude) as a yellow solid. $^1$H NMR (400 MHz, DMSO-$d_6$) δ 11.07 (br s, 1H), 7.66-7.60 (m, 1H), 7.52 (dd, J=2.4, 10.7 Hz, 1H).

Step 2

To a solution of 2-amino-5-bromo-3-fluorobenzoic acid (1.0 g, 4.2 mmol) in THF (10.0 mL) was added BH₃-Me₂S (10 M, 10.0 mL) at 0° C. The reaction mixture was stirred at 20° C. for 4 h. The reaction mixture was quenched with MeOH (100.0 mL) and then the mixture was concentrated under reduced pressure. The residue was diluted with aqueous sodium bicarbonate (25.0 mL) and extracted with ethyl acetate (30.0 mL×3). The combined organic layers were washed with brine (30.0 mL×3), dried over Na₂SO₄, and concentrated under reduced pressure to give a residue. The residue was purified by column chromatography (SiO₂) to give (2-amino-5-bromo-3-fluorophenyl)methanol (740 mg) as a white solid. $^1$H NMR (400 MHz, DMSO-$d_6$) δ 7.18 (dd, J=2.3, 10.6 Hz, H), 7.12 (s, 1H), 5.26 (t, J=5.6 Hz, 1H), 5.06 (s, 2H), 4.40 (d, J=5.5 Hz, 2H).

Step 3

To a solution of (2-amino-5-bromo-3-fluorophenyl)methanol (740 mg, 3.3 mmol) in DCM (50.0 mL) was added MnO₂ (2.9 g, 33.6 mmol). The mixture was stirred at 20° C. for 12 h. The reaction mixture was filtered. The filtrate was concentrated under reduced pressure. The residue was purified by column chromatography (SiO₂) to afford 2-amino-5-bromo-3-fluorobenzaldehyde (585 mg, 71.8% yield) as a yellow solid. $^1$H NMR (400 MHz, CHLOROFORM-d) δ 9.84 (d, J=2.0 Hz, 1H), 7.49-7.43 (m, 1H), 7.30 (dd, J=2.1, 10.5 Hz, 1H), 6.50-5.84 (m, 2H).

Step 4

A mixture of 2-amino-5-bromo-3-fluorobenzaldehyde (585 mg, 2.68 mmol) and urea (2.4 g, 40.2 mmol, 2.1 mL) was heated 180° C. for 4 h. The reaction mixture was poured into H₂O (30.0 mL) and the resulting mixture was filtered.

The cake was washed with H₂O (10.0 mL×3) to give 6-bromo-8-fluoroquinazolin-2-ol (650 mg, crude) as a yellow solid.

Step 5

A solution of 6-bromo-8-fluoroquinazolin-2-ol (650 mg, 2.6 mmol) in POCl₃ (7.0 mL) was stirred at 110° C. for 2 h. The reaction mixture was concentrated under reduced pressure. The residue was diluted with NaHCO₃ (20.0 mL) and extracted with ethyl acetate (15.0 mL×3). The combined organic layers were washed with brine (15.0 mL×3), dried over Na₂SO₄, filtered, and concentrated under reduced pressure to give a residue. The residue was purified by flash silica gel chromatography to give 6-bromo-2-chloro-8-fluoroquinazoline (370 mg, 51.3% yield) as a pale yellow solid. M+H⁺=262.8 (LCMS).

Step 6

A mixture of 6-bromo-2-chloro-8-fluoroquinazoline (350 mg, 1.3 mmol), 4,4,4',4',5,5,5',5'-octamethyl-2,2'-bi(1,3,2-dioxaborolane) (373 mg, 1.4 mmol), Pd(dppf)Cl₂ (97 mg, 133.8 umol), KOAc (394 mg, 4.0 mmol) in dioxane (12.0 mL) was degassed and purged with N₂ for 3 times, and then the mixture was stirred at 90° C. for 12 h under N₂ atmosphere. The reaction mixture was concentrated under reduced pressure to give a residue. EtOAc (20.0 mL) was added to the residue. The resulting mixture was filtered and the filtrate was concentrated to give a residue. The residue was purified by flash silica gel chromatography to give (2-chloro-8-fluoroquinazolin-6-yl)boronic acid (300 mg, 88.1% yield) as a yellow solid. M+H⁺=227.2 (LCMS).

Step 7

A mixture of (2-chloro-8-fluoroquinazolin-6-yl)boronic acid (120 mg, 530.0 umol), N-(5-bromo-3-fluoro-6-methylpyridin-2-yl)-2-chlorobenzenesulfonamide (201 mg, 530.0 umol), Pd(dppf)Cl₂ (38 mg, 53.0 umol), and NaHCO₃ (133 mg, 1.5 mmol, 61.8 uL) in dioxane (4.0 mL) and H₂O (0.4 mL) was degassed and purged with N₂ 3 times. The reaction mixture was stirred at 80° C. for 12 h under N₂ atmosphere. The reaction mixture was concentrated under reduced pressure to give a residue. Ethyl acetate (10.0 mL) was added to the residue. The resulting mixture was filtered and the filtrate was concentrated to give a residue. The residue was purified by flash silica gel chromatography to give 2-chloro-N-(5-(2-chloro-8-fluoroquinazolin-6-yl)-3-fluoro-6-methylpyridin-2-yl)benzenesulfonamide (56 mg, 14.7% yield) as a yellow solid. M+H⁺=481.2 (LCMS).

Step 8

To a solution of (1r,4r)-N1,N1-dimethylcyclohexane-1,4-diamine (41 mg, 232.7 umol, HCl) in n-BuOH (3.0 mL) was added DIEA (45 mg, 349.0 umol, 60.8 uL), 2-chloro-N-(5-(2-chloro-8-fluoroquinazolin-6-yl)-3-fluoro-6-methylpyridin-2-yl)benzenesulfonamide (56 mg, 116.3 umol), and CsF (17 mg, 116.3 umol). The reaction vessel was sealed and heated under microwave at 140° C. for 4 h. The reaction mixture was concentrated under reduced pressure to give a residue. The residue was purified by prep-HPLC (FA condition) to give 2-chloro-N-(5-(2-(((1r,4r)-4-(dimethylamino)cyclohexyl)amino)-8-fluoroquinazolin-6-yl)-3-fluoro-6-methylpyridin-2-yl)benzenesulfonamide (12.9 mg, 17.7% yield) as a yellow solid. M+H⁺=587.2 (LCMS); ¹H NMR (400 MHz, METHANOL-d₄) δ 9.03 (br s, 1H), 8.52 (br s, 1H), 8.31 (d, J=7.7 Hz, 1H), 7.58-7.44 (m, 4H), 7.41 (d, J=10.8 Hz, 2H), 4.02 (tt, J=3.9, 11.5 Hz, 1H), 3.23 (br t, J=12.0 Hz, 1H), 2.86 (s, 6H), 2.30 (br d, J=11.0 Hz, 2H), 2.21-2.12 (m, 5H), 1.79-1.65 (m, 2H), 1.54-1.39 (m, 2H).

Example 39: Synthesis of 2-chloro-N-(5-(2-(((1r, 4r)-4-(dimethylamino)cyclohexyl)amino)-8-fluoro-quinazolin-6-yl)-3-fluoro-6-methoxypyridin-2-yl)benzenesulfonamide (155)

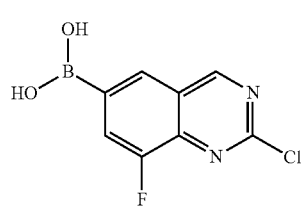

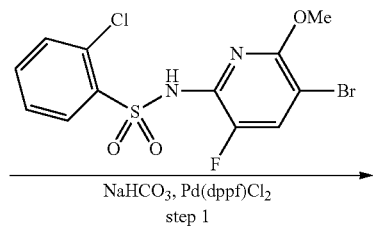

NaHCO₃, Pd(dppf)Cl₂
step 1

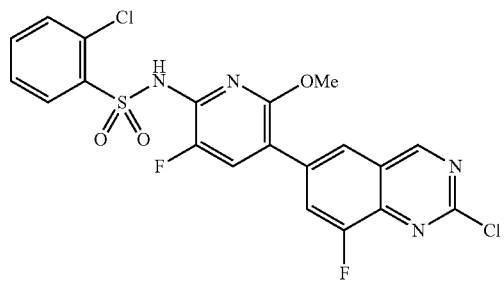

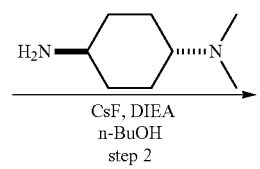

CsF, DIEA
n-BuOH
step 2

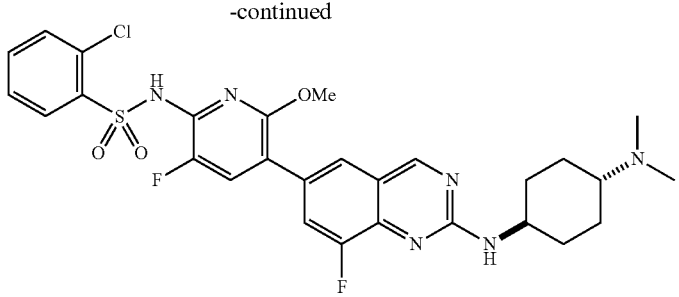

The title compound was synthesized according to the synthetic procedure described in Example 38 to afford 2-chloro-N-(5-(2-(((1r,4r)-4-(dimethylamino)cyclohexyl)amino)-8-fluoroquinazolin-6-yl)-3-fluoro-6-methoxypyridin-2-yl)benzenesulfonamide (2.1 mg, 5.0% yield, FA) as a yellow solid. M+H⁺=603.1; $^1$H NMR (400 MHz, METHANOL-$d_4$) δ 9.04 (s, 1H), 8.32 (d, J=7.7 Hz, 1H), 7.70-7.65 (m, 2H), 7.65-7.62 (m, 1H), 7.59-7.55 (m, 2H), 7.53-7.46 (m, 1H), 4.09-3.97 (m, 1H), 3.49 (s, 3H), 3.28-3.19 (m, 1H), 2.87 (s, 6H), 2.32 (br d, J=10.6 Hz, 2H), 2.16 (br d, J=11.9 Hz, 2H), 1.81-1.63 (m, 2H), 1.57-1.37 (m, 2H).

Example 40: Synthesis of 2-chloro-N-(5-(2-(((1r,4r)-4-(dimethylamino)cyclohexyl)amino)-8-ethylquinazolin-6-yl)-6-methoxypyrazin-2-yl)benzenesulfonamide (157)

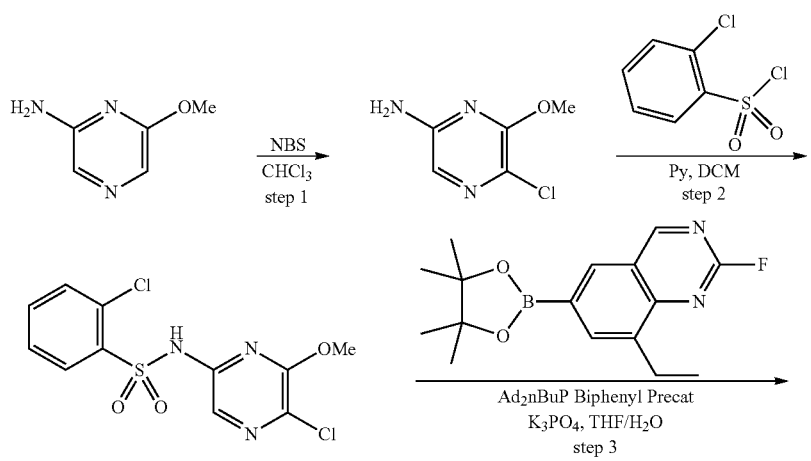

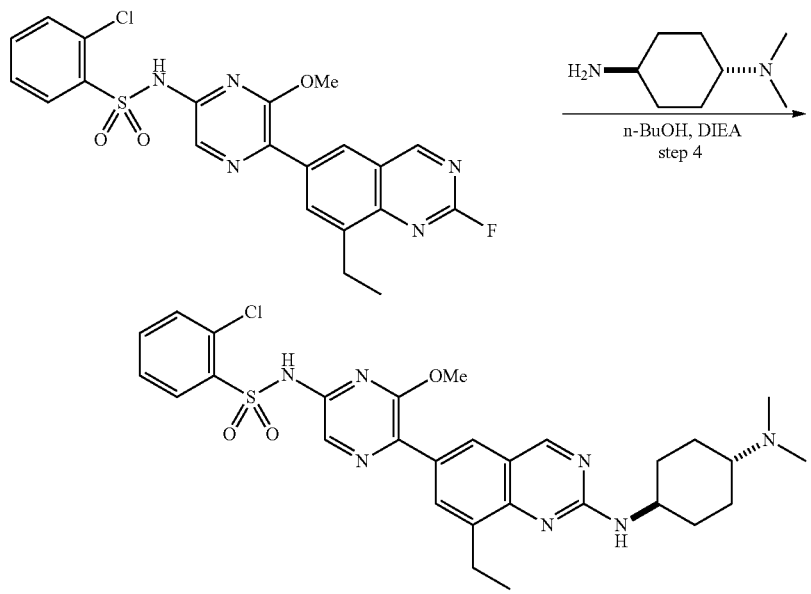

Step 1

To a solution of 6-methoxypyrazin-2-amine (0.5 g, 4.0 mmol) in $CHCl_3$ (25 mL) was added NCS (533 mg, 4.0 mmol). The reaction mixture was stirred at 40° C. for 12 h. The mixture was concentrated to give a residue. The residue was purified by column chromatography ($SiO_2$) to give 5-chloro-6-methoxypyrazin-2-amine (95 mg, 14.9% yield) as a yellow solid. $^1$H NMR (400 MHz, CHLOROFORM-d) δ 7.32 (s, 1H), 4.42 (s, 2H), 3.96 (s, 3H).

Step 2

To a solution of 5-chloro-6-methoxypyrazin-2-amine (95 mg, 595.3 umol) in DCM (8.0 mL) was added pyridine (141 mg, 1.7 mmol) and 2-chlorobenzenesulfonyl chloride (188 mg, 893.0 umol). The reaction mixture was stirred at 45° C. for 12 h. TLC indicated 5-chloro-6-methoxypyrazin-2-amine was remained, so 2-chlorobenzenesulfonyl chloride (62 mg, 293.7 umol) was added and the mixture was stirred at 45° C. for 12 h. The reaction mixture was concentrated to give a residue. The residue was purified by column chromatography ($SiO_2$) to give 2-chloro-N-(5-chloro-6-methoxypyrazin-2-yl)benzenesulfonamide (131 mg, 59.4% yield) as a yellow solid. $M+H^+=333.9$ (LCMS).

Step 3

A mixture of 2-chloro-N-(5-chloro-6-methoxypyrazin-2-yl)benzenesulfonamide (50 mg, 149.6 umol), 8-ethyl-2-fluoro-6-(4,4,5,5-tetramethyl-1,3,2-dioxaborolan-2-yl)quinazoline (45 mg, 149.6 umol), $K_3PO_4$ (0.5 M, 598.4 uL), and [2-(2-aminophenyl)phenyl]-chloro-palladium; bis(1-adamantyl)-butyl-phosphane (10 mg, 14.9 umol) in THF (2.0 mL) was degassed and purged with $N_2$ 3 times. The mixture was stirred at 80° C. for 12 h under $N_2$ atmosphere. The reaction mixture was concentrated to give a residue. The residue was purified by prep-TLC ($SiO_2$) to give 2-chloro-N-(5-(8-ethyl-2-fluoroquinazolin-6-yl)-6-methoxypyrazin-2-yl)benzenesulfonamide (44 mg, crude) as a yellow solid.

Step 4

To a solution of 2-chloro-N-(5-(8-ethyl-2-fluoroquinazolin-6-yl)-6-methoxypyrazin-2-yl)benzenesulfonamide (44 mg, 92.8 umol) in n-BuOH (3.0 mL) was added (1r,4r)-N1,N1-dimethylcyclohexane-1,4-diamine (26 mg, 185.7 umol, HCl) and DIEA (60 mg, 464.2 umol). The reaction mixture was stirred at 100° C. for 12 h. Additional (1r,4r)-N1,N1-dimethylcyclohexane-1,4-diamine (26 mg, 185.7 umol, HCQ) and DIEA (60 mg, 464.2 umol) were added. The reaction mixture was stirred at 100° C. for another 20 h. The reaction mixture was concentrated under reduced pressure to give a residue. The residue was purified by prep-HPLC (FA condition) to give 2-chloro-N-(5-(2-(((1r,4r)-4-(dimethylamino)cyclohexyl)amino)-8-ethylquinazolin-6-yl)-6-methoxypyrazin-2-yl)benzenesulfonamide (5.1 mg, 7.8% yield, FA) as a pale yellow solid. $M+H^+=596.2$ (LCMS); $^1$H NMR (400 MHz, METHANOL-$d_4$) δ 8.98 (s, 1H), 8.56-8.44 (m, 1H), 8.33 (d, J=7.9 Hz, 1H), 8.14 (s, 2H), 7.86 (s, 1H), 7.61-7.48 (m, 3H), 4.03-3.92 (m, 1H), 3.73 (s, 3H), 3.27-3.17 (m, 1H), 3.10-3.02 (m, 2H), 2.88 (s, 6H), 2.44-2.34 (m, 2H), 2.18 (br dd, J=1.7, 12.7 Hz, 2H), 1.81-1.66 (m, 2H), 1.57-1.41 (m, 2H), 1.33 (t, J=7.5 Hz, 3H).

Example 41: Synthesis of 2-chloro-N-(6-(2-(((1r,4r)-4-(dimethylamino)cyclohexyl)amino)-8-ethylquinazolin-6-yl)-5-methoxypyridazin-3-yl)benzenesulfonamide (159)

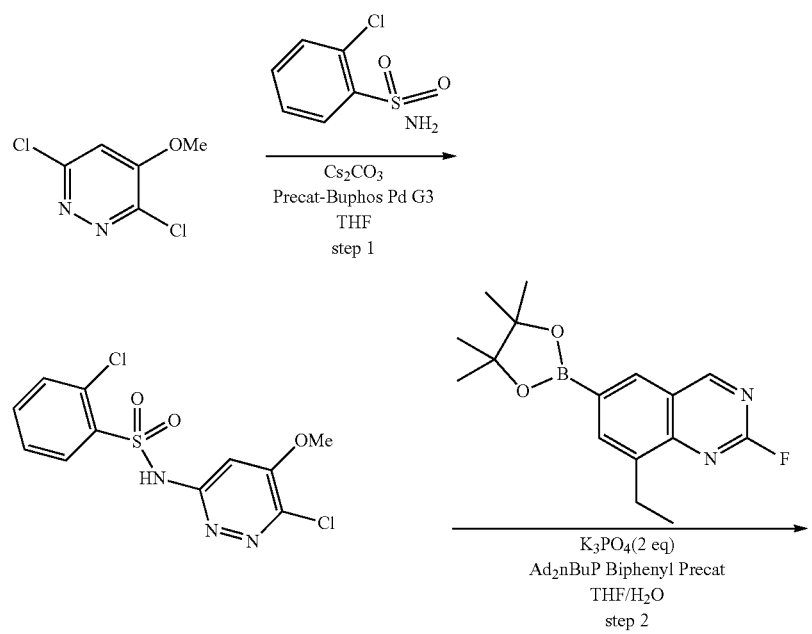

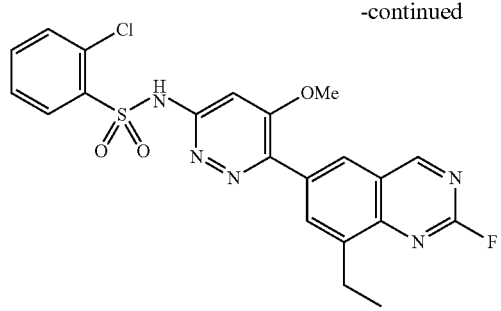 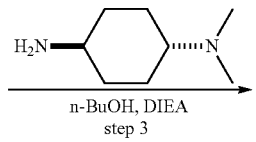

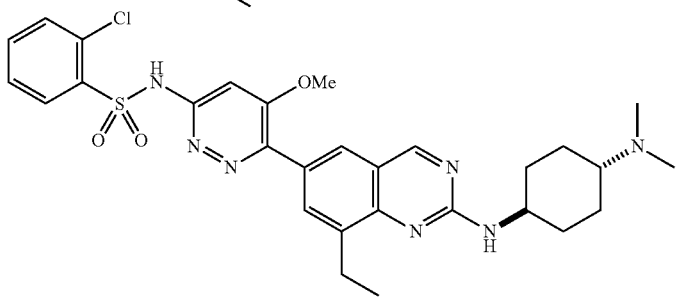

To a solution of 2-chlorobenzenesulfonamide (1.0 g, 5.4 mmol) in THF (40.0 mL) was added 3,6-dichloro-4-methoxypyridazine (0.6 g, 3.6 mmol), [2-(2-aminophenyl)phenyl]-methylsulfonyloxy-palladium; ditert-butyl-[2-(2,4,6-triisopropylphenyl)phenyl]phosphane (288 mg, 363.1 umol), and $Cs_2CO_3$ (2.3 g, 7.2 mmol). The reaction mixture was stirred at 80° C. for 12 h. The reaction mixture was concentrated to give a residue. The residue was diluted with $H_2O$ (20.0 mL) and extracted with EtOAc (20.0 mL×3). The combined organic layers were washed with brine (20.0 mL×3), dried over $Na_2SO_4$, filtered, and concentrated under reduced pressure to give a residue. The residue was purified by prep-HPLC (TFA condition) to give 2-chloro-N-(6-chloro-5-methoxypyridazin-3-yl)benzenesulfonamide (75 mg, 6.1% yield) as a red solid. $^1$H NMR (400 MHz, DMSO-$d_6$) δ 8.13 (d, J=7.3 Hz, 1H), 7.61-7.57 (m, 2H), 7.57-7.48 (m, 1H), 7.24 (br d, J=7.7 Hz, 1H), 3.95 (s, 3H).

Step 2

A mixture of 2-chloro-N-(6-chloro-5-methoxypyridazin-3-yl)benzenesulfonamide (50 mg, 149.6 umol), 8-ethyl-2-fluoro-6-(4,4,5,5-tetramethyl-1,3,2-dioxaborolan-2-yl)quinazoline (54 mg, 179.5 umol), $K_3PO_4$ (0.5 M, 598.4 uL), and [2-(2-aminophenyl)phenyl]-chloro-palladium; bis(1-adamantyl)-butyl-phosphane (10 mg, 14.9 umol) in THF (2.0 mL) was taken up into a microwave tube, then degassed and purged with $N_2$ for 3 times. The sealed tube was heated at 120° C. for 4 h under microwave. The reaction mixture was concentrated under reduced pressure to give a residue. The residue was purified by prep-TLC ($SiO_2$) to afford 2-chloro-N-(6-(8-ethyl-2-fluoroquinazolin-6-yl)-5-methoxypyridazin-3-yl)benzenesulfonamide (14 mg, 16.6% yield) as a yellow solid. M+H$^+$=474.1 (LCMS).

Step 3

To a solution of 2-chloro-N-(6-(8-ethyl-2-fluoroquinazolin-6-yl)-5-methoxypyridazin-3-yl)benzenesulfonamide (21 mg, 44.3 umol) in n-BuOH (1.0 mL) was added (1r,4r)-N1,N1-dimethylcyclohexane-1,4-diamine (15 mg, 88.6 umol, HCl) and DIEA (28 mg, 221.5 umol). The reaction mixture was stirred at 100° C. for 12 h. The reaction mixture was concentrated under reduced pressure to give a residue. The residue was purified by prep-HPLC (FA condition) to give 2-chloro-N-(6-(2-(((1r,4r)-4-(dimethylamino)cyclohexyl)amino)-8-ethylquinazolin-6-yl)-5-methoxypyridazin-3-yl)benzenesulfonamide (3.8 mg, 12.8% yield, FA) as a pale yellow solid. M+H$^+$=596.2 (LCMS); $^1$HNMR (400 MHz, METHANOL-$d_4$) δ 9.03 (s, 1H), 8.59-8.50 (m, 1H), 8.27-8.18 (m, 1H), 8.06 (d, J=1.1 Hz, 1H), 7.94 (s, 1H), 7.63-7.44 (m, 3H), 7.33 (s, 1H), 4.01 (s, 3H), 3.99-3.94 (m, 1H), 3.15-3.01 (m, 3H), 2.77 (s, 6H), 2.37 (br dd, J=1.9, 11.1 Hz, 2H), 2.20-2.10 (m, 2H), 1.82-1.60 (m, 2H), 1.57-1.42 (m, 2H), 1.33 (t, J=7.5 Hz, 3H).

Example 42: Synthesis of 2-chloro-N-(5-(2-(((1r,4r)-4-(dimethylamino)cyclohexyl)amino)-8-ethylquinazolin-6-yl)-6-methylpyridin-2-yl)-3-methylbenzenesulfonamide (160)

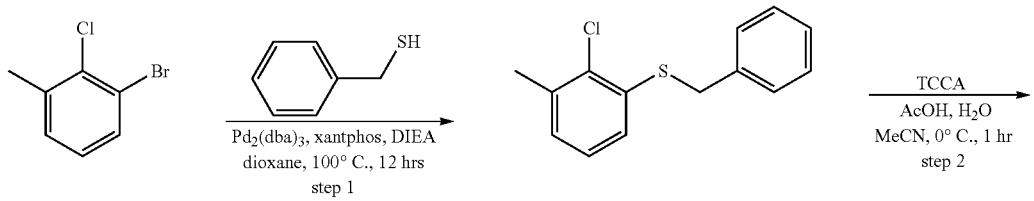

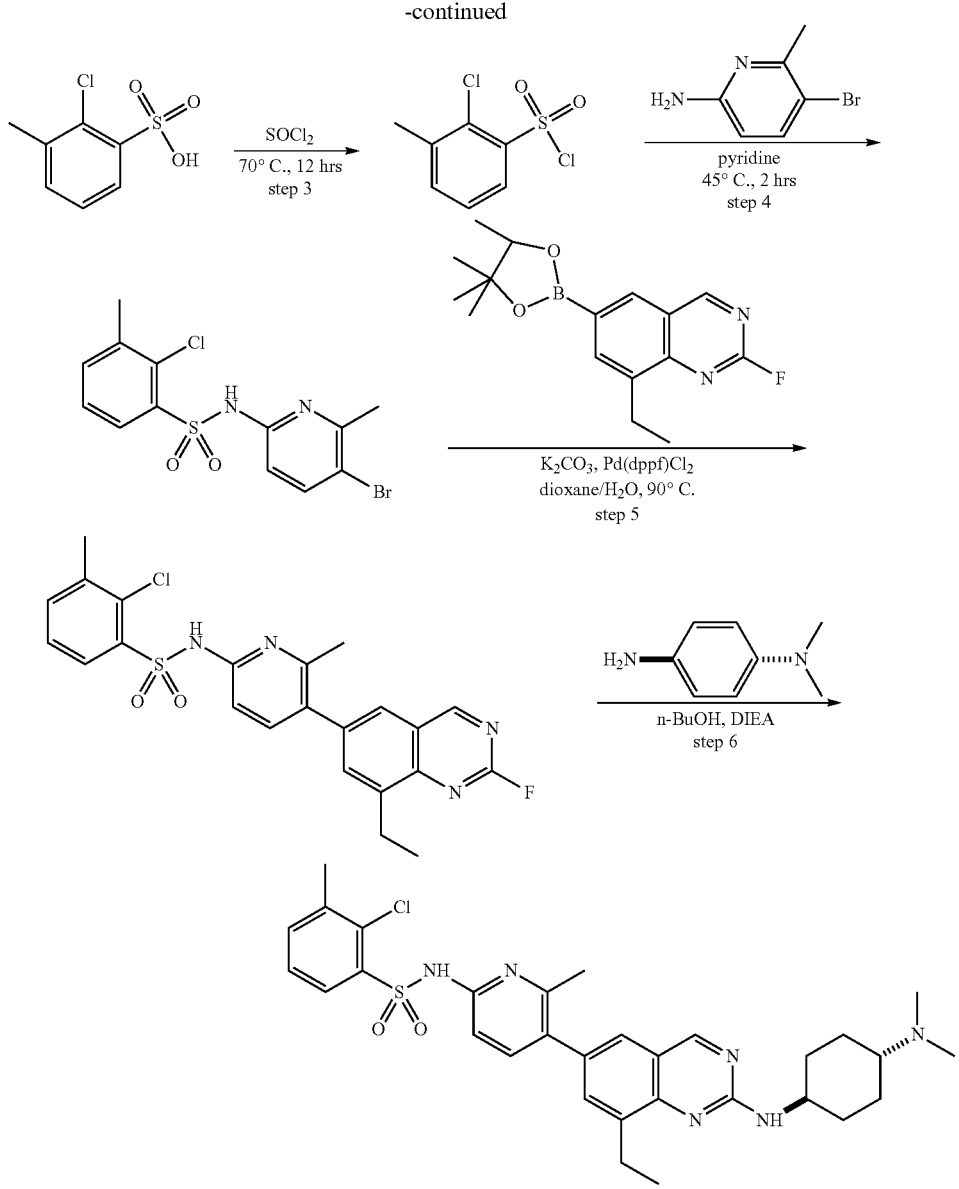

Step 1

A mixture of 1-bromo-2-chloro-3-methyl-benzene (3.0 g, 14.6 mmol), phenylmethanethiol (2.1 g, 17.5 mmol, 2.0 mL), (1E,4E)-1,5-diphenylpenta-1,4-dien-3-one; palladium (2.6 g, 2.9 mmol), DIEA (5.6 g, 43.8 mmol, 7.6 mL), and (5-diphenylphosphanyl-9,9-dimethyl-xanthen-4-yl)-diphenyl-phosphane (1.6 g, 2.9 mmol) in dioxane (60.0 mL) was degassed and purged with $N_2$ for 3 times, and then the mixture was stirred at 100° C. for 12 h under $N_2$ atmosphere. The reaction mixture was concentrated under reduced pressure. The residue was purified by column chromatography ($SiO_2$) to afford benzyl(2-chloro-3-methylphenyl)sulfane (2.6 g, 53.6% yield) as a yellow solid. $^1$HNMR (400 MHz, CHLOROFORM-d) δ 7.44-7.37 (m, 2H), 7.36-7.23 (m, 3H), 7.16-7.03 (m, 3H), 4.42-3.93 (m, 2H), 2.73-2.22 (m, 3H).

Step 2

To a solution of benzyl(2-chloro-3-methylphenyl)sulfane (0.5 g, 2.0 mmol) in MeCN (5.0 mL) was added $H_2O$ (7 mg, 401.9 umol, 7.2 uL) and AcOH (12 mg, 200.9 umol, 11.4 uL) then added trichloroisocyanuric acid (TCCA) (467 mg, 2.0 mmol) at 0° C. The reaction mixture was stirred at 0° C. for 1 h. The reaction mixture was concentrated under reduced pressure. The residue was purified by prep-HPLC (basic condition) to afford 2-chloro-3-methylbenzenesulfonic acid (70 mg, 16.8% yield) as a white solid.

Step 3

A solution of 2-chloro-3-methylbenzenesulfonic acid (100 mg, 483.9 umol) in $SOCl_2$ (4.0 mL) and DMF (0.1 mL) was stirred at 70° C. for 12 h. The reaction mixture was concentrated under reduced pressure to afford 2-chloro-3-methylbenzenesulfonyl chloride (100 mg, crude) as yellow oil.

Step 4

To a solution of 5-bromo-6-methyl-pyridin-2-amine (80 mg, 427.7 umol) in pyridine (2.0 mL) was added 2-chloro- 3-methylbenzenesulfonyl chloride (96 mg, 427.7 umol). The reaction mixture was stirred at 45° C. for 2 h. The reaction mixture was concentrated under reduced pressure. The residue was purified by prep-HPLC (FA condition) to give N-(5-bromo-6-methylpyridin-2-yl)-2-chloro-3-methylbenzenesulfonamide (16 mg, 8.8% yield, FA) as a white solid.

Step 5

A mixture of N-(5-bromo-6-methylpyridin-2-yl)-2-chloro-3-methylbenzenesulfonamide (6 mg, 14.2 umol FA), 8-ethyl-2-fluoro-6-(4,4,5,5-tetramethyl-1,3,2-dioxaborolan-2-yl)quinazoline (4. mg, 14.2 umol), $K_2CO_3$ (5 mg, 42.6 umol), and $Pd(dppf)Cl_2$ (1 mg, 1.4 umol) in dioxane (2.0 mL) and $H_2O$ (0.2 mL) was degassed and purged with $N_2$ for 3 times, and then the mixture was stirred at 90° C. for 12 h under $N_2$ atmosphere. The reaction mixture was concentrated under reduced pressure. The residue was combined with another 10 mg batch and purified by prep-TLC ($SiO_2$) to afford 2-chloro-N-(5-(8-ethyl-2-fluoroquinazolin-6-yl)-6-methylpyridin-2-yl)-3-methylbenzenesulfonamide (20 mg) as a white solid. M+H$^+$=471.2 (LCMS).

Step 6

To a solution of 2-chloro-N-(5-(8-ethyl-2-fluoroquinazolin-6-yl)-6-methylpyridin-2-yl)-3-methylbenzenesulfonamide (20 mg, 42.4 umol) in n-BuOH (2.0 mL) was added DIEA (27 mg, 212.3 umol, 36.9 uL) and (1r,4r)-N1,N1-dimethylcyclohexane-1,4-diamine (15 mg, 84.9 umol, HCl). The reaction mixture was stirred at 100° C. for 12 h. The reaction mixture was concentrated under reduced pressure. The residue was purified by prep-HPLC (FA condition) to give 2-chloro-N-(5-(2-(((1r,4r)-4-(dimethylamino)cyclohexyl)amino)-8-ethylquinazolin-6-yl)-6-methylpyridin-2-yl)-3-methylbenzenesulfonamide (4.7 mg, 16.6% yield, FA) as a pale yellow solid. M+H$^+$=593.2 (LCMS); $^1$H NMR (400 MHz, METHANOL-d$_4$) δ 9.00 (s, 1H), 8.58 (br s, 1H), 8.11 (d, J=7.6 Hz, 1H), 7.67 (d, J=8.9 Hz, 1H), 7.55-7.47 (m, 3H), 7.41-7.33 (m, 1H), 7.19 (d, J=8.8 Hz, 1H), 3.98 (ddd, J=4.0, 7.8, 11.5 Hz, 1H), 3.13-3.06 (m, 2H), 3.00 (br t, J=11.7 Hz, 1H), 2.73 (s, 6H), 2.44 (s, 3H), 2.41-2.31 (m, 5H), 2.16 (br d, J=12.0 Hz, 2H), 1.75-1.57 (m, 2H), 1.54-1.40 (m, 2H), 1.33 (t, J=7.5 Hz, 3H).

Example 43: Synthesis of 2-chloro-N-(5-(2-(((1r,4r)-4-(dimethylamino)cyclohexyl)amino)-8-ethyl-7-fluoroquinazolin-6-yl)-3-fluoro-6-methoxypyridin-2-yl)benzenesulfonamide (163)

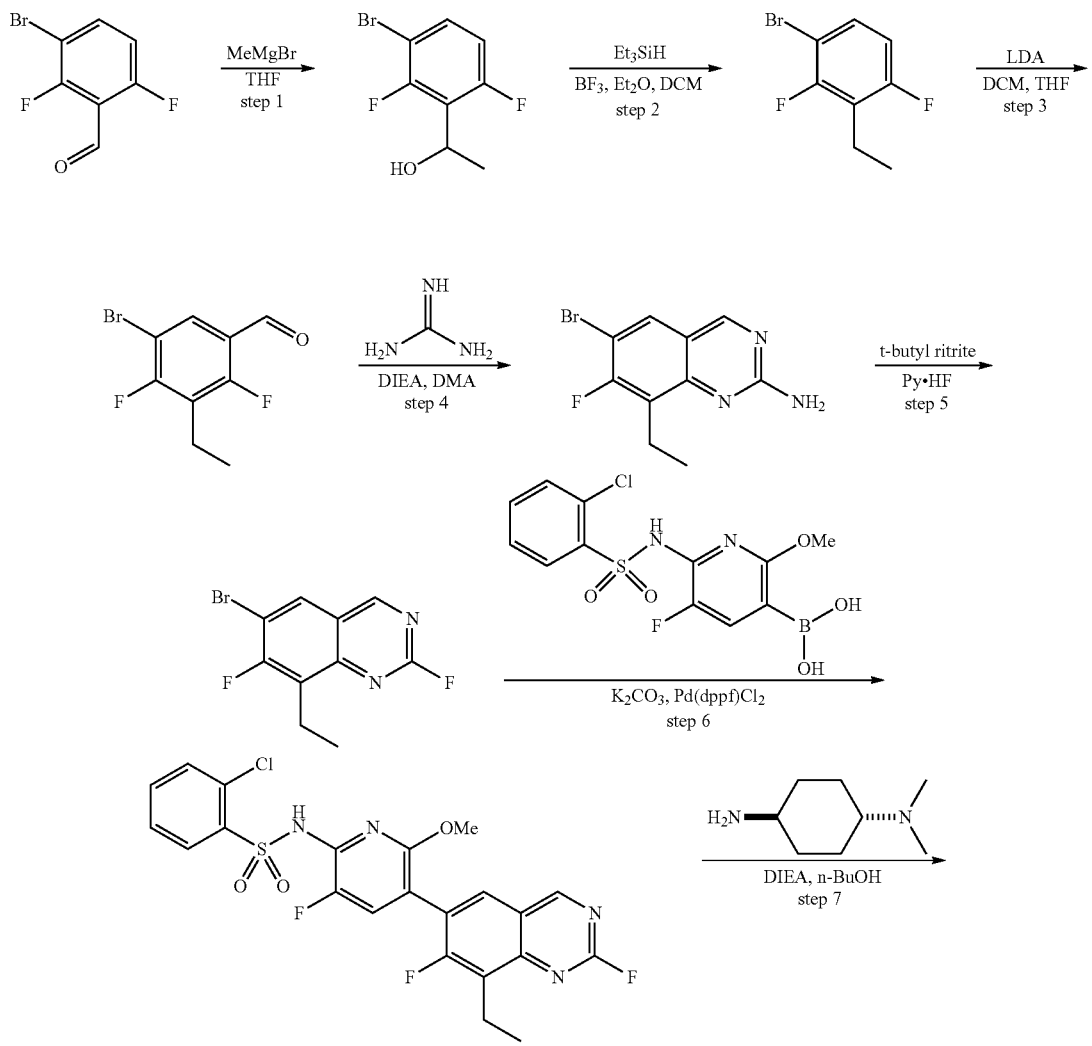

-continued

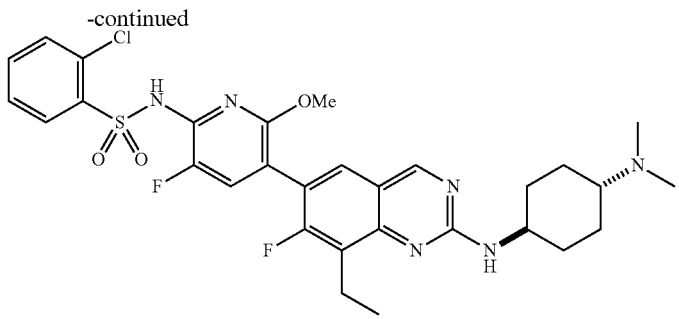

To a solution of 3-bromo-2,6-difluoro-benzaldehyde (20 g, 90.5 mmol) in THF (320.0 mL) at −78° C. was added MeMgBr (3 M, 42.2 mL) dropwise under $N_2$ atmosphere. The reaction mixture was stirred at −78° C. for 30 minutes, then at 0° C. for 1.5 h. The reaction mixture was quenched by addition of saturated $NH_4Cl$ (300.0 mL) aqueous solution and extracted with ethyl acetate (80.0 mL×3). The combined organic layers were washed with brine (80.0 mL×3), dried over $Na_2SO_4$, filtered, and concentrated under reduced pressure to give a residue. The residue was purified by flash silica gel chromatography to afford 1-(3-bromo-2,6-difluorophenyl)ethan-1-ol (21.0 g, 78.3% yield) as a yellow oil. $^1H$ NMR (400 MHz, CHLOROFORM-d) δ 7.39 (ddd, J=5.8, 7.8, 8.8 Hz, 11H), 6.77 (dt, J=1.7, 9.3 Hz, 11H), 5.30-5.14 (m, 11H), 2.79 (br d, J=3.1 Hz, 1H), 1.58 (d, J=6.8 Hz, 31H).

Step 2

To a solution of 1-(3-bromo-2,6-difluorophenyl)ethan-1-ol (21.0 g, 88.5 mmol) and $Et_3SiH$ (20.6 g, 177.1 mmol, 28.3 mL) in DCM (800.0 mL) was added $BF_3.Et_2O$ (44.9 g, 310.0 mmol, 39.0 mL, 98% purity) at 0° C. under $N_2$ atmosphere. The reaction mixture was stirred at 35° C. for 72 h. The reaction mixture was quenched by addition saturated $NaHCO_3$ (500.0 mL) aqueous solution at 0° C. and extracted with DCM (100.0 mL×3). The combined organic layers were washed with brine (100.0 mL×3), dried over $Na_2SO_4$, filtered, and concentrated under reduced pressure to give a residue. The residue was purified by flash silica gel chromatography to give 1-bromo-3-ethyl-2,4-difluorobenzene (9.8 g, 40.0% yield) as a colorless oil. $^1H$ NMR (400 MHz, CHLOROFORM-d) δ 7.35 (ddd, J=5.9, 7.9, 8.9 Hz, 1H), 6.78 (dt, J=1.7, 8.8 Hz, 1H), 2.73 (tq, J=1.3, 7.5 Hz, 211), 1.21 (t, J=7.6 Hz, 3H).

Step 3

To a solution of 1-bromo-3-ethyl-2,4-difluorobenzene (9.8 g, 44.3 mmol) in THF (100.0 mL) was added dropwise LDA (2 M, 26.6 mL) at −78° C. After addition, the mixture was stirred at this temperature for 1 h, and then DMF (4.2 g, 57.6 mmol, 4.4 mL) was added dropwise at −78° C. The resulting mixture was stirred at −78° C. for 1 h. The reaction mixture was quenched by addition saturated $NH_4Cl$ (100.0 mL) aqueous solution and extracted with ethyl acetate (50.0 mL×3). The combined organic layers were washed with brine (50.0 mL×3), dried over $Na_2SO_4$, filtered, and concentrated under reduced pressure to give a residue. The residue was purified by flash silica gel chromatography to afford 5-bromo-3-ethyl-2,4-difluorobenzaldehyde (3.3 g, 20.9% yield) as a yellow oil. $^1H$ NMR (400 MHz, CHLOROFORM-d) δ 10.24 (s, 1H), 7.95 (t, J=7.5 Hz, 11H), 2.79 (tq, J=1.4, 7.6 Hz, 2H), 1.29-1.21 (m, 3H).

Step 4

To a solution of 5-bromo-3-ethyl-2,4-difluorobenzaldehyde (3.3 g, 13.2 mmol) in DMA (65.0 mL) was added guanidine (1.6 g, 13.2 mmol, $H_2CO_3$) and DIEA (1.7 g, 13.2 mmol, 2.3 mL). The mixture was stirred at 160° C. for 1 h. The reaction mixture was quenched by addition $H_2O$ (200.0 mL) and extracted with ethyl acetate (30.0 mL×3). The combined organic layers were washed with brine (30.0 mL×3), dried over $Na_2SO_4$, filtered, and concentrated under reduced pressure to give a residue. The residue was purified by flash silica gel chromatography to afford 6-bromo-8-ethyl-7-fluoroquinazolin-2-amine (318 mg, 7.1% yield) as a yellow oil. $^1HNMR$ (400 MHz, CHLOROFORM-d) δ 8.89 (s, 1H), 7.78 (d, J=7.5 Hz, 1H), 5.24 (br s, 2H), 3.09 (dq, J=2.2, 7.5 Hz, 2H), 1.25 (t, J=7.5 Hz, 3H).

Step 5

To a solution of 6-bromo-8-ethyl-7-fluoroquinazolin-2-amine (318 mg, 1.1 mmol) in pyridine (3.0 mL) was added pyridine; hydrofluoride (6.6 g, 66.6 mmol, 6.0 mL) at −40° C. The mixture was stirred at −40° C. for 15 min. Then tert-butyl nitrite (242 mg, 2.3 mmol, 280.0 uL) was added. The mixture was stirred at 25° C. for 1 h. The reaction mixture was quenched by addition saturated $NaHCO_3$ (400.0 mL) and extracted with EtOAc (50.0 mL×3). The combined organic layers were washed with brine (50.0 mL×3), dried over $Na_2SO_4$, filtered, and concentrated under reduced pressure. The residue was purified by flash silica gel chromatography to afford 6-bromo-8-ethyl-2,7-difluoroquinazoline (180 mg, 54.3% yield) as a yellow solid. $^1HNMR$ (400 MHz, CHLOROFORM-d) δ 9.25 (d, J=2.4 Hz, 1H), 8.12 (d, J=7.1 Hz, 1H), 3.22 (dq, J=2.1, 7.5 Hz, 2H), 1.30 (t, J=7.5 Hz, 3H).

Step 6

A mixture of 6-bromo-8-ethyl-2,7-difluoroquinazoline (40 mg, 146.4 umol), (6-((2-chlorophenyl)sulfonamido)-5-fluoro-2-methoxypyridin-3-yl)boronic acid (105 mg, 292.9 umol), $K_2CO_3$ (60 mg, 439.4 umol), $Pd(dppf)Cl_2$ (10 mg, 14.6 umol), and $H_2O$ (0.1 mL) in dioxane (1.0 mL) was degassed and purged with $N_2$ for 3 times. The reaction mixture was stirred at 90° C. for 12 h under $N_2$ atmosphere. The reaction mixture was concentrated under reduced pressure. The residue was purified by prep-TLC ($SiO_2$) to afford 2-chloro-N-(5-(8-ethyl-2,7-difluoroquinazolin-6-yl)-3-fluoro-6-methoxypyridin-2-yl)benzenesulfonamide (27 mg, 21.2% yield) as yellow oil. $M+H^+$=509.1 (LCMS).

Step 7

To a solution of 2-chloro-N-(5-(8-ethyl-2,7-difluoroquinazolin-6-yl)-3-fluoro-6-methoxypyridin-2-yl)benzenesulfonamide (27 mg, 53.0 umol) in n-BuOH (2.0 mL) was added DIEA (34 mg, 265.2 umol, 46.2 uL) and (1r,4r)-N1,N1-dimethylcyclohexane-1,4-diamine (18 mg, 106.1 umol, HCl). The reaction mixture was stirred at 100° C. for 12 h. The reaction mixture was concentrated under reduced pressure. The residue was purified by prep-HPLC (FA condition) to give 2-chloro-N-(5-(2-(((1r,4r)-4-(dimethylamino)cyclohexyl)amino)-8-ethyl-7-fluoroquinazolin-6-yl)-3-fluoro-6-methoxypyridin-2-yl)benzenesulfonamide (3.0 mg, 7.8% yield, FA) as a yellow solid. M+H$^+$=631.2 (LCMS); $^1$H NMR (400 MHz, METHANOL-d$_4$) δ 8.87 (br s, 1H), 8.30 (br d, J=7.9 Hz, 1H), 7.53-7.47 (m, 3H), 7.45 (br s, 1H), 7.37 (br d, J=9.7 Hz, 1H), 3.93 (br s, 1H), 3.36 (s, 3H), 3.15 (br d, J=12.8 Hz, 1H), 3.01 (br d, J=6.6 Hz, 2H), 2.83 (s, 6H), 2.34 (br d, J=10.8 Hz, 2H), 2.15 (br d, J=10.4 Hz, 2H), 1.75-1.58 (m, 2H), 1.53-1.37 (m, 2H), 1.19 (br t, J=6.5 Hz, 3H).

Example 44: Synthesis of 2-chloro-N-(5-(2-(((1r,4r)-4-(dimethylamino)cyclohexyl)amino)-8-ethyl-7-fluoroquinazolin-6-yl)-6-methylpyridin-2-yl)benzenesulfonamide (161)

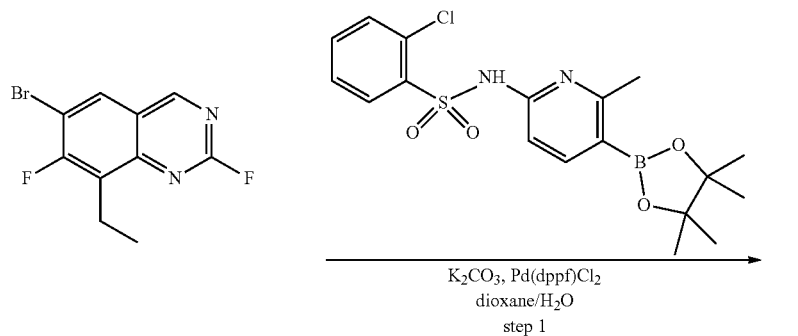

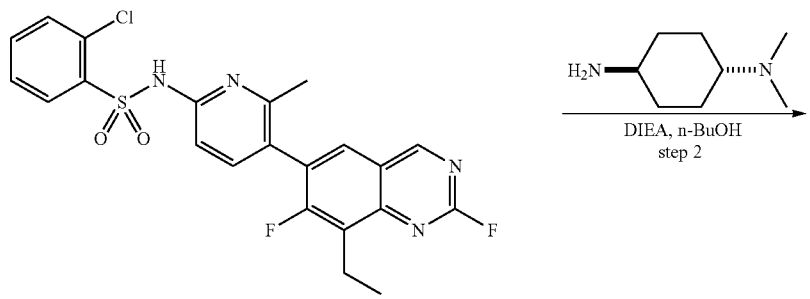

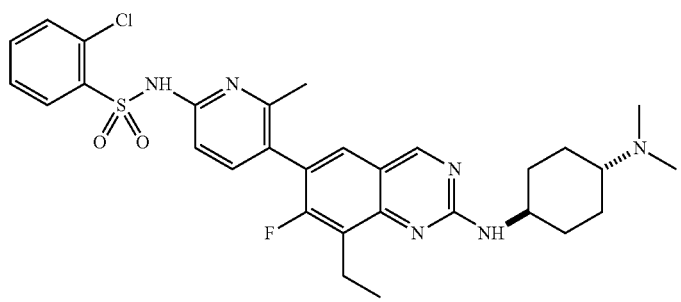

The title compound was synthesized according to the synthetic procedure described in Example 43 to afford 2-chloro-N-(5-(2-(((1r,4r)-4-(dimethylamino)cyclohexyl)amino)-8-ethyl-7-fluoroquinazolin-6-yl)-6-methylpyridin-2-yl)benzenesulfonamide (7.9 mg, 12.6% yield, FA) as a pale yellow solid. M+H$^+$=597.3 (LCMS); $^1$H NMR (400 MHz, METHANOL-d$_4$) δ 8.95 (s, 1H), 8.52 (br s, 1H), 8.23 (d, J=8.4 Hz, 1H), 7.61 (d, J=8.8 Hz, 1H), 7.57-7.51 (m, 3H), 7.51-7.45 (m, 1H), 7.17 (br d, J=8.6 Hz, 1H), 4.04-3.93 (m, 1H), 3.23 (br t, J=10.8 Hz, 1H), 3.08 (q, J=7.5 Hz, 2H), 2.86 (s, 6H), 2.38 (br d, J=10.4 Hz, 2H), 2.25 (s, 3H), 2.19 (br d, J=11.7 Hz, 2H), 1.79-1.65 (m, 2H), 1.58-1.42 (m, 2H), 1.25 (t, J=7.4 Hz, 3H).

Example 45: Synthesis of 2-chloro-N-(5-(2-(((1r,4r)-4-(dimethylamino)cyclohexyl)amino)-8-ethyl-7-fluoroquinazolin-6-yl)-3-fluoro-6-methylpyridin-2-yl)benzenesulfonamide (162)

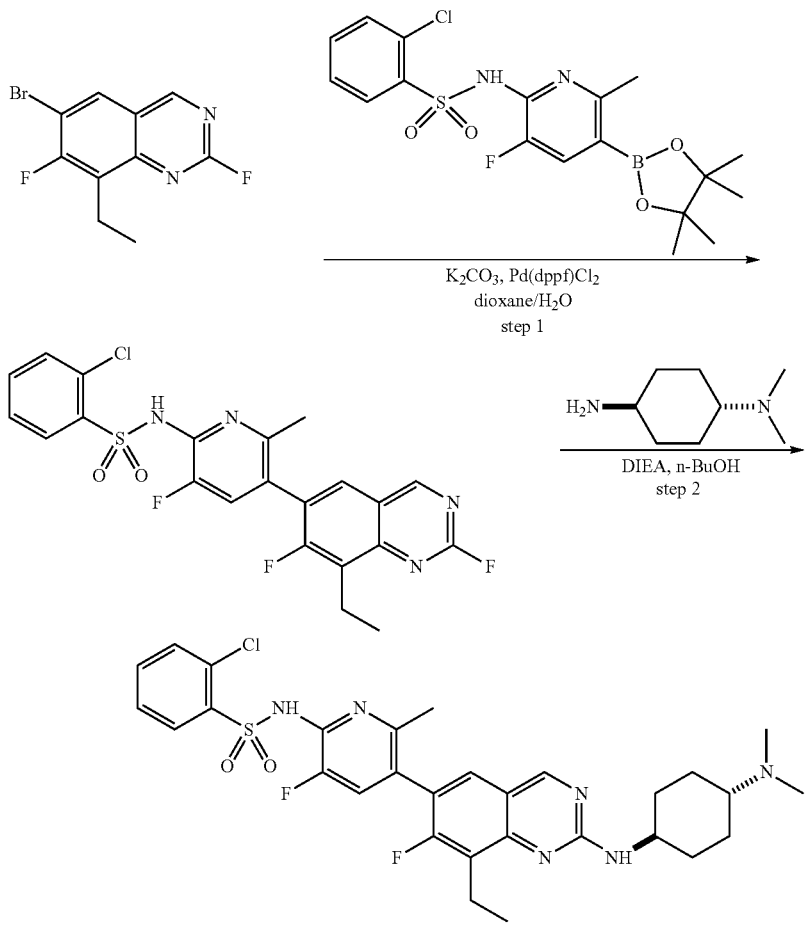

The title compound was synthesized according to the synthetic procedure described in Example 43 to afford 2-chloro-N-(5-(2-(((1r,4r)-4-(dimethylamino)cyclohexyl)amino)-8-ethyl-7-fluoroquinazolin-6-yl)-3-fluoro-6-methylpyridin-2-yl)benzenesulfonamide (3.4 mg, 6.4% yield, FA) as a white solid. M+H$^+$=615.3 (LCMS); $^1$H NMR (400 MHz, METHANOL-d$_4$) δ 8.94 (br s, 1H), 8.55 (br s, 1H), 8.31 (br d, J=7.7 Hz, 1H), 7.60-7.46 (m, 4H), 7.38 (br d, J=10.4 Hz, 1H), 3.98 (br s, 1H), 3.23 (br s, 1H), 3.07 (br d, J=7.1 Hz, 2H), 2.86 (s, 6H), 2.38 (br d, J=9.3 Hz, 2H), 2.18 (br d, J=10.8 Hz, 2H), 2.03 (s, 3H), 1.80-1.63 (m, 2H), 1.57-1.38 (m, 2H), 1.23 (br t, J=7.0 Hz, 3H).

II. Biological Evaluation

Example B1: In Vitro FRET Assay

In vitro FRET assay was performed to evaluate the ability of select compounds to inhibit IRE1, the results of which are summarized in Table 3. To perform the in vitro FRET assay, 1× complete assay buffer (CAB; 1M DTT, 50 mM sodium citrate pH 7.15, 1 mM magnesium acetate, 0.02% tween 20) was used to dilute SignalChem IRE1a protein to a final concentration of 2 nM. Selected compounds were serially diluted with DMSO in a non-binding black 384-well plate for a total of 15 ul in each well. 2 ul of the serially diluted compound or DMSO control were then added to new wells containing 98 ul of 1×CAB, for a total volume of 100 ul, 10 ul of which were then transferred to wells of a new plate. 5 ul of the diluted IRE1a was then added to each well. 5 ul of a 400 mM XBP1 RNA probe was then added to each well. Fluorescence was then read over 30 minutes in kinetic mode (485/515 nm).

Two RNA probes were used, XBP1 wildtype (SEQ ID NO: 2) which is able to be spliced by active IRE1a or XBP1 mutant (SEQ ID NO: 3) which is unable to be spliced. Each probe contained a 5' 6-FAM modification and a 3' IOWA Black FQ modification.

A second FRET assay was performed to assess ATP-mediated inhibition. In this case, compounds and IRE1a were prepared and combined as discussed above, with the addition of ATP up to 1 mM final concentration. This mixture was incubated at room temperature for 60 minutes and then 5 ul of 400 nM XBP1 wildtype or mutant RNA probe was added. Plates were then read over 30 minutes in kinetic mode (485/515 nm).

TABLE 3

| Compound Ref. No. | | Mean IC$_{50}$ |
|---|---|---|
| 23; | Formic Acid Salt | A |
| 24; | Formic Acid Salt | A |
| 25; | Formic Acid Salt | A |
| 26; | Formic Acid Salt | A |
| 27; | Formic Acid Salt | A |
| 28; | Formic Acid Salt | A |
| 29; | Formic Acid Salt | A |
| 30; | Formic Acid Salt | C |
| 31; | Formic Acid Salt | D |
| 32; | Formic Acid Salt | A |
| 33; | Formic Acid Salt | A |
| 34; | Formic Acid Salt | A |
| 35; | Formic Acid Salt | A |
| 36; | Formic Acid Salt | A |
| 37; | HCl Salt | A |
| 38; | Formic Acid Salt | A |
| 39; | Formic Acid Salt | A |
| 40; | Formic Acid Salt | A |
| 41; | Formic Acid Salt | A |
| 42; | Formic Acid Salt | A |
| 43; | Formic Acid Salt | A |
| 44; | Formic Acid Salt | A |
| 45; | Formic Acid Salt | C |
| 46; | Formic Acid Salt | A |
| 47; | Formic Acid Salt | A |
| 48; | Formic Acid Salt | A |
| 49; | Formic Acid Salt | A |
| 50; | Formic Acid Salt | A |
| 51; | Formic Acid Salt | A |
| 52; | Formic Acid Salt | A |
| 53; | Formic Acid Salt | A |
| 54; | Formic Acid Salt | A |
| 55; | Formic Acid Salt | A |
| 56; | Formic Acid Salt | A |
| 57; | Formic Acid Salt | A |
| 58; | Formic Acid Salt | B |
| 59; | Formic Acid Salt | B |
| 60; | Formic Acid Salt | A |
| 61; | Formic Acid Salt | A |
| 62; | Formic Acid Salt | A |
| 63; | Formic Acid Salt | A |
| 64; | Formic Acid Salt | A |
| 65; | Formic Acid Salt | A |
| 66; | Formic Acid Salt | A |
| 67; | Formic Acid Salt | A |
| 68; | Formic Acid Salt | A |
| 69; | Formic Acid Salt | A |
| 70; | Formic Acid Salt | A |
| 71; | Formic Acid Salt | A |
| 72; | Formic Acid Salt | A |
| 73; | Formic Acid Salt | A |
| 74; | Formic Acid Salt | A |
| 75; | Formic Acid Salt | A |
| 76; | Formic Acid Salt | A |
| 77; | Formic Acid Salt | A |
| 78; | Formic Acid Salt | A |
| 79; | Formic Acid Salt | A |
| 80; | Formic Acid Salt | A |
| 81; | Formic Acid Salt | A |
| 82; | Formic Acid Salt | A |
| 83; | Formic Acid Salt | B |
| 84; | Formic Acid Salt | A |
| 85; | Formic Acid Salt | A |
| 86; | Formic Acid Salt | A |
| 87; | Formic Acid Salt | A |
| 88; | Formic Acid Salt | A |
| 89; | Formic Acid Salt | A |
| 90; | Formic Acid Salt | A |
| 91; | Formic Acid Salt | A |
| 92; | Formic Acid Salt | A |
| 93; | Formic Acid Salt | A |
| 94; | Formic Acid Salt | A |
| 95; | Formic Acid Salt | A |
| 96; | Formic Acid Salt | A |
| 97; | Formic Acid Salt | A |
| 98; | Formic Acid Salt | A |
| 99; | Formic Acid Salt | A |
| 108; | Formic Acid Salt | A |
| 116; | Formic Acid Salt | A |
| 117; | Formic Acid Salt | A |
| 118; | Formic Acid Salt | A |
| 119; | Formic Acid Salt | A |
| 122; | Formic Acid Salt | A |
| 124; | Formic Acid Salt | A |
| 125; | Formic Acid Salt | A |
| 126; | Formic Acid Salt | C |
| 127; | Formic Acid Salt | A |
| 128; | Formic Acid Salt | A |
| 130; | Formic Acid Salt | A |
| 131; | Formic Acid Salt | A |
| 132; | Formic Acid Salt | A |
| 133; | Formic Acid Salt | A |
| 135; | Formic Acid Salt | A |
| 137; | Formic Acid Salt | A |
| 139; | Formic Acid Salt | B |
| 141; | Formic Acid Salt | A |
| 142; | Formic Acid Salt | B |
| 143; | Formic Acid Salt | B |
| 144; | Formic Acid Salt | C |
| 145; | Formic Acid Salt | A |
| 147; | Formic Acid Salt | B |
| 148; | Formic Acid Salt | A |
| 149; | Formic Acid Salt | A |
| 150; | Formic Acid Salt | A |
| 151; | Formic Acid Salt | A |
| 152; | Formic Acid Salt | A |
| 153; | Formic Acid Salt | A |
| 154; | Formic Acid Salt | A |
| 155; | Formic Acid Salt | A |
| 156; | Formic Acid Salt | D |
| 157; | Formic Acid Salt | A |
| 158; | Formic Acid Salt | A |
| 159; | Formic Acid Salt | A |
| 160; | Formic Acid Salt | A |
| 161; | Formic Acid Salt | A |
| 162; | Formic Acid Salt | A |
| 163; | Formic Acid Salt | A |

Note:
Biochemical assay Mean IC$_{50}$ data are designated within the following ranges: A: ≤ 5 nM; B: > 5 nM to ≤ 50 nM; C: > 50 nM to ≤ 100 nM; and D: > 100 nM to ≤ 10 uM.

Example B2: In Vitro Luciferase Assay

Compounds disclosed herein were assessed for disruption of IRE1 signaling using a IRE1a Endoribonuclease Nanoluciferase Assay. Briefly, $2.5 \times 10^6$ 293T cells were seeded in a 10 cm² tissue culture plate. About 24 hours later, the cells were transfected with Effectene. In a 15 mL tube, the following was added: 2 ug XBP1 luciferase reporter plasmid (PGK-Luc2-P2A-XBP1u-Nanoluciferase-PEST); 300 ul EC buffer; and 16 ul Enhancer, followed by incubation at room temp for 5 minutes. Next, 60 ul Effectene (Qiagen 301427) was added, followed by incubation at room temperature for 10 minutes. 2.6 mL cDMEM media was added. Old media was aspirated from the cells, followed by addition of 7 mL fresh media. Full transfection mixture was added dropwise to cells. Cells were incubated for 6 hours, followed by trypsinization, centrifugation and resuspension in 11 mL fresh cDMEM media. 100 μL of cells were plated per a well in a 96 well plate. A day later, ER stressors of choice +/− inhibitors were added. To harvest, media was aspirated from cells completely, then 50 uL 1× passive lysis buffer (Promega: E1941) was added per well and put on shaker (300 rpm) for 30 minutes at room temperature. Cells were centrifuged, and 15 uL sample per well was added to a new, opaque white 384 well plate (Corning 3570). 15 uL OneGlo (nanoluciferase kit, Promega N1630) was added. Plates were spun down, placed on shaker (300 rpm) for 10 minutes. Plates were read on luminometer, 1000 ms integration time per well. 15 uL Stop and Glo (nanoluciferase kit) was added. Plates were spun down, placed on shaker (300 rpm) for 10 minutes. Plates were read on luminometer, 1000 ms second integration time per well. Recordings are provided below in Table 4.

TABLE 4

| Compound Ref. No. | | Mean EC$_{50}$ |
|---|---|---|
| 23; | Formic Acid Salt | A |
| 24; | Formic Acid Salt | A |
| 25; | Formic Acid Salt | A |
| 26; | Formic Acid Salt | A |
| 27; | Formic Acid Salt | A |
| 28; | Formic Acid Salt | A |
| 29; | Formic Acid Salt | D |
| 32; | Formic Acid Salt | A |
| 33; | Formic Acid Salt | A |
| 34; | Formic Acid Salt | B |
| 35; | Formic Acid Salt | A |
| 37; | HCl Salt | A |
| 44; | Formic Acid Salt | A |
| 46; | Formic Acid Salt | A |
| 47; | Formic Acid Salt | B |
| 48; | Formic Acid Salt | B |
| 51; | Formic Acid Salt | C |
| 52; | Formic Acid Salt | A |
| 53; | Formic Acid Salt | A |
| 54; | Formic Acid Salt | B |
| 55; | Formic Acid Salt | A |
| 56; | Formic Acid Salt | A |
| 57; | Formic Acid Salt | A |
| 58; | Formic Acid Salt | A |
| 59; | Formic Acid Salt | C |
| 60; | Formic Acid Salt | A |
| 61; | Formic Acid Salt | A |
| 62; | Formic Acid Salt | B |
| 64; | Formic Acid Salt | A |
| 65; | Formic Acid Salt | B |
| 66; | Formic Acid Salt | C |
| 67; | Formic Acid Salt | B |
| 68; | Formic Acid Salt | C |
| 69; | Formic Acid Salt | A |
| 70; | Formic Acid Salt | A |
| 71; | Formic Acid Salt | A |
| 72; | Formic Acid Salt | D |
| 73; | Formic Acid Salt | A |
| 74; | Formic Acid Salt | A |
| 75; | Formic Acid Salt | D |
| 76; | Formic Acid Salt | B |
| 77; | Formic Acid Salt | B |
| 78; | Formic Acid Salt | A |
| 79; | Formic Acid Salt | B |
| 80; | Formic Acid Salt | D |
| 81; | Formic Acid Salt | A |
| 82; | Formic Acid Salt | B |
| 83; | Formic Acid Salt | C |
| 84; | Formic Acid Salt | B |
| 85; | Formic Acid Salt | D |
| 86; | Formic Acid Salt | C |
| 87; | Formic Acid Salt | A |
| 88; | Formic Acid Salt | A |
| 89; | Formic Acid Salt | D |
| 90; | Formic Acid Salt | B |
| 91; | Formic Acid Salt | A |
| 92; | Formic Acid Salt | D |
| 93; | Formic Acid Salt | A |
| 94; | Formic Acid Salt | A |
| 95; | Formic Acid Salt | A |
| 97; | Formic Acid Salt | A |
| 98; | Formic Acid Salt | A |
| 99; | Formic Acid Salt | A |
| 108; | Formic Acid Salt | A |
| 116; | Formic Acid Salt | A |
| 117; | Formic Acid Salt | A |
| 118; | Formic Acid Salt | A |
| 119; | Formic Acid Salt | A |
| 122; | Formic Acid Salt | A |
| 124; | Formic Acid Salt | A |
| 125; | Formic Acid Salt | A |
| 127; | Formic Acid Salt | A |
| 128; | Formic Acid Salt | A |
| 130; | Formic Acid Salt | A |
| 131; | Formic Acid Salt | A |
| 132; | Formic Acid Salt | A |
| 133; | Formic Acid Salt | A |
| 135; | Formic Acid Salt | A |
| 137; | Formic Acid Salt | A |
| 141; | Formic Acid Salt | D |
| 145; | Formic Acid Salt | A |
| 148; | Formic Acid Salt | A |
| 149; | Formic Acid Salt | B |
| 150; | Formic Acid Salt | B |
| 151; | Formic Acid Salt | A |
| 152; | Formic Acid Salt | A |
| 153; | Formic Acid Salt | B |
| 154; | Formic Acid Salt | A |
| 155; | Formic Acid Salt | C |
| 157; | Formic Acid Salt | A |
| 158; | Formic Acid Salt | A |
| 159; | Formic Acid Salt | B |
| 160; | Formic Acid Salt | A |
| 161; | Formic Acid Salt | A |
| 162; | Formic Acid Salt | A |
| 163; | Formic Acid Salt | A |

Note:
Biochemical assayMean EC$_{50}$ data are designated within the following ranges: A: ≤ 5 nM; B: > 5 nM to ≤ 50 nM; C: > 50 nM to ≤ 100 nM; and D: > 100 nM to ≤ 10 uM.

Example B3: Growth Assay

A growth assay was performed to evaluate the compounds disclosed herein for cytotoxicity. Briefly, 5,000,000 293T cells were resuspended in 18 mL of cDMEM for a final concentration of 277,777 cells/mL. 180 uL(50,000 cells) cDMEM was seeded per well in a 96 well flat bottom plate as shown in Table 5, with "media" wells left unfilled. In a separate 96 well dilution plate, 199 uL cDMEM and 1 μL of DMSO or any one of the compounds disclosed herein (shown as Test Compound 1, 2, 3, 4, 5, or 6 below) were added to wells A4, A8, C4, C8, E4, E8, G4, and G8. 133.3 uL cDMEM was added to wells 1, 2, 3, 5, 6, and 7 in rows A, C, E and G of the dilution plate. Compounds were serially diluted leftwards in threefold dilutions (66.7 uL into 133.3 uL cDMEM). 20 µL of each dilution was transferred in duplicate (duplicates in vertical paired wells) to the cells plated in the 96-well plate shown in Table 5, to the total concentrations shown below. 200 uL cDMEM was added to media wells (wells G5-H8). The plate was then placed in a humidified chamber for a 2 day incubation, and then photographed (media was more yellow in wells with potent cell growth). Absorbance was then measured at ~535 nM (lower for more acidic media) and ~450 nM (higher for more acidic media). The results of the growth assay as shown in Table 6.

TABLE 5

|   | 1 | 2 | 3 | 4 | 5 | 6 | 7 | 8 |
|---|---|---|---|---|---|---|---|---|
| A |   |   |   | Test Compound 1 |   |   |   | Test Compound 5 |
| B |   |   |   |   |   |   |   |   |
| C |   |   |   | Test Compound 2 |   |   |   | Test Compound 6 |
| D |   |   |   |   |   |   |   |   |
| E |   |   |   | Test Compound 3 |   |   |   | DMSO |
| F |   |   |   |   |   |   |   |   |
| G |   |   |   | Test Compound 4 |   |   |   | media only |
| H |   |   |   |   |   |   |   |   |
| Conc (uM) | 0.185 | 0.556 | 1.667 | 5 | 0.185 | 0.5556 | 1.667 | 5 |

TABLE 6

| Compound Ref. No. | % Growth at 0.185 uM | % Growth at 0.5556 uM | % Growth at 1.667 uM | % Growth at 5 uM |
|---|---|---|---|---|
| 23; Formic Acid Salt | D | C | C | D |
| 24; Formic Acid Salt | D | D | C | C |
| 25; Formic Acid Salt | D | D | D | D |
| 27; Formic Acid Salt | D | D | C | B |
| 28; Formic Acid Salt | D | D | C | B |
| 29; Formic Acid Salt | D | D | D | D |
| 32; Formic Acid Salt | D | D | C | B |
| 33; Formic Acid Salt | D | D | D | C |
| 34; Formic Acid Salt | D | D | D | A |
| 35; Formic Acid Salt | D | D | C | B |
| 37; HCl Salt | n/a | D | C | B |
| 46; Formic Acid Salt | D | D | D | D |
| 52; Formic Acid Salt | D | D | D | C |
| 55; Formic Acid Salt | D | D | D | D |
| 65; Formic Acid Salt | D | D | D | C |
| 67; Formic Acid Salt | D | D | C | C |
| 69; Formic Acid Salt | n/a | D | C | C |
| 71; Formic Acid Salt | D | D | C | B |

Note:
% Growth data are designated within the following ranges: A: ≤ 25%; B: > 25% to ≤ 50%; C: > 50% to ≤ 75%; D: > 75% to ≤ 100%;

Example B4: ELISA Assay

Total human or mouse CD4 T cells are isolated by negative selection with Miltenyi MACS beads. Mouse CD4 T cells are isolated from mouse spleen while human CD4 T cells were isolated from human PBMCs. CD4 T cells are washed and then mixed with CD3/CD28 activator Dynabeads at 8 pm. After a 36 hour incubation, select IRE1a inhibitor compounds or IRE1a inhibitor controls are added and incubated for 2 hours.

After the two hour incubation, mouse or human cell-free malignant ascites supernatants or cRPMI control are added. After a 10 hour incubation, supernatants are isolated and used in an IFN-g ELISA assay. Trizol is added to each ELISA well containing T Cells for isolating RNA. ELISA assay is performed with the eBioscience Ready-Set-Go IFN-g ELISA kit according to the manufacturer's recommended protocol.

Example B5: T Cell Metabolism Assay

Total human or mouse CD4 T cells are isolated by negative selection with Miltenyi MACS beads. Mouse CD4 T cells are isolated from mouse spleen while human CD4 T cells are isolated from human PBMCs. One and a half million CD4 T cells are washed and then mixed with CD3/CD28 activator Dynabeads at a 1:1 bead:cell ratio and plated in complete RPMI in a 6 well plate. After a 24 hour incubation, select IRE1a inhibitor compounds or IRE1a inhibitor control compounds are added and incubated for 2 hours. After the two hour incubation, mouse or human cell-free malignant ascites supernatants or cRPMI control are added. After a 16 hour incubation, the dynabeads are removed by magnetic separation and mitochondrial oxygen consumption rate (OCR) and glycolytic extracellular acidification rate (ECAR) is measured with the Seahorse XFe96 Analyzer (Agilent). Samples are assayed in triplicate with 150,000 viable cells plated in each well of the assay plate. Supernatants are additionally isolated and used in downstream IFN-g ELISA assays. IRE1a activity is also measured by quantifying XBP1 splicing with quantitative PCR or by intracellular flow cytometric staining with an XBP1s-specific monoclonal antibody (clone: Q3-695; BD Pharmingen).

Example B6: Inflammatory Cytokine Production Assay

Approximately $3 \times 10^6$ mouse bone marrow cells (after RBC lysis) are seeded in 10 mL cRPMI with 20 ng/mL GM-CSF in a petri dish. On culture day 3, 10 mL of cRPMI+20 ng/mL GM-CSF is added. On culture day 6, non-adherent cells from each plate are collected and resuspended in 20 mL of fresh cRPMI+20 ng/mL GM-CSF. On culture day 7, suspension cells are harvested, counted, and the resuspended at 500,000 cells per 180 microliters in fresh cRPMI+20 ng/mL GM-CSF+110% final concentration of IRE1a inhibitor compounds or DMSO as a control. 180 microliters of cell suspension are added to each well of a 96 well flat bottom TC-treated plate and incubated for 2 hours. 20 ul of 10×LPS (1 ug/mL) prepared in cRPMI+20 ng/mL GM-CSF is added to indicated wells and incubated for another 6 hours. Cells are spun down and supernatant was stored in a new 96-well V-bottom plate. 200 microliters of trizol is added to pelleted cells for subsequent RNA analysis.

Example B7: Lipid Analysis and Transcriptional Profiling

Lipid peroxidation byproducts are measured in mice described in Examples B1-2. Intracellular lipid content is evaluated via flow cytometry using 4,4-Difluorol,3,5,7,8-Pentamethyl-4-Bora-3a,4a-Diaza-s-Indacene (BODIPY 493/503; Life Technologies). Briefly, 5×10⁶ splenic cells or dendritic cells from naïve mice, parental ID8 mice, and aggressive ID8-Defb29/Vegf-A mice that are administered vehicle or a compound from Table 1 are stained for surface markers using antibodies that do not overlap with BODIPY 493/503, namely CDl Ic-APC, CD45-APC-Cy7, and CD11b-Pacific Blue, followed by staining with 500 mL of BODIPY 493/503 at 0.5 mg/mL in PBS for 15 minutes at room temperature in the dark. BODIPY 493/503 staining is then detected in the PE or FITC channel. Lipid analysis is also performed using electron microscopy analysis and mass spectrometry. In addition to lipid content, intracellular reactive oxygen species (ROS) and 4-HNE adducts are measured with 2',7'-dichlorofluorescin diacetate (DCFDA) and a competitive ELISA assay (Cell Biolabs), respectively.

Transcriptional profiling is performed in naïve mice, parental ID8 mice, and aggressive ID8-Defb29/Vegf-A mice that are treated with vehicle or a compound from Table 1. Gene expression of genes that are involved in unfolded protein response (UPR)/endoplasmic reticulum (ER) stress and genes involved in lipid metabolism are measured in tDCs purified by FACS. These include but are not limited to Sec24d, Sec61al, P4hb, Fasn, Agpat4, and Agpat6.

Example B8: $IC_{50}$ Measurements for hERG Potassium Ion Channel

Blockade of the cardiac ion channel coded by the hERG gene can lead to cardiac arrhythmia. Many small compounds have been found to bind to the hERG gene leading to problems in the QT response. To determine the viability of the compounds disclosed herein as pharmacological agents that would not affect the hERG channel blockade, a standard automated planar clamp method was employed to determine the $IC_{50}$ for various test compounds on their inhibition of the channel. An electrophysiological assay was prepared to measure the electric current passing through the hERG channel expressed in a stable CHO cell line by applying the planar clamp method. This assay was performed using the automated QPatch platform (Sophion, Denmark) which allows fast and accurate electrophysiological characterization of the hERG ion channel and the determination of $IC_{50}$ values for the test compounds, as shown in Table 7. The significant separation (100-1000×) between effects against IRE1a-mediated XBP1 splicing in 293T cells and the effect on hERG channels suggest that there is a good safety margin for targeting IRE1a.

TABLE 7

| Compound Ref. No. | | Mean $IC_{50}$ |
|---|---|---|
| 24; | Formic Acid Salt | C |
| 37; | HCl Salt | B |
| 69; | Formic Acid Salt | B |

Note:
hERG channel blockade Mean $IC_{50}$ data are designated within the following ranges: A: > 50 uM; B: > 10 uM to ≤ 50 uM; C: > 1 uM to ≤ 10 uM; and D: ≤ 1 uM.

Example B9: Bioavailability Assay

Figure 3A:
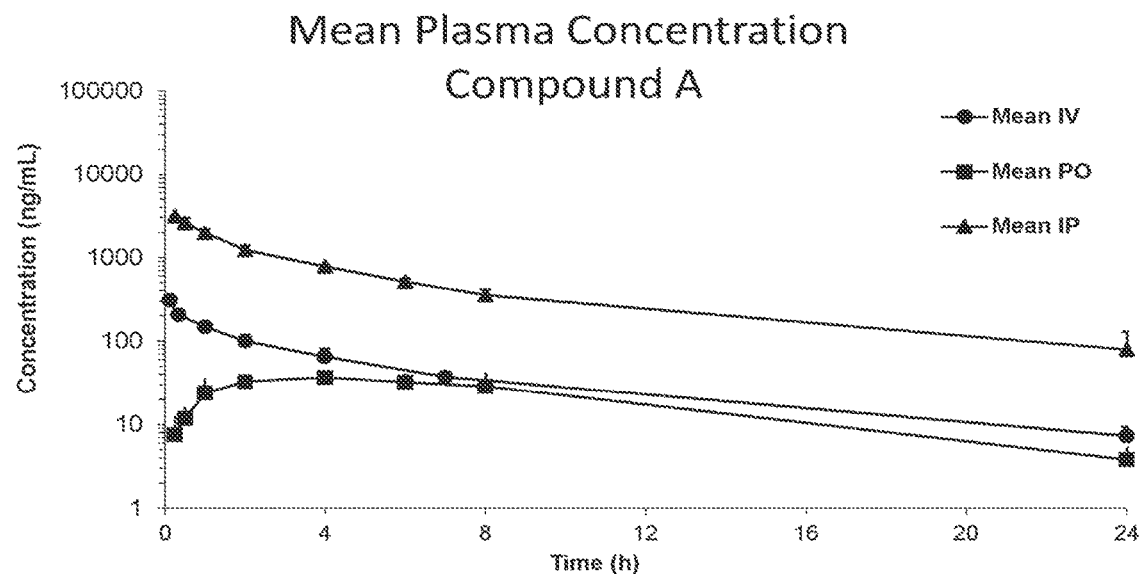
FIG. 3A depicts comparison of the mean plasma concentration of Compound A of the current disclosure after intravenous (IV), oral (PO), and intraperitoneal (IP) dosing.
Figure 3B:
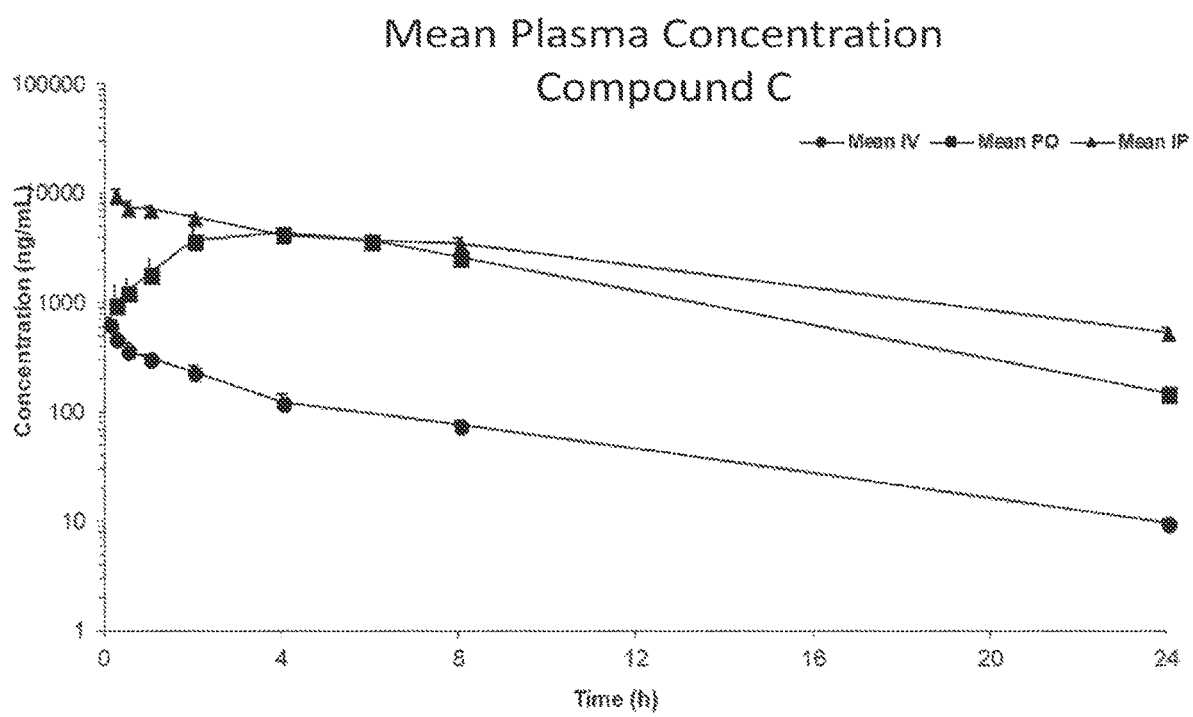
FIG. 3B depicts comparison of the mean plasma concentration of Compound C of the current disclosure after intravenous (IV), oral (PO), and intraperitoneal (IP) dosing.
Figure 4A:
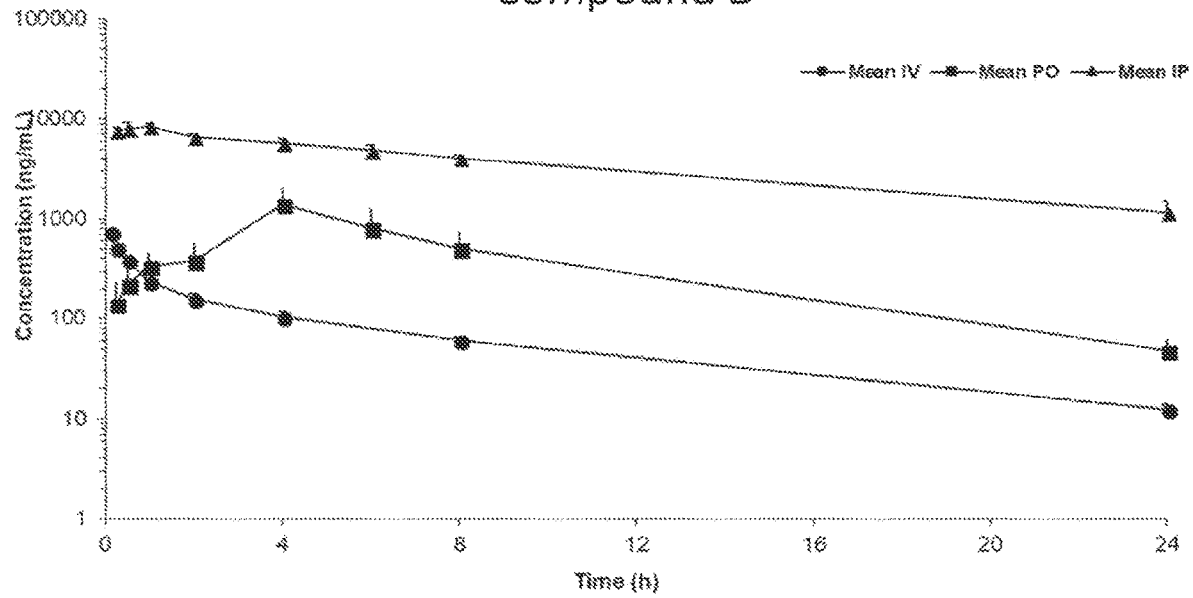
FIG. 4A depicts comparison of the mean plasma concentration of Compound B of the current disclosure after intravenous (IV), oral (PO), and intraperitoneal (IP) dosing.
Figure 4B:
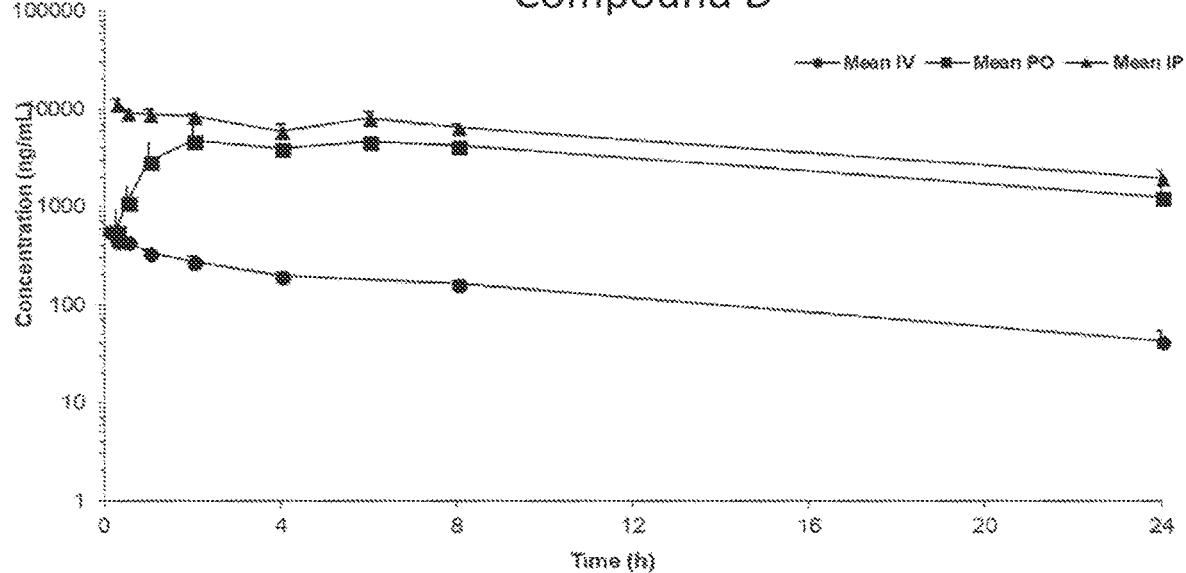
FIG. 4B depicts comparison of the mean plasma concentration of Compound D of the current disclosure after intravenous (IV), oral (PO), and intraperitoneal (IP) dosing.

Results from FRET assay and nano-luciferase assays showed that compounds having $R^6$ and $R^7$ N,N-dimethyl groups tend to be more potent at inhibiting IRE1 as versus their hydrogen analogs (data not shown). Compounds having $R^6$ and $R^7$ N,N-dimethyl groups were compared to their hydrogen analogs in a pharmacokinetic study and were similarly shown to have improved mouse oral bioavailability. For example, compound 91 (Compound C) had 66% oral bioavailability in a mouse study while the di-hydrogen version, N-(5-(2-(((1r,4r)-4-aminocyclohexyl)amino)-8-ethylquinazolin-6-yl)-6-methylpyridin-2-yl)-2-chlorobenzenesulfonamide (Compound A), had only 4% oral bioavailability. This can be seen in a plot of mean plasma concentrations of Compound A after intravenous (IV, 1 mg/kg), oral (PO, 10 mg/kg), and intraperitoneal (IP, 10 mg/kg) dosing (FIG. 3A) compared to Compound C after intravenous (IV, 1 mg/kg), oral (PO, 30 mg/kg), and intraperitoneal (IP, 30 mg/kg) dosing (FIG. 3B). In another example, compound 99 (Compound D) had 70% oral bioavailability while the di-hydrogen version compound 37 (Compound B) had only 17% oral bioavailability. This can be seen in a plot of mean plasma concentrations of Compound B after intravenous (IV, 1 mg/kg), oral (PO, 30 mg/kg), and intraperitoneal (IP, 30 mg/kg) dosing (FIG. 4A) compared to Compound D after intravenous (IV, 1 mg/kg), oral (PO, 30 mg/kg), and intraperitoneal dosing (IP, 30 mg/kg) (FIG. 4B).

In addition, metabolic assays of N,N-dimethyl compounds, such as Compounds C and D, showed removal of the methyl groups to arrive at compound similar to the dihydrogen analogs. (Data not shown.) This indicates that improved activities associated with N,N-dimethyl compounds in assays described herein are likely associate with their methylated state.

Example B10: Assay for Target Engagement in Pancreas and Salivary Gland

Figure 5:
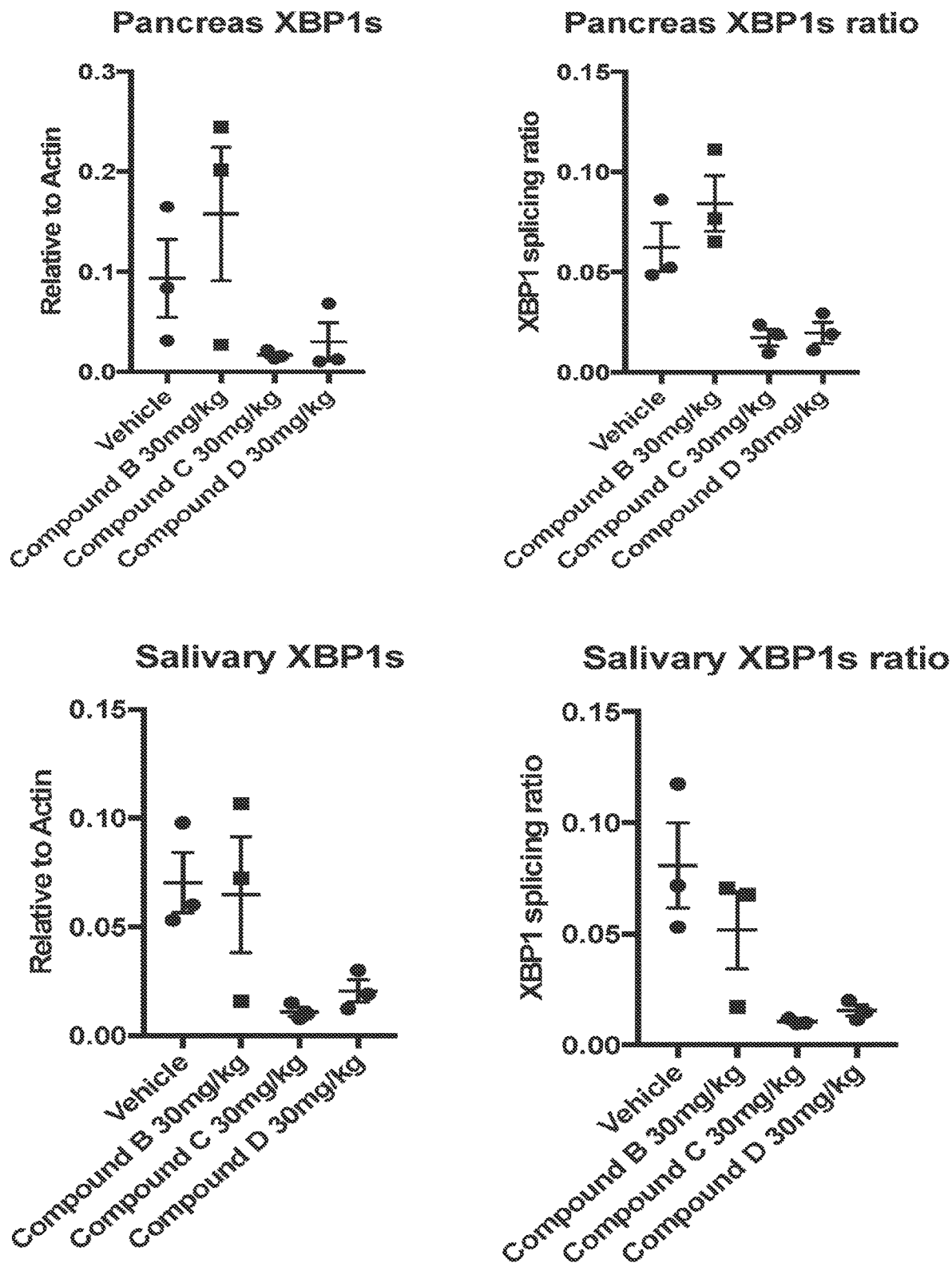
FIG. 5 depicts plots of results from an assay of XBP1 splicing in pancreas tissue (upper plots) and salivary tissue (lower plots) following treatment with control, Compound B, Compound C or Compound D.

Mice (n=3 per group) were orally gavaged with 30 mg/kg vehicle control or IRE1 inhibitors dissolved in $H_2O$. After 6 hours, mice were euthanized and pancreas and salivary gland tissues were isolated, snap frozen on dry ice, and used for subsequent RT-qPCR analysis of beta-actin, XBP1s and total XBP1. Gene expression was evaluated by quantitative PCR for XBP1s and total XBP1 transcripts using the $2^{(-\Delta CT)}$ method for calculating normalized gene expression. Gene expression levels were normalized to Actb transcripts. XBP1 splicing is calculated as XBP1s expression divided by total XBP1 expression. Compounds having $R^6$ and $R^7$ N,N-dimethyl groups (Compound C and Compound D) potently suppressed IRE1a-mediated XBP1 splicing in multiple tissue types after only 6 hours compared to the control and the di-hydrogen version of Compound D (Compound B). See FIG. 5.

Example B11: Assay for Inhibition of Endogenous XBP1 Splicing

Figure 6A:
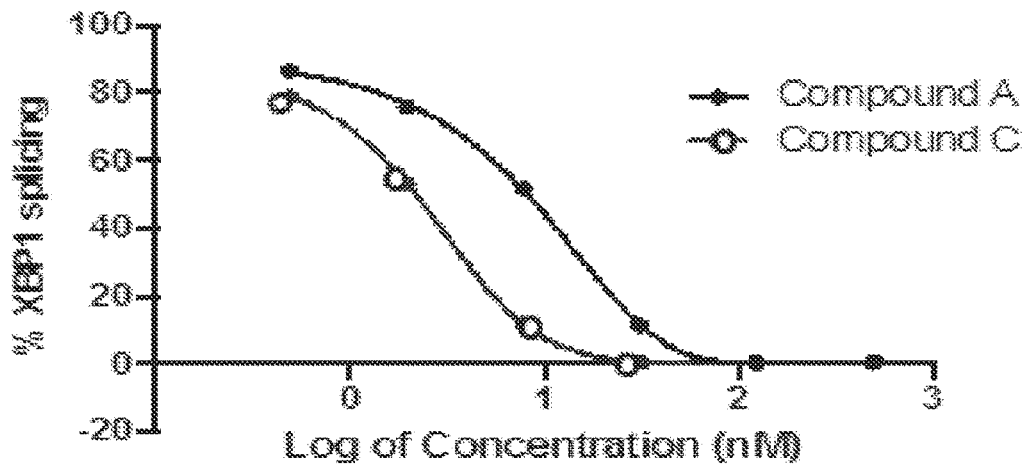
FIG. 6A depicts a plot from a pharmacodynamic assay of XBP1 splicing event occurrence in 293T cells treated with Compound A or Compound C after stress induction.
Figure 6B:
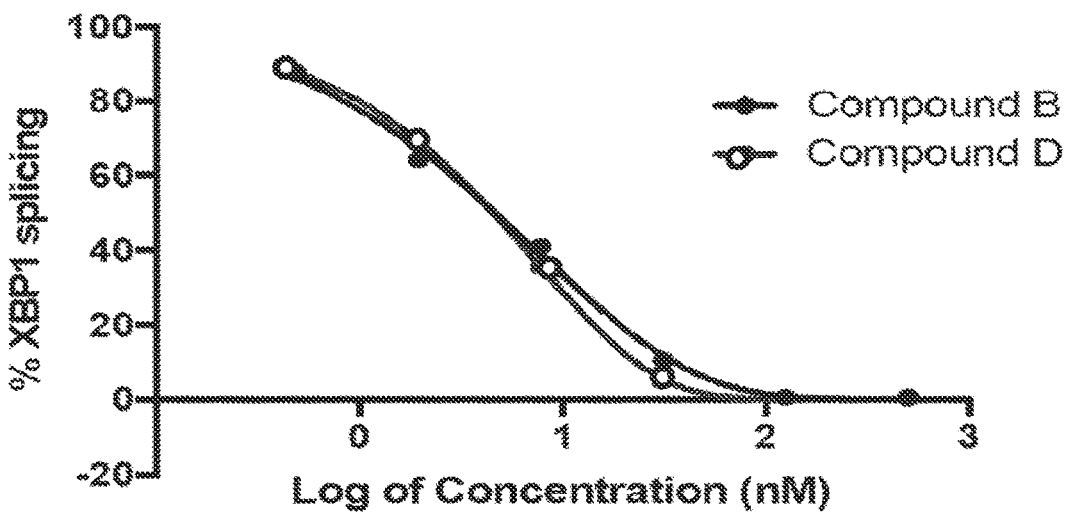
FIG. 6B depicts a plot from a pharmacodynamic assay of XBP1 splicing event occurrence in 293T cells treated with Compound B or Compound D after stress induction.

Dose-dependent inhibitor effects on the IRE1a/XBP1 pathway in 293T cells with or without tunicamycin (TM) (an ER stress inducer) were performed with compounds having $R^6$ and $R^7$ N,N-dimethyl groups (Compound C and Compound D) compared to their dihydrogen analogs (Compound A and Compound B, respectively) (FIG. 6A and FIG. 6B). Gene expression was evaluated by quantitative PCR for XBP1s and total XBP1 transcripts using the $2^{(-\Delta CT)}$ method for calculating normalized gene expression. Gene expression levels were normalized to ACTB transcripts. XBP1 splicing was calculated as actin-normalized XBP1s expression divided by actin-normalized total XBP1 expression. The addition of methyl groups to compounds enhanced the inhibition of IRE1a in the human cell line 293T. The shift in potency observed between Compound A and Compound C was approximately 3.6×.

Example B12: IRE1a Phosphorylation Inhibition Assay

Figure 7:
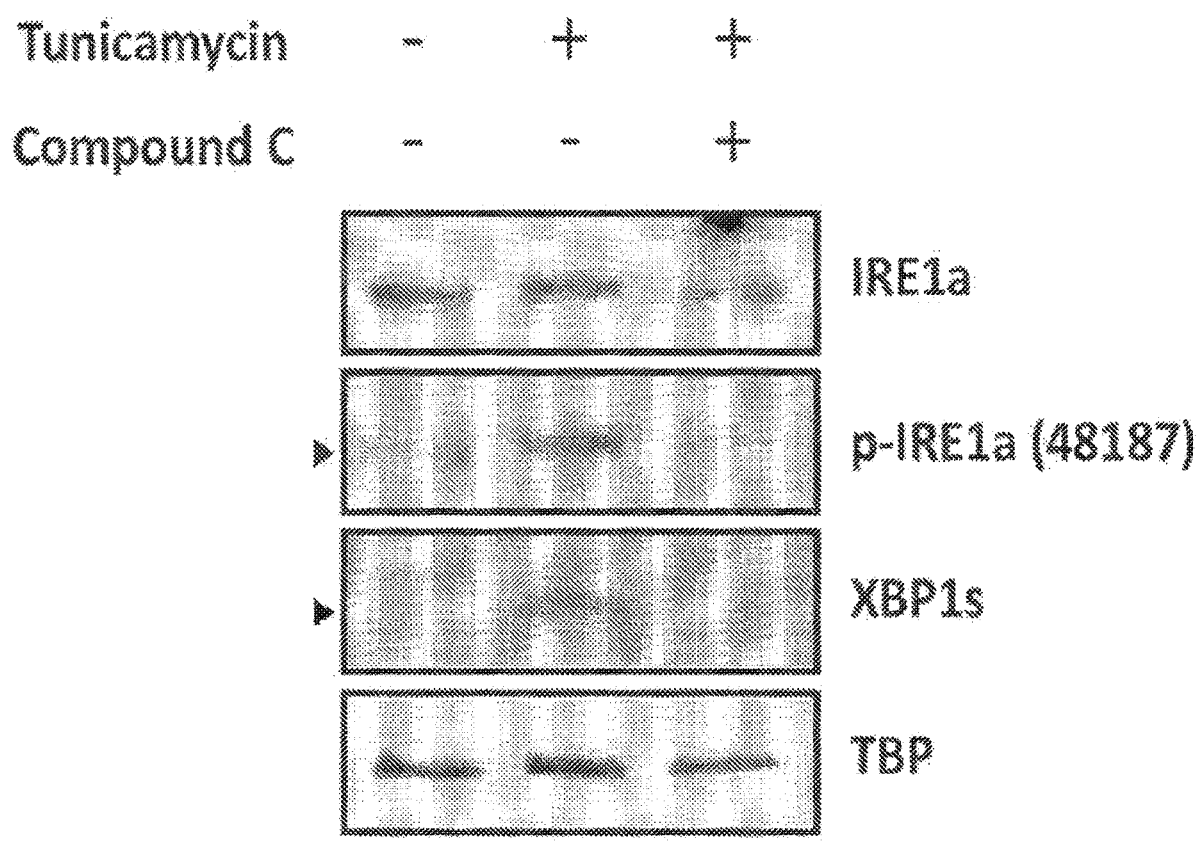
FIG. 7 depicts immunoblot analysis of lysates from tunicamycin treated and optionally Compound C treated 293T cells. Cells were stained for IRE1a, phosphorylated-IRE1a, XBP1, and TBP.

Inhibition of ER stress-induced IRE1a phosphorylation and XBP1s protein accumulation in human 293T cells was assessed. Immunoblot analysis was performed in human 293T cells lysates obtained from cells after exposure to the chemical ER stress-inducing agent tunicamycin, and optional treatment with Compound C. Lysates were probed with antibodies recognizing IRE1a, phosphorylated IRE1a, XBP1, or TATA-binding protein (TBP). TBP was blotted as a protein loading control. Pre-incubation with Compound C of the disclosure, having $R^6$ and $R^7$ N,N-dimethyl groups, strongly repressed IRE1a phosphorylation and completely abrogated the accumulation of XBP1s protein. See FIG. 7. 20 nM was sufficient to reduce XBP1s protein levels below the limit of detection in this assay.

Example B13: Protein Binding—Plasma Protein Binding Assay-HTD Method

The plasma protein binding is determined according to the following steps. Frozen plasma or freshly prepared plasma from various subjects are used as test matrix. They are purchased from commercial vendors or prepared in house from animals. Warfarin is used as a positive control. Other control compound(s) may be used according to specific requirement. One or more compounds from Table 1 are spiked into blank matrix at the final concentration of 2 μM (or other test concentrations based on specific requirement). Final organic solvent concentration is <1%. If plasma samples are collected from in-life studies, they are used as test matrix without spiking compounds. An appropriate volume of spiked plasma solution is removed before incubation for recovery calculation. An aliquot (e.g., 150 uL) of matrix sample is added to one side of the chamber (donor chamber) in a 96-well equilibrium dialyzer plate (HTD dialysis device) and an equal volume of dialysis buffer is added to the other side of the chamber (receiver chamber). Triplicate incubations are performed (or other replicate number according to specific requirement). The dialyzer plate is placed into a humidified incubator with 5% $CO_2$ and incubated at 37° C. for 4 to 6 hours. After incubation, samples are taken from the donor chamber as well as the receiver chamber. The plasma sample is matched with an appropriate volume of blank buffer; and buffer samples are matched with an appropriate volume of blank plasma. The matrix-matched samples are quenched with stop solution containing internal standard. Samples are analyzed by LC/MS/MS. Test compound concentrations in donor and receiver samples are expressed as peak area ratios of analyte/internal standard. If a quantitative analysis is needed, a set of calibration curve and quality controls could be included.

Example B14: TGFb Stimulation Assay

Approximately 2500 HFL1 cells per well are seeded in 100 μL cMEM (MEM supplemented with nonessential amino acids, 25 mM HEPES, 10% FBS, 2 mM glutamax, and 1 mM sodium pyruvate) in a 96-well tissue culture treated plate. Cells are allowed to attach to the plate, incubating undisturbed at 37° C., 5% $CO_2$, for 8 hours. Following the incubation, growth media is removed from the wells via aspiration and replaced with 100 μL of starvation media (MEM supplemented with nonessential amino acids, 25 mM HEPES, 2 mM glutamax, and 1 mM sodium pyruvate). The cells are then incubated at 37° C., 5% $CO_2$, for 16 hours. After the starvation period, starvation media is removed from the wells via aspiration and replaced with 100 μL fresh starvation medium +/− TGFb (5 ng/mL) and IRE1a inhibitor or DMSO as a control is added. The cells are treated for 48 hours at 37° C., 5% $CO_2$. Upon completion of TGFb stimulation and inhibitor treatment gene expression levels are measured by qPCR.

Example B15: Evaluation of Test Compounds in the TNO Bleomycin-Induced Lung Fibrosis Mouse Model Male C57Bl/6J mice (group of 68; 10-12 weeks old) are matched on body weight and divided into five groups. Starting at day 0, 8 mice receive a single oropharyngeal administration with PBS (group 1) and 60 mice (groups 2 to 5, n=15 per group) receive a single oropharyngeal administration with bleomycin to induce lung fibrosis. At day 7, all mice receive a bolus i.p. injection with 100% $D_2O$ or 100% $D_2O/0.9\%$ NaCl. Mice receive 8% $D_2O$ in the drinking water to enable labelling of newly formed collagen. Beginning on day 8, mice receive oral treatment (QD) with vehicle (8% $D_2O$-water; groups 1 and 2), oral treatment with an IRE1a inhibitor (150 mg/kg dose; groups 3 and 4), or i.p. treatment with an IRE1a inhibitor (50 mg/kg dose; group 5). On day 9 (24 hours after the first dosing) and on day 21 (24 hours after the last dosing), 100 μL of unfasted EDTA-plasma is collected by a tail vein bleed for pharmacokinetic analysis of the IRE1a inhibitors. On day 21, all mice are sacrificed using isoflurane anesthesia and terminal blood (by heart puncture), pancreas, and lung lobes are isolated, and at least 100 μL plasma is collected for $D_2O$ determination. Pancreatic tissue is used for RNA analysis, and lung tissue (medial, accessory, cranial, and caudal lobes) is used for histology evaluation, determination of hydroxyproline content, new collagen analysis, and/or RNA analysis. The Ashcroft lung score and total collagen content in the lung and/or new collagen in the lung are analyzed. The effects of the inhibitors on the histology lung fibrosis score (modified Ashcroft score) and on collagen content (hydroxyproline content) are determined, and new collagen is evaluated.

While examples of the present disclosure have been shown and described herein, it will be obvious to those skilled in the art that such examples are provided by way of example only. Numerous variations, changes, and substitutions will now occur to those skilled in the art without departing from the disclosure. It should be understood that various alternatives to the examples of the disclosure described herein may be employed in practicing the disclosure. It is intended that the following claims define the scope of the disclosure and that methods and structures within the scope of these claims and their equivalents be covered thereby.

What is claimed is:

1. A method of treating fibrosis in a subject, the method comprising administering to the subject an effective amount of a compound of Formula (I) or a pharmaceutically acceptable salt thereof;
wherein the compound of Formula (I) is:

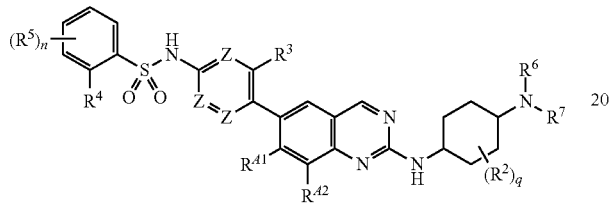

Formula (I)

wherein
each Z is independently N or $CR^1$, provided that at least one Z is N;
each $R^1$ is independently H, halogen, —CN, —$OR^8$, —$SR^8$, —S(=O)$R^9$, —S(=O)$_2$RV, —S(=O)$_2$N($R^8$)$_2$, —$NR^8$S(=O)$_2R^9$, —C(=O)$R^9$, —OC(=O)$R^9$, —C(=O)$OR^8$, —OC(=O)$OR^9$, —N($R^8$)$_2$, —OC(=O)N($R^8$)$_2$, —$NR^8$C(=O)$R^9$, —$NR^8$C(=O)$R^9$, optionally substituted $C_1$-$C_4$alkyl, optionally substituted $C_1$-$C_4$fluoroalkyl, optionally substituted $C_1$-$C_4$heteroalkyl, optionally substituted $C_3$-$C_6$cycloalkyl, optionally substituted aryl, or optionally substituted heteroaryl;
$R^3$ is —CN, —$OR^8$, —$SR^8$, optionally substituted $C_1$-$C_4$alkyl, optionally substituted $C_1$-$C_4$fluoroalkyl, optionally substituted —O—$C_1$-$C_4$alkyl, optionally substituted $C_1$-$C_4$heteroalkyl, optionally substituted $C_3$-$C_6$cycloalkyl, optionally substituted —O—$C_3$-$C_6$cycloalkyl, optionally substituted $C_3$-$C_6$heterocycloalkyl, optionally substituted —O—$C_3$-$C_6$heterocycloalkyl, optionally substituted aryl, or optionally substituted heteroaryl,
$R^4$ is halogen, —CN, —$OR^8$, optionally substituted $C_1$-$C_4$alkyl, optionally substituted $C_1$-$C_4$fluoroalkyl, or optionally substituted $C_1$-$C_4$heteroalkyl;
each $R^5$ is independently halogen, —CN, —$OR^8$, —$SR^8$, —N($R^8$)$_2$, optionally substituted $C_1$-$C_4$alkyl, optionally substituted $C_1$-$C_4$fluoroalkyl, optionally substituted $C_1$-$C_4$heteroalkyl, optionally substituted $C_3$-$C_6$cycloalkyl, optionally substituted $C_2$-$C_{10}$heterocycloalkyl, optionally substituted aryl, or optionally substituted heteroaryl;
each $R^2$ is independently halogen, —CN, —$OR^8$, —$SR^8$, —S(=O)$R^9$, —S(=O)$_2R^9$, —S(=O)$_2$N($R^8$)$_2$, —$NR^8$S(=O)$_2R^9$, —C(=O)$R^9$, —OC(=O)$R^9$, —C(=O)$OR^8$, —OC(=O)$OR^9$, —N($R^8$)$_2$, —OC(=O)N($R^8$)$_2$, —$NR^8$C(=O)$R^9$, —$NR^8$C(=O)$OR^9$, optionally substituted $C_1$-$C_4$alkyl, optionally substituted $C_1$-$C_4$fluoroalkyl, optionally substituted $C_1$-$C_4$heteroalkyl, optionally substituted $C_3$-$C_6$cycloalkyl, optionally substituted aryl, or optionally substituted heteroaryl;

$R^6$ is H, optionally substituted $C_1$-$C_4$alkyl, optionally substituted $C_1$-$C_4$heteroalkyl, optionally substituted $C_1$-$C_4$fluoroalkyl, optionally substituted $C_3$-$C_6$cycloalkyl, optionally substituted $C_3$-$C_6$cycloalkylalkyl, optionally substituted $C_2$-$C_{10}$heterocycloalkyl, optionally substituted aryl, or optionally substituted heteroaryl;
$R^7$ is optionally substituted $C_1$-$C_4$alkyl, optionally substituted $C_1$-$C_4$heteroalkyl, optionally substituted $C_1$-$C_4$fluoroalkyl, optionally substituted $C_3$-$C_6$cycloalkyl, optionally substituted $C_3$-$C_6$cycloalkylalkyl, optionally substituted $C_2$-$C_{10}$heterocycloalkyl, optionally substituted aryl, or optionally substituted heteroaryl;
or $R^6$ and $R^7$ are taken together with the N atom to which they are attached to form an optionally substituted heterocycle;
each $R^8$ is independently H, optionally substituted $C_1$-$C_4$alkyl, optionally substituted $C_1$-$C_4$heteroalkyl, optionally substituted $C_1$-$C_4$fluoroalkyl, optionally substituted $C_3$-$C_6$cycloalkyl, optionally substituted $C_2$-$C_{10}$heterocycloalkyl, optionally substituted aryl, or optionally substituted heteroaryl;
or two $R^8$ are taken together with the N atom to which they are attached to form an optionally substituted heterocycle;
each $R^9$ is independently optionally substituted $C_1$-$C_4$alkyl, optionally substituted $C_1$-$C_4$heteroalkyl, optionally substituted $C_1$-$C_4$fluoroalkyl, optionally substituted $C_3$-$C_6$cycloalkyl, optionally substituted $C_2$-$C_{10}$heterocycloalkyl, optionally substituted aryl, or optionally substituted heteroaryl;
$R^{41}$ and $R^{42}$ are each independently H, halogen, —$OR^9$, optionally substituted $C_1$-$C_4$alkyl, optionally substituted $C_1$-$C_4$heteroalkyl, optionally substituted $C_1$-$C_4$fluoroalkyl, or optionally substituted aryl;
provided that both $R^{41}$ and $R^{42}$ are not H;
n is 0, 1, 2, 3, or 4; and
q is 0, 1, 2, 3, or 4;
provided that the compound of Formula (I) is not 2-chloro-N-(5-2-(((1s,4s)-4-(dimethylamino)-4-methylcyclohexyl)amino)-8-ethylquinazolin-6-yl)-6-methoxypyridin-2-yl)benzenesulfonamide or 2-chloro-N-(5-(2-(((1s,4s)-4-(dimethylamino)-4-methylcyclohexyl)amino)-8-ethylquinazolin-6-yl)-3-fluoro-6-methoxypyridin-2-yl(benzenesulfonamide.

2. The method of claim 1, wherein $R^6$ is hydrogen or optionally substituted $C_1$-$C_4$alkyl.

3. The method of claim 1, wherein

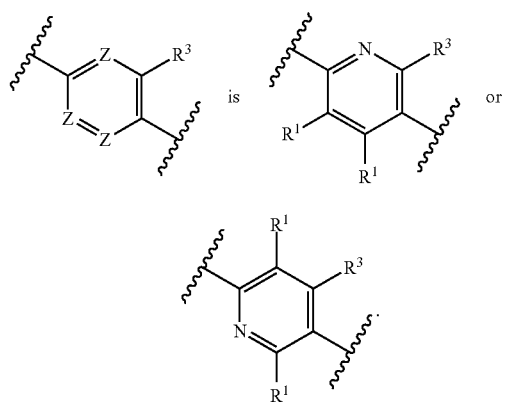

4. The method of claim 3, wherein $R^3$ is methyl, ethyl, propyl, or butyl.

5. The method of claim 4, wherein $R^4$ is halogen.

6. The method of claim 1, wherein q is 0.

7. The method of claim 1, wherein the compound of Formula (I) is a compound of Formula (I*), or a pharmaceutically acceptable salt thereof:

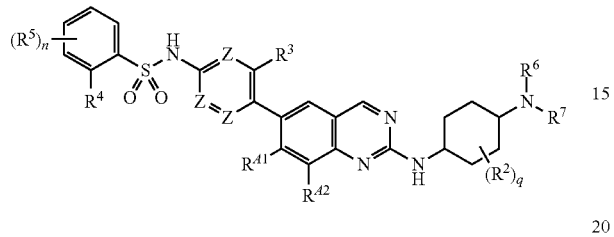

Formula (I*)

wherein
each Z is independently N or $CR^1$, provided that at least one Z is N;
each $R^1$ is independently hydrogen, fluorine, chlorine, or cyano;
$R^3$ is —CN, optionally substituted $C_1$-$C_3$alkyl, optionally substituted $C_3$-$C_4$cycloalkyl, optionally substituted —O—$C_3$-$C_4$cycloalkyl, or optionally substituted —O—$C_1$-$C_3$alkyl;
$R^4$ is chlorine, —$CH_3$, cyano, —$OCH_3$, or $CF_3$;
each $R^5$ is independently chlorine, —$CH_3$, cyano, —$OCH_3$, or $CF_3$;
each $R^2$ is independently fluorine, —$CH_3$, or —OH;
$R^6$ is H, or $C_1$-$C_3$alkyl;
$R^7$ is optionally substituted $C_1$-$C_3$alkyl;
$C_1$-$C_3$fluoroalkyl, $C_1$-$C_3$heteroalkyl, or $C_3$-$C_4$cycloalkyl-$C_1$-$C_3$alkyl;
or $R^6$ and $R^7$ are taken together with the N atom to which they are attached to form an optionally substituted 4 to 6 membered ring, the remainder of the ring atoms being carbon;
$R^{41}$ and $R^{42}$ are each independently H, optionally substituted $C_1$-$C_3$alkyl, $C_1$-$C_3$fluoroalkyl, optionally substituted $C_1$-$C_3$heteroalkyl, or optionally substituted $C_3$-$C_4$cycloalkyl-$C_1$-$C_3$alkyl, provided that both $R^{41}$ and $R^{42}$ are not hydrogen;
n is 0, 1, 2, 3, or 4; and
q is 0, 1, 2, 3, or 4.

8. The method of claim 7, wherein the compound has the structure of formula (Ib*), (Ic*), or (Id*), or a pharmaceutically acceptable salt:

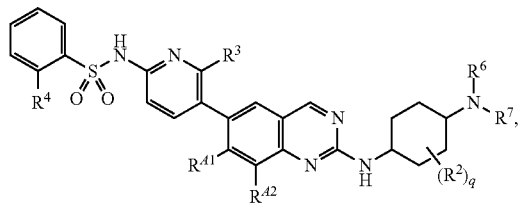

(Ib*)

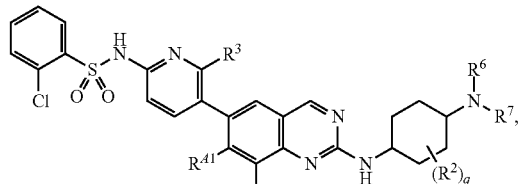

(Ic*)

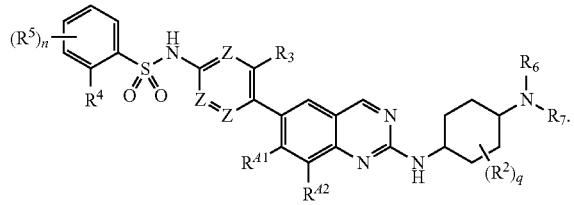

(Id*)

9. The method of claim 7, wherein $R^4$ is halo.

10. The method of claim 7, wherein:
each Z is independently N or $CR^1$, provided that at least one Z is N;
each $R^1$ is independently hydrogen, fluorine, chlorine or cyano;
$R^3$ is $C_1$-$C_3$alkyl or —$OC_1$-$C_3$alkyl;
$R^{41}$ is hydrogen or $C_1$-$C_3$alkyl;
$R^{42}$ is $C_1$-$C_3$alkyl, $C_1$-$C_3$fluoroalkyl, or $C_1$-$C_3$heteroalkyl;
provided that both $R^{41}$ and $R^{42}$ are not hydrogen;
$R^4$ is chlorine;
each $R^5$ is independently chlorine, —$CH_3$, cyano, —$OCH_3$, or $CF_3$;
n is 0, 1, 2, 3, or 4; and
q is zero.

11. The method of claim 10, wherein one Z is nitrogen.

12. The method of claim 11, wherein:
n is 0;
$R^4$ is chlorine;
q is 0; and
$R^1$ is hydrogen.

13. The method of claim 12, wherein $R^6$ is methyl and $R^7$ is methyl.

14. The method of claim 13, wherein $R^{42}$ is ethyl.

15. The method of claim 1, wherein the compound of Formula (I) is selected from:
2-chloro-N-(5-(2-((((1r,4r)-4-(dimethylamino)cyclohexyl)amino)-8-ethylquinazolin-6-yl)-6-methylpyridin-2-yl)benzenesulfonamide;
2-chloro-N-(5-(2-(((1r,4r)-4-(dimethylamino)cyclohexyl)amino)-8-ethylquinazolin-6-yl)-3-fluoro-6-methylpyridin-2-yl)benzenesulfonamide;
2-chloro-N-(5-(2-(((1r,4r)-4-(dimethylamino)cyclohexyl)amino)-8-ethylquinazolin-6-yl)-6-methoxypyridin-2-yl)benzenesulfonamide;
2-chloro-N-(5-(2-(((1r,4r)-4-(dimethylamino)cyclohexyl)amino)-7-methylquinazolin-6-yl)-6-methoxypyridin-2-yl)benzenesulfonamide;
2-chloro-N-(5-(8-ethyl-2-(((1r,4r)-4-(methylamino)cyclohexyl)amino)quinazolin-6-yl)-6-methoxypyridin-2-yl)benzenesulfonamide;
2-chloro-N-(5-(2-(((1r,4r)-4-(dimethylamino)cyclohexyl)amino)-8-ethylquinazolin-6-yl)-6-ethylpyridin-2-yl)benzenesulfonamide;

N-(5-(8-ethyl-2-(((1r,4r)-4-(methylamino)cyclohexyl)amino)quinazolin-6-yl)-6-methoxy pyridin-2-yl)-2-methylbenzenesulfonamide;

N-(5-(2-(((1r,4r)-4-(dimethylamino)cyclohexyl)amino)-8-ethylquinazolin-6-yl)-6-methoxypyridin-2-yl)-2-methylbenzenesulfonamide;

2-chloro-N-(5-(8-ethyl-2-(((1r,4r)-4-(methylamino)cyclohexyl)amino)quinazolin-6-yl)-6-methylpyridin-2-yl)benzenesulfonamide;

2-chloro-N-(5-(8-(1,1-difluoroethyl)-2-(((1r,4r)-4-(dimethylamino)cyclohexyl)amino)quinazolin-6-yl)-6-methoxypyridin-2-yl)benzenesulfonamide;

2-chloro-N-(5-(8-ethyl-2-(((1r,4r)-4-(ethyl(methyl)amino)cyclohexyl)amino)quinazolin-6-yl)-6-methylpyridin-2-yl)benzenesulfonamide;

2-chloro-N-(5-(8-ethyl-2-(((1r,4r)-4-(methyl(2,2,2-trifluoroethyl)amino)cyclohexyl)amino)quinazolin-6-yl)-6-methylpyridin-2-yl)benzeneesulfonamide;

2-chloro-N-(5-(8-ethyl-2-(((1r,4r)-4-(methylamino)cyclohexyl)amino)quinazolin-6-yl)-3-fluoro-6-methoxypyridin-2-yl)benzenesulfonamide;

2-chloro-N-(5-(2-(((1r,4r)-4-(dimethylamino)cyclohexyl)amino)-8-ethylquinazolin-6-yl)-3-fluoro-6-methoxypyridin-2-yl)benzenesulfonamide;

2-chloro-N-(5-(2-(((1r,4r)-4-((cyclobutylmethyl)(methyl)amino)cyclohexyl)amino)-8-ethylquinazolin-6-yl)-6-methylpyridin-2-yl)benzenesulfonamide;

2-chloro-N-(5-(8-(1,1-difluoroethyl)-2-((1r,4r)-4-(dimethylamino)cyclohexyl)amino)quinazolin-6-yl)-6-methylpyridin-2-yl)benzenesulfonamide;

2-chloro-N-(5-(8-ethyl-2-(((1r,4r)-4-((2-methoxyethyl)(methyl)amino)cyclohexyl)amino)quinazolin-6-yl)-6-methylpyridin-2-yl)benzenesulfonamide;

2-chloro-N-(5-(2-(((1r,4r)-4-(dimethylamino)cyclohexyl)amino)-8-methylquinazolin-6-yl)-6-methoxypyridin-2-yl)benzenesulfonamide;

2-chloro-N-(5-(2-(((1r,4r)-4-(dimethylamino)cyclohexyl)amino)-8-(trifluoromethyl)quinazolin-6-yl)-6-methoxypyridin-2-yl)benzenesulfonamide;

2-chloro-N-(5-(2-(((1r,4r)-4-(dimethylamino)cyclohexyl)amino)-8-(methoxymethyl)quinazolin-6-yl)-6-methoxypyridin-2-yl)benzensulfonamide;

2-chloro-N-(5-(2-(((1s,4s)-4-(dimethylamino)cyclohexyl)amino)-8-methylquinazolin-6-yl)-6-methoxypyridin-2-yl)benzenesulfonamide;

2-chloro-N-(5-(2-(((1s,4s)-4-(dimethylamino)cyclohexyl)amino)-8-ethylquinazolin-6-yl)-6-methoxypyridin-2-yl)benzenesulfonamide;

2-chloro-N-(5-(2-(((1 s,4s)-4-(dimethylamino)cyclohexyl)amino)-8-ethylquinazolin-6-yl)-3-fluoro-6-methoxypyridin-2-yl)benzenesulfonamide;

2-chloro-N-(5-(2-(((1s,4s)-4-(dimethylamino)-4-methylcyclohexyl)amino)-8-ethylquinazolin-6-yl)-6-methoxypyridin-2-yl)benzenesulfonamide;

2-chloro-N-(5-(2-(((1 s,4s)-4-(dimethylamino)-4-methylcyclohexyl)amino)-8-ethylquinazolin-6-yl)-3-fluoro-6-methoxypyridin-2-yl)benzenesulfonamide;

2-chloro-N-(5-(2-(((1r,4r)-4-(dimethylamino)cyclohexyl)amino)-8-methylquinazolin-6-yl)-3-fluoro-6-methoxypyridin-2-yl)benzenesulfonamide;

2-chloro-N-(5-(2-(((1s,4s)-4-(dimethylamino)cyclohexyl)amino)-8-methylquinazolin-6-yl)-3-fluoro-6-methoxypyridin-2-yl)benzenesulfonamide;

2-chloro-N-(5-(2-(((1r,4r)-4-(dimethylamino)cyclohexyl)amino)-8-fluoroquinazolin-6-yl)-6-methoxypyridin-2-yl)benzenesulfonamide;

2-chloro-N-(5-(2-(((1r,4r)-4-(dimethylamino)cyclohexyl)amino)quinazolin-6-yl)-3-fluoro-6-methoxypyridin-2-yl)benzenesulfonamide;

2-chloro-N-(3-fluoro-6-methoxy-5-(2-(((1r,4r)-4-(methylamino)cyclohexyl)amino)quinazolin-6-yl)pyridin-2-yl)benzenesulfonamide;

2-chloro-N-(5-(2-(((1S,2S,4S)-4-(dimethylamino)-2-fluorocyclohexyl)amino)-8-ethylquinazolin-6-yl)-6-methylpyridin-2-yl)benzenesulfonamide;

2,3-dichloro-N-(5-(2-(((1r,4r)-4-(dimethylamino)cyclohexyl)amino)-8-ethylquinazolin-6-yl)-6-methylpyridin-2-yl)benzenesulfonamide;

2-chloro-N-(5-(2-(((1r,4r)-4-(dimethylamino)cyclohexyl)amino)quinazolin-6-yl)-3-fluoro-6-methylpyridin-2-yl)benzenesulfonamide;

2-chloro-N-(5-(2-(((1r,4r)-4-(dimethylamino)cyclohexyl)amino)-8-ethylquinazolin-6-yl)-4-methoxypyrimidin-2-yl)benzenesulfonamide;

2-chloro-N-(5-(2-(((1r,4r)-4-(dimethylamino)cyclohexyl)amino)-8-ethylquinazolin-6-yl)-3-fluoro-6-methoxypyridin-2-yl)benzenesulfonamide;

2-chloro-N-(5-(2-(((1r,4r)-4-(dimethylamino)cyclohexyl)amino)-8-fluoroquinazolin-6-yl)-3-fluoro-6-methylpyridin-2-yl)benzenesulfonamide;

2-chloro-N-(5-(2-(((1r,4r)-4-(dimethylamino)cyclohexyl)amino)-8-ethylquinazolin-6-yl)-6-methoxypyrazin-2-yl)benzenesulfonamide;

2-chloro-N-(5-(2-(((1r,4r)-4-(dimethylamino)cyclohexyl)amino)-8-ethylquinazolin-6-yl)-6-methylpyridin-2-yl)-3-fluorobenzenesulfonamide;

2-chloro-N-(6-(2-(((1r,4r)-4-(dimethylamino)cyclohexyl)amino)-8-ethylquinazolin-6-yl)-5-methoxypyridazin-3-yl)benzenesulfonamide;

2-chloro-N-(5-(2-(((1r,4r)-4-(dimethylamino)cyclohexyl)amino)-8-ethylquinazolin-6-yl)-6-methylpyridin-2-yl)-3-methylbenzenesulfonamide;

2-chloro-N-(5-(2-(((1r,4r)-4-(dimethylamino)cyclohexyl)amino)-8-ethyl-7-fluoroquinazolin-6-yl)-6-methylpyridin-2-yl)benzenesulfonamide;

2-chloro-N-(5-(2-((1r,4r)-4-(dimethylamino)cyclohexyl)amino)-8-ethyl-7-fluoroquinazolin-6-yl)-3-fluoro-6-methylpyridin-2-yl)benzenesulfonamide; and 2-chloro-N-(5-(2-(((1r,4r)-4-(dimethylamino)cyclohexyl)amino)-8-ethyl-7-fluoroquinazolin-6-yl)-3-fluoro-6-methoxypyridin-2-yl)benzenesulfonamide;

and pharmaceutically acceptable salts thereof.

16. The method of claim 1, wherein the compound of Formula (I) is selected from:

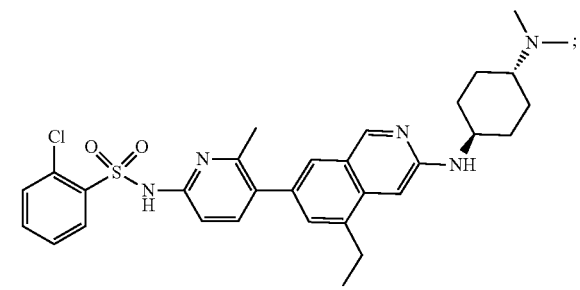

2-chloro-N-(5-(2-(((1r,4r)-4-(dimethylamino)cyclohexyl)amino)-8-ethylquinazolin-6-yl)-6-methylpyridin-2-yl)benzenesulfonamide

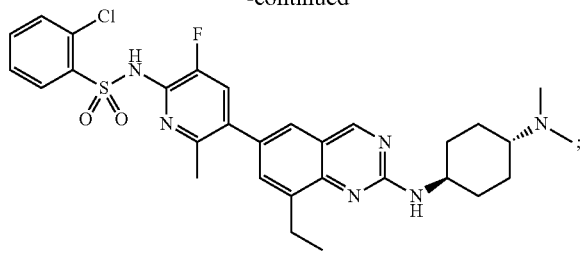

2-chloro-N-(5-(2-(((1r,4r)-4-
(dimethylamino)cyclohexyl)amino)-8-
ethylquinazolin-6-yl)-3-fluoro-6-
methylpyridin-2-yl)benzenesulfonamide

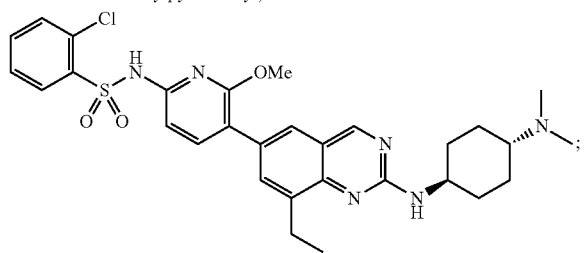

2-chloro-N-(5-(2-(((1r,4r)-4-
(dimethylamino)cyclohexyl)amino)-8-
ethylquinazolin-6-yl)-6-methoxypyridin-2-
yl)benzenesulfonamide

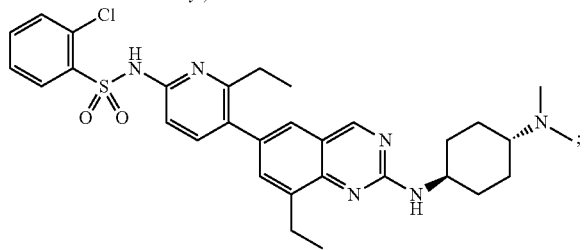

2-chloro-N-(5-(2-(((1r,4r)-4-
(dimethylamino)cyclohexyl)amino)-8-
ethylquinazolin-6-yl)-6-ethylpyridin-2-
yl)benzenesulfonamide

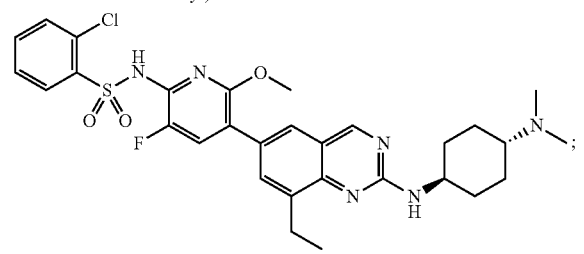

2-chloro-N-(5-(2-(((1r,4r)-4-
(dimethylamino)cyclohexyl)amino)-8-
ethylquinazolin-6-yl)-3-fluoro-6-
methoxypyridin-2-yl)benzenesulfonamide

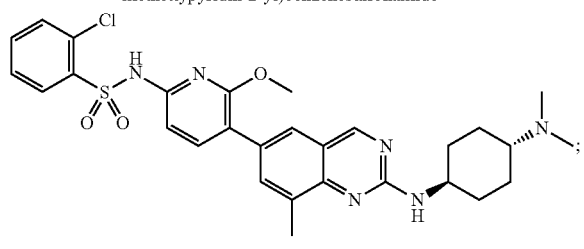

2-chloro-N-(5-(2-(((1r,4r)-4-
(dimethylamino)cyclohexyl)amino)-8-
methylquinazolin-6-yl)-6-methoxypyridin-2-
yl)benzenesulfonamide

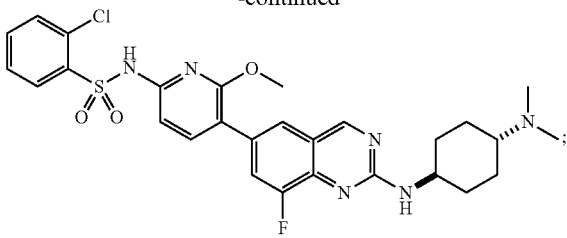

2-chloro-N-(5-(2-(((1r,4r)-4-
(dimethylamino)cyclohexyl)amino)-8-
fluoroquinazolin-6-yl)-6-methoxypyridin-2-
yl)benzenesulfonamide

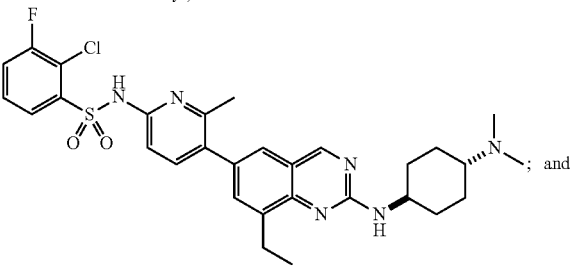

2-chloro-N-(5-(2-(((1r,4r)-4-
(dimethylamino)cyclohexyl)amino)-8-
ethylquinazolin-6-yl)-6-methylpyridin-2-yl)-
3-fluorobenzenesulfonamide

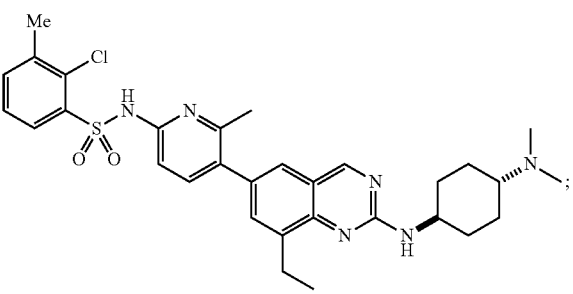

2-chloro-N-(5-(2-(((1r,4r)-4-
(dimethylamino)cyclohexyl)amino)-8-
ethylquinazolin-6-yl)-6-methylpyridin-2-yl)-
3-methylbenzenesulfonamide and pharmaceutically acceptable salts thereof.

17. The method of claim 1, wherein, the compound of Formula (f) is selected from:
N-(5-(2-(((1r,4r)-4-aminocyclohexyl)amnio)-8-ethylquinazolin-6-yl)-4-methylpyrimidin-2-yl)-2-chlorobenzenesulfonamide;
N-(4-(2-(((1r,4r)-4-aminocyclohexyl)amino)-8-ethylquinazolin-6-yl)-2-fluorophenyl)-2-chlorobenzenesulfonamide;
N-(5-(2-(((1r,4r)-4-aminocyclohexyl)amino)-8-ethylquinazolin-6-yl)pyrazin-2-yl)-2-chlorobenzenesulfonamide;
N-(4-(2-(((1r,4r)-4-aminocyclohexyl)amino)quinazolin-6-yl)phenyl)-2-chlorobenzenesulfonamide;
N-(5-(2-(((1r,4r)-4-aminocyclohexyl)amino)-8-ethylquinazolin-6-yl)pyridin-2-yl)-2-chlorobenzenesulfonamide;
N-(6-(2-(((1r,4r)-4-aminocyclohexyl)amino)-8-ethylquinazolin-6-yl)pyridin-3-yl)-2-chlorobenzenesulfonamide;
N-(5-(2-(((1r,4r)-4-aminocyclohexyl)amino)-8-ethylquinazolin-6-yl)-1H-pyrazol-3-yl)-2-chlorobenzenesulfonamide;

N-(4-(2-(((1r,4r)-4-aminocyclohexyl)amino)-8-hydroxyquinazolin-6-yl)-3-methylphenyl)-2-chloro-N-methylbenzenesulfonamide;

N-(4-(2-(((1r,4r)-4-aminocyclohexyl)amino)-8-ethylquinazolin-6-yl)-3-methylphenyl)-2-chloro-N-methylbenzenesulfonamide;

N-(6-(2-(((1r,4r)-4-aminocyclohexyl)amino)-8-ethylquinazolin-6-yl)pyridazin-3-yl)-2-chlorobenzenesulfonamide;

N-(2-(2-(((1r,4r)-4-aminocyclohexyl)amino)-8-ethylquinazolin-6-yl)pyrimidin-5-yl)-2-chlorobenzenesulfonamide;

N-(4-(2-(((1r,4r)-4-aminocyclohexyl)amino)-8-ethylquinazolin-6-yl)-3-ethylphenyl)-2-chlorobenzenesulfonamide;

N-(4-(2-(((1r,4r)-4-aminocyclohexyl)amino)-8-ethylquinazolin-6-yl)-3-fluorophenyl)-2-chlorobenzensulfonamide;

N-(4-(2-(((1r,4r)-4-aminocyclohexyl)amino)-8-methoxyquinazolin-6-yl)-3-methylphenyl)-2-chlorobenzenesulfonamide;

N-(5-(2-(((1r,4r)-4-aminocyclohexyl)amino)-8-ethylquinazolin-6-yl)-6-methoxypyridin-2-yl)-2-chlorobenzenesulfonamide;

N-(5-(2-(((1r,4r)-4-aminocyclohexyl)amino)-8-ethylquinazolin-6-yl)-4-methylthiazol-2-yl)-2-chlorobenzenesulfonamide;

N-(5-(2-(((1r,4r)-4-aminocyclohexyl)amino)-8-ethylquinazolin-6-yl)pyridin-2-yl)-2-chlorobenzenesulfonamide;

N-(5-(2-(((1r,4r)-4-aminocyclohexyl)amino)-8-isopropylquinazoline-6-yl)-1-methyl-1H-pyrazol-3-yl)-2-chlorobenzenesulfonamide;

N-(5-(2-(((1r,4r)-4-aminocyclohexyl)amino)-8-ethylquinazolin-6-yl)thiazol-2-yl)-2-chlorobenzenesulfonamide;

N-(4-(2-(((1r,4r)-4-aminocyclohexyl)amino)-8-ethylquinazolin-6-yl)-2-fluoro-5-methoxyphenyl)-2-chlorobenzenesulfonamide;

N-(1-(2-(((1r,4r)-4-aminocyclohexyl)amino)-8-ethylquinazolin-6-yl)-1H-pyrazol-4-yl)-2-chlorobenzenesulfonamide;

N-(5-(2-(((1r,4r)-4-aminocyclohexyl)amino)-8-ethylquinazolin-6-yl)isoxazol-3-yl)-2-chlorobenzenesulfonamide;

N-(5-(2-(((1r,4r)-4-aminocyclohexyl)amino)-8-methoxyquinazolin-6-yl)-1-methyl-1H-pyrazol-3-yl)-2-chlorobenzenesulfonamide;

N-(5-(2-(((1r,4r)-4-aminocyclohexyl)amino)-8-ethylquinazolin-6-yl)-4-methoxypyrimidin-2-yl)-2-chlorobenzenesulfonamide;

N-(5-(2-(((1r,4r)-4-aminocyclohexyl)amino)-8-propylquinazolin-6-yl)-1-methyl-1H-pyrazol-3-yl)-2-chlorobenzenesulfonamide;

N-(4-(2-(((1r,4r)-4-aminocyclohexyl)amino)quinazolin-6-yl)-3-fluorophenyl)-2-chlorobenzenesulfonamide;

N-(6-(2-(((1r,4r)-4-aminocyclohexyl)amino)quinazolin-6-yl)pyridazin-3-yl)-2-chlorobenzenesulfonamide;

N-(4-(2-(((1r,4r)-4-aminocyclohexyl)amino)quinazolin-6-yl)-2-fluorophenyl)-2-chlorobenzensulfonamide;

N-(6-(2-(((1r,4r)-4-aminocyclohexyl)amino)quinazolin-6-yl)-5-fluoropyridin-3-yl)-2-chlorobenzenesulfonamide;

N-(6-(2-(((1r,4r)-4-aminocyclohexyl)amino)-8-ethylquinazolin-6-yl)-5-fluoropyridin-3-yl)-2-chlorobenzenesulfonamide;

N-(4-(2-(((1r,4r)-4-aminocyclohexyl)amino)quinazolin-6-yl)-2,5-difluorophenyl)-2-chlorobenzenesulfonamide;

N-(5(2-(((1r,4r)-4-aminocyclohexyl)amino)quinazolin-6-yl)-3-fluoropyridin-2-yl)-2-chlorobenzenesulfonamide;

N-(5-(2-(((1r,4r)-4-aminocyclohexyl)amino)-8-ethylquinazolin-6-yl)-3-fluoropyridin-2-yl)-2-chlorobenzenesulfonamide;

N-(4-(2-(((1r,4r)-4-aminocyclohexyl)amino)quinazolin-6-yl)-2,3-difluorophenyl)-2-chlorobenzenesulfonamide;

N-(4-(3-(((1r,4r)-4-aminocyclohexyl)amino)isoquinolin-7-yl)-2-fluorophenyl)-2-chlorobenzenesulfonamide;

(S)-2-amino-N-(1r,4S)-4-((6-(4-((2-chlorophenyl)sulfonamido)-3-fluorophenyl)-8-ethylquinazolin-2-yl)amino)cyclohexyl)-3-methylbutanamide;

N-((1r,4r)-4-((6-(4-((2-chlorophenyl)sulfonamido)-3-fluorophenyl)-8-ethylquinazolin-2-yl)amino)cyclohexyl)acetamide;

2-chloro-N-(4-(8-ethyl-2-(((1r,4r)-4-(methylamino)cyclohexyl)amino)quinazolin-6-yl)-2-fluorophenyl)benzenesulfonamide;

2-chloro-N-(6-(8-ethyl-2-(((1r,4r)-4-(methylamino)cyclohexyl)amino)quinazolin-6-yl)pyridazin-3-yl)benzenesulfonamide;

N-(4-(2-(((1r,4r)-4-aminocyclohexyl)amino)quinazolin-6-yl)-3,5-difluorophenyl)-2-chlorobenzenesulfonamide;

N-(4-(2-(((1r,4r)-4-aminocyclohexyl)amino)-8-ethylquinazolin-6-yl)-2,6-difluorophenyl)-2-chlorobenzenesulfonamide;

2-chloro-N-(6-(2-(((1r,4r)-4-(dimethylamino)cyclohexyl)amino)-8-ethylquinazolin-6-yl)pyridazin-3-yl)benzenesulfonamide;

N-(6-(2-(((1r,4r)-4-aminocyclohexyl)amino)-8-ethylquinazolin-6-yl)-5-methoxypyridazin-3-yl)-2-chlorobenzenesulfonamide;

N-(6-(2-((1r,4r)-4-aminocyclohexyl)amino)-8-ethylquinazolin-6-yl)-4-methoxypyridazin-3-yl)-2-chlorobenzenesulfonamide;

N-(6-(2-(((1r,4r)-4-aminocyclohexyl)amino)-8-ethylquinazolin-6-yl)-5-methylpyridazin-3-yl)-2-chlorobenzenesulfonamide;

N-(5-(2-(((1r,4r)-4-aminocyclohexyl)amino)quinazolin-6-yl)-4-methylpyrimidin-2-yl)-2-chlorobenzenesulfonamide;

2-chloro-N-(4-(2-(((1r,4r)-4-(dimethylamino)cyclohexyl)amino)-8-ethylquinazolin-6-yl)-2-fluorophenyl)benzenesulfonamide;

N-(4-(2-(((1R,3R,4S)-4-amino-3-methylcyclohexyl)amino)-8-ethylquinazolin-6-yl)-2-fluorophenyl)-2-chlorobenzenesulfonamide;

N-(4-(2-(((1r,4r)-4-aminocyclohexyl)amino)-8-ethylquinazolin-6-yl)-2-fluoro-3-methylphenyl)-2-chlorobenzenesulfonamide;

N-(4-(2-(((1R,3 S)-3-aminocyclohexyl)amino)-8-ethylquinazolin-6-yl)-2-fluorophenyl)-2-chlorobenzenesulfonamide;

(S)-2-chloro-N-(4-(8-ethyl-2-(piperidin-3-ylamino)quinazolin-6-yl)-2-fluorophenyl)benzenesulfonamide;

N-(4-(2-(((1R,3R,4R)-4-amino-3-methylcyclohexyl)amino)-8-ethylquinazolin-6-yl)-2-fluorophenyl)-2-chlorobenzenesulfonamide;

N-(4-(2-(((1R,3 S)-3-aminocyclohexyl)amino)quinazolin-6-yl)-2-fluorophenyl)-2-chlorobenzenesulfonamide;

(S)-2-chloro-N-(2-fluoro-4-(2-(piperidin-3-ylamino)quinazolin-6-yl)phenyl)benzenesulfonamide;

N-(4-(2-(((1R,3R)-3-aminocyclopentyl)amino)quinazolin-6-yl)-2-fluorophenyl)-2-chlorobenzenesulfonamide;

N-(4-(2-(((1R,3R)-3-aminocyclopentyl)amino)-8-ethylquinazolin-6-yl)-2-fluorophenyl)-2-chlorobenzenesulfonamide;

N-(4-(2-(((1R,3S)-3-aminocyclopentyl)amino)-8-ethylquinazolin-6-yl)-2-fluorophenyl)-2-chlorobenzenesulfonamide;

N-(4-(2-(((1R,3S)-3-aminocyclopentyl)amino)quinazolin-6-yl)-2-fluorophenyl)-2-chlorobenzenesulfonamide;

N-(4-(2-((4-aminobicyclo[2.2.2]octan-1-yl)amino)quinazolin-6-yl)-2-fluorophenyl)-2-chlorobenzenesulfonamide;

N-(4-(2-(((2r,5r)-5-aminooctahydropentalen-2-yl)amino)-8-ethylquinazolin-6-yl)-2-fluoropentyl)-2-chlorobenzenesulfonamide;

N-(4-(2-(((2r,5r)-5-aminooctahydropentalen-2-yl)amino)-8-ethylquinazolin-6-yl)-2-fluorophenyl)-2-chlorobenzenesulfonamide;

N-(4-(2-(((2s,5s)-5-aminooctahydropentalen-2-yl)amino)-8-ethylquinazolin-6-yl)-2-fluorophenyl)-2-chlorobenzenesulfonamide;

N-(4-(2-(((2s,5s)-5-aminooctahydropentalen-2-yl)amino)quinazolin-6-yl)-2-fluorophenyl)-2-chlorobenzenesulfonamide;

N-(4-(2-((4-aminobicyclo[2.2.1]heptan-1-yl)amino)quinazolin-6-yl)-2-fluorophenyl)-2-chlorobenzenesulfonamide;

N-(4-(2-((4-aminobicyclo[2.2.2]octan-1-yl)amino)-8-ethylquinazolin-6-yl)-2-fluorophenyl)-2-chlorobenzenesulfonamide;

2-chloro-N-(4-(8-ethyl-2-(((1r,4r)-4-(pyrrolidin-1-yl)cyclohexyl)amino)quinazolin-6-yl)-2-fluorophenyl)benzenesulfonamide;

N-(5-(2-(((1r,4r)-4-aminocyclohexyl)amino)quinazolin-6-yl)-1,3,4-thiadiazol-2-yl)-2-chlorobenzenesulfonamide;

N-(4-(2-(((1r,4r)-4-aminocyclohexyl)amino)-7-methylquinazolin-6-yl)-2-fluorophenyl)-2-chlorobenzenesulfonamide;

N-(5-(2-(((1r,4r)-4-aminocyclohexyl)amino)-8-ethylquinazolin-6-yl)-4-methoxypyridin-2-yl)-2-chlorobenzenesulfonamide;

N-(6-(2-(((1r,4r)-4-aminocyclohexyl)amino)-8-ethylquinazolin-6-yl)-5-methoxypyridin-3-yl)-2-chlorobenzenesulfonamide;

N-(5-(2-(((1r,4r)-4-aminocyclohexyl)amino)-8-ethylquinazolin-6-yl)-6-methylpyrazin-2-yl)-2-chlorobenzenesulfonamide;

2-chloro-N-(5-(2-(((1r,4r)-4-(dimethylamino)cyclohexyl)amino)-8-ethylquinazolin-6-yl)-3-fluoropyridin-2-yl)benzenesulfonamide;

N-(6-(2-(((1r,4r)-4-aminocyclohexyl)amino)-8-ethylquinazolin-6-yl)-5-ethylpyridazin-3-yl)-2-chlorobenzenesulfonamide; and N-(5-(2-(((1r,4r)-4-aminocyclohexyl)amino)-8-ethylquinazolin-6-yl)-6-methoxypyrazin-2-yl)-2-chlorobenzenesulfonamide;

and pharmaceutically acceptable salts thereof.

18. The method of claim 1, wherein fibrosis is liver fibrosis, cirrhosis, kidney fibrosis (optionally kidney fibrosis associated with chronic kidney disease (CKD) or End-Stage Renal Disease (ESRD)), peritoneal fibrosis, chronic hepatic damage, fibrillogenesis, fibrotic diseases in other organs, abnormal scarring (optionally keloids or hypertrophic scars) associated skin injury (optionally accidental skin injury and iatrogenic injury from a medical treatment or surgery), scleroderma, cardiofibrosis, failure of glaucoma filtering operation, intestinal adhesions, aberrant wound healing, alcoholic liver damage-induced liver fibrosis, bridging fibrosis, Crohn's Disease (fibrosis of the intestine), cystic fibrosis of the pancreas or lungs, injection fibrosis (optionally as a complication of intramuscular injections, especially in children), endomyocardial fibrosis, cardiac fibrosis, fibrosis resulting from Graft-Versus-Host Disease (GVHD), fibrosis of the spleen, fibrosis of the eye (optionally subretinal fibrosis), glomerulonephritis, interstitial fibrosis, macular degeneration, mediastinal fibrosis (fibrosis of the soft tissue of the mediastinum), morphea, multifocal fibrosclerosis, myelofibrosis (fibrosis of the bone marrow), nephrogenic systemic fibrosis (fibrosis of the skin in advanced kidney failure patients), nodular subepidermal fibrosis (optionally benign fibrous histiocytoma), pleural fibrosis, fibrosis as a consequence of surgery (optionally, from surgical implants), proliferative fibrosis, pipestem fibrosis, postfibrinous fibrosis, old myocardial infarction (fibrosis of the heart), pancreatic fibrosis, progressive massive fibrosis, radiation fibrosis, renal fibrosis, renal fibrosis related to or arising from chronic kidney disease, retroperitoneal fibrosis (fibrosis of the soft tissue of the retroperitoneum), systemic sclerosis (fibrosis of the skin), subepithelial fibrosis, uterine fibrosis, viral hepatitis induced fibrosis, nonalcoholic fatty liver disease (NAFLD), or nonalcoholic steatohepatitis (NASH).

19. The method of claim 1, wherein fibrosis is lung fibrosis.

20. The method of claim 1, comprising administering the compound of Formula (I) or a pharmaceutically acceptable salt thereof in combination with a second therapeutic agent.

* * * * *